US009838550B2

(12) United States Patent
Kusaka et al.

(10) Patent No.: US 9,838,550 B2
(45) Date of Patent: *Dec. 5, 2017

(54) IMAGE DISPLAY APPARATUS HAVING IMAGE-RELATED INFORMATION DISPLAYING FUNCTION

(71) Applicant: NIKON CORPORATION, Tokyo (JP)

(72) Inventors: Yosuke Kusaka, Yokohama (JP); Shoei Nakamura, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/342,266

(22) Filed: Nov. 3, 2016

(65) Prior Publication Data

US 2017/0054932 A1    Feb. 23, 2017

Related U.S. Application Data

(60) Continuation of application No. 15/160,379, filed on May 20, 2016, now Pat. No. 9,578,186, which is a
(Continued)

(30) Foreign Application Priority Data

| Dec. 3, 2001 | (JP) | 2001-368014 |
| Dec. 7, 2001 | (JP) | 2001-373831 |
| Dec. 10, 2001 | (JP) | 2001-375568 |

(51) Int. Cl.
*H04N 1/00* (2006.01)
*H04N 5/232* (2006.01)
(Continued)

(52) U.S. Cl.
CPC ......... *H04N 1/00153* (2013.01); *G06F 3/005* (2013.01); *G06F 3/041* (2013.01);
(Continued)

(58) Field of Classification Search
CPC ........... H04N 1/00204; H04N 1/00127; H04N 1/00153; H04N 1/00151; H04N 1/00164;
(Continued)

(56) References Cited

U.S. PATENT DOCUMENTS

| 5,296,884 A | 3/1994 | Honda et al. |
| 5,604,531 A | 2/1997 | Iddan et al. |

(Continued)

FOREIGN PATENT DOCUMENTS

| JP | H10-4534 A | 1/1998 |
| JP | H10-341388 A | 12/1998 |

(Continued)

OTHER PUBLICATIONS

Apr. 27, 2017 Office Action issued in U.S. Appl. No. 15/131,395.
Nov. 22, 2016 Office Action issued in U.S. Appl. No. 15/131,395.
Jul. 26, 2016 Office Action issued in U.S. Appl. No. 15/131,395.

*Primary Examiner* — John Villecco
(74) *Attorney, Agent, or Firm* — Oliff PLC

(57) ABSTRACT

A first mobile electronic device includes an image sensor that outputs image data from an image of a subject received through a lens of the first mobile electronic device, a first communication circuit and a second communication circuit. The first communication circuit transmits the image data to a server. The second communication circuit is different from the first communication circuit and transmits information by which to obtain the image data from the server to a second mobile electronic device so that the image data can be obtained from the server by the second mobile electronic device using the information.

30 Claims, 99 Drawing Sheets

Related U.S. Application Data continuation of application No. 14/808,549, filed on Jul. 24, 2015, now abandoned, which is a division of application No. 14/327,903, filed on Jul. 10, 2014, now abandoned, which is a continuation of application No. 13/909,283, filed on Jun. 4, 2013, now Pat. No. 8,804,006, which is a continuation of application No. 12/926,564, filed on Nov. 24, 2010, now Pat. No. 8,482,634, which is a continuation of application No. 12/149,231, filed on Apr. 29, 2008, now Pat. No. 7,864,218, which is a continuation of application No. 10/497,146, filed as application No. PCT/JP02/12625 on Dec. 3, 2002, now Pat. No. 7,382,405.

(51) Int. Cl.
| | |
|---|---|
| H04N 5/44 | (2011.01) |
| G06K 9/00 | (2006.01) |
| H04N 5/225 | (2006.01) |
| G08B 13/196 | (2006.01) |
| H04N 1/32 | (2006.01) |
| G06F 3/041 | (2006.01) |
| G06F 3/0488 | (2013.01) |
| G06F 3/00 | (2006.01) |

(52) U.S. Cl.
CPC ..... *G06F 3/04883* (2013.01); *G06K 9/00221* (2013.01); *G06K 9/00536* (2013.01); *G08B 13/19656* (2013.01); *H04N 1/0097* (2013.01); *H04N 1/00106* (2013.01); *H04N 1/00114* (2013.01); *H04N 1/00129* (2013.01); *H04N 1/00251* (2013.01); *H04N 1/00281* (2013.01); *H04N 1/32101* (2013.01); *H04N 5/225* (2013.01); *H04N 5/2256* (2013.01); *H04N 5/2257* (2013.01); *H04N 5/23216* (2013.01); *H04N 5/23219* (2013.01); *H04N 5/23222* (2013.01); *H04N 5/23245* (2013.01); *H04N 5/23293* (2013.01); *H04N 5/44* (2013.01); *G06F 2203/04808* (2013.01); *H04N 2201/0084* (2013.01)

(58) Field of Classification Search
CPC .......... H04N 5/23206; G08B 13/19656; G08B 13/19658
USPC ............................ 725/105; 348/207.1, 211.3
See application file for complete search history.

(56) References Cited

U.S. PATENT DOCUMENTS

| | | | |
|---|---|---|---|
| 5,682,142 A | 10/1997 | Loosmore et al. | |
| 5,768,633 A | 6/1998 | Allen et al. | |
| 5,805,215 A | 9/1998 | Mizoguchi | |
| 5,999,213 A | 12/1999 | Tsushima et al. | |
| 6,037,936 A | 3/2000 | Ellenby et al. | |
| 6,070,167 A | 5/2000 | Qian et al. | |
| 6,137,597 A * | 10/2000 | Kanaya | H04L 29/1215 358/402 |
| 6,191,819 B1 | 2/2001 | Nakano | |
| 6,282,362 B1 | 8/2001 | Murphy et al. | |
| 6,337,712 B1 | 1/2002 | Shiota et al. | |
| 6,337,951 B1 | 1/2002 | Nakamura | |
| 6,384,927 B1 * | 5/2002 | Mori | H04N 1/00204 358/1.15 |
| 6,388,707 B1 | 5/2002 | Suda | |
| 6,396,537 B1 | 5/2002 | Squilla et al. | |
| 6,417,913 B2 | 7/2002 | Tanaka | |
| 6,424,376 B1 | 7/2002 | Hirasawa | |
| 6,437,797 B1 | 8/2002 | Ota | |
| 6,470,264 B2 | 10/2002 | Bide | |
| 6,526,158 B1 | 2/2003 | Goldberg | |
| 6,538,698 B1 | 3/2003 | Anderson | |
| 6,628,325 B1 | 9/2003 | Steinberg et al. | |
| 6,628,333 B1 | 9/2003 | Gowda et al. | |
| 6,628,899 B1 | 9/2003 | Kito | |
| 6,642,959 B1 | 11/2003 | Arai | |
| 6,670,933 B1 | 12/2003 | Yamazaki | |
| 6,690,883 B2 | 2/2004 | Pelletier | |
| 6,694,133 B1 | 2/2004 | Tobita et al. | |
| 6,715,003 B1 | 3/2004 | Safai | |
| 6,789,113 B1 | 9/2004 | Tanaka | |
| 6,906,818 B1 | 6/2005 | Makishima | |
| 6,909,889 B2 | 6/2005 | Ishikawa | |
| 6,919,927 B1 | 7/2005 | Hyodo | |
| 6,957,040 B1 | 10/2005 | Tanaka | |
| 6,961,540 B1 | 11/2005 | Kondoh | |
| 6,970,189 B1 | 11/2005 | Bernstein et al. | |
| 6,980,234 B2 | 12/2005 | Kitawaki | |
| 6,999,112 B2 | 2/2006 | Seaman et al. | |
| 7,034,684 B2 | 4/2006 | Boman et al. | |
| 7,075,573 B2 | 7/2006 | Imaeda | |
| 7,102,670 B2 | 9/2006 | Seaman et al. | |
| 7,146,188 B2 | 12/2006 | Deeds | |
| 7,248,285 B2 | 7/2007 | Needham | |
| 7,298,520 B2 | 11/2007 | Ohkubo et al. | |
| 7,321,763 B2 | 1/2008 | Tanaka et al. | |
| 7,333,140 B2 | 2/2008 | Suda | |
| 7,339,610 B2 | 3/2008 | Kusaka | |
| 7,355,632 B2 | 4/2008 | Shiiyama | |
| 7,362,219 B2 | 4/2008 | Nogami et al. | |
| 7,382,405 B2 | 6/2008 | Kusaka et al. | |
| 7,446,800 B2 | 11/2008 | Holmes | |
| 7,477,841 B2 | 1/2009 | Yamaguchi et al. | |
| 7,636,733 B1 | 12/2009 | Rothmuller | |
| 7,646,409 B2 | 1/2010 | Tsuda et al. | |
| 7,864,218 B2 | 1/2011 | Kusaka et al. | |
| 8,015,189 B2 | 9/2011 | Naaman | |
| 8,164,426 B1 | 4/2012 | Steinhart et al. | |
| 8,212,909 B2 | 7/2012 | Nozaki et al. | |
| 8,482,634 B2 | 7/2013 | Kusaka et al. | |
| 8,614,753 B2 | 12/2013 | Ko et al. | |
| 8,804,006 B2 | 8/2014 | Kusaka et al. | |
| 2001/0009456 A1 | 7/2001 | Tanaka | |
| 2001/0016820 A1 | 8/2001 | Tanaka et al. | |
| 2001/0024236 A1 | 9/2001 | Sato | |
| 2001/0032335 A1 | 10/2001 | Jones | |
| 2001/0048534 A1 | 12/2001 | Tanaka et al. | |
| 2002/0001468 A1 | 1/2002 | Kaku | |
| 2002/0012048 A1 | 1/2002 | Yamagishi | |
| 2002/0047905 A1 | 4/2002 | Kinjo | |
| 2002/0047916 A1 | 4/2002 | Miyagi et al. | |
| 2002/0051207 A1 | 5/2002 | Ohkubo et al. | |
| 2002/0054331 A1 | 5/2002 | Takenobu et al. | |
| 2002/0069239 A1 * | 6/2002 | Katada | G06F 3/1204 709/202 |
| 2002/0076217 A1 | 6/2002 | Rodriguez et al. | |
| 2002/0101519 A1 | 8/2002 | Myers | |
| 2002/0171747 A1 | 11/2002 | Niikawa et al. | |
| 2003/0058110 A1 | 3/2003 | Rich | |
| 2003/0058343 A1 | 3/2003 | Katayama | |
| 2003/0058353 A1 | 3/2003 | Tsue | |
| 2003/0081126 A1 | 5/2003 | Seaman et al. | |
| 2003/0095197 A1 | 5/2003 | Wheeler et al. | |
| 2003/0129970 A1 * | 7/2003 | Kawaoka | B41J 3/44 455/412.1 |
| 2003/0208409 A1 | 11/2003 | Mault | |
| 2004/0051787 A1 | 3/2004 | Mutsuro et al. | |
| 2004/0087273 A1 | 5/2004 | Perttila et al. | |
| 2004/0125216 A1 | 7/2004 | Keskar et al. | |
| 2004/0174435 A1 | 9/2004 | Kondoh | |
| 2004/0201683 A1 | 10/2004 | Murashita et al. | |
| 2004/0202382 A1 | 10/2004 | Pilu | |
| 2004/0263631 A1 | 12/2004 | Brittan et al. | |
| 2005/0104956 A1 | 5/2005 | Ono et al. | |
| 2005/0104976 A1 | 5/2005 | Currans | |
| 2005/0116821 A1 | 6/2005 | Wilsey et al. | |
| 2005/0179811 A1 | 8/2005 | Palatov | |
| 2005/0285944 A1 | 12/2005 | Watanabe et al. | |
| 2006/0007315 A1 | 1/2006 | Singh | |
| 2006/0007319 A1 | 1/2006 | Kitawaki | |

(56) References Cited

U.S. PATENT DOCUMENTS

| | | |
|---|---|---|
| 2006/0038896 A1 | 2/2006 | Tsuda et al. |
| 2006/0044402 A1 | 3/2006 | Segawa et al. |
| 2006/0110154 A1 | 5/2006 | Hulsen et al. |
| 2006/0190812 A1 | 8/2006 | Ellenby et al. |
| 2006/0197842 A1 | 9/2006 | Akaho et al. |
| 2006/0264209 A1 * | 11/2006 | Atkinson ............ G06F 17/3028 455/422.1 |
| 2008/0079984 A1 * | 4/2008 | Gallucci ........... G06F 17/30017 358/1.15 |
| 2009/0009626 A1 | 1/2009 | Ko et al. |
| 2012/0062766 A1 | 3/2012 | Park |

FOREIGN PATENT DOCUMENTS

| | | | | |
|---|---|---|---|---|
| JP | H11-72348 A | | 3/1999 | |
| JP | H11-164282 A | | 6/1999 | |
| JP | 11224228 A | * | 8/1999 | ........... G06Q 10/107 |
| JP | 2000-023015 A | | 1/2000 | |
| JP | 2000-151498 A | | 5/2000 | |
| JP | 2000-278037 A | | 10/2000 | |
| JP | 2001-014277 A | | 1/2001 | |
| JP | 2001-144767 A | | 5/2001 | |
| JP | 2001-177742 A | | 6/2001 | |
| JP | 2001-197150 A | | 7/2001 | |
| JP | 2001-223712 A | | 8/2001 | |
| JP | 2001313756 A | * | 11/2001 | ......... G06Q 30/0633 |
| JP | 2002024078 A | * | 1/2002 | |
| JP | 2002-094857 A | | 3/2002 | |
| JP | 2002-112074 A | | 4/2002 | |
| JP | 2002183743 A | * | 6/2002 | ............. G06T 11/80 |
| JP | 2002-271672 A | | 9/2002 | |
| JP | 2002-279394 A | | 9/2002 | |
| JP | 2002-305717 A | | 10/2002 | |
| JP | 2002-320172 A | | 10/2002 | |
| JP | 2002-344867 A | | 11/2002 | |
| JP | 2003-018070 A | | 1/2003 | |
| JP | 2003271650 A | * | 9/2003 | |
| JP | 2004-260304 A | | 9/2004 | |
| JP | 2006-059292 A | | 3/2006 | |
| JP | 2006-060741 A | | 3/2006 | |
| JP | 2007-102575 A | | 4/2007 | |
| JP | 2007-251706 A | | 9/2007 | |
| JP | 2007-272836 A | | 10/2007 | |
| KR | 819812 B1 | | 4/2008 | |

* cited by examiner

FIG. 6

PERSONAL INFORMATION DATA

| |
|---|
| FILING NUMBER |
| NAME |
| GENDER |
| DATE OF BIRTH |
| PLACE OF BIRTH |
| IMAGE DATA (FACE, FULL BODY) |
| FAMILY INFORMATION (FAMILY STRUCTURE, MEMBER NAMES, MEMBER'S DATES OF BIRTH) |
| JOB INFORMATION (EMPLOYER, DEPARTMENT, POSITION, CONTACT, COMMUTING ROUTE), CAREER HISTORY |
| ACADEMIC HISTORY |
| LICENSE INFORMATION (DRIVER'S LICENSE NUMBER, VEHICLE NUMBER, ETC.) |
| OFFICIAL INFORMATION (SOCIAL INSURANCE NUMBER, HISTORY OF AWARDS AND PUNISHMENTS, ETC.) |
| SPECIALTY |
| NATIONALITY |
| LANGUAGES |
| HEALTH INFORMATION (HEALTH HISTORY) |
| VISUAL ACUITY (DIOPTER, VISION, FAVORED-EYE, COLOR-BLINDNESS, VISION CORRECTION WITH GLASSES, ETC.) |
| PHYSICAL DATA (FAVORED HAND, HEIGHT, WEIGHT) |
| TASTES (FOOD, SEASONS, COLORS, HOBBIES, SPORTS, MUSIC CATEGORIES, ENTERTAINMENT CATEGORIES) |
| ACCESS DATA (POSTAL ADDRESS, E-MAIL ADDRESS, HOMEPAGE URL, IMAGE SAVE LOCATION, TELEPHONE NUMBER) |
| CREDIT INFORMATION (BANKING INSTITUTIONS, ACCOUNT NUMBERS, CREDIT CARD NUMBERS, ETC.) |
| PUBLIC (OPEN) KEY |
| PASSWORD |
| NICKNAMES |
| ADDRESS BOOK (FRIENDS' TELEPHONE NUMBERS, E-MAIL ADDRESSES) |
| FAVORITES (INTERNET URLS, INFORMATION SOURCES) |
| APPLICATION EQUIPMENT (VEHICLE MODEL, PC MODEL, OS TYPE, SOFTWARE VERSION NUMBERS, PORTABLE TELEPHONE MODEL, ETC.) |

USER IDENTIFICATION PROCESSING

| DETECTION RESULTS | SETTING | DISPLAY |
|---|---|---|
| NUMBER DETECTED=0 | USER=DEFAULT | DEFAULT |
| NUMBER DETECTED=1 | USER=DETECTED USER | DETECTED USER |
| NUMBER DETECTED≧2 | USER=AUTOMATICALLY SELECTED | AUTOMATICALLY SELECTED USER |

161

161

FIG. 62
PHOTOGRAPHING INFORMATION DATA

| ITEM | CONTENTS |
|---|---|
| PHOTOGRAPHIC LENS | 50-100mm/f4 |
| PHOTOGRAPHIC FOCAL LENGTH | 80mm |
| PHOTOGRAPHIC APERTURE VALUE | f4 |
| SHUTTER SPEED | 1/250 |
| EXPOSURE | LEVEL + 0.5 |
| FOCUS | + 50 μm |
| STROBE | YES |
| STROBE LIGHT QUANTITY | LEVEL - 1 |
|  |  |

FIG. 63
GENERAL INFORMATION DATA

| INFORMATION A: INTERNET ACCESS INFORMATION DATA |
|---|
| INFORMATION A: CONTENTS DATA |
| INFORMATION A: POSITION INFORMATION DATA |
| INFORMATION B: INTERNET ACCESS INFORMATION DATA |
| INFORMATION B: CONTENTS DATA |
| INFORMATION B: POSITION INFORMATION DATA |
|  |

FIG. 64
PERSONAL INFORMATION DATA

| |
|---|
| IMAGE-PLANE POSITION INFORMATION DATA |
| POSITION INFORMATION DATA |
| INTERNET ACCESS INFORMATION DATA (HOME PAGE URL) |
| NAME |
| GENDER |
| DATE OF BIRTH |
| PLACE OF BIRTH |
| IMAGE DATA (FACE, FULL BODY) |
| AUDIO DATA (SELF INTRODUCTION) |
| FAMILY INFORMATION (FAMILY STRUCTURE, MEMBER NAMES, MEMBER'S DATES OF BIRTH) |
| JOB INFORMATION (EMPLOYER, DEPARTMENT, POSITION, CONTACT, COMMUTING ROUTE), CAREER HISTORY |
| ACADEMIC HISTORY |
| LICENSE INFORMATION (DRIVER'S LICENSE NUMBER, VEHICLE NUMBER, ETC.) |
| OFFICIAL INFORMATION (SOCIAL INSURANCE NUMBER, HISTORY OF AWARDS AND PUNISHMENTS, ETC.) |
| SPECIALTY |
| NATIONALITY |
| LANGUAGES |
| HEALTH INFORMATION (HEALTH HISTORY) |
| VISUAL ACUITY (DIOPTER, VISION, FAVORED-EYE, COLOR-BLINDNESS, VISION CORRECTION WITH GLASSES, ETC.) |
| PHYSICAL DATA (FAVORED HAND, HEIGHT, WEIGHT) |
| TASTES OR PERSON'S LIKING (FOOD, SEASONS, COLORS, HOBBIES, SPORTS, MUSIC CATEGORIES, ENTERTAINMENT CATEGORIES) |
| GENERAL ACCESS INFORMATION DATA (POSTAL ADDRESS, E-MAIL ADDRESS, IMAGE SAVE LOCATION, TELEPHONE NUMBER) |
| CREDIT INFORMATION (BANKING INSTITUTIONS, ACCOUNT NUMBERS, CREDIT CARD NUMBERS, ETC.) |
| OPEN KEY |
| PASSWORD |
| NICKNAMES |
| ADDRESS BOOK (FRIENDS' TELEPHONE NUMBERS, E-MAIL ADDRESSES) |
| FAVORITES (INTERNET URLS, INFORMATION SOURCES) |
| EQUIPMENT (VEHICLE MODEL, PC MODEL, OS TYPE, SOFTWARE VERSION NUMBERS, PORTABLE TELEPHONE MODEL, ETC.) |

(x1, y1)  (x2, y2)

F I G. 88
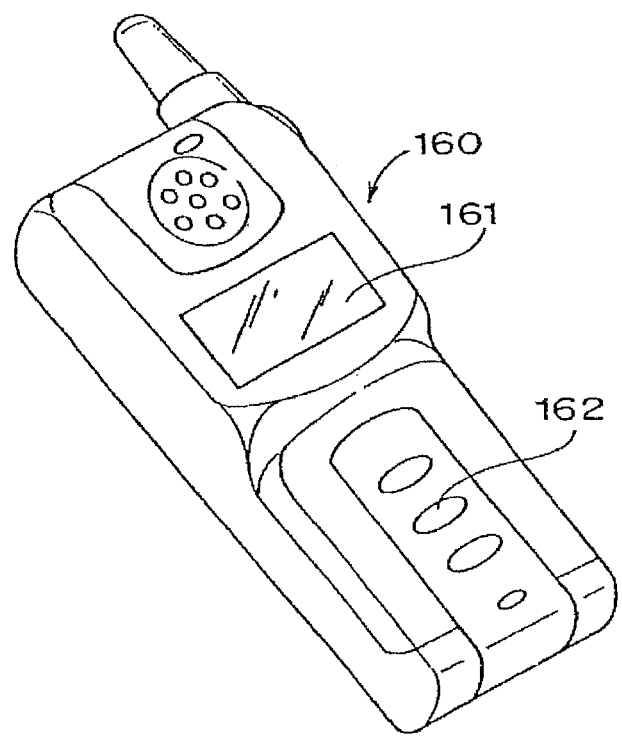

| UPLOAD DIAL NUMBER | UPLOAD LOCATION |
|---|---|
| 1 | IMAGE SERVER W |
| 2 | IMAGE SERVER X |
| 3 | IMAGE SERVER Y |
| 4 | IMAGE SERVER Z |

FIG. 106
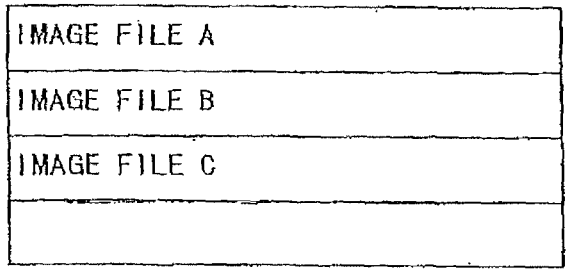
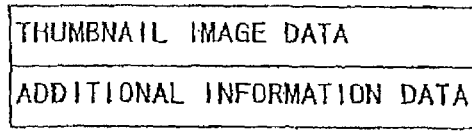
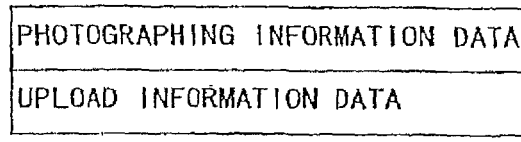 → TO FIG. 107
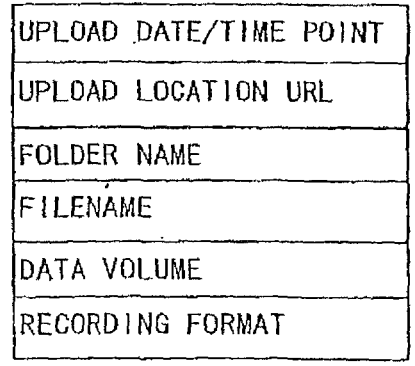

PHOTOGRAPHING INFORMATION DATA

| ITEM | CONTENTS |
|---|---|
| PHOTOGRAPHING DATE/TIME POINT | OCOTBER 31, 2001/10:58:47 |
| PHOTOGRAPHIC LENS | 50-100mm/f4 |
| PHOTOGRAPHIC FOCAL LENGTH | 80mm |
| PHOTOGRAPHIC APERTURE VALUE | f4 |
| SHUTTER SPEED | 1/250 |
| EXPOSURE | LEVEL +0.5 |
| FOCUS | +50 MICRONS |
| STROBE | YES |
| STROBE LIGHT QUANTITY | LEVEL -1 |
|  |  |

IMAGE DISPLAY APPARATUS HAVING IMAGE-RELATED INFORMATION DISPLAYING FUNCTION

This is a Continuation of application Ser. No. 15/160,379 filed May 20, 2016 (now U.S. Pat. No. 9,578,186), which in turn is a Continuation of application Ser. No. 14/808,549 filed Jul. 24, 2015 (now abandoned), which in turn is a Division of application Ser. No. 14/327,903 filed Jul. 10, 2014 (now abandoned), which is a Continuation of U.S. patent application Ser. No. 13/909,283, filed Jun. 4, 2013 (now U.S. Pat. No. 8,804,006), which is a Continuation of U.S. patent application Ser. No. 12/926,564 filed Nov. 24, 2010 (now U.S. Pat. No. 8,482,634), which is a Continuation of U.S. patent application Ser. No. 12/149,231 filed Apr. 29, 2008 (now U.S. Pat. No. 7,864,218), which is a Continuation of U.S. patent application Ser. No. 10/497,146, filed May 28, 2004 (now U.S. Pat. No. 7,382,405), which is a National Phase of International Patent Application No. PCT/JP2002/12625, filed Dec. 3, 2002. The entire contents of each of the above-identified applications are hereby incorporated by reference.

The disclosures of the following priority applications are herein incorporated by reference in their entireties: Japanese Patent Application No. 2001-368014 filed Dec. 3, 2001; Japanese Patent Application No. 2001-373831 filed Dec. 7, 2001 and Japanese Patent Application No. 2001-375568 filed Dec. 10, 2001.

BACKGROUND

The present invention relates to an electronic apparatus that identifies a user and performs an operation corresponding to the user and a method for identifying a user of an electronic apparatus and identifying an electronic apparatus to be utilized by the user and, more specifically, it relates to an electronic apparatus that identifies a user through communication executed between the electronic apparatus and the user and a method for identifying an electronic apparatus user and an electronic apparatus to be utilized by a user by executing communication between the electronic apparatus and the user.

The present invention also relates to an electronic camera, an image display apparatus and an image display system that stores electronic image data obtained by photographing a desired subject with the electronic camera into a storage medium, reads out the electronic image data from the storage medium and displays an image reproduced from the electronic image data at a specific screen and, more specifically, it relates to an electronic camera, an image display apparatus and an image display system that brings up a display of information related to the image data at the screen at which the image reproduced from the image data is displayed.

In addition, the present invention relates to an information transmission system and an information transmission method through which data are exchanged among portable terminals or the like and, more specifically, it relates to an image transmission system and an image transmission method through which electronic image data obtained by photographing a desired subject with a photographing apparatus such as an electronic camera are transmitted to an electronic instrument such as a portable telephone terminal having an image display function.

Electronic apparatuses such as cameras that identify electronic apparatus users and engage in a specific operation corresponding to a given user are known in the related art. For instance, Japanese Laid-Open Patent Publication No. H 11-164282 discloses a digital camera having a card read unit, which allows a user to enter personal information to the digital camera through the card reader unit, automatically connects with a data server corresponding to the user based upon the entered personal information and automatically transfers image data obtained through a photographing operation performed with the digital camera to the data server.

The electronic apparatus in the related art described above requires a magnetic card or a memory card having stored therein the personal information to be directly loaded at the electronic apparatus or necessitates a wired connection of the magnetic card or the memory card to the electronic apparatus so that the personal information can be read into the electronic apparatus.

However, having to directly load a magnetic card or a memory card at the electronic apparatus or connect the magnetic card or the memory card to the electronic apparatus, by means of wiring, each time the user needs to use the electronic apparatus places a considerable onus on the user and, moreover, there is a problem in that the electronic apparatus cannot be used immediately in a situation that arises suddenly. For instance, there is a risk of missing a good photo opportunity while setting the personal information in the digital camera.

In addition, in the electronic apparatus in the related art described above, the personal information is utilized for limited purposes such as the automatic selection of the recipient to which images are to be transmitted and setting and display operations are performed in the electronic apparatus without fully reflecting the personal information. As a result, the user may not always be satisfied with the ease of operation it affords. The design of the electronic apparatus is particularly lax in consideration of users such as first-time users, seniors and children, who may not be accustomed to operating electronic apparatuses.

People also store image data obtained through a photographing operation performed with an electronic camera on a trip or the like into a memory card and later review images reproduced from the image data displayed at a liquid crystal display screen of the electronic camera in which the memory card is loaded or at a screen of a personal computer to which the image data have been transferred from the memory card.

The user reviewing electronic image data in the related art as described above is simply allowed to view the reproduced images on display, and there is difficulty in expanding the range of information utilization beyond reviewing of the images.

For instance, if the user becomes interested in a historical structure or the like photographed in the image he is currently reviewing, he has to stop reviewing images temporarily to look it up in an encyclopedia or to conduct a search on the Internet. In addition, if the user becomes interested in a person (the person's name, hobby, etc.) photographed in the image he is reviewing, the user cannot obtain that person's personal information immediately on the spot.

In addition, image data obtained through a photographing operation of an electronic camera are transferred to another image display terminal for reviewing the image data through an off-line information transmission method, in which the image data are temporarily saved into a memory card and then the memory card is loaded at the other image display terminal or through an on-line information transmission method, in which the image data are transmitted through a wireless or wired communication from the electronic camera to the other image display terminal, in the related art. For instance, Japanese Laid-Open Patent Publication No. H 10-341388 discloses an image transmission system which enables a direct transmission of image data from an electronic camera to another electronic camera through optical communication achieved by using infrared light.

There are disadvantages to the off-line image transmission system and the off-line image transmission method in the related art described above in that since they necessitate an exchange of an information storage medium such as a memory card between the electronic camera and the image display terminal, the storage medium must be frequently loaded and unloaded, and data cannot be obtained and recorded through a photographing operation in the meantime, and in that since the recording medium must be physically transported, there is a time lag before the data can be utilized on the recipient side.

While the need to transport the information recording medium is eliminated by adopting the on-line transmission system and the on-line image transmission method in the related art described above, there is a problem in that data cannot be obtained and recorded through a photographing operation or the like while communication is in progress at a low transmission speed. In particular, the length of time required to transmit image data the volume of which is much larger than that of standard text data or the like tends to be very significant. Furthermore, when image data of a group picture of a number of people taken with an electronic camera are directly transmitted by the electronic camera to portable telephones or the like of the plurality of subjects, the image data transmission takes a great deal of time.

SUMMARY

The present invention provides, preferably, an electronic apparatus that has a user identification function for performing identification of the user of the electronic apparatus through a wireless method so as to speed up the user identification without placing an onus on the user and for effectively preventing an erroneous identification that would identify a party other than the user when executing the user identification through the wireless method and a user identification method that may be adopted in the electronic apparatus.

The present invention also provides, preferably, an electronic apparatus identification method in which identification of an electronic apparatus to be utilized by a user is executed through a wireless method so as to speed up the identification without placing an onus on the user, and an erroneous identification that would identify another electronic apparatus different from the intended electronic apparatus as the electronic apparatus to be utilized is effectively prevented when electronic apparatus identification is executed through the wireless method.

The present invention further provides, preferably, an electronic apparatus that has a user identification function that allows beginners/unexperienced users, elderly persons and children as well as experienced users to operate the same electronic apparatus with ease, without requiring any special data input or registration setting to enable the electronic apparatus to execute a user identification.

The present invention further provides, preferably, an electronic camera, an image display apparatus and an image display method that enable an easy and prompt review of information related to a subject photographed in an image, which interests the user reviewing a reproduced display of electronic image data in linkage with the reproduced display of the electronic image data.

The present invention also provides, preferably, an image transmission system and an image transmission method that allow images to be transmitted to an image recipient side in a short time without placing an onus on the image sender side during an image transmission. More specifically, it provides an image transmission system and an image transmission method that allow image data obtained through a photographing operation executed in an electronic camera to be promptly transmitted to a partner-side electronic instrument without placing a great onus on the electronic camera. Furthermore, the present invention provides an image transmission system and an image transmission method that enable distribution of image data obtained through a photographing operation executed in an electronic camera to portable terminals carried by a plurality of parties who are subjects without placing a great onus on the electronic camera.

In the electronic apparatus having a user identification function and the identification method according to the present invention, the electronic apparatus automatically identifies the user of the electronic apparatus through wireless communication executed between the electronic apparatus and an electronic instrument having stored therein user personal information. In addition, if the electronic apparatus identifies a plurality of possible users, the electronic apparatus automatically selects the correct user based upon specific user identification processing.

In the electronic apparatus identification method according to the present invention, an electronic instrument carried by a user automatically identifies an utilization-object, or target, electronic apparatus through wireless communication executed between the electronic apparatus and the electronic instrument. In addition, if the electronic instrument identifies a plurality of possible utilization-object electronic apparatuses, the electronic instrument automatically selects the correct electronic apparatus based upon specific identification processing.

In the electronic apparatus having a user identification function and the identification method adopted in the electronic apparatus according to the present invention, the electronic apparatus engages in wireless communication with an electronic instrument having stored therein personal information that is available for general purposes and in the electronic apparatus, to have the personal information transferred to the electronic apparatus. The user is categorized based upon the personal information available for general purposes and various operational settings are automatically selected for the electronic apparatus based upon the categorization results.

In the electronic camera, the image display apparatus and the image display method according to the present invention, information related to a subject, which is made to correlate to the position of the subject in the image plane is appended to the electronic image data and stored in memory and the information related to the subject is displayed in correspondence to the subject position within the image plane in a reproduced display of the electronic image data.

In the information transmission system (or image transmission system) and the information transmission method (or image transmission method) according to the present invention, an image generating apparatus (a photographing apparatus, or an electronic camera) has a function which allows it to be connected to the Internet, information (or an image) that has been generated and appended with identification data (or a file name), is first transmitted to a specific information server (or image server) on the Internet where it is temporarily saved (or uploaded), a direct connection is established with an electronic instrument which is the recipient of the information (image) through a short-distance communication, information indicating the address of the Information server (or image server) on the Internet and the identification data corresponding to the generated information (image) are transmitted to the electronic instrument and the electronic instrument utilizes the information (image) by reading it out (or downloading) from the Information server (or image server) on the Internet based upon the address information and the identification data having been received.

In the information transmission system (or image transmission system) and the information transmission method (or image transmission method) according to the present invention, an image generating apparatus (a photographing apparatus, or an electronic camera) achieves a direct connection with an electronic instrument which is the recipient of information (or image) through short-distance communication, receives information indicating the address of the electronic instrument on the Internet from the electronic instrument on the partner side and transmits (or uploads), on a temporary basis, the address information of the electronic instrument together with the information (or image) which has been generated to a specific information server (or image server) on the Internet, and the information server (or image server), in turn, automatically transmits the information (or image) which has been received to the electronic instrument corresponding to the received address information.

BRIEF DESCRIPTION OF THE DRAWINGS

FIG. 6 shows the structure of the personal information data;

FIG. 62 shows the structure of the photograph information data;
FIG. 63 shows the structure of the general information data;
FIG. 64 shows the structure of the personal information data.

FIG. 88 presents an external view of a portable telephone;
FIG. 106 shows the structure of the data in the memory card.

DETAILED DESCRIPTION OF EMBODIMENTS

First Embodiment

Figure 1:
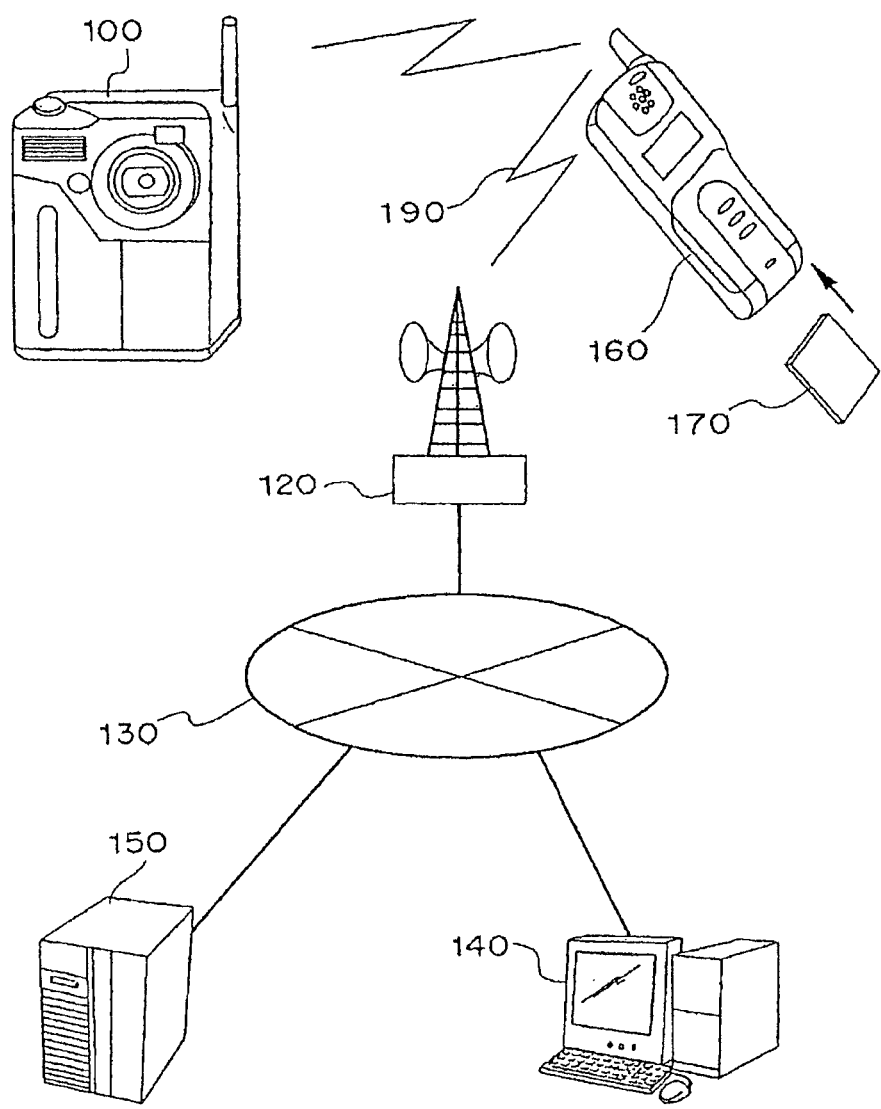
FIG. 1 a conceptual diagram of the system configuration adopted in a first embodiment of the present invention.

The first embodiment of the present invention is explained in reference to the drawings. FIG. 1 is a conceptual diagram of an electronic camera adopting the present invention and an electronic image communication system achieved by utilizing the electronic camera. In FIG. 1, an electronic camera 100 that includes a memory card saves electronic image data or digital image data (hereafter referred to as image data) obtained through a photographing operation into the memory card. In addition, the electronic camera 100 has a short-distance wireless communication function (e.g., Bluetooth (registered trademark; RTM) enabling communication within a range of approximately a 10M) and engages in communication with a portable telephone 160 that also has a short-distance wireless communication function. It is assumed that this portable telephone 160 is carried by a user of the electronic camera 100 and that a UIM card (user identification module card) 170 having stored therein user personal information (or user information) can be loaded at the portable telephone 160.

Through communication between the electronic camera 100 and the portable telephone 160 carried by the user, the user personal information is transferred to the electronic camera 100 and the electronic camera 100, in turn, sets itself up for the specific user in conformance to the transferred personal information. In addition, image data obtained through a photographing operation at the electronic camera 100 are transferred to the portable telephone 160 from the electronic camera 100, and then the image data are transferred to a personal computer 140 for personal use or an image server 150, first via a wireless base station 120 through a wireless portable telephone line 120 and then via a wired or wireless public telephone line or the Internet 130.

Figure 2:
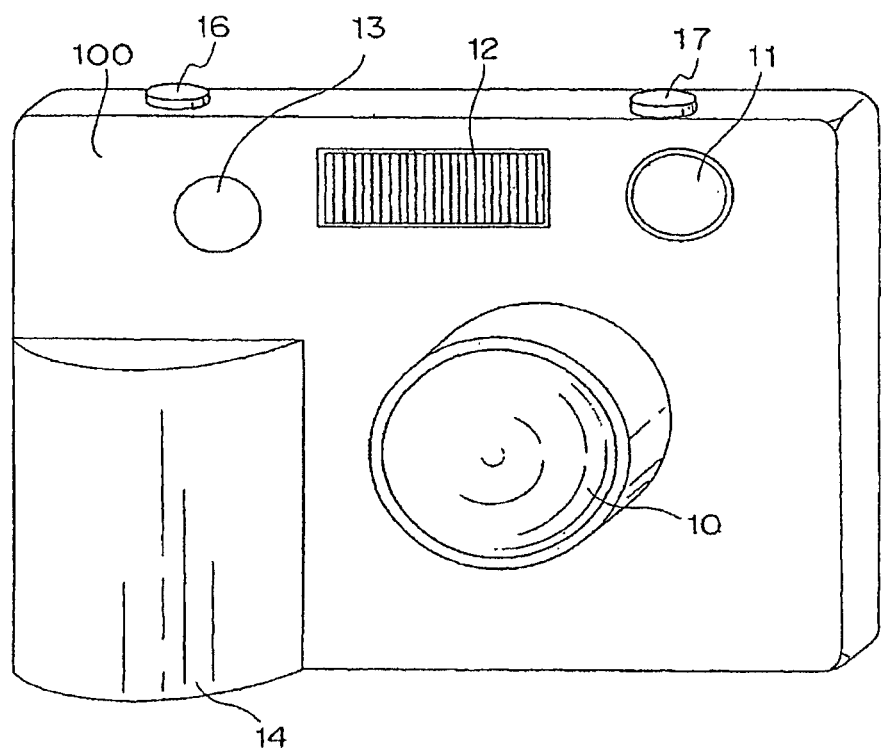
FIG. 2 is an external view (a front view) of the electronic camera achieved in the first embodiment of the present invention.
Figure 3:
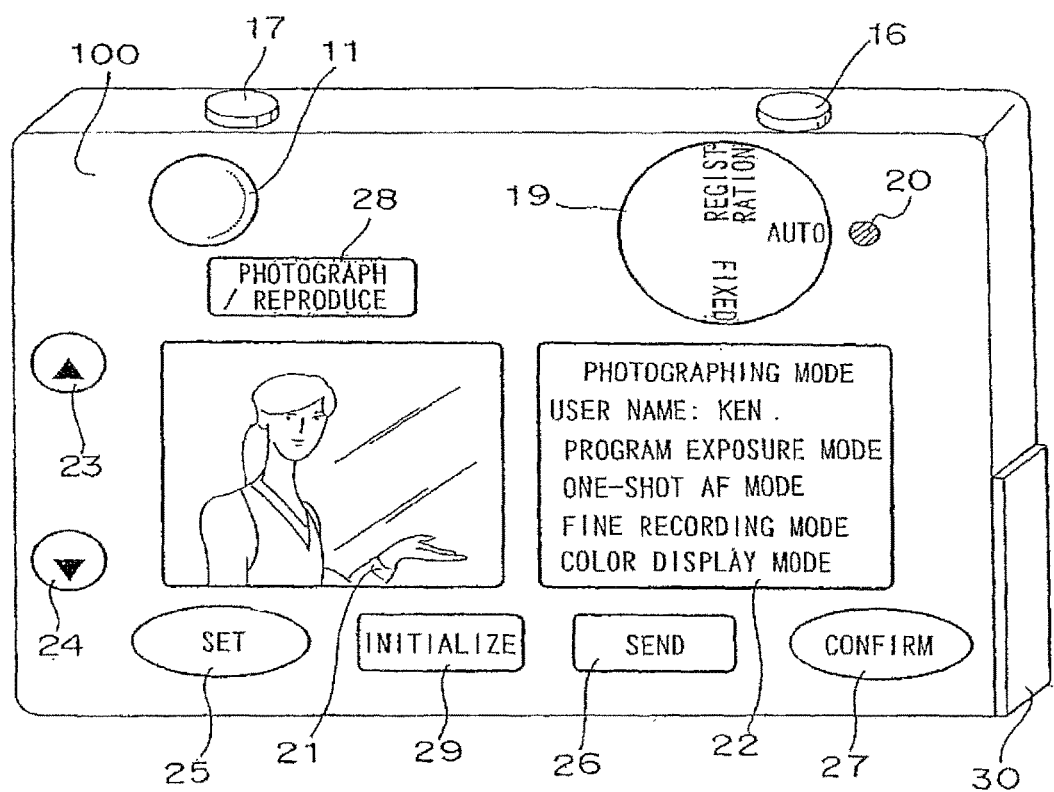
FIG. 3 is an external view (a rear view) of the electronic camera achieved in the first embodiment of the present invention.

FIGS. 2 and 3 present external views (a front view and a rear view) of an embodiment of the electronic camera 100 in FIG. 1. As shown in FIG. 2, at the front of the electronic camera 100, a photographic lens 10 which forms a subject image, a viewfinder 11 used to check the photographic image plane, a strobe 12 used to illuminate the subject during a photographing operation, a photometering circuit 13 that detects the brightness of the subject and a grip portion 14 that projects out from the camera main body to allow the electronic camera 100 to be held by hand are provided, whereas a shutter release button 16 operated to issue an instruction for a photographing start and a power switch 17 (a momentary switch which is alternately set to ON or OFF each time it is operated) through which the on/off state of the power to the electronic camera 100 is controlled are provided at the upper surface.

As shown in FIG. 3, at the rear of the electronic camera 100, an eyepiece unit of the viewfinder 11, a MODE dial 19 that can be rotated to select a user-identify mode (a registration mode selected for user registration, an automatic mode selected for automatic user identification or a fixed mode selected for the user), a dot 20 used to indicate the setting position of the MODE dial 19, a left LCD (left screen) 21 having a substantially quadrangular screen for displaying text and images and a right LCD (right screen) 22 having a substantially quadrangular screen for displaying text and images are provided. In the vicinity of the left screen 21 on its left side, an up button 23 and a down button 24 operated to switch the image displayed at the left screen 21 are provided, whereas under the right screen 22 and the left screen 21, a SET button 25 operated to set various operations of the electronic camera 100, a SEND button 26 operated to issue an instruction for an image data transmission to the outside, a CONFIRM button 27 used to finalize user selections and setting items and an INITIALIZE button 29 operated to initialize the various operational settings in the electronic camera 100 are provided. Above the left screen 21, a PHOTOGRAPH/DISPLAY button 28 operated to select a reproduction mode in which image data saved in a memory card 104 are displayed at the left screen 21 or a photographing mode in which image data are obtained through photographing (the photographing mode or the reproduction mode is alternately selected each time the button is operated) is provided. At a side surface, a memory card slot 30 in which the memory card 104 can be loaded is provided.

It is to be noted that the shutter release button 16, the MODE dial 19, the up button 23, the left LCD 24, the SET button 25, the SEND button 26, the CONFIRM button 27, the PHOTOGRAPH/DISPLAY button 28 and the INITIALIZE button 29 are all operating keys operated by the user.

It is also to be noted about over the surfaces of the left screen 21 and the right screen 22, so-called touch tablets 66 having a function of outputting position data corresponding to a position indicated through a finger contact operation are provided, and they can be used to make a selection from selection items displayed on the screens or to select specific image data. The touch tablets 66 are each constituted of a transparent material such as a glass resin so that the user can observe images and text formed inside the touch tablets 66 through the touch tablets 66.

Figure 4:
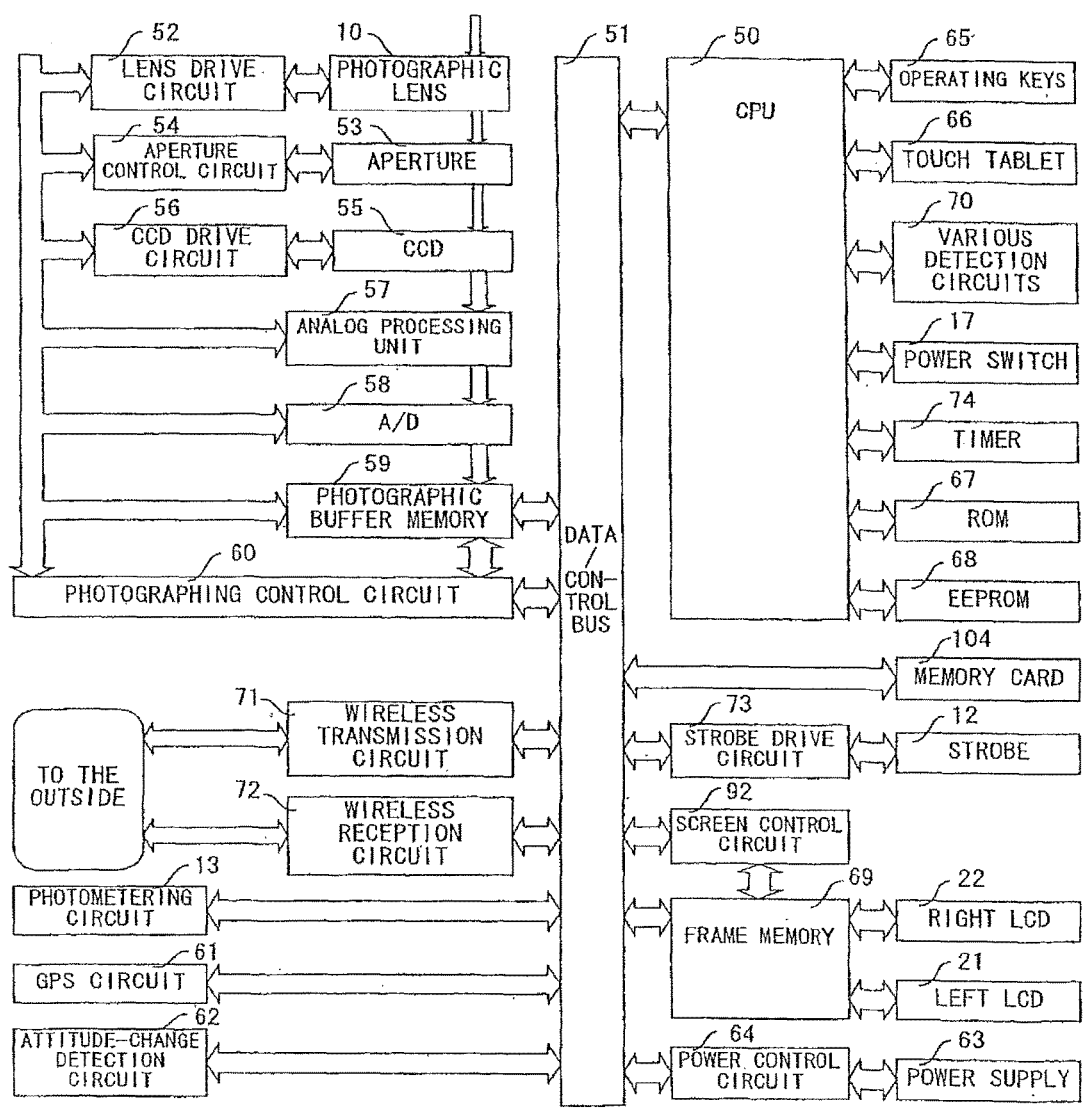
FIG. 4 is a block diagram of the electrical structure adopted in the electronic camera in the first embodiment.

In the block diagram in FIG. 4, which presents an example of an internal electrical structure that may be assumed in the electronic camera 100 shown in FIGS. 2 and 3, various components are connected with one another via a data/control bus 51 through which various types of information data and control data are transmitted.

The components are divided into the following five primary blocks, i.e., 1) a block, the core of which is a photographing control circuit 60 that executes an image data photographing operation, 2) a block, the core of which is constituted by a wireless transmission circuit 71 and a wireless reception circuit 72 that execute transmission/reception of image data to and from the outside, 3) a block constituted of the memory card 104 in which image data are stored and saved, 4) a block, the core of which is a screen control circuit 92 that executes display of image data and information related to the image data and 5) a block, the core of which is constituted of user interfaces such as operating keys 65 and a CPU 50 that implements integrated control on various control circuits.

The CPU 50 (central processing unit), which is a means for implementing overall control on the electronic camera 100, issues various instructions for the photographing control circuit 60, the wireless transmission circuit 710, the wireless reception circuit 720, the screen control circuit 92 and a power control circuit 64 in conformance to information input from the operating keys 65, the touch tablets 66, various detection circuits 70, the power switch 17, a timer 74, the photometering circuit 13, a GPS circuit 61 and an attitude change detection circuit 62. It is to be noted that the various detection circuits 70 include a grip sensor to be detailed later and the like.

The photometering circuit 13 measures the brightness of the subject and outputs photometric data indicating the results of the measurement to the CPU 50. In conformance to the photometric data, the CPU 50 sets the length of the exposure time and the sensitivity of a CCD 55 through a CCD drive circuit 56, and in addition, it controls the aperture value for an aperture 53 with an aperture control circuit 54 via the photographing control circuit 60 in conformance to the data indicating the settings. In the photographing mode, the CPU 50 controls the photographing operation via the photographing control circuit 60 in response to an operation of the shutter release button 15. In addition, if the photometric data indicate a low subject brightness, the CPU 50 engages the strobe 12 in a light emission operation via a strobe drive circuit 73 during the photographing operation.

The GPS circuit 61 (global positioning system circuit) detects information indicating the position of the electronic camera 100 by using information provided by a plurality of satellites orbiting around the earth and provides the detected position information to the CPU 50. When an image is photographed, the CPU 50 transfers this position information or processed position information (the name of the site, the geographic location or the like) together with the image data to the memory card 104 for storage.

The attitude-change detection circuit 62, which is constituted of an attitude sensor of the known art or the like, capable of detecting a change in the attitude of the electronic camera 100, provides information indicating the extent of the attitude change having occurred between the immediately preceding photographing operation and the current photographing operation to the CPU 50. Based upon the attitude change information, a decision can be made with regard to whether or not the photographic composition has been changed for the current photographing operation from that for the immediately preceding photographing operation. The CPU 50 transfers this attitude change information together with the image data to the memory card 104 for storage.

The timer 74, having an internal clock circuit provides time information corresponding to the current time point to the CPU 50. The CPU 50 transfers the time point information indicating a photographing operation time point together with the image data to the memory card 104 for storage. The CPU 50 controls the various units in conformance to a control program stored in a ROM 67 (read-only memory). In an EEPROM 68 (electrically erasable/programmable ROM) which is a nonvolatile memory, personal information, registration setting information and the like necessary for the operations of the electronic camera 100 are stored. The CPU 50 implements control on a power supply 63 via the power control circuit 64 by detecting the operating state of the power switch 17.

The photographing control circuit 60 focuses or zooms the photographic lens 10 through a lens drive circuit 52, controls the exposure quantity at the CCD 55 through control implemented on the aperture 53 by engaging the aperture control circuit 54 and controls the operation of the CCD 55 through the CCD drive circuit 56. The photographic lens 10 forms a subject image onto the CCD 55 with a light flux from the subject via the aperture 53 which adjusts the light quantity. This subject image is captured by the CCD 55. The CCD 55 (charge-coupled device) having a plurality of pixels is a charge storage type image sensor that captures a subject image, and outputs electrical image signals corresponding to the intensity of the subject image formed on the CCD 55 to an analog processing unit 57 in response to a drive pulse supplied by the CCD drive circuit 56.

The analog processing unit 57 samples the image signals having undergone photoelectric conversion at the CCD 56 with predetermined timing and amplifiers the sampled signals to a predetermined level. An A/D conversion circuit 58 (analog digital conversion circuit) converts the image signals sampled at the analog processing unit 57 to digital data through digitization and the digital data are temporarily stored into a photographic buffer memory 59.

In the photographing mode, the photographing control circuit 60 repeatedly executes the operation described above and the screen control circuit 92 repeatedly executes an operation in which the digital data sequentially stored into the photographic buffer memory 59 are readout via the data/control bus 51, the digital data thus read out are temporarily stored into a frame memory 69, the digital data are converted to display image data and are restored into the frame memory 69 and the display image data are displayed at the left screen 21. In addition, the screen control circuit 92 obtains text display information from the CPU 50 as necessary, converts it to display text data which are then stored into the frame memory 69 and displays the display text data at the left screen 21 and the right screen 22. Since the image currently captured by the CCD 55 is displayed at the left screen 21 in real time in the photographing mode in this manner, the user is able to set the composition for the photographing operation by using this through screen (through image) as a monitor screen.

The photographing control circuit 60 detects the state of the focal adjustment at the photographic lens 10 by analyzing the degree of the high-frequency component of the digital data stored in the photographic buffer memory 59 and performs a focal adjustment for the photographic lens 10 with the lens drive circuit 52 based upon the results of the detection. Upon receiving a photographing instruction from the CPU 50, the photographing control circuit 60 engages the CCD 55 to capture a subject image via the CCD drive circuit 56 and temporarily stores image signals generated through the image-capturing operation as digital data (raw data) into the photographic buffer memory 59 via the analog processing unit 57 and the A/D converter circuit 58. The photographing control circuit 60 then generates image data by converting or compressing the digital data stored in the photographic buffer memory 59 on a temporary basis to a predetermined recording format (such as JPEG) and stores the image data back into the photographic buffer memory 59. The photographing control circuit 60 stores the image data stored back into the photographic buffer memory 59 into the memory card 104 as an image file.

In the reproduction mode, the screen control circuit 92 reads out an image file specified by the CPU 50 from the memory card 104, temporarily stores the image file into the frame memory 69, converts the image data to display image data and stores the display image data back into the frame memory 69 and then displays the display image data at the left screen 21.

In the reproduction mode, upon receiving a transmission instruction from the CPU 50, the wireless transmission circuit 71 reads out a specified image file from the memory card 104 and outputs this image file to the outside through wireless transmission. The wireless transmission circuit 71 and the wireless reception circuit 72 engage in communication with an external wireless instrument during a user identification operation and provides the results of the communication to the CPU 50.

Figure 5:
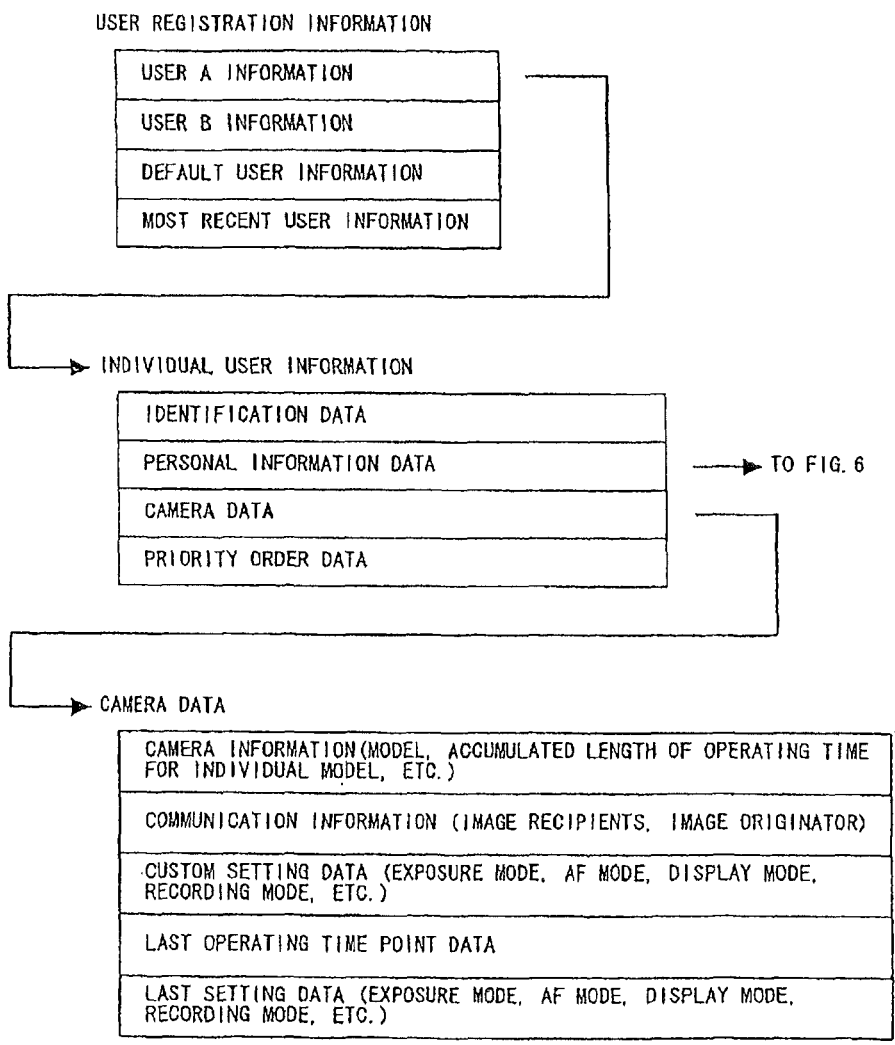
FIG. 5 shows the structure of the user registration information.

FIGS. 5 and 6 show the data structure of user registration information saved within the EEPROM 68. As shown in FIG. 5, the user registration information is prepared for individual users (user A, user B, default user and most recent user in FIG. 5). The default user is a general-purpose user having set for use in case a user identification could not be performed successfully, and the most recent user is the user who last operated the electronic camera 100. Each set of individual user information includes identification data (individual identification data used to identify the instrument at the communication partner), personal information data (see FIG. 6), camera data and priority order data. The camera data are constituted of camera information, communication information, custom setting data, last operating time point data and last setting data.

As shown in FIG. 6, the personal information data are general personal-information data having no relevance to the settings at the electronic camera 100, which can be utilized for multiple purposes. For this reason, it is not necessary to specially set these personal information data in order to operate the electronic camera 100. The personal information data include the name, the date of birth and the preferred language of the individual, physical data (visual acuity, diopter (eyesight) and hand preference), tastes (favorite color, etc.) and other data, and the electronic camera 100 can be customized by using the personal information data.

Figures 7, 8:
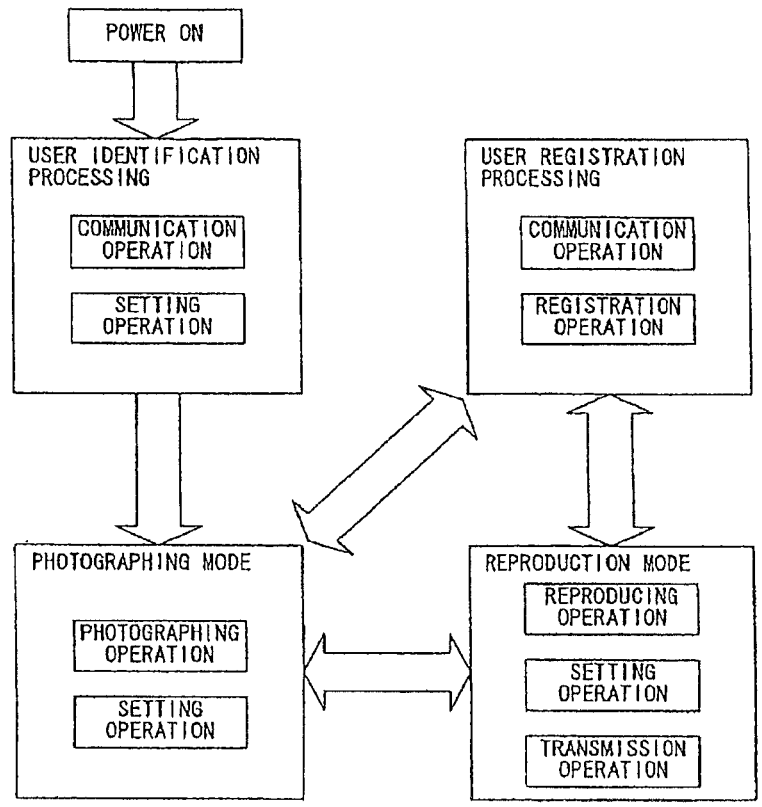
FIG. 7 is a transition diagram of the state assumed in the electronic camera according to the present invention.
FIG. 8 presents a correspondence list relevant to the user identification operation.

FIG. 7 is a transition diagram of the state assumed in the electronic camera in the embodiment of the present invention. As the power is turned on, wireless user identification processing is executed. During the user identification processing, a communication operation and a camera setting operation are performed. Once the user identification processing at power ON is completed, the operation shifts to the photographing mode in which a photographing operation and a camera setting operation are performed. In response to an operation of the PHOTOGRAPH/DISPLAY button 28, the operation shifts from the photographing mode to the reproduction mode or from the reproduction mode to the photographing mode. In the reproduction mode, an image data reproducing operation, a camera setting operation and an image data transmission operation are performed. If the MODE dial 19 is set for registration, the operation shifts to user registration processing from the photographing mode or the reproduction mode, a communication operation and a registration operation for user registration are performed, and then when these operations are completed, the operation shifts back into the original mode, i.e., the photographing mode or the reproduction mode.

The table in FIG. 8 provided to facilitate an explanation of the user identification processing operation indicates that the default user is set as the current user if the number of users detected through the wireless communication operation is 0, the detected user is set as the current user if the number of detected users is one, and the user selected through automatic selection processing which is to be detailed later is set as the current user if the number of detected users is two or more.

Figure 9:
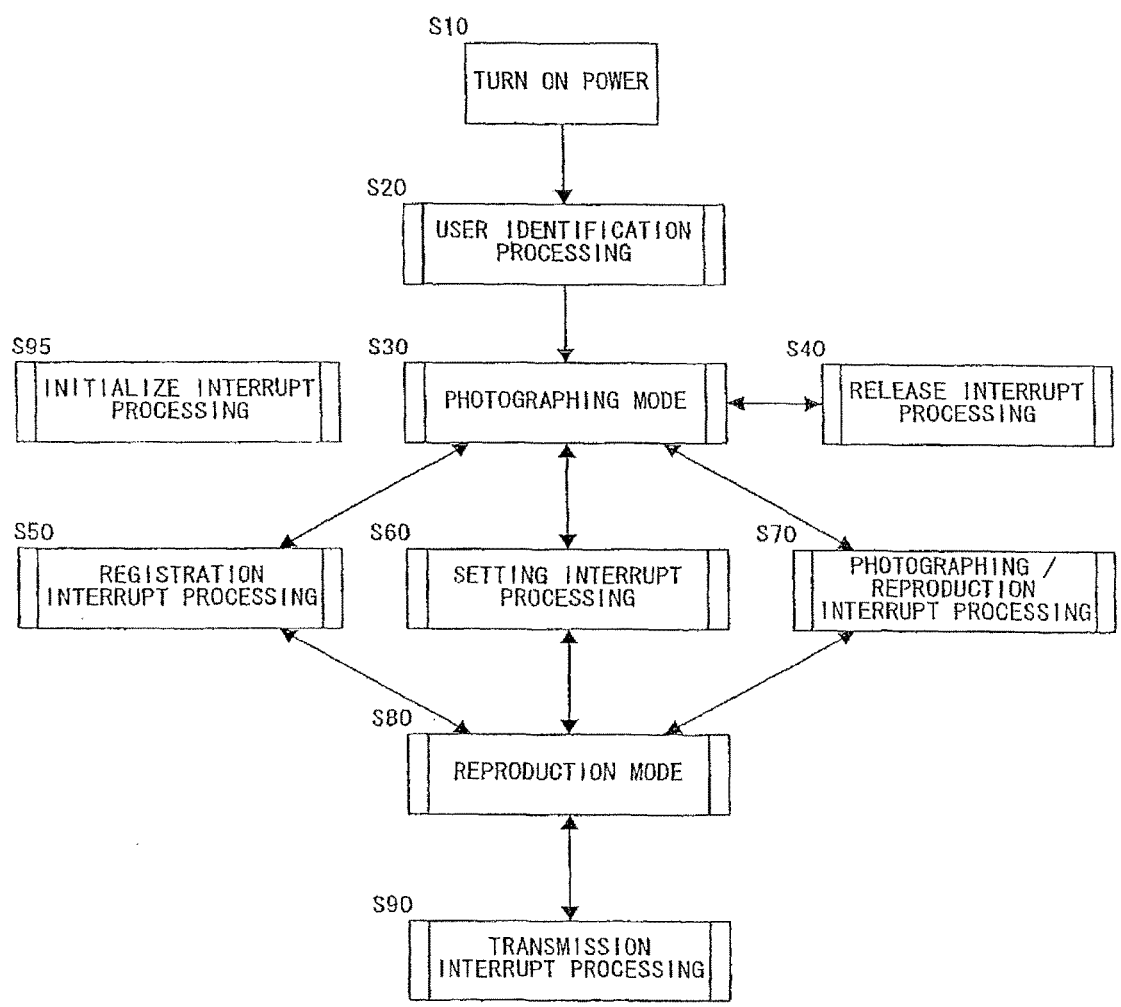
FIG. 9 presents a flowchart of the main routine executed at the CPU.

FIG. 9 presents a chart of the main flow of the operations executed in the electronic camera 100 (the CPU 50) in the embodiment described above. First, the power is turned on as the power switch 17 is operated in S10, and a user identification processing subroutine to be detailed later is executed in S20 to identify the current user of the electronic camera 100. When the user identification processing in S20 is completed, a photographing mode subroutine is executed in S30 and thus the camera enters a photographing-enabled state. If the shutter release button 16 is operated in the photographing mode, a release interrupt processing subroutine in S40 is executed to perform a photographing operation. If the PHOTOGRAPH/DISPLAY button 28 is operated in the photographing mode, a photographing/reproduction interrupt processing subroutine in S70 is executed and a reproduction mode subroutine in S80 is executed to display the reproduced image of image data stored in the memory card 104 at the left screen 21. If, on the other hand, the PHOTOGRAPH/DISPLAY button 28 is operated in the reproduction mode, the photographing/reproduction interrupt processing subroutine in S70 is executed and the photographing mode subroutine in S30 is executed.

If the SEND button 26 is operated in the reproduction mode, a transmission interrupt processing subroutine in S90 is executed to transmit the image data currently reproduced in the reproduction mode to the outside. In addition, if the SET button 25 is operated either in the photographing mode or the reproduction mode, a setting interrupt processing in S60 is executed to enable manual setting of the camera, if the INITIALIZE 29 is operated either in the photographing mode or the reproduction mode, initialize interrupt processing in S95 is executed to initialize the camera settings in correspondence to the specific user and if the MODE dial 19 is set for registration in the photographing mode or the reproduction mode, a registration interrupt processing in S50 is executed to enable a new user registration.

Figure 10:
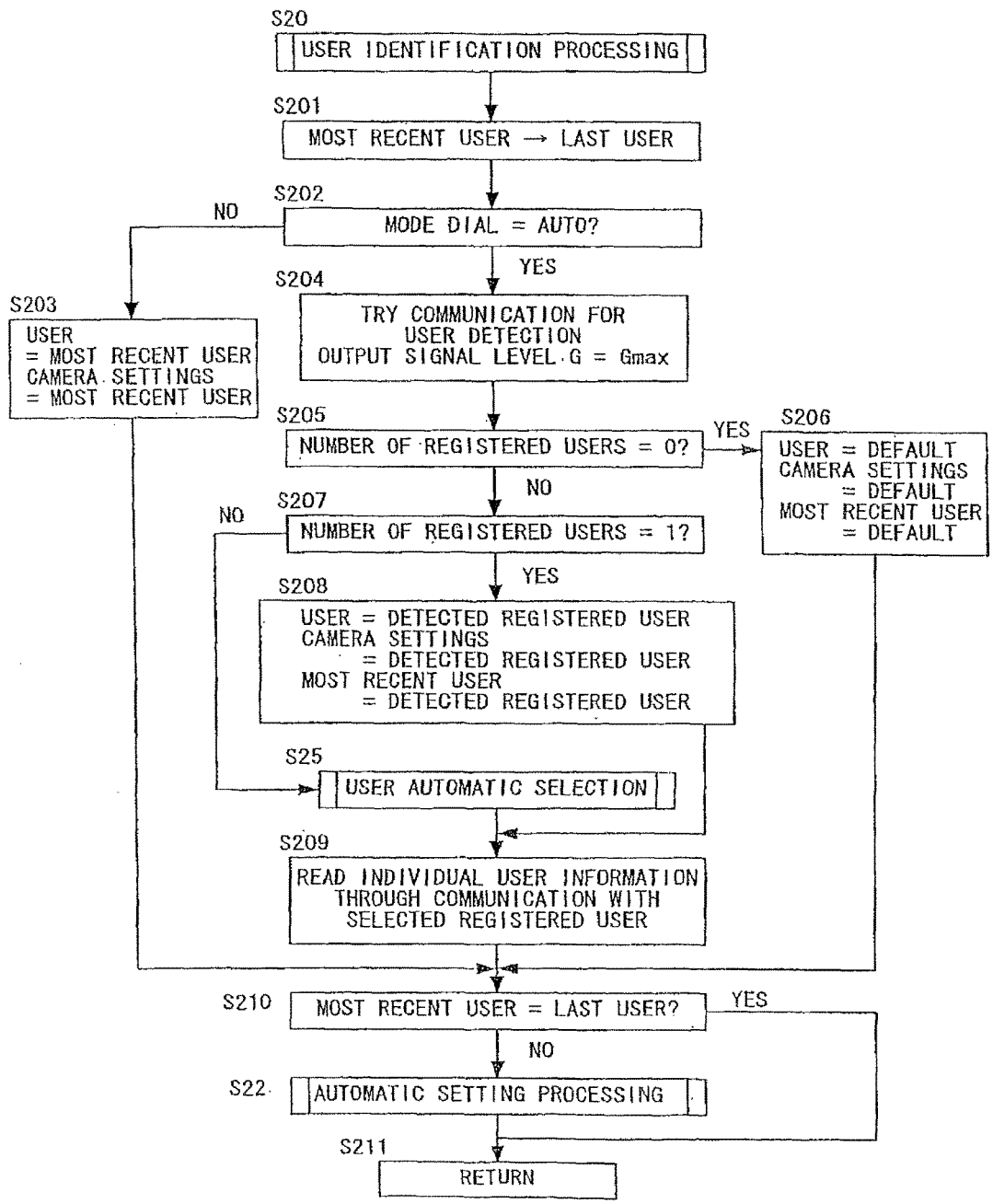
FIG. 10 presents a flowchart of a subroutine.

In the detailed flowchart of the user identification processing subroutine presented in FIG. 10, the last user is set as the most recent user in S201 after the subroutine is started up in S20. In S202, the MODE dial 19 is checked to ascertain whether or not it is set to "auto", the most recent user is set as the current user if the MODE dial 19 is not set to "auto" and, accordingly, the most recent user settings are selected for the camera before the operation proceeds to S210. Namely, if the MODE dial 19 is set to "fixed", the last user who operated the camera is set as the current user and the camera settings are selected accordingly without executing a user identification. If, on the other hand, it is ascertained in S202 that the MODE dial 19 is set to "auto", the operation proceeds to step S204 to attempt communication with the outside for user detection by engaging the wireless transmission circuit 71 and the wireless reception circuit 72. At this time, the user detection is performed over the maximum wireless communication range by setting the output signal level G of the wireless transmission circuit 71 to the maximum (Gmax).

In S205, a verification as to whether or not the number of registered users among the detected users is 0 is accomplished, and if the number of registered users is 0, the default setting is selected for the user, the camera settings for the default user are selected and the most recent user is updated as the default user in S206 before the operation proceeds to S210. If, on the other hand, it is ascertained in S205 that the number of registered users is not 0, a verification is achieved in S207 as to whether or not the number of registered users among the detected users is 1, and if the number of registered users is 1, the detected registered user is set as the current user, the camera settings for the detected registered user are selected and the most recent user is updated as the detected registered user in S208 before the operation proceeds to S209.

If it is ascertained in S207 that the number of registered users among the detected users is not 1, i.e., if number of registered users among the detected users is at least 2, a single registered user is selected through an automatic user selection subroutine executed in S25 which is to be detailed later, and then the operation proceeds to S209. In S209, the individual user information of the registered user having determined to be the current user is read and stored into the EEPROM 68 by communicating with the selected registered user again.

In step S210, a verification as to whether or not the most recent user whose individual user information is stored in the EEPROM 68 matches the last user is achieved, and if they match, the operation makes a direct return in S211. If, on the other hand, they do not match, an automatic setting subroutine in S22 which is to be detailed later is executed to initialize the camera settings before the operation makes a return in S211.

Figure 11:
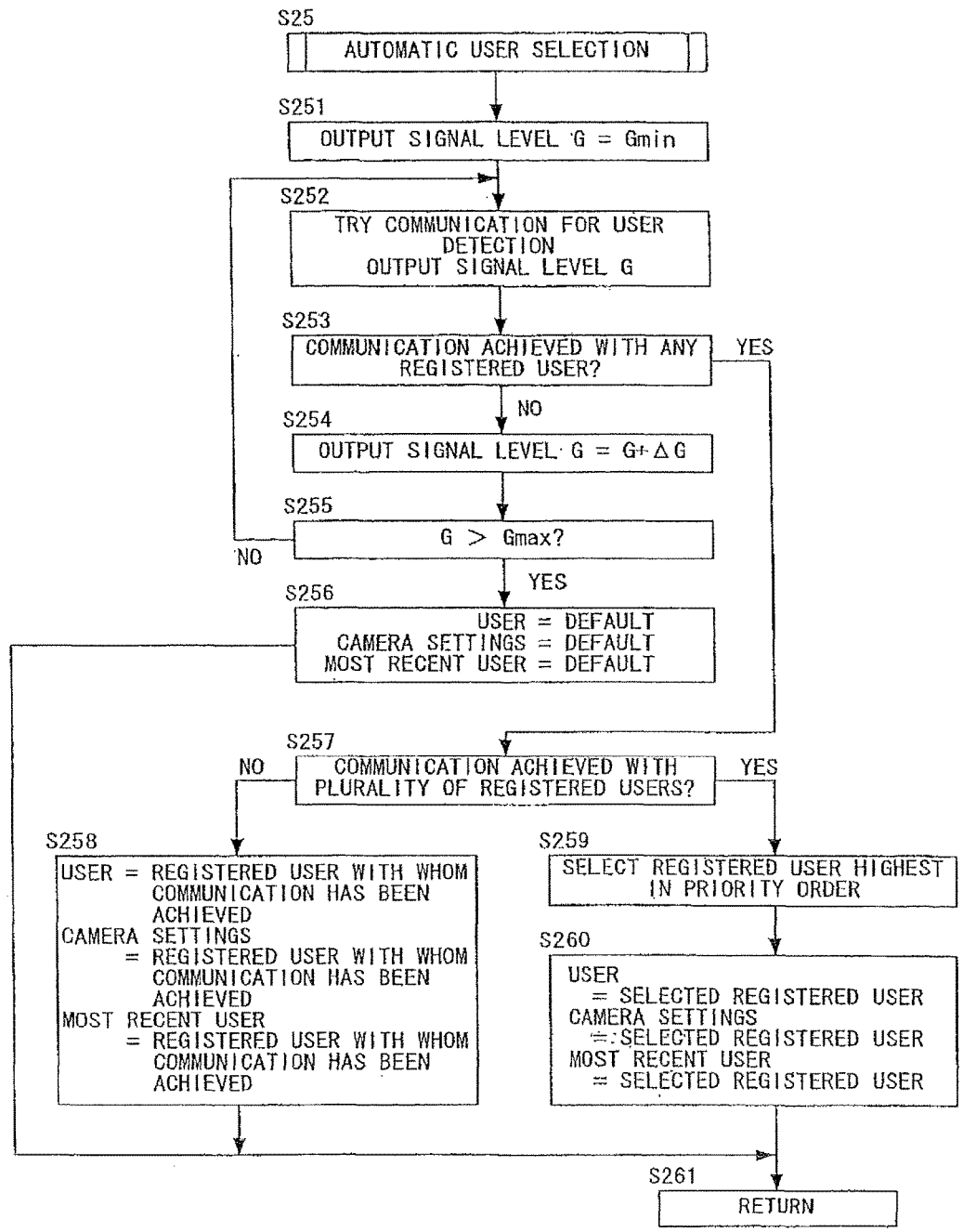
FIG. 11 presents a flowchart of a subroutine.

In the detailed flowchart of the automatic user selection subroutine presented in FIG. 11, after the subroutine is started up in S25, the output signal level G of the wireless transmission circuit 71 is first initialized to the minimum (Gmin) in S251 to reduce the wireless communication range to the minimum, and then a wireless communication is attempted at the output signal level setting G to communicate with a registered user in S252. A verification is achieved in S253 as to whether or not communication with the registered user has been achieved, and if no communication has been achieved, the output signal level G of the wireless transmission circuit 71 is increased by ΔG in S254. In S255, a verification is achieved as to whether or not the output signal level G of the wireless transmission circuit 71 exceeds the maximum (Gmax), and if the output signal level G does not exceed the maximum level, the operation returns to S252 to attempt communication with a registered user by slightly increasing the output signal level.

If it is confirmed in S253 that communication with a registered user has been achieved, a verification is achieved in S257 as to whether or not communication with a plurality of registered users has been achieved at the output signal level setting, and if communication has not been achieved with a plurality of registered users, the registered user with whom communication has been achieved is accepted as the current user, the camera settings for the registered user with whom communication has been achieved are selected and the most recent user is updated as the registered user with whom communication has been achieved in S258 before the operation makes a return in S261.

If, on the other hand, it is verified in S257 that communication with a plurality of registered users has been achieved at the output signal level setting, the registered user ranked highest in the priority order among the registered users with whom communication has been achieved is selected as the current user in S259, and the registered user thus selected is set as the current user, the camera settings for the selected registered user are selected and the most recent user is updated as the selected registered user in S260 before the operation makes a return in S261.

If it is decided in S255 that the output signal level G of the wireless transmission circuit 71 exceeds the maximum (Gmax), the default user is set as the current user, the camera settings for the default user are selected and the most recent user is updated as the default user in S256 before the operation makes a return in S261.

As described above, since the registered users are searched while gradually increasing the wireless communication range in the user automatic selection subroutine shown in FIG. 11, the registered user present within the shortest distance from the camera (likely to be the current user of the camera) can be automatically selected and even if communication is achieved simultaneously with a plurality of registered users, the user most likely to be operating the camera can be selected in conformance to the predetermined priority order.

Figure 12:
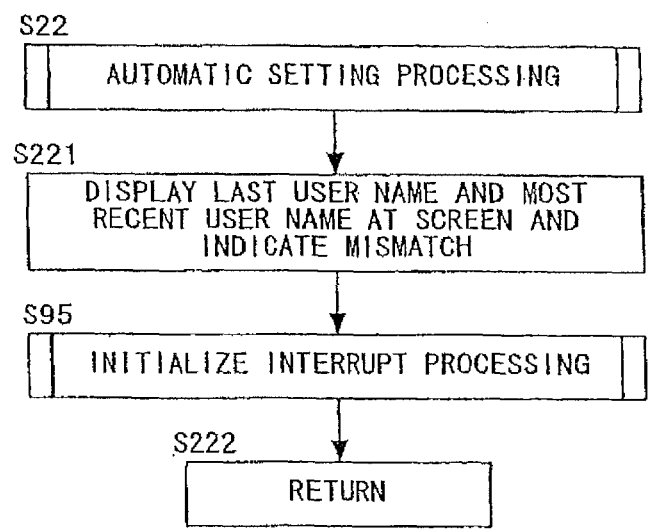
FIG. 12 presents a flowchart of a subroutine.

In the detailed flowchart of the automatic setting processing subroutine presented in FIG. 12, after the subroutine is started up in S22, the last user and the most recent user are displayed at the left screen 21 and a message indicating that the last user and the most recent user do not match is displayed at the right screen 22 in S221. Next, the initialize interrupt processing subroutine in S95 is executed before the operation makes a return in S222.

Figure 14:
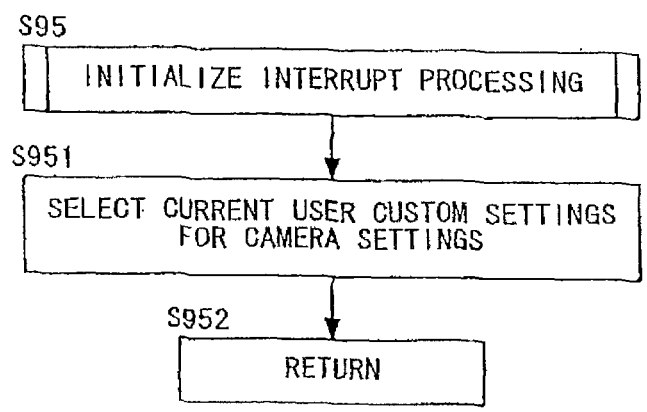
FIG. 14 presents a flowchart of a subroutine.

In the detailed flowchart of the initialize interrupt processing subroutine presented in FIG. 14, after the subroutine is started up in S95, the camera settings are initialized to the custom settings corresponding to the most recent user in S951 and then the operation makes a return in S952.

Figure 15:
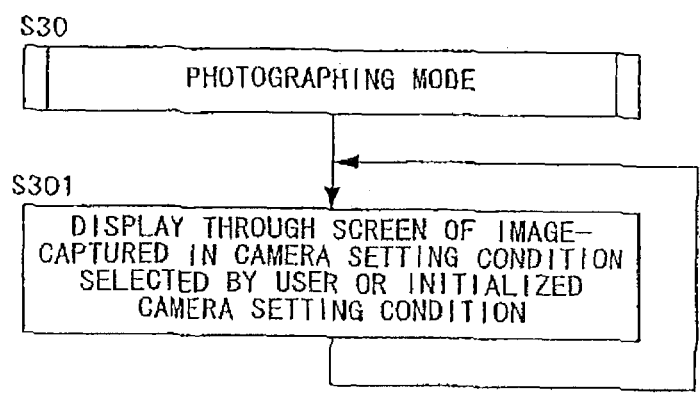
FIG. 15 presents a flowchart of a subroutine.
Figure 16:
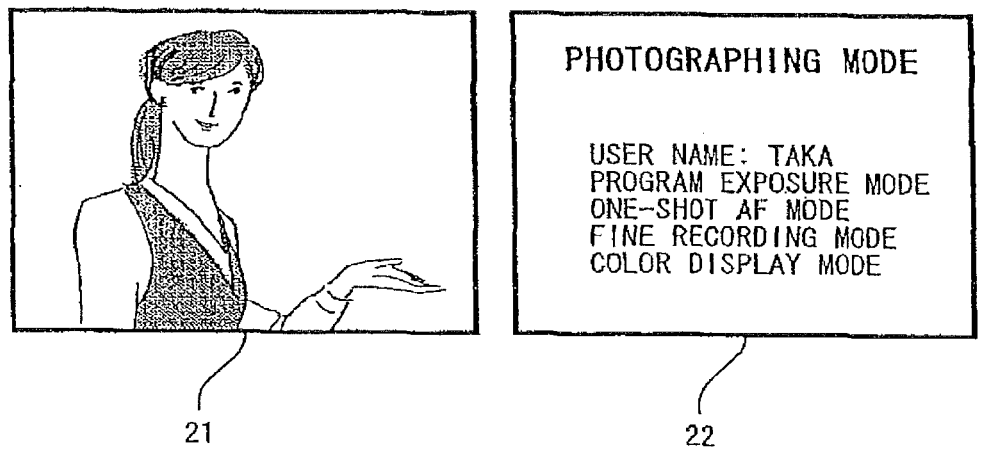
FIG. 16 presents an example of screen display.

In the detailed flowchart of the photographing mode subroutine presented in FIG. 15, after the subroutine is started up in S30, the processing in S301 is repeatedly executed. In S301, image data sequentially generated by the CCD 55 under the camera setting condition selected by the user or in the initialized camera setting condition are displayed at the left screen 21 and the corresponding camera setting condition and the user name are displayed in text at the right screen 22, as shown in FIG. 16.

Figure 17:
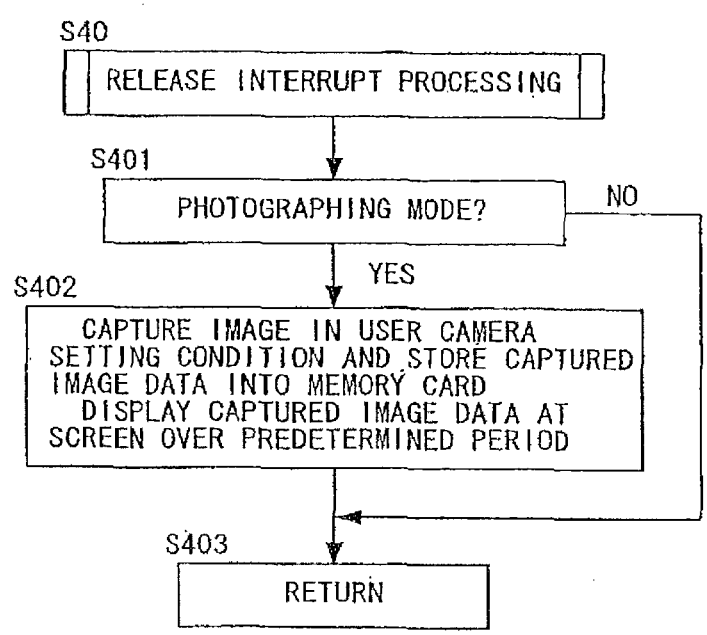
FIG. 17 presents a flowchart of a subroutine.

In the detailed flowchart of the release interrupt processing subroutine presented in FIG. 17, after the subroutine is started up in S40, a verification is achieved in S401 as to whether or not the camera is currently set in the photographing mode, and if it is decided that the camera is not set in the photographing mode, the operation makes a return in S403. If, on the other hand, the camera is set in the photographing mode, an image-capturing operation is executed in the camera setting condition corresponding to the user and image data obtained through the image-capturing operation are stored into the memory card 104 in S402. In addition, the image data are displayed at the screen over a predetermined length of time before the operation makes a return in S403.

Figure 18:
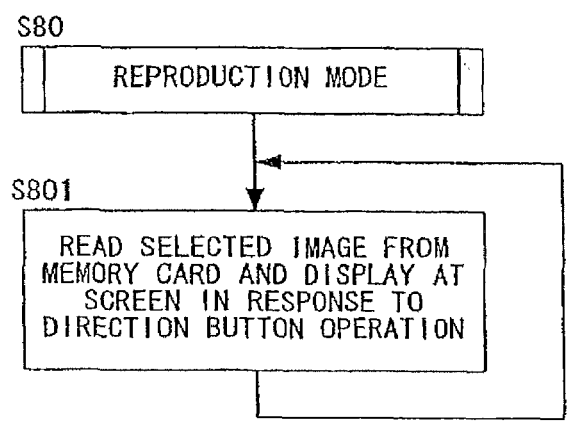
FIG. 18 presents a flowchart of a subroutine.
Figure 19:
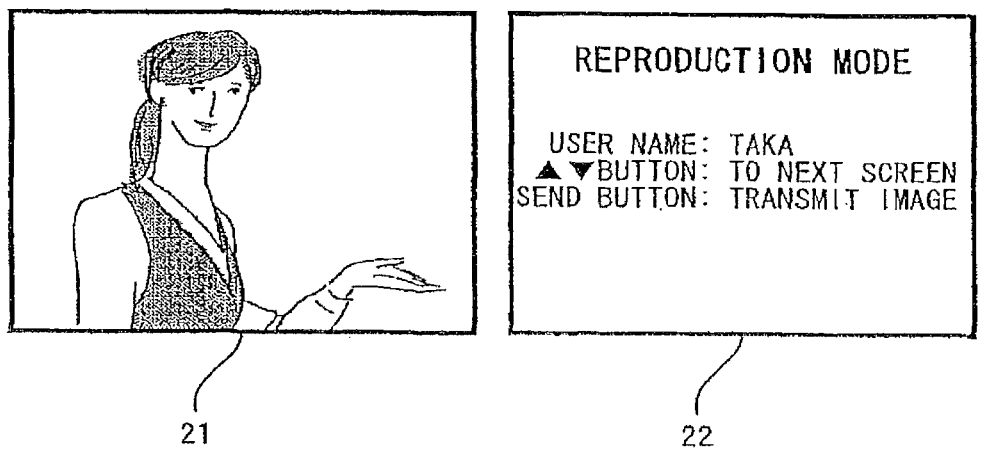
FIG. 19 presents an example of screen display.

In the detailed flowchart of the reproduction mode subroutine presented in FIG. 18, after the subroutine is started up in S80, the processing in S801 is repeatedly executed. In S801, specific image data stored in the memory card 104 are selected and read out in response to an operation of the direction buttons 23 and 24 and the image data are reproduced and displayed at the left screen 21 and the operating instructions and the user name are displayed at the right screen 22, as shown in FIG. 19.

Figure 20:
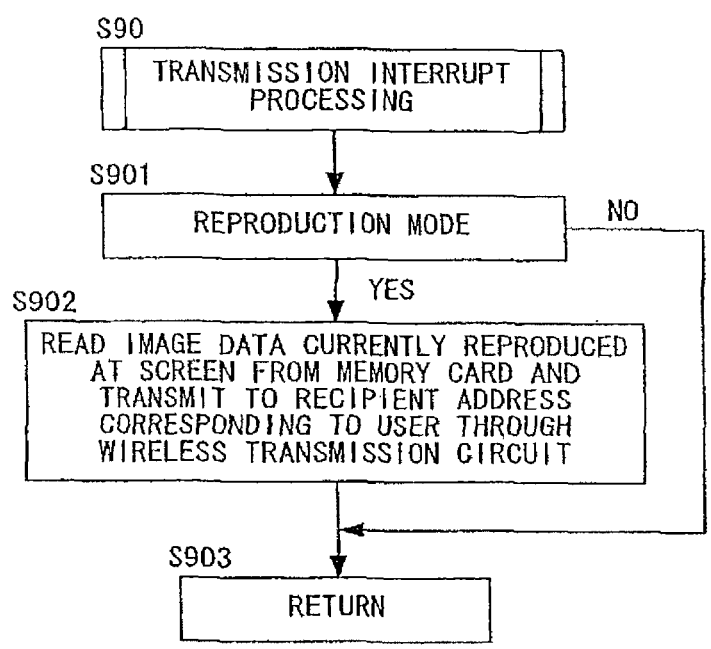
FIG. 20 presents a flowchart of a subroutine.

In the detailed flowchart of the transmission interrupt processing subroutine presented in FIG. 20, after the subroutine is started up in S90, a verification is achieved in S901 as to whether or not the camera is currently set in the reproduction mode and the operation makes a return in S903 if the camera is not set in the reproduction mode. If, on the other hand, the camera is currently set in the reproduction mode, the image data the reproduced image of which is currently displayed at the left screen 21 are read out from the memory card 104 and the image data are wirelessly transmitted to the recipient corresponding to the user through the wireless transmission circuit 71 in S902, and then the operation makes a return in S903.

Figure 21:
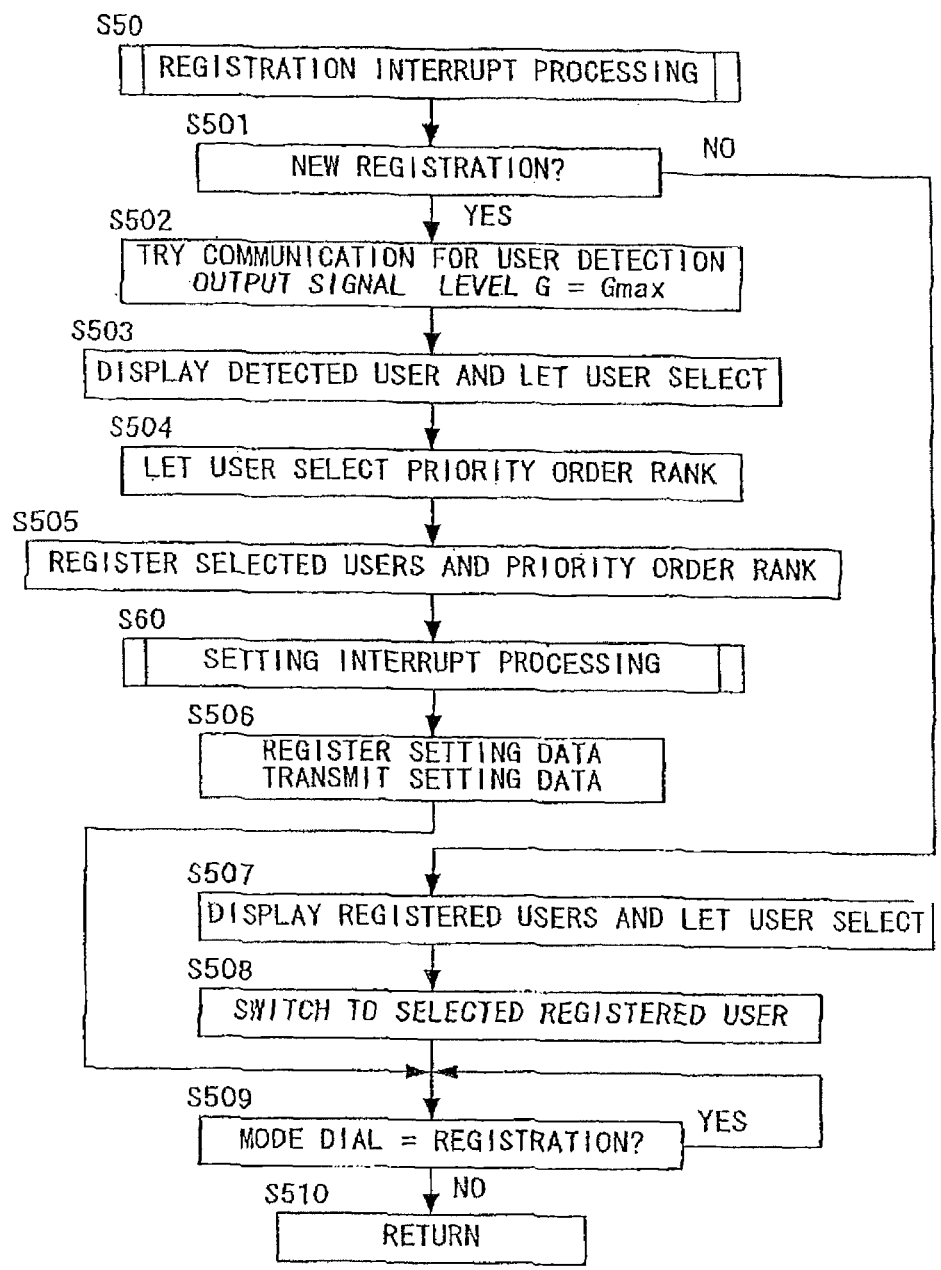
FIG. 21 presents a flowchart of a subroutine.
Figure 22:
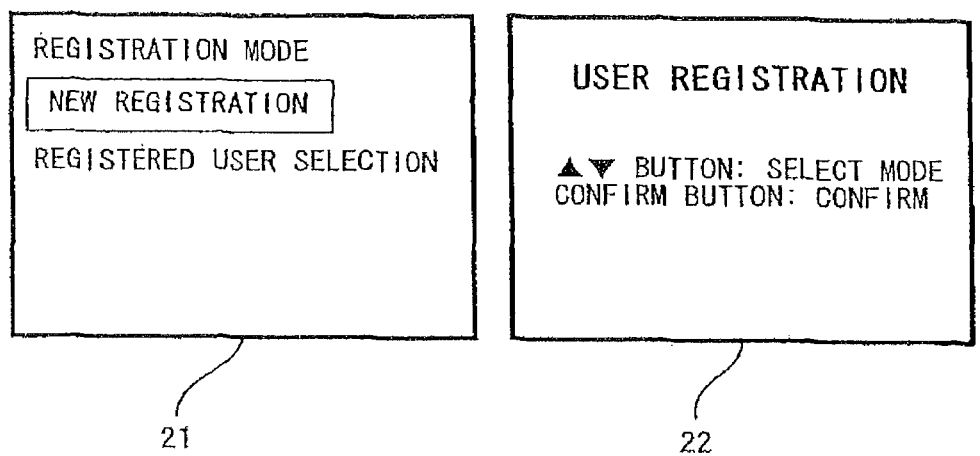
FIG. 22 presents an example of screen display.
Figure 23:
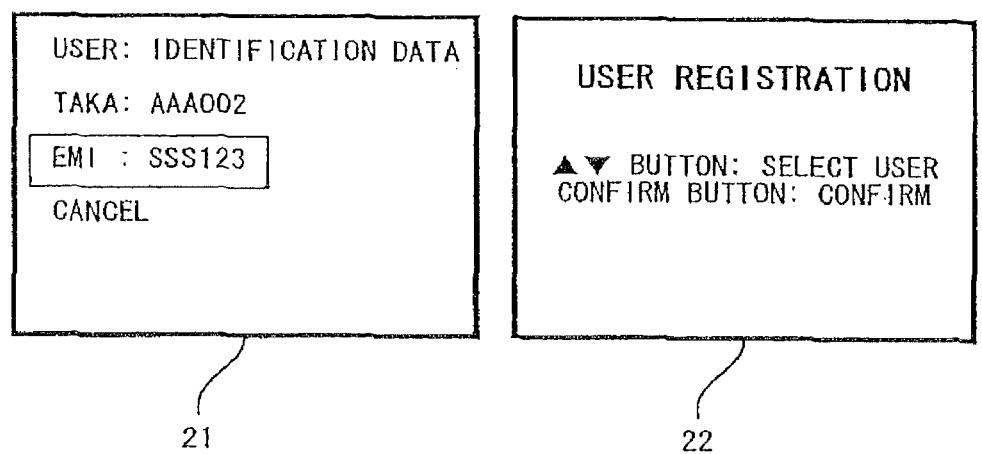
FIG. 23 presents an example of screen display.
Figure 24:
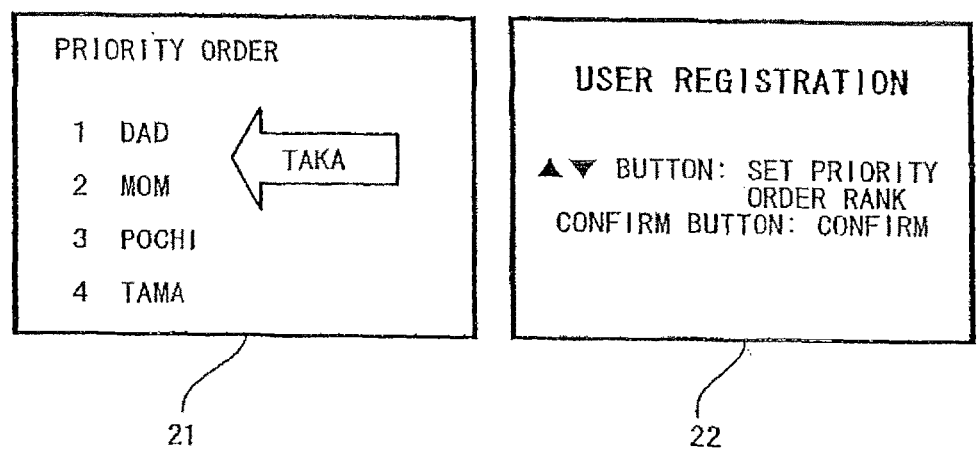
FIG. 24 presents an example of screen display.

In the detailed flowchart of the registration interrupt processing subroutine presented in FIG. 21, after the subroutine is started up in S50, two selection items, i.e., "new user registration" and "registered user selection" are displayed is at the left screen 21, as shown in FIG. 22, to allow the user to select one of the selection items in S501. If the user selects "new user registration", a communication for user detection is attempted through the wireless transmission circuit 71 and the wireless reception circuit 72 by setting the output signal level G to the maximum (Gmax) in S502. In S503, the names of the detected users and their identification data are displayed at the left screen 21 as shown in FIG. 23 to enable a selection of the user to be registered. In S504, the registered users are displayed in conformance to the priority order at the left screen 21, as shown in FIG. 24, to enable selection of a priority order rank for the user to be newly registered.

In S505, data indicating the selected user and his priority order rank and data related to the selected user (the identification data and the personal information data) are registered and saved at the EEPROM 68. In S60, the setting interrupt processing subroutine is executed to select the camera settings and the like for the newly registered user, and then in S506, data indicating the selected settings and the like are registered and saved at the EEPROM 68 as the camera data of the newly registered user and also the setting data are sent back through the wireless transmission circuit 71 to be saved into an instrument such as a portable telephone carried by the user before the operation proceeds to S509.

Figure 25:
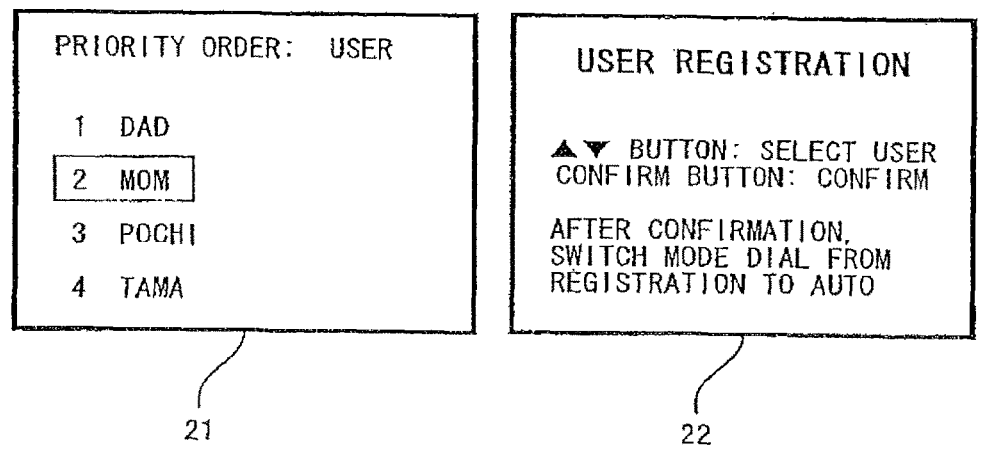
FIG. 25 presents an example of screen display.

If, on the other hand, "registered user selection" is selected in S501, the names of the registered users are displayed at the left screen 21 as shown in FIG. 25 to enable a selection of the desired registered user in S507, and then the current user is switched to the selected registered user, the camera settings are switched to those for the selected registered user and the most recent user is updated as the selected registered user in S508 before the operation proceeds to S509. In S509, the MODE dial 19 is repeatedly checked to verify whether or not a setting other than the registration mode has been selected through the MODE dial 19, and if a setting other than the registration mode has been selected, the operation makes a return in S510.

Figure 26:
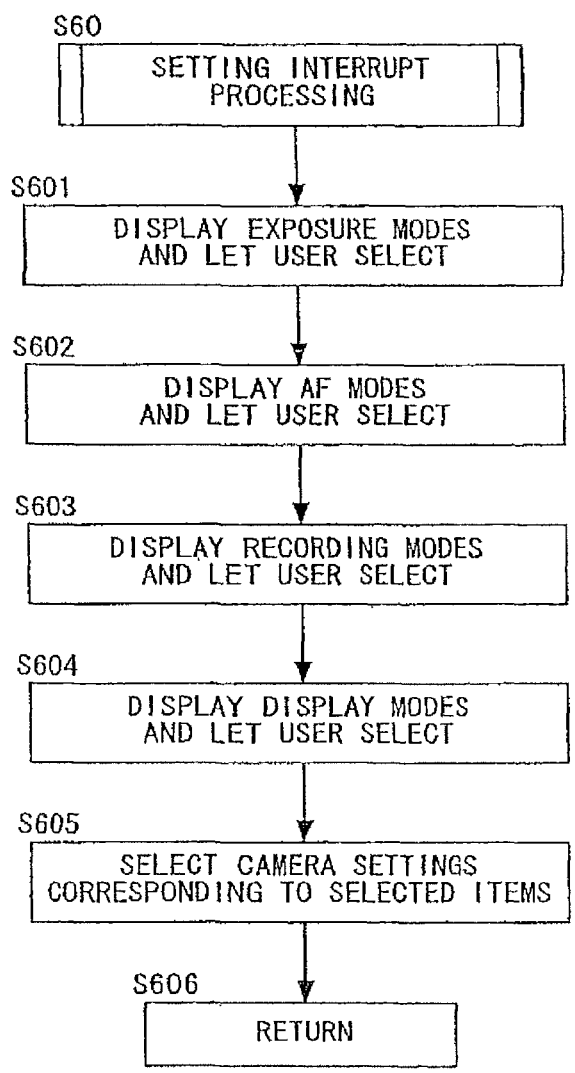
FIG. 26 presents a flowchart of a subroutine.
Figure 27:
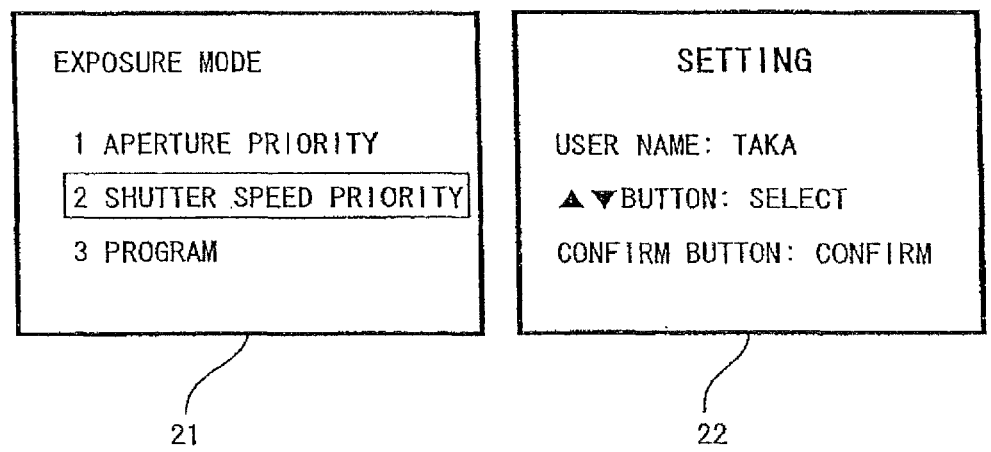
FIG. 27 presents an example of screen display.
Figure 28:
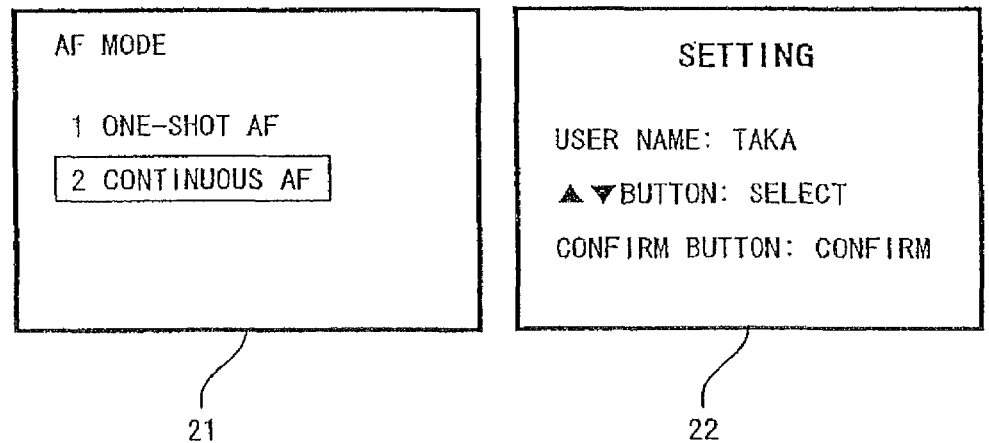
FIG. 28 presents an example of screen display.
Figure 29:
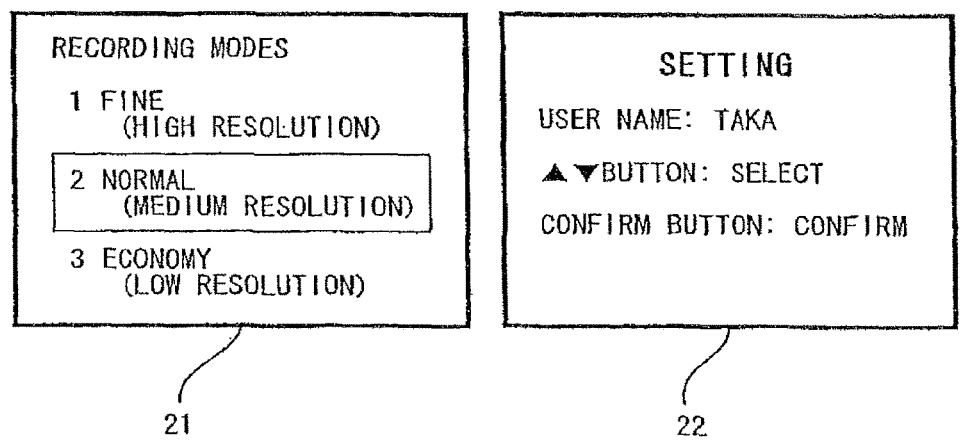
FIG. 29 presents an example of screen display.
Figure 30:
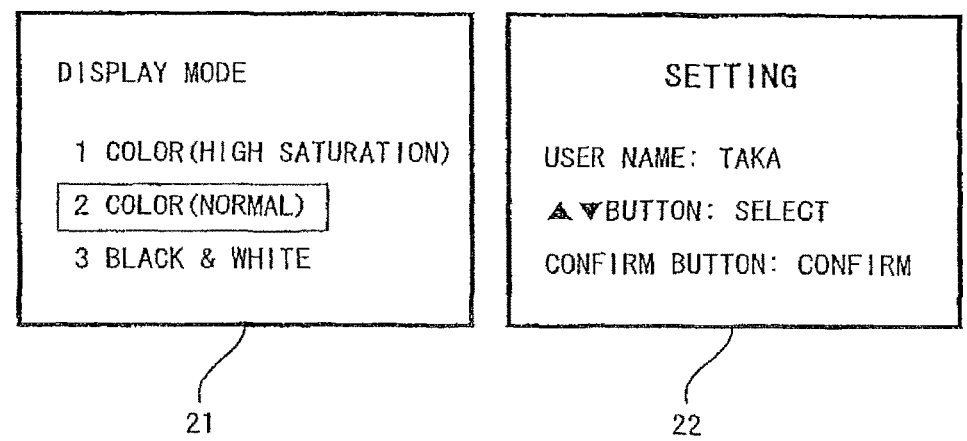
FIG. 30 presents an example of screen display.

In the detailed flowchart of the setting interrupt processing subroutine presented in FIG. 26, after the subroutine is started up in S60, exposure-mode selection items are displayed at the left screen 21 as shown in FIG. 27 in S601 to enable a user selection. In S602, AF mode (automatic focal adjustment mode) selection items are displayed at the left screen 21, as shown in FIG. 28, to enable a user selection. In S603, image-data-recording-mode selection items are displayed at the left screen 21, as shown in FIG. 29, to enable a user selection. In S604, image-data-display-mode selection items are displayed at the left screen 21, as shown in FIG. 30, to enable a user selection. Then, in S605, the current camera settings are updated in conformance to the selected camera settings before the operation makes a return in S606.

Figure 31:
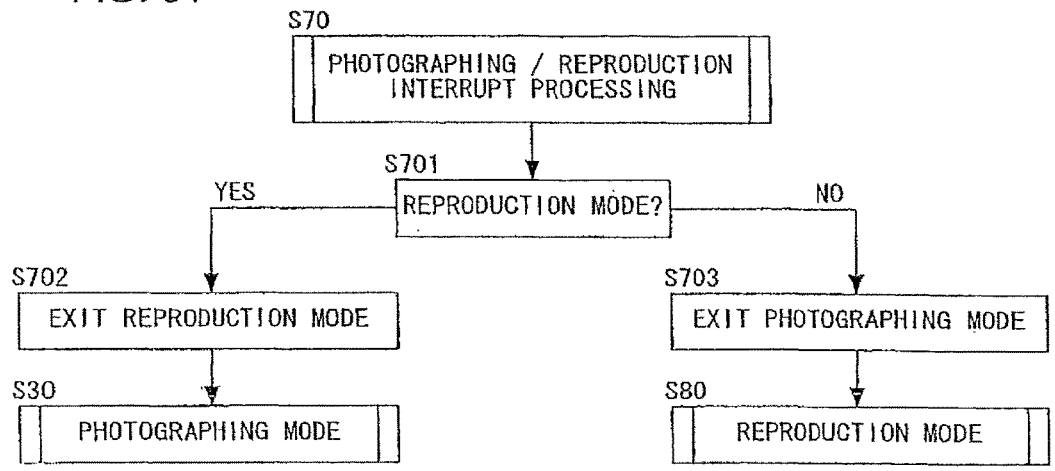
FIG. 31 presents a flowchart of a subroutine.

In the detailed flowchart of the photographing/reproduction interrupt processing subroutine presented in FIG. 31, after the subroutine is started up in S70, a verification is achieved as to whether or not the camera is currently set in the reproduction mode, and if it is decided that the camera is set in the reproduction mode, the operation exits the reproduction mode in S702 to shift to the photographing mode subroutine in S30. If, on the other hand, the camera is not set in the reproduction mode, the operation exits the photographing mode in S703 to shift to the reproduction mode subroutine in S80.

Figure 32:
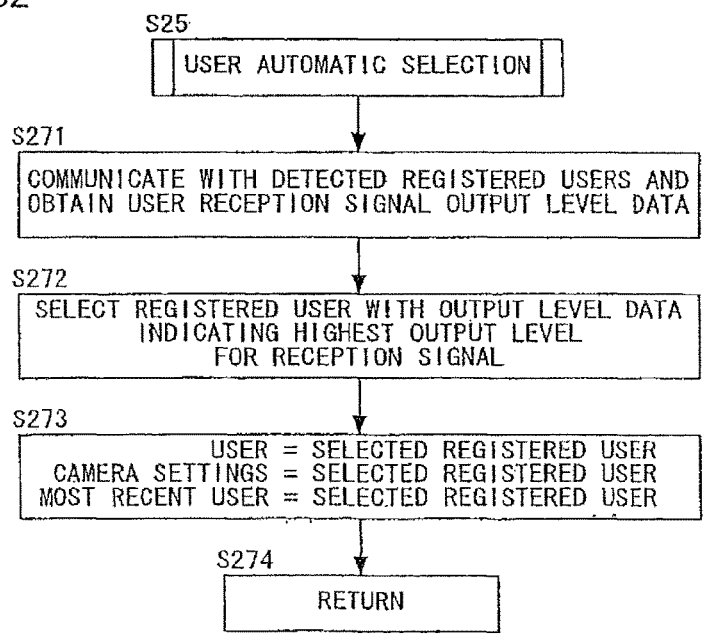
FIG. 32 presents a flowchart of a subroutine.

In the detailed flowchart of an example of a variation of the automatic user selection subroutine presented in FIG. 32, after the subroutine is started up in S25, communication with detected registered users is executed with the output level of the wireless transmission signal set at a constant level and data indicating the reception signal output levels at the user-side instruments are obtained from the user-side instruments in S271. Then, in S272, the registered user whose data indicate the highest reception signal output level is selected. In S273, the selected registered user is set as the current user, the camera settings for the selected registered user are selected and the most recent user is updated as the selected registered user before the operation makes a return in S274.

As described above, in the automatic user selection subroutine shown in FIG. 32, signal output levels of the signal transmitted by the electronic camera and received by the users are detected on the reception side, and the data indicating the detected reception signal output levels are sent back to the camera where the registered user with the highest output level for reception signal (within the shortest distance) is selected.

Figure 33:
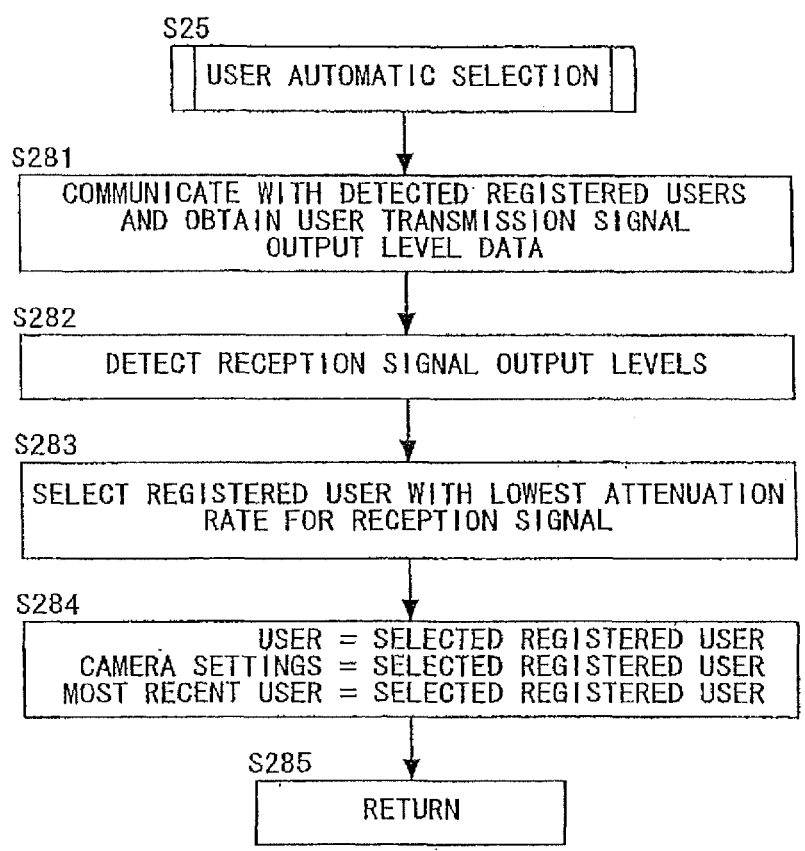
FIG. 33 presents a flowchart of a subroutine.

In the detailed flowchart of another example of a variation of the automatic user selection subroutine presented in FIG. 33, after the subroutine started up in S25, the electronic camera communicates with detected registered users and obtains data indicating the output levels of signals transmitted by the user-side instruments from the user-side instruments in S281. In S282, the signals transmitted by the user-side are received and the output levels of the received signals are detected. In S283, the registered user with the lowest signal-attenuation rate is selected by comparing the reception-signal output levels with the transmission signal output-level data. In S284, the registered user thus selected is set as the current user, the camera settings for the selected registered user are selected and the most recent user is updated as the selected registered user, and then the operation makes a return in S285. As described above, in the user automatic selection subroutine shown in FIG. 33, the registered user with the lowest signal attenuation rate at the electronic camera (the registered user within the shortest distance) is selected.

Figure 34:
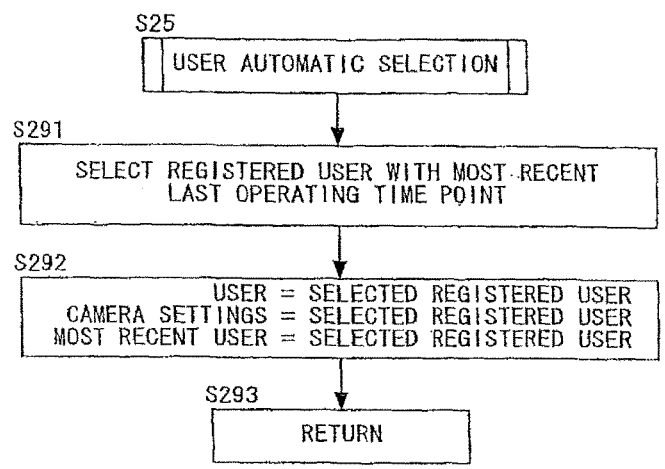
FIG. 34 presents a flowchart of a subroutine.

In the detailed flowchart of yet another example of a variation of the user automatic selection subroutine presented in FIG. 34, after the subroutine is started up in S25, the registered user whose last operation of the electronic camera is recorded with the most recent time among the detected registered users is selected in S291. In S292, the registered user thus selected is set as the current user, the camera settings for the selected registered user are selected and the most recent user is updated as the selected registered user before the operation makes a return in S285.

As described above, in the user automatic selection subroutine shown in FIG. 34, the registered user whose last operation of the electronic camera is the most recent (most likely to be the current user) is selected from the detected registered users. By referencing the history of the use of the camera by the users in this manner, the level of the user identification capability can be improved.

Figure 35:
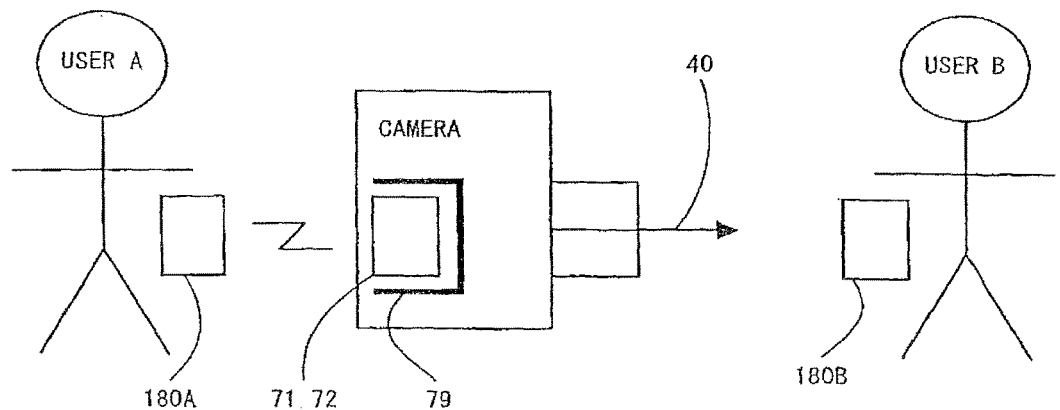
FIG. 35 illustrates the structure of the wireless circuit.
Figure 36:
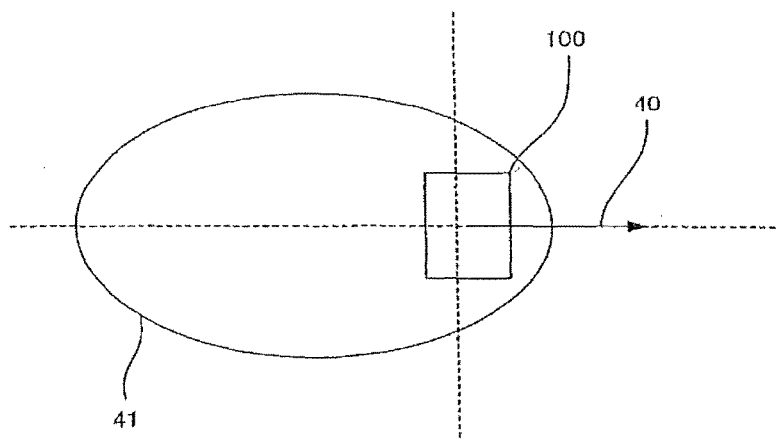
FIG. 36 illustrates the communication directivity.

In FIG. 35 illustrating the structure of the wireless transmission circuit 71 and the wireless reception circuit 72 within the electronic camera, the wireless transmission circuit 71 and the wireless reception circuit 72 are enclosed by an electromagnetic shield film 79 over the camera front surface (along with the photographic optical axis), the camera lower surface, the camera upper surface and the camera left and right side surfaces. Accordingly, the wireless transmission circuit 71 and the wireless reception circuit 72 are allowed to achieve communication readily with a portable instrument 180A carried by a user likely to be present to the rear of the camera, i.e., the photographer (user A in the figure) and are not allowed to achieve ready communication with a portable instrument 180B carried by the subject (user B in the figure) or the like present along the photographing direction. FIG. 36, which shows the communication directivity of the wireless transmission circuit 71 and the wireless reception circuit 72, indicates that the directivity on the side to the rear of the electronic camera 100 is extreme and that the directivity on the side to the front (along the optical axis 40) is slight.

By adopting the structure shown in FIG. 35 to allow the wireless transmission circuit 71 and the wireless reception circuit 72 to assume extreme directivity on the side to the rear of the camera as described above, the likelihood of detecting the photographer as the current user is increased. It is to be noted that the directivity may be adjusted by adopting a specific antenna structure as well as by using an electromagnetic shield film.

Figure 37:
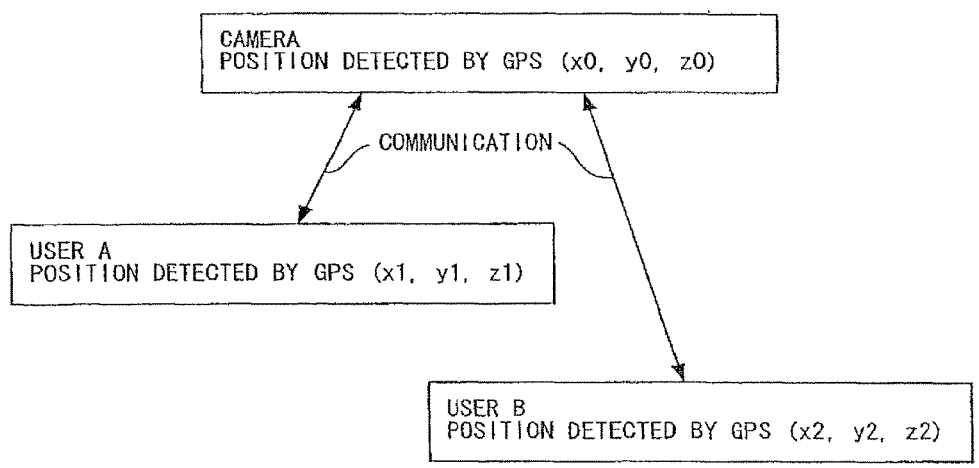
FIG. 37 illustrate the positional detection.

In FIG. 37 illustrating a user selection achieved based upon the positional relationships between the camera and users, camera user A and camera user B individually detect position data (x, y, z) with GPS (global positioning system) units, and the detected position data (x1, y1, z1) and (x2, y2, z2) of user A and user B respectively are provided to the camera which calculates the relative distances between the camera and user A and between the camera and user B based upon its own position data (x0, y0, z0) and selects the user present within the shortest relative distance. For instance, the relative distance between the camera and user A can be calculated as the square root of the sum of the squares of (x1−x0), (y1−y0) and (z1−z0).

Figure 38:
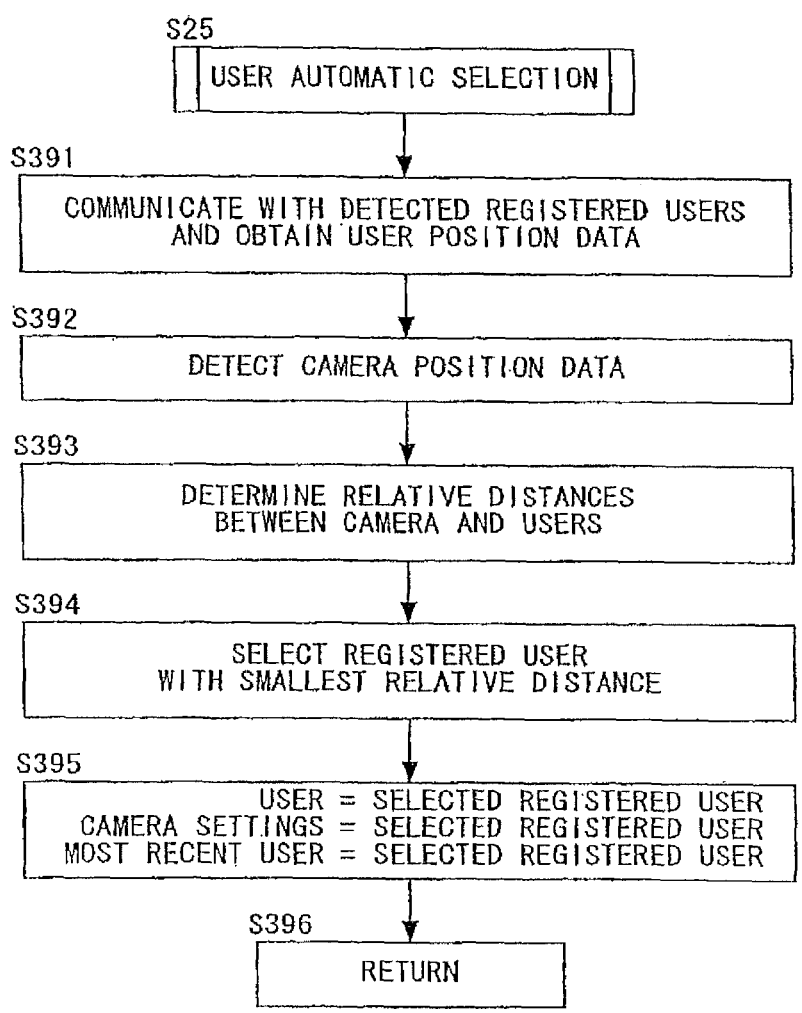
FIG. 38 presents a flowchart of a subroutine.

In the detailed flowchart of an embodiment of the user automatic selection subroutine which is achieved by utilizing GPS units presented in FIG. 38, after the subroutine is started up in S25, the position data indicating the user positions are obtained by communicating with the detected registered users in S391. In S392, position data indicating the position of the camera itself are detected. In S393, based upon the user position data and the camera position data, the relative distances between the camera and detected registered users are calculated. In S394, the registered user present within the shortest relative distance is selected. In S395, the registered user thus selected is set as the current user, the camera settings for the selected registered user are selected and the most recent user is updated as the selected registered user before the operation makes a return in S396.

As described above, in the user automatic selection subroutine shown in FIG. 38, the registered user present within the shortest distance from the camera is selected based upon the positions detected with the GPS units.

Figure 39:
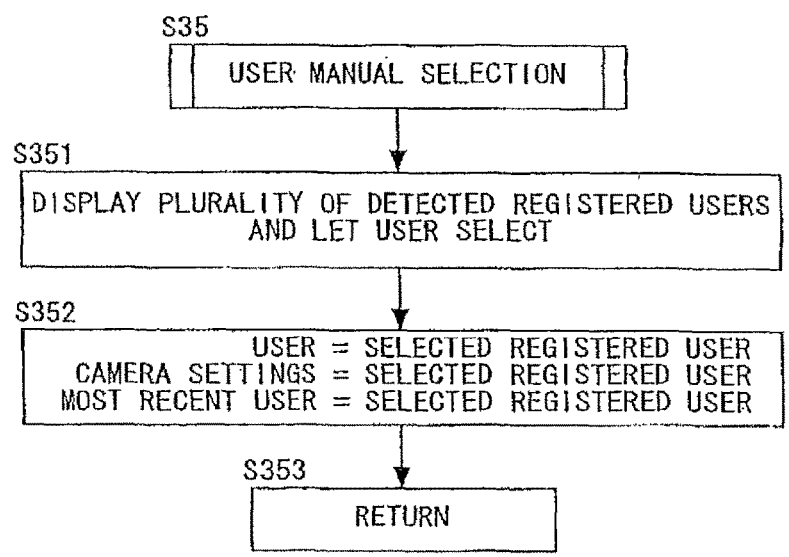
FIG. 39 presents a flowchart of a subroutine.
Figure 40:
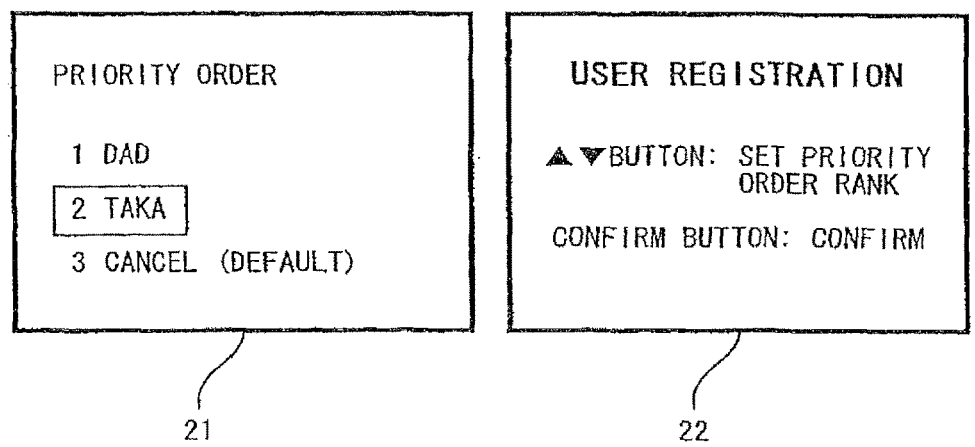
FIG. 40 presents an example of screen display.

In the detailed flowchart of a user manual selection subroutine executed to manually select the current user instead of through the user automatic selection subroutine, after the subroutine is started up in S35, the registered users detected as a result of a communication trial are displayed at the left screen 21, as shown in FIG. 40, to enable a user selection in S351. In S352, the registered user that has been selected is set as the current user, the camera settings for the selected registered user are selected and the most recent user is updated as the selected registered user, before the operation makes a return in S353. As described above, in the user manual selection subroutine shown in FIG. 39, a registered user is manually selected from the detected users indicated as the results of communication and thus, the current user can be selected with a high degree of reliability.

Figure 41:
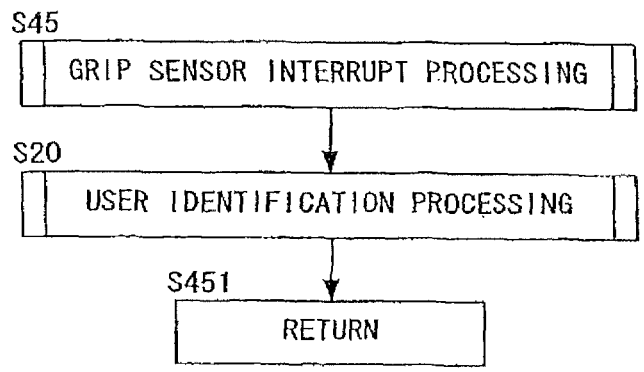
FIG. 41 presents a flowchart of a subroutine.

In the detailed flowchart of a grip sensor interrupt processing subroutine presented in FIG. 41, through which the user identification processing can be started at power ON, as well as in response to an output from a grip sensor internally provided at the grip portion 14, the grip-sensor-interrupt-processing subroutine in S45 is started up as the grip sensor senses that there has been a change at the grip portion 14, i.e., a change from a non-gripped state to a gripped state and the user identification processing subroutine in S20 is executed accordingly before the operation makes a return in S451. By executing the grip sensor interrupt subroutine shown in FIG. 41 as described above, the current user can be identified with a high degree of reliability even when a change of photographer occurs while the power is on.

Figure 42:
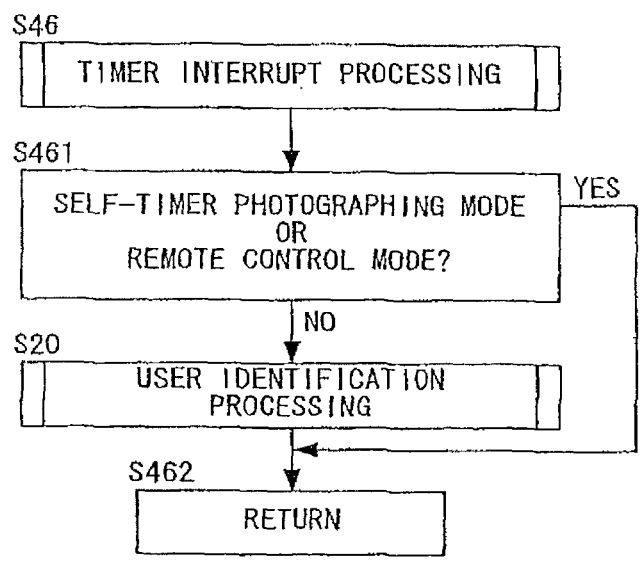
FIG. 42 presents a flowchart of a subroutine.

In the detailed flowchart of a timer interrupt processing subroutine presented in FIG. 42, through which the user identification processing is started up by a timer interrupt, the timer interrupt processing in S46 is started up over a predetermined time interval, a verification is achieved in S461 as to whether or not the camera is currently set in a self timer photographing mode (a mode set with an operating member (not shown), in which an image-capturing operation is executed with a predetermined delay following a shutter release operation) or a remote control mode (a mode set with an operating member (not shown), in which the shutter is released in the camera through a remote control operation), and if the camera is set in either the self timer photographing mode or the remote control mode, the operation makes a return in S462 without executing a user identification. If, on the other hand, the camera is not set in the self timer photographing mode or the remote control mode, the user identification processing subroutine in S20 is executed and then the operation makes a return in S462.

As described above, the timer interrupt processing subroutine shown in FIG. 42, the user identification is executed over predetermined time intervals to achieve a reliable user identification even when the photographer hands the camera over to another operator while the power is on. In addition, since the user identification is not executed in an operating mode (the self timer photographing mode or the remote control mode) in which the photographer is likely to be away from the camera, the reliability of user identification is improved.

Figure 43:
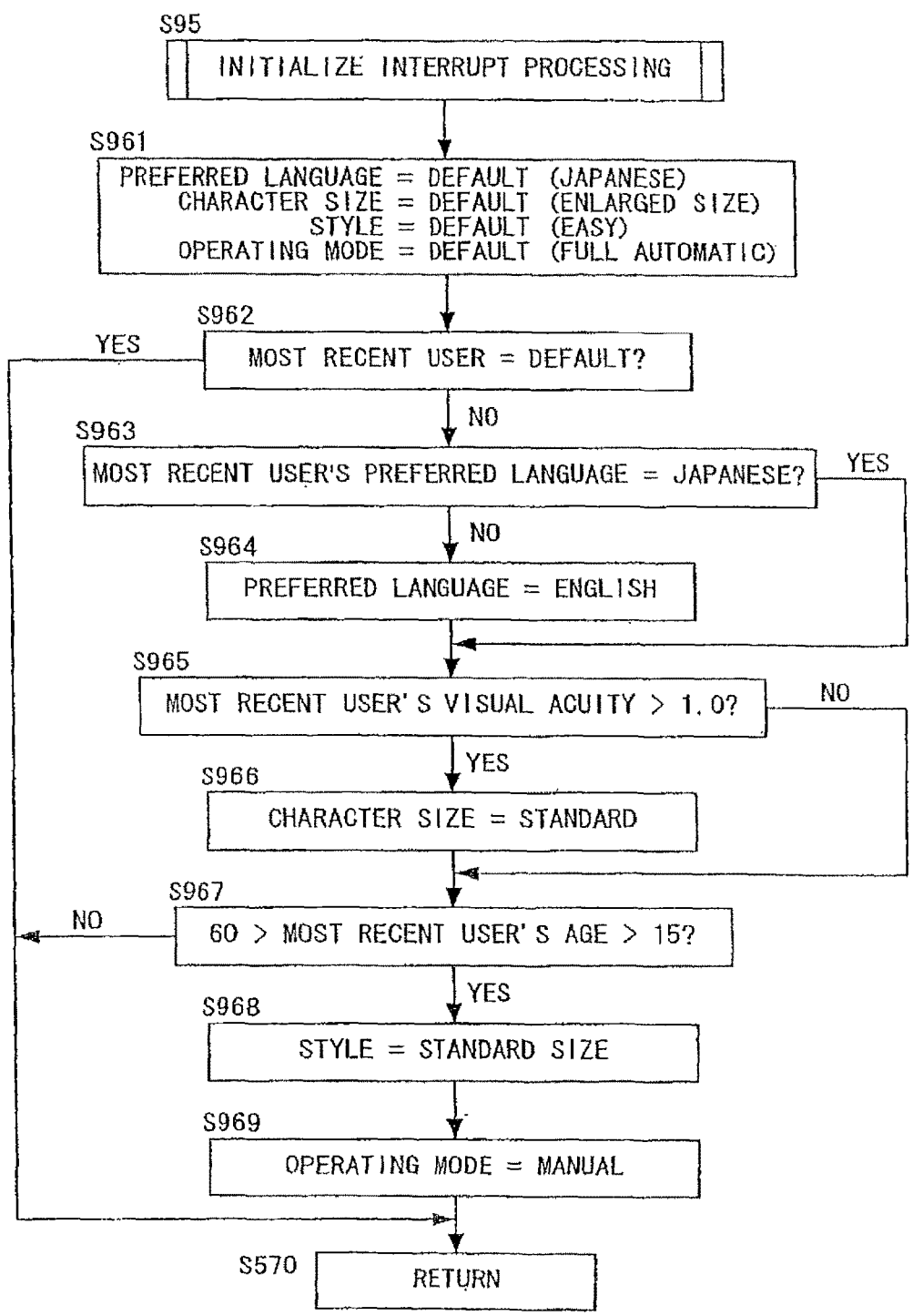
FIG. 43 presents a flowchart of a subroutine.

In the detailed flowchart of an example of a variation of the initialize-interrupt-processing subroutine presented in FIG. 43, the camera operation is set based upon the personal information data. After the subroutine is started up in S95, the default settings for the preferred language, the display character size, the preferred text style and the operating mode (preferred language=Japanese, character size=enlarged size, text style=easy, operating mode=full automatic) are selected in S961. In S962, a verification is achieved as to whether or not the most recent user is the default user, and if the most recent user is the default user, the operation makes a return in S570. If, on the other hand, the most recent user is not the default user, a verification is achieved in S963 as to whether or not the preferred language of the most recent user is Japanese, and if the preferred language is Japanese, the operation proceeds to S965. If, on the other hand, the preferred language of the most recent user is not Japanese, English is set for the preferred language in S964 before the operation proceeds to S965. In S965, a verification is achieved as to whether or not the visual acuity of the most recent user is equal to or higher than 1.0 and if the visual acuity of the most recent user and is not equal to or higher than 1.0, the operation proceeds to S967. If the visual acuity of the most recent user is equal to or higher than 1.0, on the other hand, the character size is set to a standard size before the operation proceeds to S967. In S967, a verification is achieved as to whether or not the age of the most recent user is equal to or higher than 15 and equal to or lower than 60, and if the age of the most recent user is not equal to or higher than 15 and equal to or lower than 60, the operation makes a return in S570. If, on the other hand, the age of the most recent user is equal to or higher than 15 and equal to or lower than 60, the text style is set to "standard" in S968, the operating mode is set to "manual" in S969 and then the operation makes a return in S570. The settings thus selected are reflected in the camera operation and the display operation executed after the return.

Figure 44:
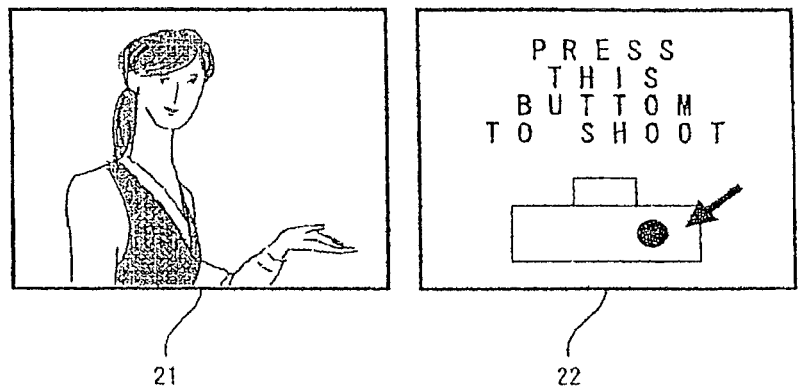
FIG. 44 presents an example of screen display.

As described above, in the initialize interrupt subroutine shown and FIG. 43, the operating mode of the camera is adjusted to satisfy individual user needs (a user likely to be inexperienced can use the camera with ease in the full auto (fully automatic) mode, whereas an experienced user can use the camera in a more advanced application through manual setting), the character size is adjusted for an easy-to-check display (a display of larger-sized characters for a user with poor vision), the text style is adjusted to ensure that an error-free operation is performed (an easy text style, free of technical terms, and graphics are used for seniors and children) and a reliable man-machine interface is provided by adjusting the preferred language, based upon the personal information data (the age, the visual acuity and the preferred language). FIG. 44 presents an example of a screen display brought up in the photographing mode with the preferred language set to English, the character size set to large and the text style set to easy. Simple English text (without any technical terms) is displayed by using large-size alphanumeric characters together with graphics and, in this case, the camera assumes the full auto settings (program exposure mode, one-shot AF mode, normal recording mode and color normal display mode), thereby allowing even an inexperienced photographer to perform a reliable photographing operation without having to select special settings.

Figure 45:
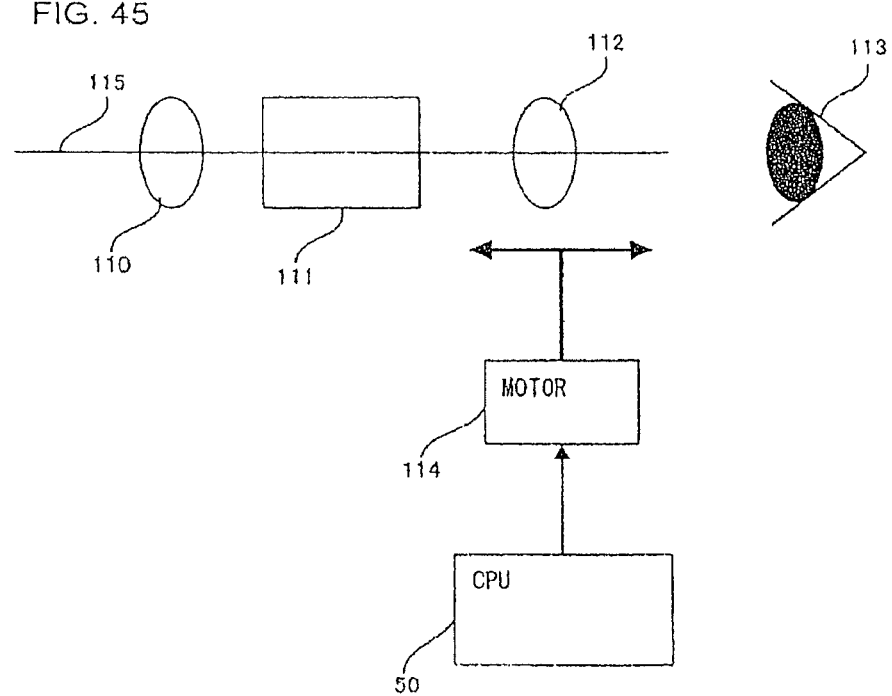
FIG. 45 illustrates the diopter adjustment.

In FIG. 45, presenting an example of a configuration that may be adopted to automatically adjust the viewfinder diopter in conformance to data indicating the user diopter (eyesight), a Kepler viewfinder (a real-image finder) is constituted with an objective lens 110, an erecting prism 111 and an eyepiece lens 112 and the photographic field can be observed with an eye 113 set on a viewfinder optical axis 115. By moving the eyepiece lens 112 along the viewfinder optical axis, the diopter can be adjusted. The eyepiece lens 112 is moved by a motor 114 which is controlled by the CPU 50.

Figure 46:
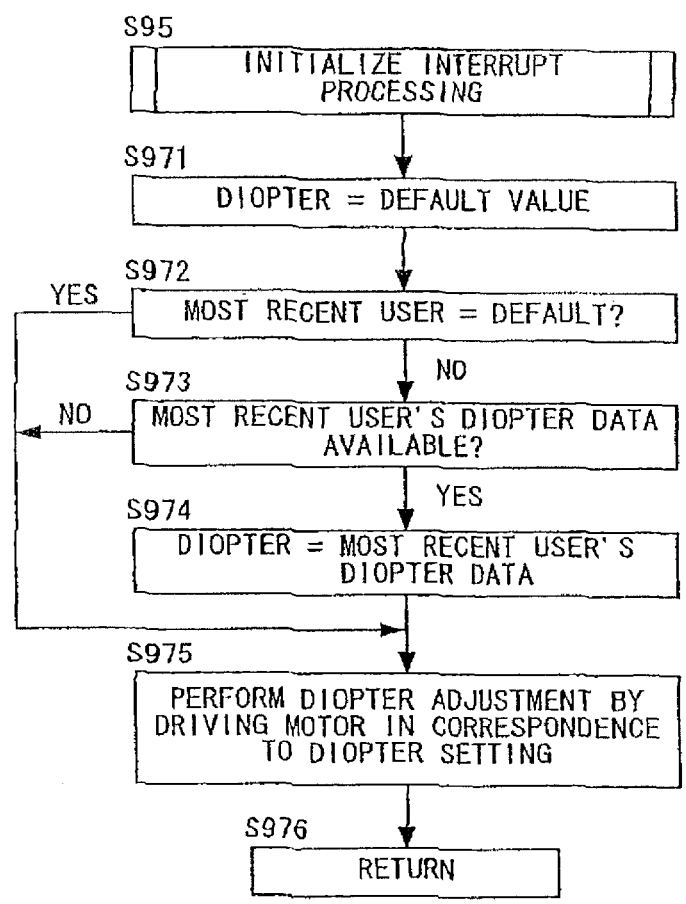
FIG. 46 presents a flowchart of a subroutine.

FIG. 46 presents a detailed flowchart of an automatic diopter (eyesight) adjustment performed for each user by adopting the configuration shown in FIG. 45 through the initialize interrupt processing subroutine. After the subroutine is started up in S95, the diopter is set to the default value in S971, a verification is achieved in S972 as to whether or not the most recent user is the default user and if the most recent user is the default user, the operation proceeds to S975. If, on the other hand, the most recent user is not the default user, the operation proceeds to S973 to make a verification as to whether or not the diopter data of the most recent user are available and if the diopter data are not available, the operation proceeds to S975. If the diopter data are available, the diopter is set as indicated by the diopter data of the most recent user and then the operation proceeds to S975. In S975, the CPU 50 drives the motor 114 in conformance to the diopter that has been set to adjust the position of the eyepiece lens 112, thereby completing the diopter adjustment executed in conformance to the user diopter before the operation makes a return in S976. It is to be noted that data indicating the extent of user fatigue may be read out by communicating with the user over predetermined time intervals to fine-adjust the diopter in conformance to the fatigue data, or the length of time over which the electronic camera 100 has been continuously used since the user started operating the electronic camera 100 may be measured to fine-adjust the diopter in conformance to the length of the continuous operation.

Figure 47:
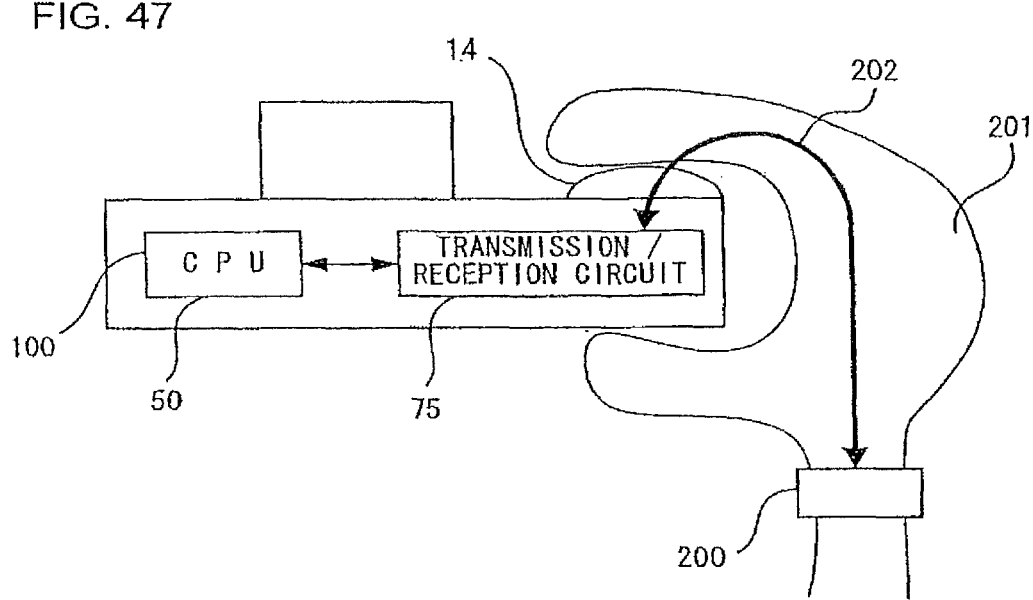
FIG. 47 illustrates communication achieved through a user internal path.

In FIG. 47 showing the structure that may be adopted in an example of a variation of the wireless communication between the electronic camera and an instrument carried by the user, a weak electrical current (a weak electromagnetic wave) traveling through a path 202 inside the body (a hand 201) of the user holding the portion 14 of the electronic camera 100 is used to enable communication between the CPU 50 and a wristwatch-type instrument 200 worn by the user at which the user information is stored, through a transmission/reception circuit 75. The surface of the grip portion 45, an electrical contact layer that transmits/receives electrical signals through the hand placed in contact with the surface is formed. This contact layer is connected with the transmission/reception circuit 75, so as to enable communication with the instrument 200 carried by the user via the hand holding the portion 14. The instrument 200, too, includes an electrical contact layer to be placed in contact with the hand 201 of the user, so that data can be received and stored data can be transmitted through the contact layer.

Figure 48:
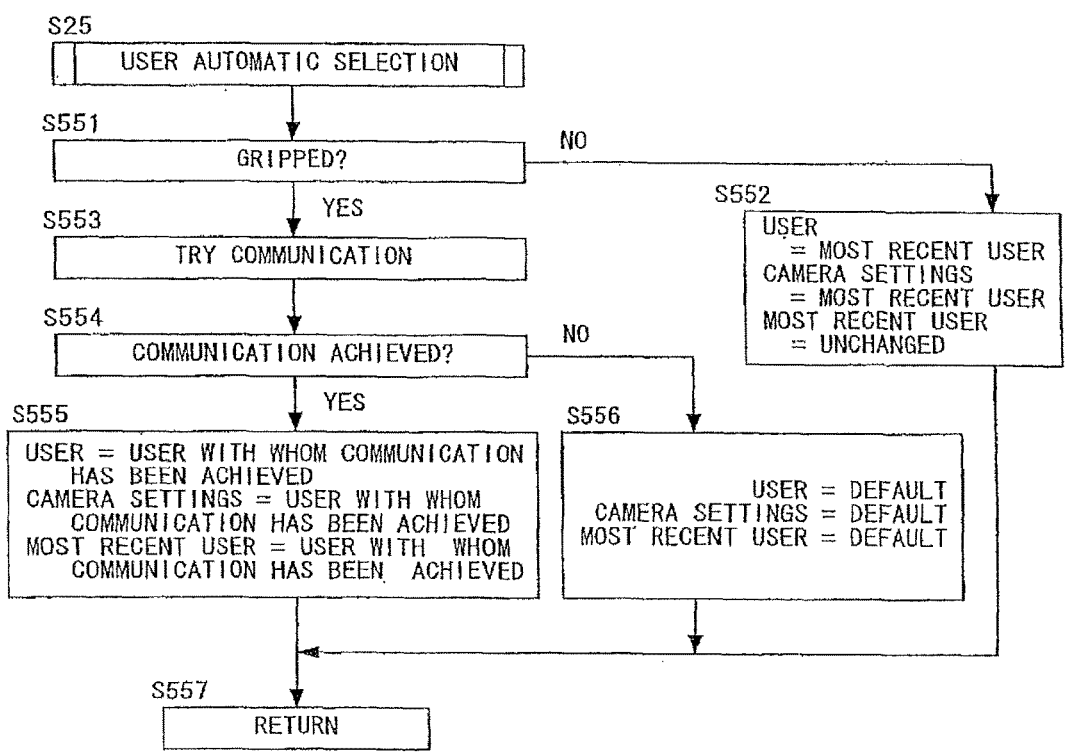
FIG. 48 presents a flowchart of a subroutine.

In the detailed flowchart of a user processing subroutine presented in FIG. 48, which is achieved by adopting the embodiment illustrated in FIG. 47, after the subroutine is started up in S25, a verification is achieved in S551 through the grip sensor as to whether or not the portion 14 is gripped and if it is judged that the portion 14 is not gripped, the most recent user is set as the current user, the camera settings for the most recent user are selected and the most recent user setting is left unchanged in S552 before the operation makes a return in S557. If, on the other hand, it is judged in S551 that the portion 14 is gripped, a communication is attempted via the path 202 within the hand 201 in S553, and if it is judged in S554 that communication has been achieved, the user with whom communication has been achieved is set as the current user, the camera settings for the user with whom communication has been achieved are selected and the most recent user is updated as the user with whom communication has been achieved in S555 before the operation makes a return in S557. If, on the other hand, it is judged in S554 that communication has not been achieved, the default user is set as the current user, the camera settings for the default user are selected and the most recent user is updated as the default user in S556, and then the operation makes a return in S557. As described above, since communication with the instrument having stored therein the user personal information is achieved through the hand holding the electronic camera 100 in the user automatic selection subroutine shown in FIG. 48, the operator (the user) of the electronic camera 100 can be selected with a high degree of reliability.

Figure 49:
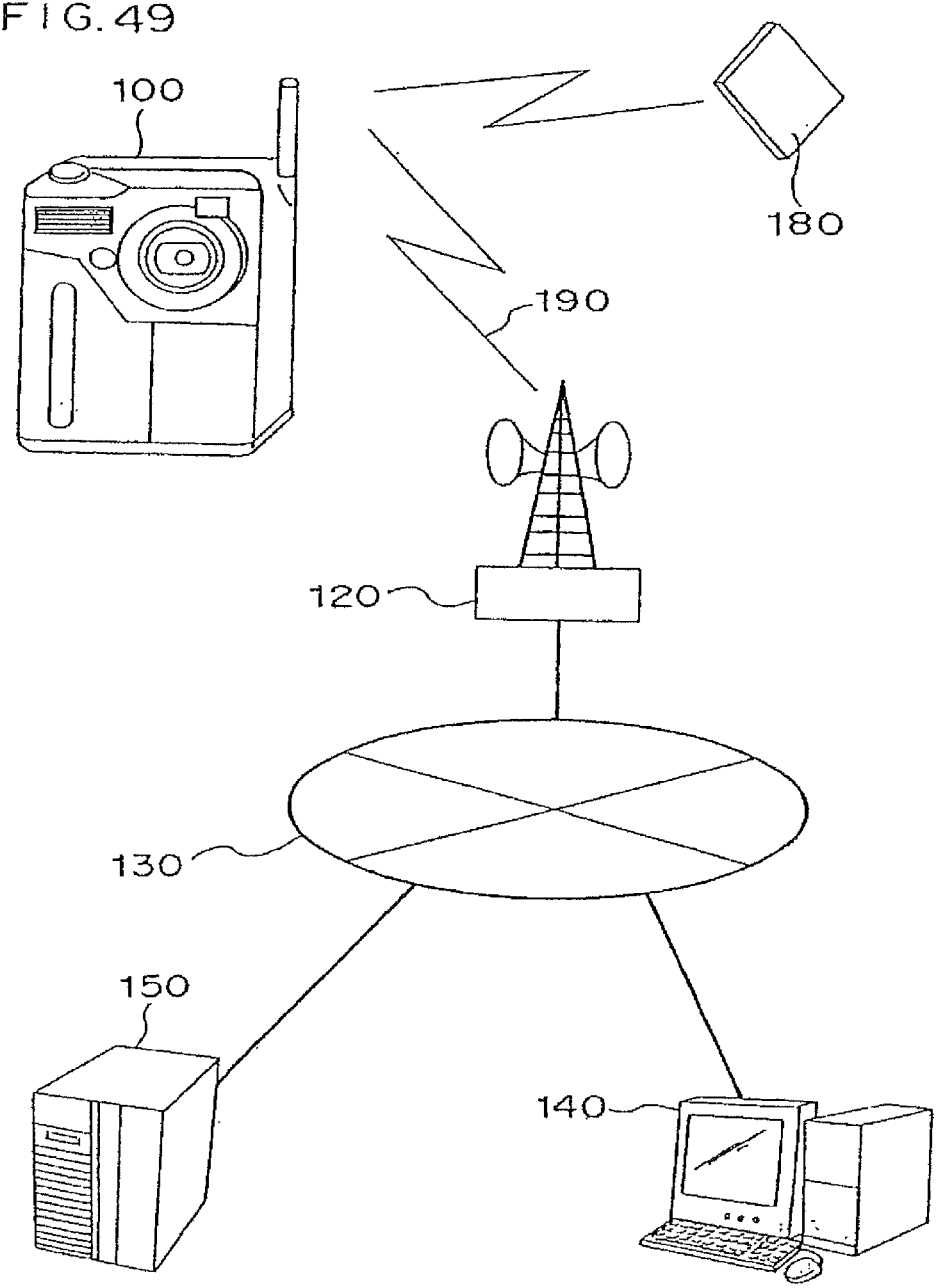
FIG. 49 is a conceptual diagram of an example of a variation of the system configuration.

FIG. 49 is another conceptual diagram of an electronic camera adopting the present invention and an electronic image communication system achieved by utilizing this electronic camera. While the personal information data stored in the UIM card 170 loaded at the portable telephone 160 are read into the electronic camera 100 through a short-distance wireless communication between the electronic camera 100 and the portable telephone 180 carried by the user in the electronic image communication system in FIG. 1, personal information data stored in a wireless tag (a non-contact IC card) are automatically read from the wireless tag into the electronic camera 100 as the wireless tag enters the vicinity of the electronic camera 100 internally provided with a non-contact wireless read unit in the electronic image communication system shown in FIG. 49. The electronic camera 100 also has a function of engaging in wireless communication through a wireless telephone line 190 and thus is capable of transmitting image data obtained through an image-capturing operation to an external database 140 and the like. As described above, in the electronic image communication system shown in FIG. 49, the operations of the electronic camera 100 can be customized by the user simply by holding a compact wireless tag (a non-contact IC card) which does not require a power source.

In the embodiment described above (see FIGS. 1 and 10), a wireless communication between the electronic apparatus and a portable instrument carried by a user is achieved simply as the user approaches the electronic apparatus, the personal information on the user is transferred to the electronic apparatus and the electronic apparatus automatically selects operational settings that are optimal for the user in conformance to the personal information. As a result, the user is able to immediately operate the electronic apparatus which has been customized for his use without having to perform a special operation.

In the embodiment described above (see FIG. 1), in which the user identification is executed through short-distance wireless communication, the likelihood of communicating with a partner (or an opponent) that is the current user is increased.

In the embodiment (see FIG. 9), the user identification is executed at power ON before the main operation of the electronic apparatus starts and the settings of the electronic apparatus are selected in correspondence to the identified user. Thus, a given user can always operate the electronic apparatus at the settings customized for the user.

Since the communication partner most likely to be the current user is automatically selected as the user if wireless communication with a plurality of partners has been achieved during the wireless user identification in the embodiment described above (see FIG. 10), the confusion that might otherwise result when a plurality of partners with whom wireless communication is enabled are present in the vicinity of the electronic apparatus is prevented.

Since the user is selected from the pre-registered users if wireless communication with a plurality of partners has been achieved during the wireless user identification in the embodiment described above (see FIG. 10), the confusion that might otherwise result when a plurality of partners with whom wireless communication is enabled are present in the vicinity of the electronic apparatus is prevented.

Since the predetermined default user is set as the current user if wireless communication has not been achieved with any partner during the wireless user identification in the embodiment described above (see FIG. 10), even a user who is not capable of transferring his personal information data to the electronic apparatus can operate the electronic apparatus at the default settings.

Since the electronic apparatus can be operated at the settings corresponding to the most recent user without executing a user identification if the MODE dial 19 is set to "fixed" in the embodiment described above (see FIG. 10), the confusion that might otherwise result when a plurality of partners with whom wireless communication is enabled are present in the vicinity of the electronic apparatus is prevented.

In the embodiment described above (see FIG. 11), if wireless communication with a plurality of partners has been achieved during the wireless user identification, communication is attempted by gradually adjusting the transmission output from low to high and the first user with whom communication is achieved is selected as the current user. As a result, the partner most likely to be the current user (the partner present over the shortest distance from the electronic apparatus) can be selected and the confusion that might otherwise result when a plurality of partners with whom wireless communication is enabled are present in the vicinity of the electronic apparatus is prevented.

Since the user is selected in conformance to the predetermined priority order if wireless communication with a plurality of partners has been achieved during the wireless user identification in the embodiment described above (see FIG. 11), a partner likely to be the current user can be selected and the confusion that might otherwise result when a plurality of partners with whom wireless communication is enabled are present in the vicinity of the electronic apparatus is prevented.

Figure 13:
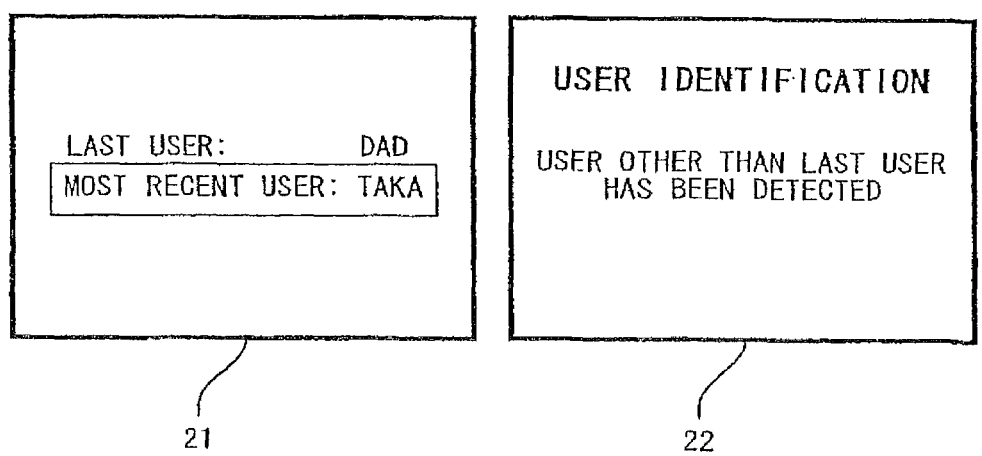
FIG. 13 presents an example of screen display.

Since the names of the last user and the current user are displayed only if the last user does not match the current user as a result of the user identification in the embodiment described above (see FIGS. 10, 12 and 13), no unnecessary display is brought up when a single user is continuously operating the electronic apparatus and, in addition, an appropriate action (registration setting) can be promptly taken manually if a user has been erroneously identified.

In the embodiment described above (see FIG. 14), the electronic apparatus can be initialized to the custom settings set in advance for a given user through a single action, and thus, the camera can be set to the user's preferred settings promptly to correspond to a specific photographing condition.

Since the name of the identified user remains on display at the screen in the embodiment described above (see FIG. 16 and the like), an appropriate action (registration setting) can be manually taken promptly even when the user has been erroneously identified.

When registering a new user, the names of the partners with whom wireless communication has been achieved are brought up on displayed at the screen and the user himself selects the name of the user to be newly registered in the embodiment described above (see FIGS. 21 and 23) and, as a result, the user to be newly registered can be specified with a high degree of reliability.

Since the user automatically identified by the camera can be manually changed in the embodiment described above (see FIGS. 21 and 25), an appropriate action can be promptly taken manually even when the wrong user has been identified by the camera.

In the embodiment described above (see FIG. 32), the communication partner reporting the highest-reception-signal level among a plurality of partners with whom wireless communication has been achieved is selected as the current user during the wireless user identification and, as a result, the partner most likely to be the current user (the partner present at the shortest distance from the electronic apparatus) can be selected, thereby preventing the confusion which might otherwise result when a plurality of partners with whom wireless communication is enabled are present in the vicinity of the electronic apparatus.

In the embodiment described above (see FIG. 33), the communication partner with the lowest transmission signal attenuation rate among a plurality of partners with whom wireless communication has been achieved is selected as the current user during the wireless user identification and, as a result, the partner most likely to be the current user (the partner present at the shortest distance from the electronic apparatus) can be selected, thereby preventing the confusion which might otherwise result when a plurality of partners with whom wireless communication is enabled are present in the vicinity of the electronic apparatus.

In the embodiment described above (see FIG. 34), the communication partner who has operated the electronic apparatus most recently among a plurality of partners with whom wireless communication has been achieved is selected as the current user during the wireless user identification and, as a result, the partner most likely to be the current user can be selected, thereby preventing the confusion which might otherwise result when a plurality of partners with whom wireless communication is enabled are present in the vicinity of the electronic apparatus.

In the embodiment described above (see FIGS. 35 and 36), the directivity of the wireless communication in the electronic apparatus is restricted along the direction in which the operator of the electronic apparatus is likely to be present relative to the position of the electronic apparatus main unit by using an electromagnetic shield or the like and, as a result, the likelihood of wireless communication being achieved with the true user is increased and the likelihood of wireless communication being achieved with parties other than the true user is reduced during the user identification executed through a wireless communication, thereby preventing the confusion which might otherwise result when a plurality of partners with whom wireless communication is enabled are present in the vicinity of the electronic apparatus.

In the embodiment described above (see FIGS. 37 and 38), the communication partner who is present within the shortest distance from the electronic apparatus among a plurality of partners with whom wireless communication has been achieved is selected as the current user during the wireless user identification and, as a result, the partner most likely to be the current user can be selected, thereby preventing the confusion which might otherwise result when a plurality of partners with whom wireless communication is enabled are present in the vicinity of the electronic apparatus.

In the embodiment described above (see FIGS. 39 and 40), if wireless communication has been achieved with a plurality of partners during the wireless user identification, the names of the partners with whom communication has been achieved are brought up on display at the screen and then the user himself is allowed to select the true user from the partners on display. As a result, the correct user can be specified with a high degree of reliability and the confusion that might otherwise result when a plurality of partners with whom wireless communication is enabled are present in the vicinity of the electronic apparatus is prevented.

Since the user identification is executed by detecting that the electronic apparatus is held by the user in the embodiment described above (see FIG. 41), the user identification is executed only if there is a user who is bound to be operating the electronic apparatus and thus, an erroneous user identification resulting from wireless communication achieved with a non-user partner when there is no true user present in the vicinity of the electronic apparatus is prevented.

In the embodiment described above (see FIG. 42), the user identification is executed over predetermined time intervals. As a result, a change-over of the user taking place when the power to the electronic apparatus is on can be automatically detected with a high degree of reliability and the electronic apparatus can be set for operation by the new user.

Since no user identification is executed through the short-distance wireless communication in an operating mode in which a true user is not likely to be in the vicinity of the electronic apparatus in the embodiment described above (see FIG. 42), the risk of erroneously identifying a party other than the true user as the current user is reduced.

Since the operational settings and the display settings are selected for the electronic apparatus in conformance to the extent of expertise of a given user in handling the electronic apparatus which is indirectly assessed based upon the general personal information on the user (information bearing no direct relevance to the electronic apparatus) in the embodiment described above (see FIGS. 43 and 44), unexperienced users (e.g. seniors and children) unaccustomed to handling electronic apparatuses can use the electronic apparatus through an easy and simple operation and, at the same time, users in the age group likely to be familiar with handling electronic apparatuses can utilize the electronic apparatus in a more advanced application through manual settings and the like.

Since the diopter adjustment of the viewfinder is executed based upon the information indicating the user's visual acuity in the embodiment described above (see FIGS. 45 and 46), it is not necessary to manually perform a viewfinder diopter adjustment each time one of a plurality of users sharing the camera operates the camera and, as a result, a photographing operation can be started promptly without missing a good photo opportunity.

Since the electronic apparatus communicates with an instrument worn by the user through the hand of the user holding the electronic apparatus in the embodiment described above (see FIGS. 47 and 48), the user can be identified with a high degree of reliability. Alternatively, the electronic instrument may be embedded in the body of the user.

Since the electronic apparatus includes a read circuit that reads a non-contact IC card (wireless tag) and thus is able to perform a non-contact read of the personal information from the non-contact IC card (wireless tag) in the embodiment described above (see FIG. 49), the personal information on the user carrying a light weight and compact non-contact IC card that does not require a power supply is provided to the electronic apparatus without requiring the user to perform any special operation and thus, the electronic apparatus can be operated with the settings preferred by the user.

(Examples of Variations)

The present invention is not limited to the embodiment described above and allows for a number of variations and modifications.

In the embodiment described above (see FIG. 9), communication with the electronic instrument (a portable telephone, a wireless tag) carried by the user is attempted from the electronic apparatus (electronic camera) side for user identification. However, an operating member that executes a trial communication may be provided at the user-side electronic instrument so that the electronic apparatus near the electronic instrument responds only when the user operates the operating member to enable transmission of the user personal information to the electronic apparatus, instead.

Figure 50:
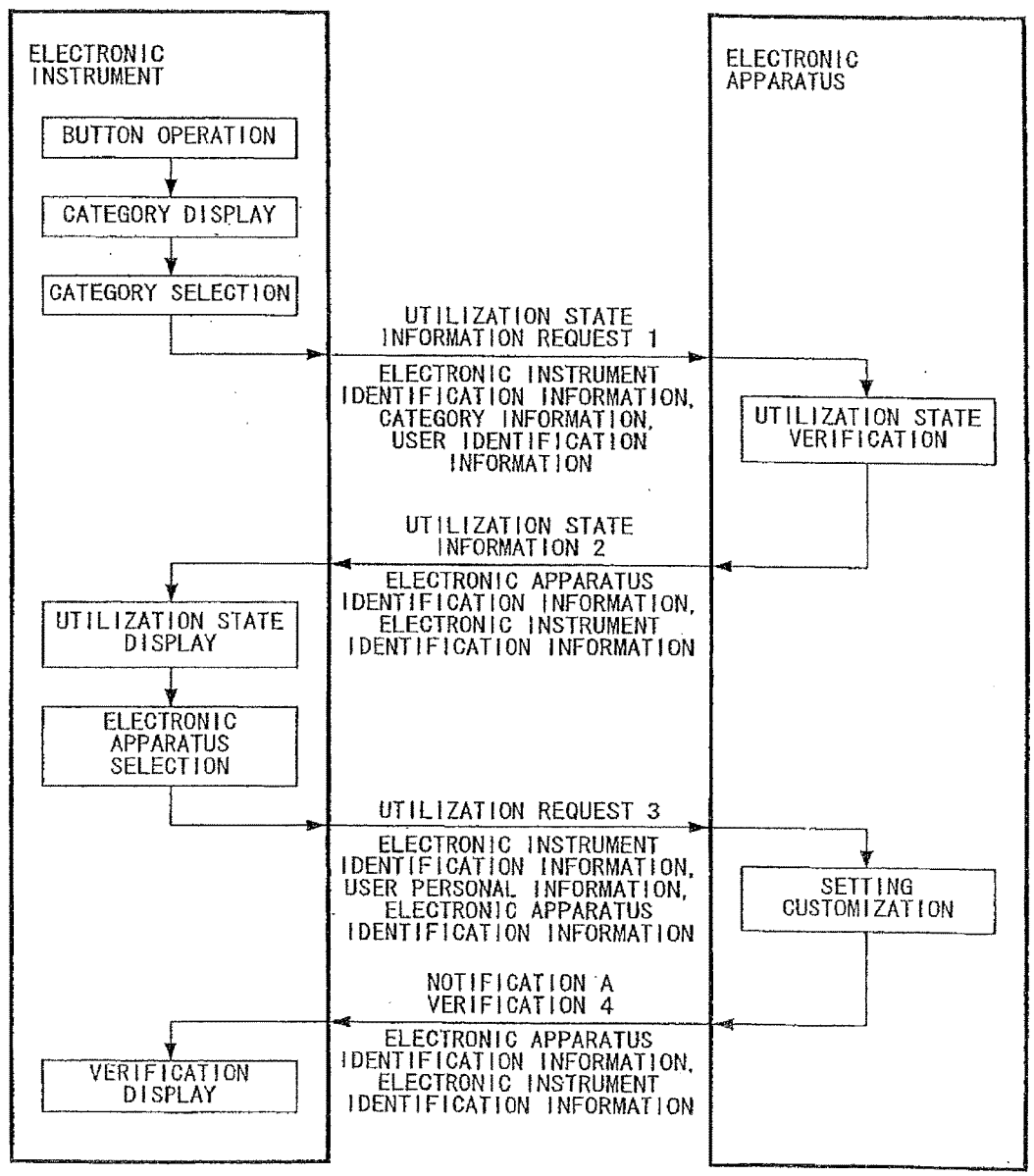
FIG. 50 shows an example of a variation of the communication sequence.
Figure 51:
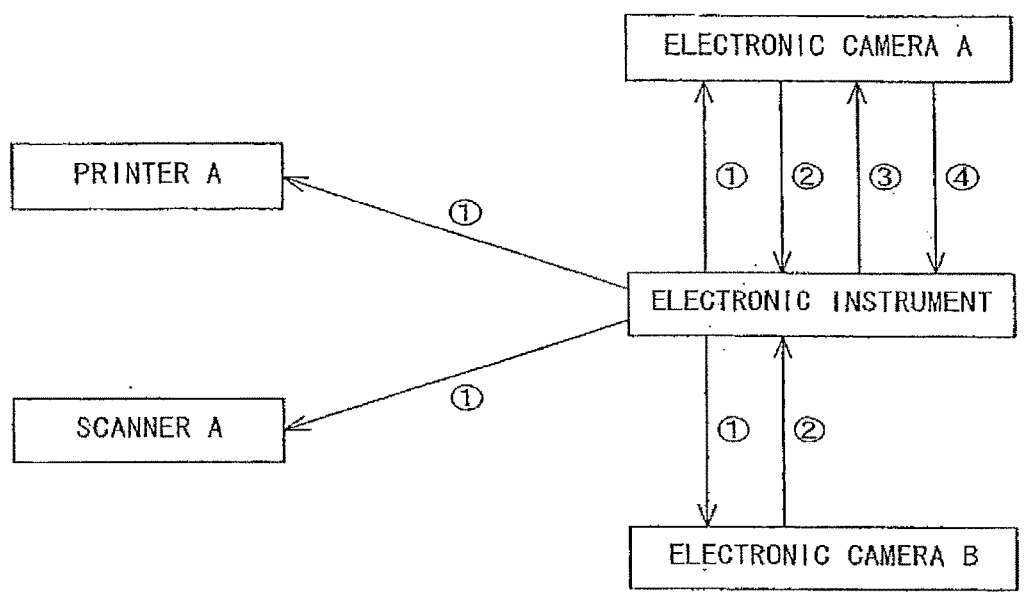
FIG. 51 illustrates a communication mode.
Figure 52:
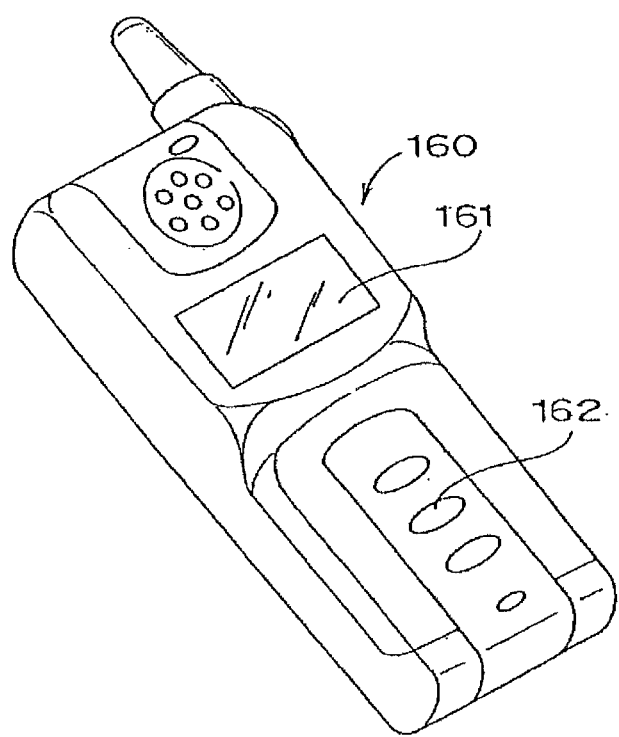
FIG. 52 presents an external view of a portable telephone.
Figure 53:
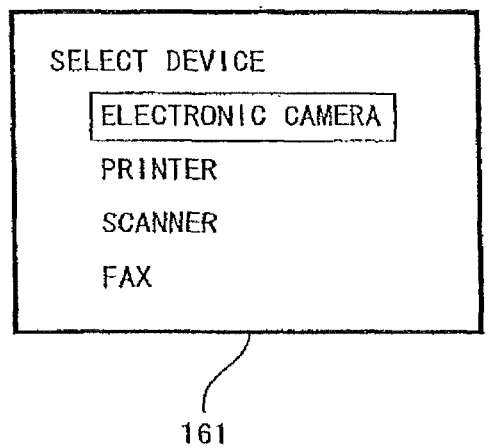
FIG. 53 presents an example of screen display.

FIG. 50 illustrates the sequence of a wireless communication exchange between an electronic instrument carried by the user and the electronic apparatus that the user wishes to utilize, which is initiated on the electronic instrument side. The electronic instrument is a portable telephone 160 shown in FIG. 52 at which a UIM card or the like is loaded and thus the personal information on the user carrying the portable telephone 160 is stored and saved. The portable telephone 160 includes a display screen 161 and operating buttons 162. As shown in FIG. 51, an electronic camera A, an electronic camera B, a printer A and a scanner A are present in the vicinity of the electronic instrument, and the user carrying the electronic instrument (the portable telephone 160) wishing to use an electronic apparatus (the electronic camera A) first operates an operating button 162 at the portable telephone 160 to set the portable telephone 160 in the communication mode, whereby various categories of electronic apparatuses that may be used are brought on display at the display screen 161, as shown in FIG. 53, to allow the user to select the category of the electronic apparatus he wishes to use with a selection member (not shown). FIG. 53 presents an example of a display in which the electronic camera is selected as the category of the electronic apparatus the user wishes to use.

Once the category of the electronic apparatus that the user wishes to utilize is the selected, the electronic instrument transmits electronic instrument identification information, information indicating the selected category and the user identification information to the electronic apparatuses present in the vicinity of the electronic instrument together with a utilization state information request 1. Among the electronic apparatuses having received the utilization state information request 1 from the electronic instrument, any electronic apparatus that does not belong to the category indicated by the category information does not return any response. However, if a given electronic apparatus fits into the category indicated by the category information, the electronic apparatus verifies the current utilization state (i.e. whether or not the user indicated by the user information can use the apparatus) and then executes communication 2 to transmit the utilization state information, resulting from the verification, to which both the identification information of the sender electronic apparatus and the electronic instrument information corresponding to the recipient are appended.

Figure 54:
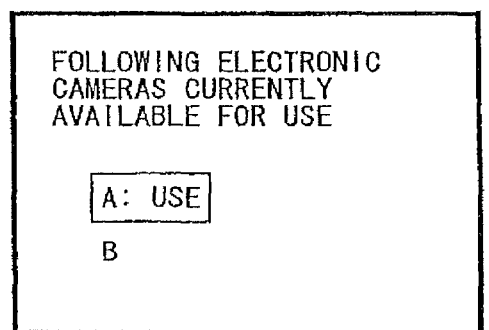
FIG. 54 presents an example of screen display.

The electronic instrument corresponding to the electronic instrument information that has received the utilization state information 2 from eligible electronic apparatuses displays their utilization states, i.e., the identities of the electronic apparatuses that are available for use, as shown in FIG. 54, at the display screen 161 and then automatically selects a single electronic apparatus based upon, for instance, varying distances between the electronic instrument and the electronic apparatuses. Alternatively, the user may be allowed to select the specific category of the electronic apparatus that he wishes to use with a selection member (not shown). FIG. 54 presence an example of a display in which the electronic camera A is selected as the electronic apparatus to be used.

Figure 55:
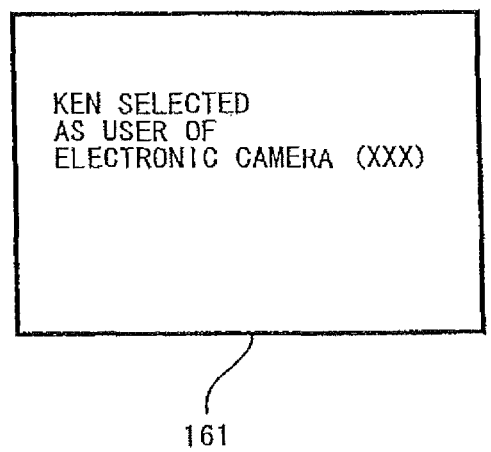
FIG. 55 presents an example of screen display.

After the electronic apparatus to be used is selected at the electronic instrument, the electronic instrument issues a utilization request to the selected electronic apparatus by transmitting the identification information corresponding to the selected electronic apparatus, the identification information corresponding to the sender electronic instrument and the user personal information through a communication 3. Upon receiving the utilization request 3, the electronic apparatus selected by the electronic instrument performs a custom setting operation for the electronic apparatus based upon the user personal information and also, it sends a verification notification attached with the identification information corresponding to the sender electronic apparatus and the identification information corresponding to the recipient electronic instrument through a communication 4 with the electronic instrument that has transmitted the utilization state. Upon receiving the verification notification 4, the electronic instrument, i.e., the recipient of the verification notification, displays a message indicating that the selected electronic apparatus is now available for use at the display screen 161, as shown in FIG. 55, for the user.

Subsequently, the user can operate the electronic apparatus at the settings customized for his use.

Since this allows the electronic apparatus to verify with a high degree of reliability that the electronic instrument having initiated a trial communication belongs to a user, an erroneous user identification can be prevented and, at the same time, since the electronic apparatus is able to execute the user identification with arbitrary timing, the current user of the electronic apparatus can be effectively identified even after a user has changed-over.

The user-side electronic instrument, having received the electronic apparatus utilization information from an electronic apparatus (e.g., information indicating that the electronic apparatus is currently being used by another person, information indicating that only limited users are allowed use of the electronic apparatus), makes a decision as to whether or not the user can use this particular electronic apparatus. If the user-side electronic instrument decides that there is a single electronic apparatus in its vicinity that can be used by the user, this electronic apparatus is selected as the apparatus to be used by the user and transmits a message indicating that the user's intention to use the electronic apparatus and the user personal information to the electronic apparatus. Upon receiving the message indicating the user's intention to use the electronic apparatus and the user personal information from the electronic instrument, the electronic apparatus identifies the user carrying the electronic instrument as the user of the electronic apparatus and customizes the settings of the electronic apparatus for the user based upon the user personal information.

If the user-side electronic instrument determines that there are a plurality of electronic apparatuses in its vicinity that can be used by the user, it automatically selects the electronic apparatus that the user most likely wishes to use through a method similar to any of those adopted in the embodiment (the electronic apparatus present at the shortest distance, the electronic apparatus which is highest in the priority order, manual selection, etc.) and transmits a message indicating the user's intention to use the electronic apparatus and the user personal information to the selected electronic apparatus. Upon receiving the message indicating the user's intention to use the electronic apparatus and the user personal information from the electronic instrument, the electronic apparatus identifies the user carrying the electronic instrument as the user of the electronic apparatus and customizes the settings of the electronic apparatus for the user based upon the user personal information.

Alternatively, if the user-side electronic instrument determines that there are a plurality of electronic apparatuses in its vicinity that can be used by the user, it may transmits a message indicating the user's intention to use the electronic apparatus and the user personal information to the plurality of electronic apparatuses. In this case, upon receiving the message indicating the user's intention and the personal information from the electronic instrument, each of the plurality of electronic apparatuses identifies the user carrying the electronic instrument as the user of the electronic apparatus and, as a result, the settings at the plurality of electronic apparatuses are simultaneously customized for the user based upon the user personal information. Thus, the need to execute the user identification at each electronic apparatus is eliminated when the user wishes to use a plurality of electronic apparatuses at the same time.

As another alternative, the user-side electronic instrument may immediately transmit a message indicating the user's intention and the user personal information to any electronic apparatus in its vicinity without verifying the number of electronic apparatuses in its vicinity that can be used by the user. In this case, each electronic apparatus having received the message indicating the user's intention to use and the personal information from the electronic instrument identifies the user carrying the electronic instrument as the user of the electronic apparatus and, as a result, the settings at a plurality of electronic apparatuses or a single electronic apparatus can be customized for the user based upon the user personal information. While this does not allow the user to select a specific electronic apparatus for use, it eliminates the step in which a decision is made as to whether or not a given electronic apparatus is available for use by the user and, for this reason, it is effective in a situation in which the user urgently needs to operate an electronic apparatus customized for his use.

In addition, the electronic apparatus automatically selected by the user-side electronic instrument may be displayed at the display unit of the electronic instrument for user verification. Alternatively, a list of electronic apparatuses available for use by the user may be displayed at the user-side electronic instrument based upon the results of the communication to allow the user to select the electronic apparatus he wishes to use.

In the embodiment described above (see FIG. 9), the user identification is achieved through a wireless (electromagnetic wave) communication between the electronic apparatus and the electronic instrument carried by the user. However, during this process, a redundant communication with an electronic instrument carried by a party other than the true user should be prevented by keeping the wireless transmission signal output level within a range lower than a predetermined value and thus, limiting the communication-enabled distance range based upon the assumption that electronic instruments have the average reception capability. This distance range is determined by taking into consideration the standard manner in which the electronic apparatus is operated, whether or not an object that blocks the electromagnetic waves is present between the electronic apparatus and the electronic instrument, the performance of the receiver at the electronic instrument and the like. It is desirable to set the range equal to or less than approximately 10 m under normal circumstances and to set the range equal to or less than 2 m and preferably equal to or less than 1 m in the case of an electronic apparatus that is primarily operated by the user carrying the apparatus.

In the embodiment described above (see FIG. 9), the user identification is achieved through a wireless (electromagnetic wave) communication between the electronic apparatus and the electronic instrument carried by the user. However, the user identification may be instead achieved through either a non-contact method or a contact method other than wireless communication. In addition, by combining a contact-type user identification method (e.g., finger print detection) or a non-contact user identification method (e.g., pupil pattern detection, retina pattern detection, face image detection or voiceprint detection), both achieved based upon physical characteristics of the user, with the wireless user detection method that uses the electromagnetic wave described above, an even more reliable user identification is enabled. By adopting such a combined method, the electronic apparatus detects the user's physical characteristics and then identifies the communication partner whose physical characteristics read out from his electronic instrument present in the vicinity of the electronic apparatus through wireless communication match the detected physical characteristics as the true user.

In the embodiment described above (see FIG. 9), the user identification is executed through wireless communication between the electronic apparatus and the electronic instrument carried by the user and the user verifies that he has been identified by the electronic apparatus by checking the user name displayed at the screen of the electronic apparatus. Instead, the electronic apparatus information may be transmitted by the electronic apparatus to the electronic instrument of the user identified by the electronic apparatus and the user's instrument, upon receiving the information, may display at the user-side electronic instrument, information indicating specifically which electronic apparatus has identified the user. In addition, the electronic instrument may notify the user that he has been identified by an electronic apparatus by utilizing a means for sound generation. In such a case, one of various sound patterns may be used in correspondence to a specific electronic apparatus type so that a user can ascertain the type of electronic apparatus which has identified him without having to check the display.

By adopting the structure described above, it becomes possible for the user to verify that he has been correctly identified by an electronic apparatus that does not include a means for display. In addition, such an audio notification allows the user to verify that he has been correctly identified by an electronic apparatus even if his electronic instrument does not include a means for display while keeping the electronic instrument in his pocket or the like.

In the embodiment described above (see FIG. 11), the electronic apparatus wirelessly communicates with an electronic instrument carried by a user, and if a plurality of users are detected as a result, the electronic apparatus attempts communication with the electronic instruments by gradually increasing the transmission output and selects the user able to use the electronic apparatus with whom communication is achieved initially, as the correct user. However, the electronic apparatus may attempt communication with electronic instruments by gradually increasing the transmission output from the initial state and select the user able to use the electronic apparatus with whom communication is achieved first as the correct user, instead.

In the embodiment described above (see FIG. 41), the user identification is executed with the timing with which the electronic apparatus is held by the user. However, the user identification may instead be executed through another method or with timing other than that used in the embodiment. For instance, the user identification may be executed with timing with which a given operating member of the electronic apparatus is operated (e.g., the timing with which the shutter release button 16 of the electronic camera 100 is pressed half way down). Since this allows the user identification to be executed at time when the user of the electronic apparatus is surely present in the vicinity of the electronic apparatus, a reliable user identification is achieved and, at the same time, the need for a special detection sensor such as a grip sensor is eliminated. Alternatively, a pair of elements, i.e., a light emitting element and a light-receiving element may be provided near the eyepiece unit of the viewfinder 11 to execute the user identification with the timing with which an increase in the quantity of reflected light is detected as a user moves his eyes or face closer to the eyepiece unit. As a further alternative, the user identification may be executed with the timing with which the memory card 104 is detached. Furthermore, the user identification may be executed with the timing with which the photographic lens is replaced, a zooming operation is performed, a focusing operation is performed or an external strobe is detached/attached in the electronic camera.

In the embodiment described above (see FIG. 42), no user identification is executed if the electronic apparatus is set in the remote control mode. However, the remote control device may be equipped with a user identification function, instead. In this case, a user identification is enabled even in the remote control mode and, at the same time, it is not necessary to execute the user identification at individual electronic apparatuses when a plurality of electronic apparatuses are controlled by using a single remote control device.

In the embodiment described above (see FIG. 43), the camera setting operation and the display operation are customized based upon the personal information on the user identified by the electronic apparatus. However, processing other than the camera setting operation and the display operation may be executed in conformance to the personal information which has been obtained.

For instance, the functions of operating members may be changed (e.g., the functions of the shutter release button 16 and the power switch 17 in FIG. 2 may be switched) in conformance to the information indicating the user's favored hand (left-handed or right-handed). The level of force (resistance) required to depress the shutter release button 16 may be adjusted in correspondence to the age or gender of the user. Moreover, any portion of the display on the screen that uses different hues may instead be displayed with varying levels of contrast if the user has a vision problem such as color blindness.

In the embodiment described above (see FIG. 9), the electronic camera 100 communicates with the electronic instrument carried by the photographer (user) and identifies the photographer operating the electronic camera 100. However, the electronic camera 100 may instead communicate with an electronic instrument carried by a subject to set the operations of the electronic camera 100 in conformance to the personal information of the subject.

In this case, the electronic camera 100 engages in wireless communication with electronic instruments in the vicinity and eliminates the electronic instrument that appears to be carried by the photographer among the electronic instruments with which communication has been achieved, for instance. The photographer's electronic instrument may be pre-registered at the electronic camera 100, or the electronic instrument present at the shortest distance from the electronic camera 100 may be identified as the electronic instrument carried by the photographer and thus eliminated. Next, the electronic camera 100 sets the distance range over which the subject of the electronic camera 100 should be present by using information indicating the photographic lens focal length or information indicating the photographic lens photographing distance and then selects the electronic instrument carried by the user (subject) of the electronic camera 100 present within the subject distance range from the electronic camera 100 among the electronic instruments with which wireless communication has been achieved based upon information related to the distances between the electronic camera 100 and the electronic instruments (the signal levels, the position information or the like). During this process, the photographing direction and the photographic field angle of the electronic camera 100 may be determined based upon azimuth information detected by a means for azimuth detection internally provided at the electronic camera 100 and the information indicating the photographic lens focal length, and the positions (the directions of the electronic instruments relative to the electronic camera 100 may be calculated based upon information indicating the measured positions (position information) of the electronic camera 100 and the electronic instruments so as to select the electronic instrument present within the photographic field angle along the photographing direction.

By selecting the electronic instrument carried by a party other than the photographer, i.e., the subject, as described above and, selectively engaging in wireless communication with the electronic instrument, the electronic camera 100 may obtain data indicating the color of the irises of the subject so that if any red-eye phenomenon occurs in the image data obtained by photographing the subject, the portion of the image data corresponding to the red-eye can be touched up by using the pupil color data.

In addition, the personal information may include data indicating whether or not the red-eye phenomenon tends to occur readily so that the electronic camera 100 can automatically set itself in a red-eye reproduction mode (a mode for reducing the extent of the red-eye phenomenon by emitting a small quantity of light at the strobe prior to a photographing operation and causing the pupils of the subject to contract) to perform a strobe photographing operation if the personal information obtained from the subject indicates that the user tends to induce the red-eye phenomenon readily. Furthermore, the personal information does not necessarily need to include direct data indicating whether or not the red-eye phenomenon tends to occur readily and, instead, it may include indirect data obtained by deducing the likelihood of the red-eye phenomenon based upon the general personal information such as the user's age and visual acuity. For instance, statistically, young children and myopic people tend to have large pupils and thus are likely to induce the red-eye phenomenon. Accordingly, the camera is forcibly set in the red-eye reproduction mode when photographing a young child or a myopic person. As an alternative means to a strobe light emission for causing the pupils to contract, a lamp or a very bright LED capable of continuously providing illumination over a predetermined length of time may be set in an ON state continuously prior to the photographing operation.

The first embodiment described above, in which a prompt user identification is achieved without placing a great onus on the user by identifying the user through wireless communication and the user highly likely to be the true user is automatically selected if a plurality of user candidates are detected wirelessly, enables the user to promptly start operating the electronic apparatus such as an electronic camera without having to perform any time-consuming tasks.

In addition, since the settings and the display at the electronic apparatus are adjusted by automatically optimizing them for use by the specific user in conformance to the general personal information bearing no direct relevance to the electronic apparatus settings, which the electronic apparatus has obtained from the user, an environment that allows inexperienced users, seniors and children as well as seasoned users to operate the electronic apparatus with ease and comfort is provided.

Second Embodiment

The second embodiment of the present invention is now explained in reference to the drawing. In the conceptual diagram of the second embodiment of the present invention presented in FIG. 56, an electronic camera that photographs a subject present within the photographing range also obtains related information from the subject and an information source present in the vicinity of the camera through wireless communication. In addition, the information related to the subject, which is made to correspond to the position of the subject within the photographic image plane, is appended to the image data obtained through the photographing operation together with other related information to constitute an image file.

When reproducing an image file, the image data having been obtained through a photographing operation are first reproduced and displayed as a home screen. Then, as the position within the image plane is specified at the home screen, the information related to the subject reproduced and displayed at the position is displayed at the screen. From the related information thus displayed, further related information linked with the information can be brought up on display.

Figure 56:
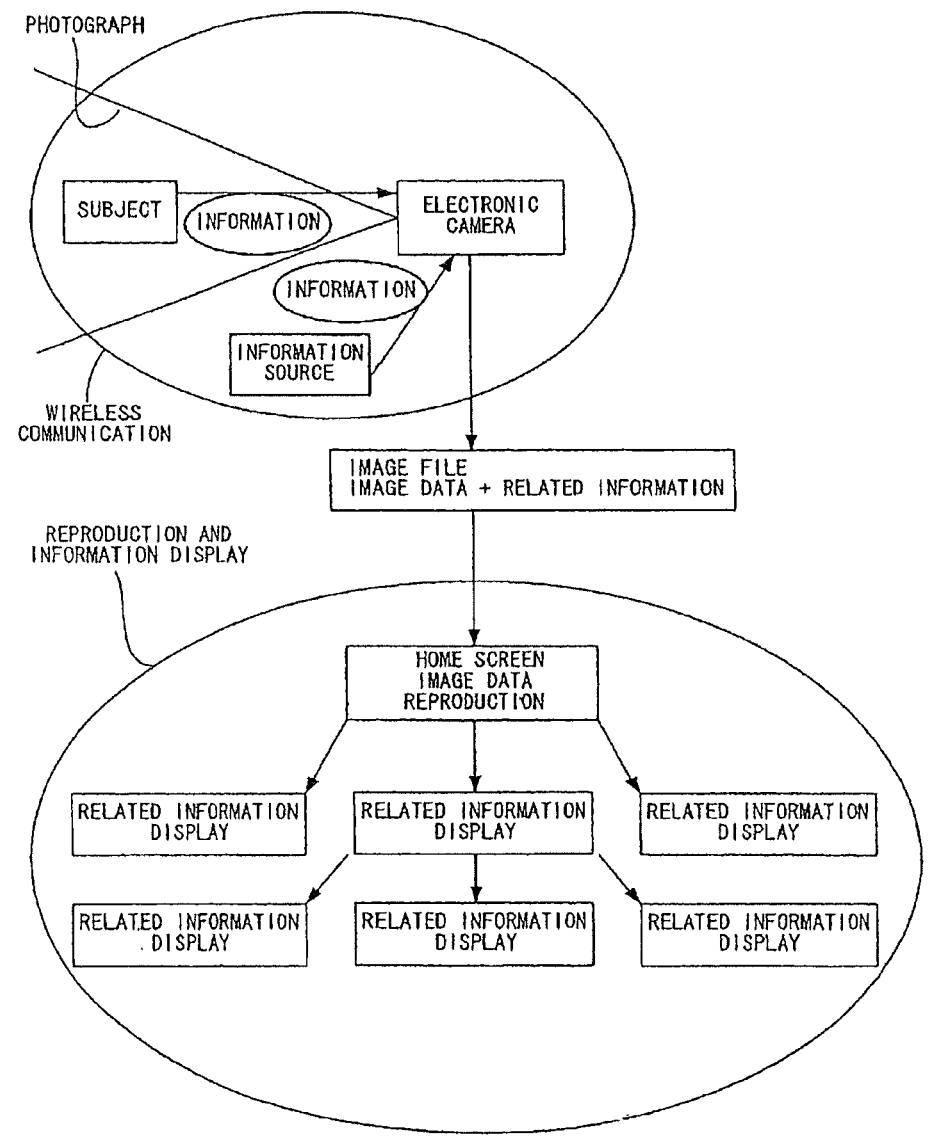
FIG. 56 illustrates the concept adopted in a second embodiment of the present invention.
Figure 57:
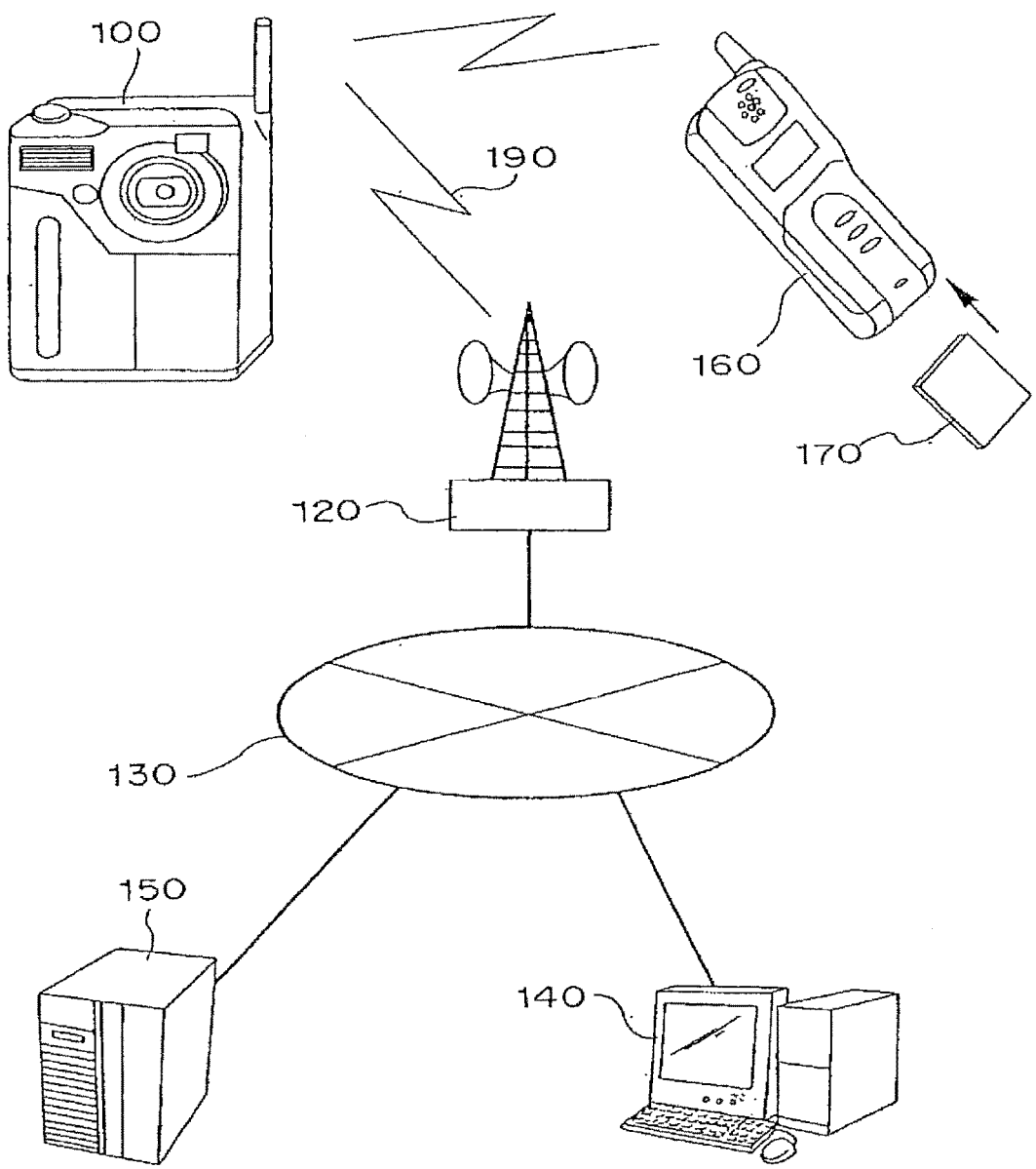
FIG. 57 illustrates the system configuration adopted in the second embodiment of the present invention.

FIG. 57 is a conceptual diagram of an electronic camera adopting the present invention and an electronic image communication system achieved by utilizing the electronic camera. In FIG. 56, an electronic camera 100 that includes a memory card saves electronic image data or digital image data (hereafter referred to as image data) obtained by photographing a photographic field contained within a photographic image plane in a predetermined size into a memory card. In addition, the electronic camera 100 has a short-distance wireless communication function (e.g., Bluetooth (registered trademark) enabling communication within a range of approximately a 10 meters) and engages in communication with a portable telephone 160 that also has a short-distance wireless communication function. It is assumed that this portable telephone 160 is carried by a subject, i.e., a person to be photographed by the electronic camera 100 and that a UIM card (user identification module card) 170 having stored therein user personal information, that can be loaded at the portable telephone 160. In addition, the portable telephone 160 is internally provided with a means for positional measurement (a means for positional detection such as a GPS) unit.

When the person, i.e., the subject, is photographed with the electronic camera 100, the personal information of the subject is transferred to the electronic camera 100 through communication between the electronic camera 100 and the portable telephone 160 carried by the subject. In addition, the electronic camera 100 detects the position of the subject within the photographic image plane through a method which is to be detailed later and stores an image file constituted of a set of the image-plane position information and the personal information as well as the image data obtained through the photographing operation into the memory card. The electronic camera 100 also transfers the image file to a personal computer 140 for personal use or an image server 150 via a wireless base station 120 through a wireless portable telephone line 190 and then via a wired or wireless public telephone line or the Internet 130.

The electronic camera 100 includes a liquid crystal display screen at which an image file can be reproduced and displayed by reading out the image file saved in the memory card. In addition, the electronic camera 100 is capable of accessing various information servers and information sites based upon the information related to the subject via the wireless portable telephone line 190 and the Internet 130, obtaining detailed information on the subject and reproducing and displaying the detailed information at the liquid crystal display screen.

The personal computer 140 for personal use includes a CRT display screen at which an image file can be reproduced and displayed by reading out the image file saved at the image server 150. The personal computer 140 for personal use is also capable of accessing various information servers and information sites based upon the information related to the subject via the Internet 130, obtaining detailed information on the subject and reproducing and displaying the detailed information at the CRT display screen.

Figure 58:
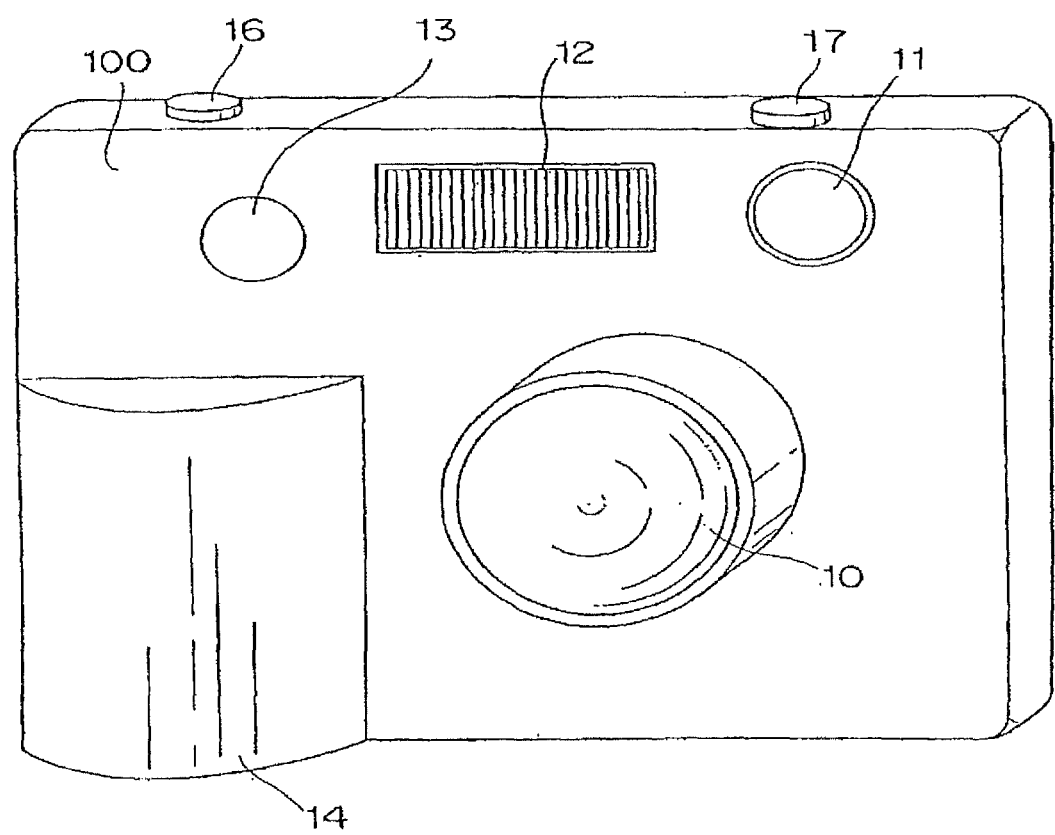
FIG. 58 is an external view (a front view) of the electronic camera achieved in the second embodiment of the present invention.
Figure 59:
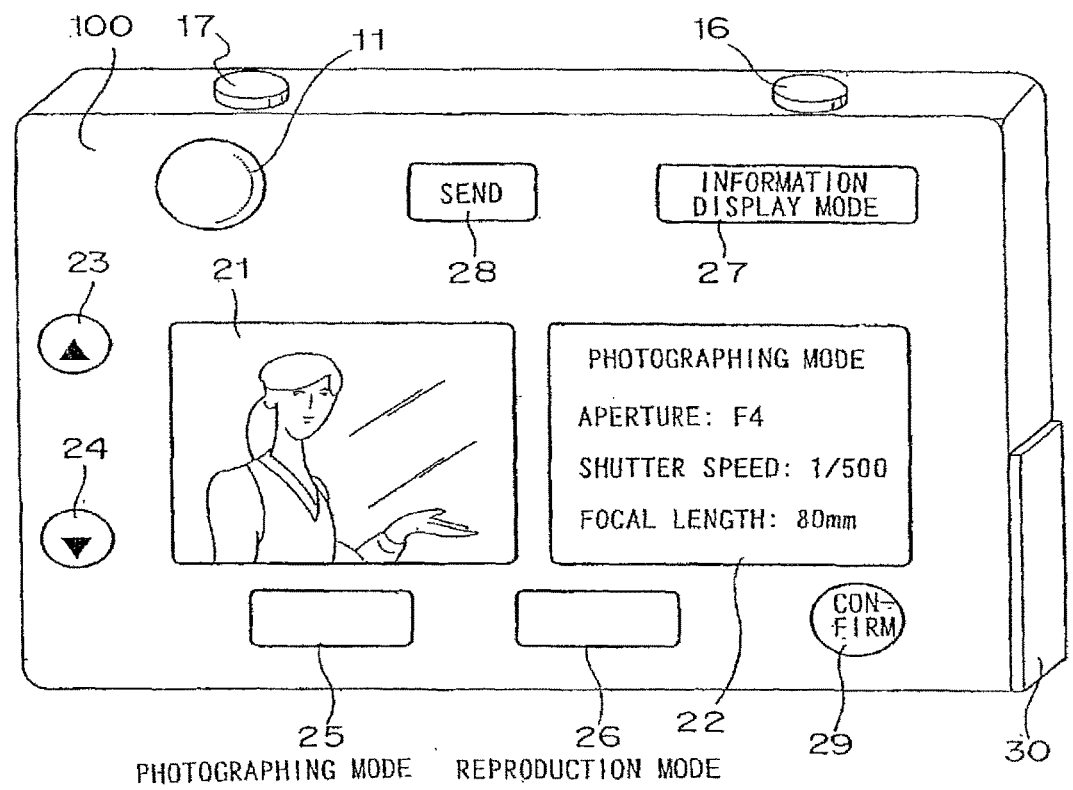
FIG. 59 is an external view (a rear view) of the electronic camera achieved in the second embodiment of the present invention.

FIGS. 58 and 59 present external views (a front view and a rear view) of the electronic camera 100 in FIG. 57, as achieved in an embodiment. As shown in FIG. 58, at the front of the electronic camera 100, a photographic lens 10 which forms a subject image, a viewfinder 11 through which the photographic image plane is checked, a strobe 12 used to illuminate the subject during a photographing operation, a photometering circuit 13 that detects the brightness of the subject and a grip portion 14 that projects out from the camera main body to allow the electronic camera 100 to be held by hand are provided, whereas a shutter release button 16 operated to issue an instruction for a photographing start and a power switch 17 (a momentary switch which is alternately set to ON and OFF each time it is operated) through which the on/off state of the power to the electronic camera 100 is controlled are provided at the upper side of the camera.

As shown in FIG. 59, at the rear of the electronic camera 100, an eyepiece unit of the viewfinder 11, a left LCD (left screen) 21 having a substantially quadrangular screen for text and image display and a right LCD (right screen) 22 having a substantially quadrangular screen for text and image display are provided, and an up button 23 and a down button 24 for switching the image displayed at the left screen 21 are provided in the vicinity of, and to the left of the left LCD 21, whereas the photographing mode button 25 operated to set the electronic camera 100 in a photographing mode, a reproduction mode button 26 operated to set the electronic camera 100 in a reproduction mode, an information display mode button 27 operated to set the electronic camera 100 in an information display mode and a CONFIRM button 29 used to set a selection item are provided around the right screen 22 and the left screen 21. At a side surface, a memory card slot 30 at which a memory card 104 may be loaded is provided.

It is to be noted that the shutter release button 16, the up button 23, the down button 24, the photographing mode button 25, the reproduction mode button 26, the information display mode button 27, the SEND button 28 and the CONFIRM button 29 are all operating keys operated by the user.

It is also to be noted that over the surfaces of the left screen 21 and the right screen 22, so-called touch tablets 66 having a function of outputting position data corresponding to a position indicated through a finger contact operation are provided, and they can be used to make a selection from selection items displayed on the screens or to select a subject displayed on the screen. The touch tablets 66 are each constituted of a transparent material such as a glass resin so that the user can observe images and text formed inside the touch tablets 66 through the touch tablets 66.

Figure 60:
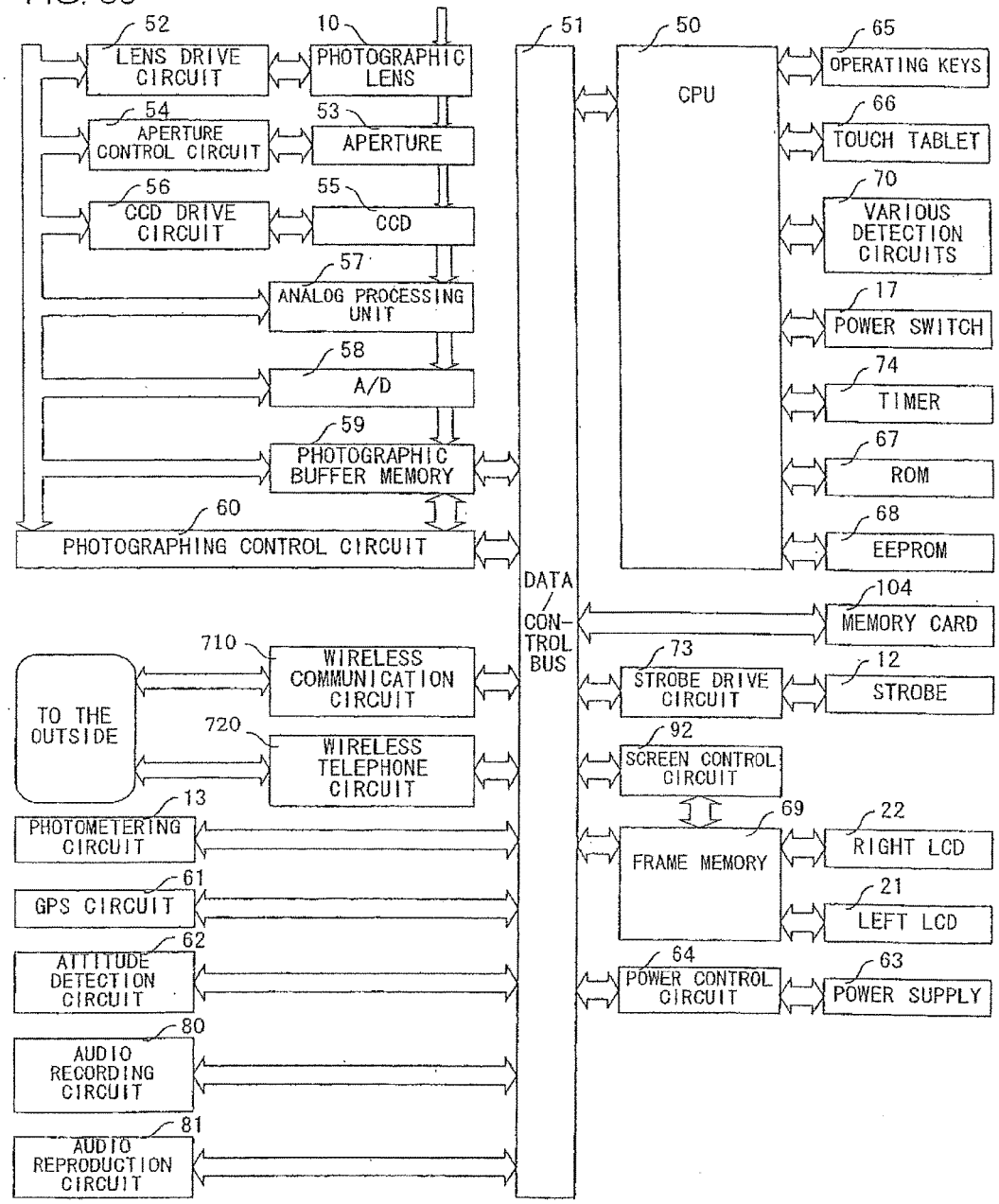
FIG. 60 is a block diagram of the electrical structure adopted in the electronic camera in the second embodiment.

In the block diagram in FIG. 60, which presents an example of an internal electrical structure that may be assumed in the electronic camera 100 shown in FIGS. 58 and 59, various components are connected with one another via a data/control bus 51 through which various types of information data and control data are transmitted.

The components are divided into the following five primary blocks, i.e., a block, the core of which is a photographing control circuit 60 that executes an image data photographing operation, a block, the core of which is constituted of a wireless communication circuit 710 that communicates with electronic instruments in the vicinity of the electronic camera 100 through wireless communication (Bluetooth or the like) and a wireless telephone circuit 720 that exchanges data with the outside through a wireless portable telephone line, a block constituted of the memory card 104 in which image files are stored and saved, a block, the core of which is a screen control circuit 92 that executes display of image data and information related to the image data and a block, the core of which is constituted of user interfaces such as operating keys 65 and a CPU 50 that implements integrated control on various control circuits.

The CPU 50 (central processing unit), which is a means for implementing overall control on the electronic camera 100, issues various instructions for the photographing control circuit 60, the wireless communication circuit 710, the wireless telephone circuit 720, the screen control circuit 92 and a power control circuit 64 in conformance to information input from the operating keys 65, the touch tablets 66, various detection circuits 70, the power switch 17, a timer 74, the photometering circuit 13, a GPS circuit 61 and an attitude detection circuit 62.

An audio recording circuit 80 records sound generated by the subject during a photographing operation and sound made by the photographer after the photographing operation as a memorandum as audio data in conformance to control implemented by the CPU 50, and such audio data are stored in the image file together with the image data. An audio reproduction circuit 81 reproduces the audio data which are stored in the image file together with the image data during an image data reproduction or other audio data, in conformance to control implemented by the CPU 50.

The photometering circuit 13 measures the brightness of the subject and outputs photometric data indicating the results of the measurement to the CPU 50. In conformance to the photometric data, the CPU 50 sets the length of the exposure time and the sensitivity of a CCD 55 through a CCD drive circuit 56, and in addition, it controls the aperture value for an aperture 53 with an aperture control circuit 54 via the photographing control circuit 60 in conformance to the data indicating the settings.

In the photographing mode, the CPU 50 controls the photographing operation via the photographing control circuit 60 in response to an operation of the shutter release button 15. If the photometric data indicate a low subject brightness, the CPU 50 engages the strobe 12 in a light emission operation via a strobe drive circuit 73 during the photographing operation.

The 61 (global positioning system circuit) detects information indicating the position of the electronic camera 100 by using information provided by a plurality of satellites orbiting around the earth and provides the photographing position information to the CPU 50 when an image is photographed. The attitude change detection circuit 62, which is constituted of an attitude sensor of the known art (a gyro sensor, an azimuth sensor or the like) capable of detecting the attitude of the electronic camera 100, detects information indicating the camera attitude and provides the photographing attitude information to the CPU 50 during the image photographing operation.

The timer 74 having an internal clock circuit detects information indicating a current time point and provides the photographing time point (day and time) information to the CPU 50 when a photographing operation is executed, the CPU 50 controls the various units in conformance to a control program stored in a ROM 67 (read only memory). In an EEPROM 68 (electrically erasable/programmable ROM) which is a nonvolatile memory, the setting information and the like necessary for the operations of the electronic camera 100 are stored. The CPU 50 implements control on a power supply 63 via the power control circuit 64 by detecting the operating state of the power switch 17.

The photographing control circuit 60 focuses or zooms the photographic lens 10 through a lens drive circuit 52, controls the exposure quantity at the CCD 55 through control implemented on the aperture 53 by engaging the aperture control circuit 54 and thus controls the operation of the CCD 55 through the CCD drive circuit 56. The photographic lens 10 forms a subject image onto the CCD 55 with a light flux from the subject via the aperture 53 which adjusts the light quantity. This subject image is captured by the CCD 55. The CCD 55 (charge-coupled device) having a plurality of pixels is a charge storage type image sensor that captures a subject image, and outputs electrical image signals corresponding to the intensity of the subject image formed on the CCD 55 to an analog processing unit 57 in response to a drive pulse supplied by the CCD drive circuit 56. It is to be noted that the photographic field contained inside the angle of field which is determined by the effective image plane size at the CCD 55 and the focal length of the photographic lens 10 is photographed into the photographic image plane as image data.

The photographing control circuit 60 repeatedly executes the operation described above and, concurrently, the screen control circuit 92 repeatedly executes an operation in which the digital data sequentially stored into a photographic buffer memory 59 are read out via the data/control bus 51. The digital data thus read out are temporarily stored into a frame memory 69, the digital data are converted to display image data and are restored into the frame memory 69 and the display image data are displayed at the left screen 21. In addition, the screen control circuit 92 obtains text display information from the CPU 50 as necessary, converts it to display text data which are then stored into the frame memory 69 and displays the display text data at the left screen 21 or the right screen 22. Since the image currently captured by the CCD 55 is displayed at the left screen 21 in real time in the photographing mode in this manner, the user is able to set the composition for the photographing operation by using this through screen as a monitor screen.

The photographing control circuit 60 detects the state of the focal adjustment at the photographic lens 10 by analyzing the degree of the high-frequency component of the digital data stored in the photographic buffer memory 59 and performs a focal adjustment for the photographic lens 10 with the lens drive circuit 52 based upon the results of the detection.

During a photographing operation, upon receiving a photographing instruction from the CPU 50, the photographing control circuit 60 engages the CCD 55 to capture a subject image via the CCD drive circuit 56 and temporarily stores image signals generated through the image-capturing operation as digital data (raw data) into the photographic buffer memory 59 via the analog processing unit 57 and the A/D conversion circuit 58. The photographing control circuit 60 then generates image data by converting or compressing the digital data stored in the photographic buffer memory 59 on a temporary basis in a predetermined recording format (such as JPEG) and stores the image data back into the photographic buffer memory 59.

The CPU 50 communicates with the electronic instrument such as a portable telephone carried by the subject via the wireless communication circuit 710 to collect information related to the subject and also to obtain information indicating the position of the electronic instrument. In addition, the CPU 50 obtains the photographing position information from the GPS circuit 61, the photographing attitude information from the attitude detection circuit 62 and the focal length information with regard to the focal length of the photographic lens 10 from the photographing control circuit 60 and executes an arithmetic operation to obtain image-plane position information indicating the subject position within the image plane through a method which is to be detailed later based upon the information indicating the electronic instrument position, the photographing position information, the photographing attitude information and the focal length information. The CPU 50 stores the image data, the information related to the subject and the image plane subject position information into the memory card 104 as an image file.

In the reproduction mode, the screen control circuit 92 reads out an image file specified by the CPU 50 from the memory card 104, temporarily stores the image file into the frame memory 69, converts the image data to display image data and stores the display image data back into the frame memory 69 and then displays the display image data at the left screen 21. It also stores text data of the reproduction mode instructions and the like into the frame memory 69 and displays the text data at the right screen 22 in response to an instruction issued by the CPU 50. In the reproduction mode, upon receiving a transmission instruction issued by the CPU 50, the wireless telephone circuit 720 reads out the specified image file from the memory card 104 and wirelessly transmits the image file to the outside.

In the information display mode, the CPU 50 first reproduces and displays specific image data at the left screen 21 via the screen control circuit 92 as in the reproduction mode, and also brings up a superimposed display of an information icon at the position in the image plane of the subject corresponding to the position information. In addition, it displays instruction text data at the right screen 22. If the information icon is selected through the touch tablet 66 in the information display mode, the CPU 50 accesses the information source (homepage or the like) on the Internet via the wireless telephone circuit 720 based upon the subject-related information corresponding to the image-plane position information, displays a screen or the like of the homepage at the left screen 21 and display is an operational instruction screen at the right screen 22.

Figure 61:
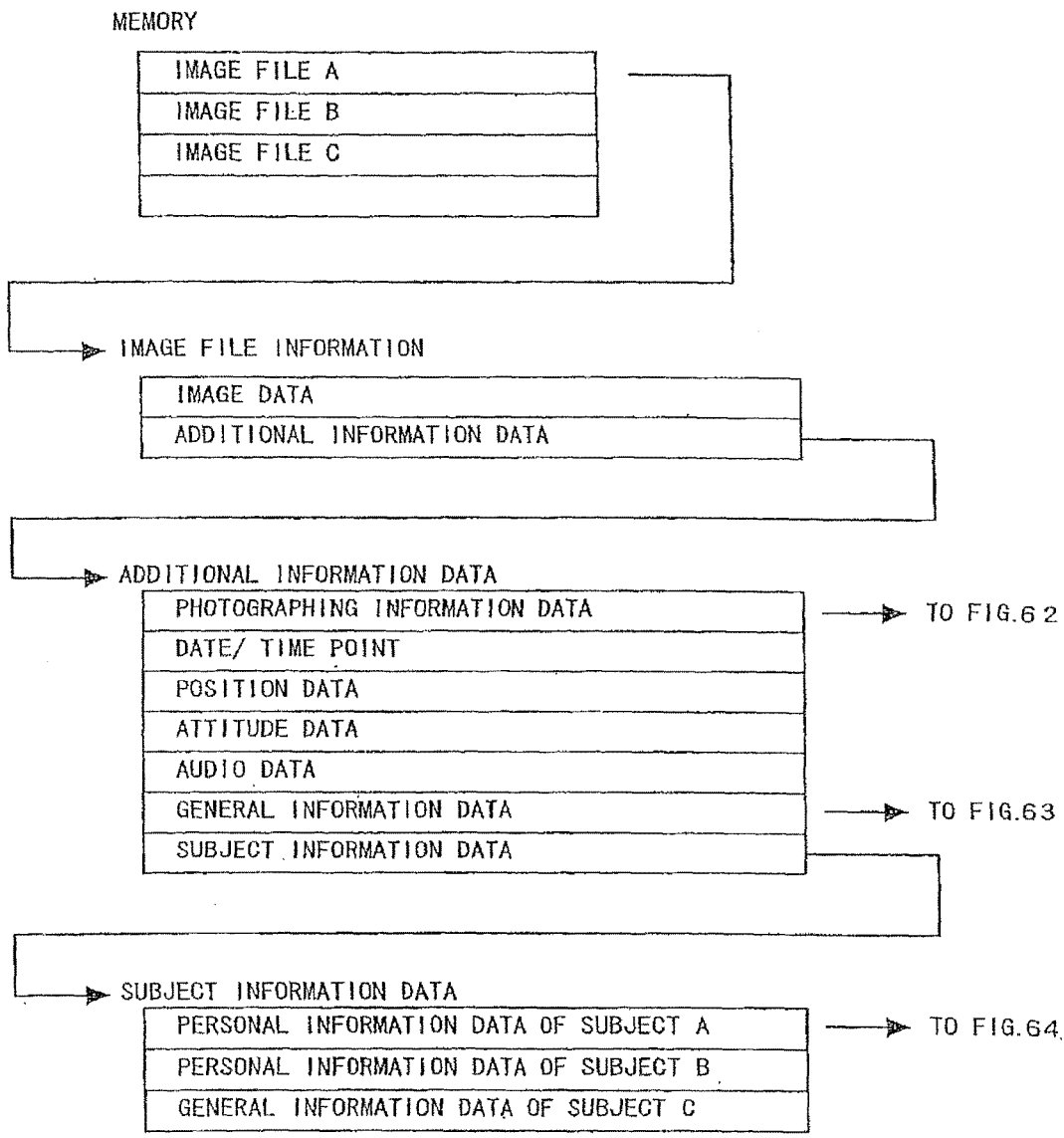
FIG. 61 shows the structure of the data in the memory.

FIG. 61 shows the data structure of image files stored in the memory card 104. As shown in FIG. 61, a plurality of image files are saved at the memory card 104. The image files are each constituted of image data and additional information data. The additional information data are constituted of photographing information data (see FIG. 62) indicating various settings selected for the photographing operation, time point information data indicating the photographing time point, the position information data indicating the photographing position, the attitude information data indicating the camera attitude during the photographing operation, audio information data recorded during or after the photographing operation, general information data (see FIG. 63) containing general information related to the photographing operation input during or after the photographing operation and subject information data containing information related to subjects which is entered during or after the photographing operation.

The subject information data are constituted of information related to the subjects (each of which may be a person, a building, a landscape or the like) photographed in the photographic image plane. For instance, the subject information data may be constituted of personal information data (see FIG. 64) of a subject person and general information data related to a subject building.

FIG. 62 shows the structure of the photographing information data constituted of setting information indicating the photographic lens setting and the camera settings selected for the photographing operation.

FIG. 63 shows the structure of the general information data constituted of Internet access data (homepage addresses or the like) indicating how individual sets of information may be accessed on the Internet, data indicating the contents of the individual sets of information and position information data indicating the positions of the originators of the individual sets of information.

FIG. 64 shows the structure of the personal information data constituted of the image-plane position information indicating a specific subject within the image plane to which the personal information corresponds, position information indicating the position of the electronic instrument from which the personal information has been transmitted, Internet access information data (the homepage URL and the like) of the individual, the e-mail address of the individual, the individual's name, date of birth, preferred language, physical data (visual acuity, diopter, favored hand), tastes or person's liking (favorite color, etc.) and other data.

Figure 65:
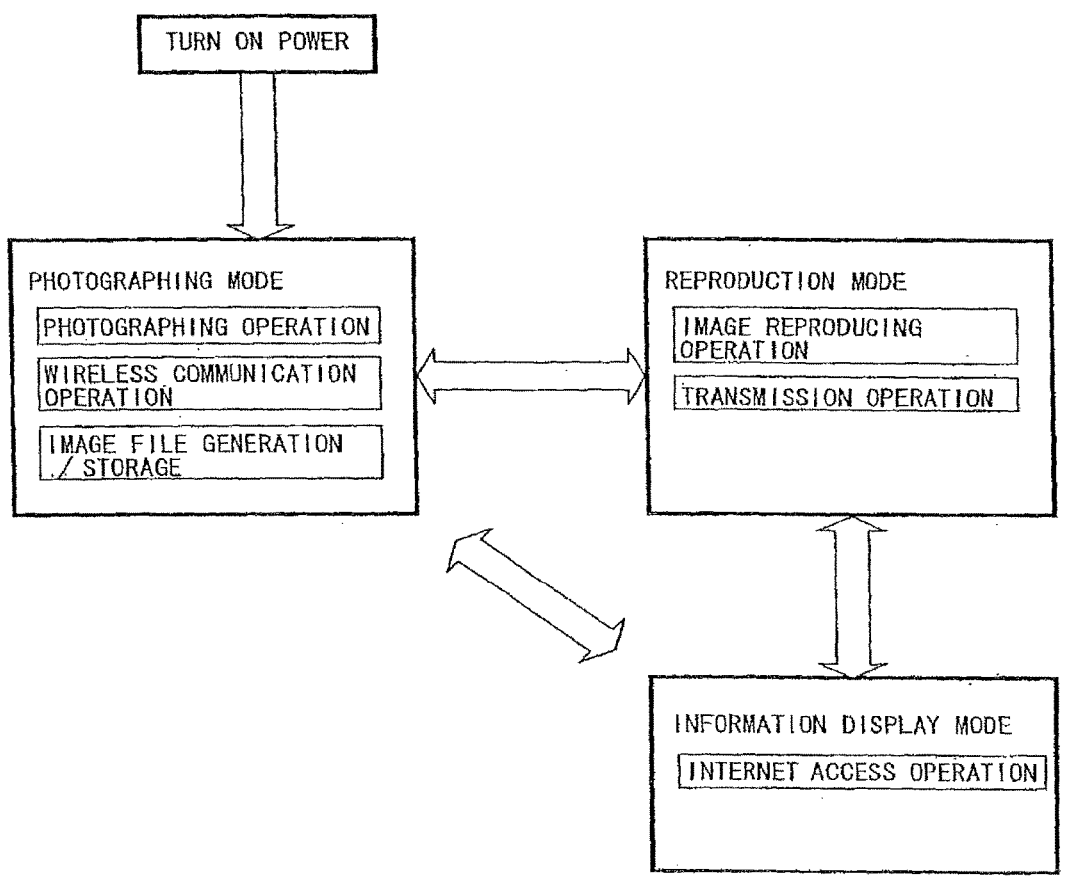
FIG. 65 is a transition diagram of the state assumed in an electronic camera according to the present invention.

FIG. 65 is a transition diagram of the state assumed by the electronic camera 100 in the embodiment of the present invention. The electronic camera, which assumes one of the three operating modes, i.e., the photographing mode, the reproduction mode and the information display mode, makes a shift among the modes in response to an operation of one of the three operating buttons (the photographing mode button 25, the reproduction mode button 26 and the information display mode button 27). As the power is turned on, the electronic camera shifts to the photographing mode first. In the photographing mode, a photographing operation, a wireless communication operation and an image file preparation and storage operation are executed. In the reproduction mode, an image file reproducing operation and a transmission operation to transmit an image file to the outside are executed. In the information display mode, information related to the image data is collected by, for instance, accessing the Internet based upon the additional information data corresponding to the image data and the information thus collected is displayed.

Figure 66:
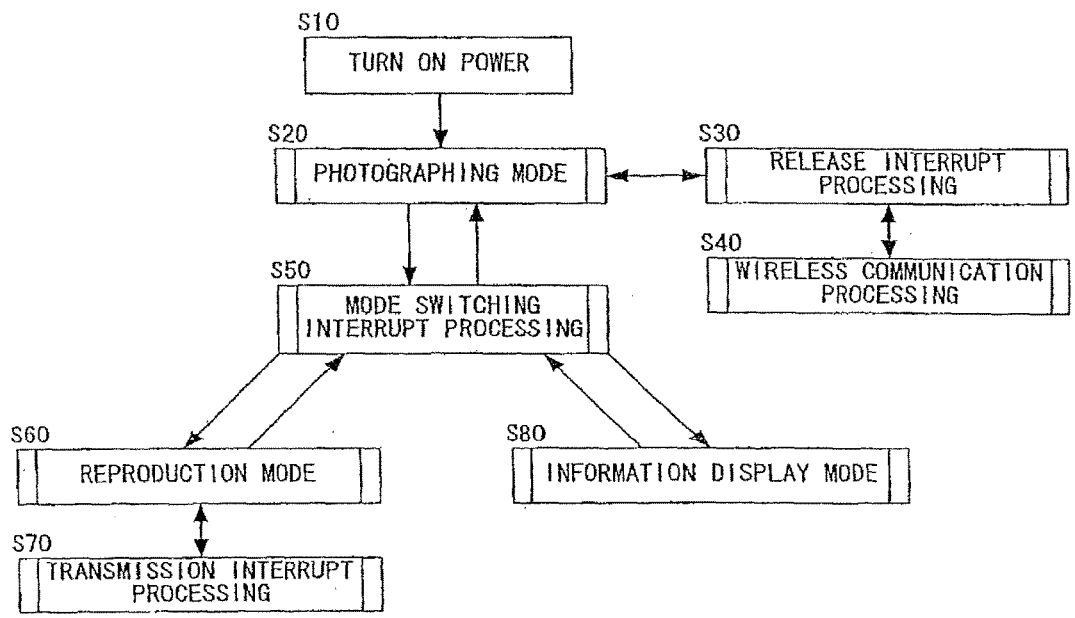
FIG. 66 presents a flowchart of the main program.

FIG. 66 presents a flowchart of the main flow of the operations executed in the electronic camera 100 (the CPU 50) in the embodiment described above. First, the power is turned on as the power switch 17 is operated in S10, and then, a photographing mode subroutine is executed in S20 to enter a photographing-enabled state. If the shutter release button 16 is operated in the photographing mode, a release interrupt processing subroutine in S30 is executed to perform a photographing operation. In addition, while the photographing operation is executed, a wireless interrupt subroutine in S40 is called up from the release interrupt processing subroutine in S30 to engage the electronic camera in wireless communication with electronic instruments present in the vicinity of the electronic camera to collect subject information data and general information data. The subject information data and the general information data thus collected constitute the additional information data together with the photographing information data, and the additional information data are stored together with the image data into the memory card 104 as an image file.

If one of the three operating buttons (the photographing mode button 25, the reproduction mode button 26 and the information display mode button 27) is operated in a given operating mode, mode switching interrupt processing in S50 is started up to switch over to the mode selected in correspondence to the operating button which has been operated.

In the reproduction mode in S60, an image file stored in the memory card 104 is read out and the image data are reproduced and displayed at the display screen, and if the SEND button 28 is operated, a transmission interrupt processing subroutine in S70 is executed to transmit the image file containing the image data currently reproduced in the reproduction mode to an external recipient.

In the information display mode in S80, image data are first reproduced and displayed at the display screen as detailed later and also, the subject information itself, which includes the image-plane position information corresponding to the position specified by the user through the touch tablet 66 on the display screen, or information collected by accessing the Internet based upon the Internet access information contained in the subject information is brought on display at the display screen.

Figure 67:
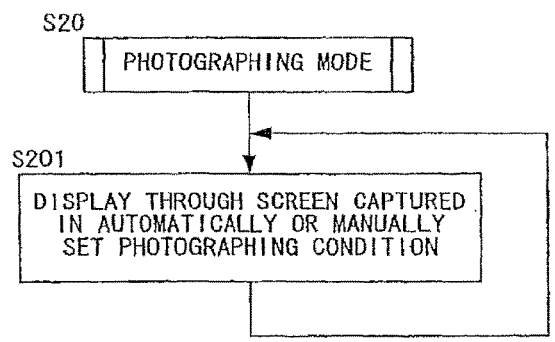
FIG. 67 presents a flowchart of a subroutine.
Figure 68:
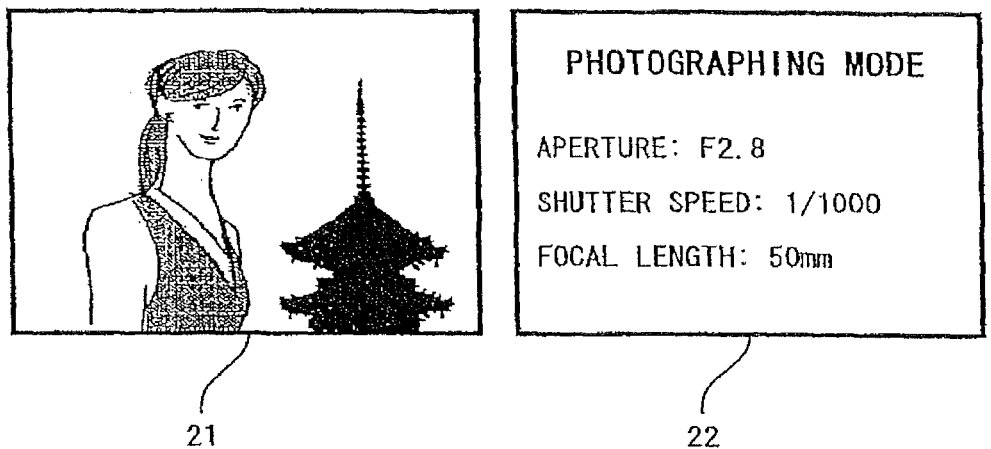
FIG. 68 presents an example of screen display.

In the detailed flowchart of the photographing mode subroutine presented in FIG. 67, after the subroutine is started up in S20, the processing in S201 is repeatedly executed. In S201, image data sequentially generated by the CCD 55 in conformance to the photographing setting condition selected by the user are displayed at the left screen 21 as shown in FIG. 68 and the selected photographing setting condition is displayed in text at the screen LCD 22.

Figure 69:
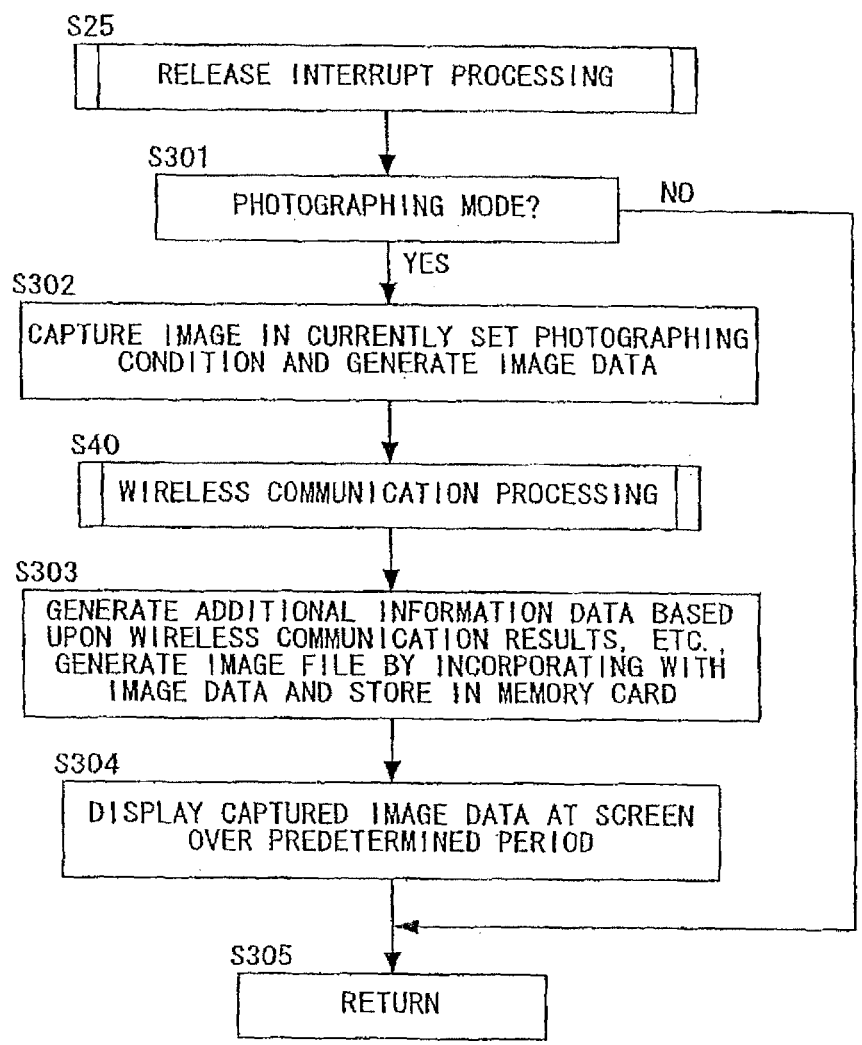
FIG. 69 presents a flowchart of a subroutine.

In the detailed flowchart of the release interrupt processing subroutine presented in FIG. 69, after the subroutine is started up in S30, a verification is achieved in S301 as to whether or not the camera is currently set in the photographing mode, and if it is decided that the camera is not set in the photographing mode, the operation makes a return in S305. If, on the other hand, it is decided that the camera is set in the photographing mode, an image-capturing operation is executed in conformance to the photographing setting condition selected by the user in S302 to generate image data, and then the wireless communication processing subroutine in S40, which is to be detailed later, is executed to generate additional information data. In S303, an image file is generated by incorporating the image data and the additional information data and the image file is saved into the memory card 104. In S304, the image data are displayed at the screen over a predetermined length of time, and then the operation makes a return in S305. It is to be noted that the image data achieves a predetermined photographic image plane size so that a photographed subject is bound to be present somewhere within this photographic image plane in accordance to the photographic composition.

Figure 70:
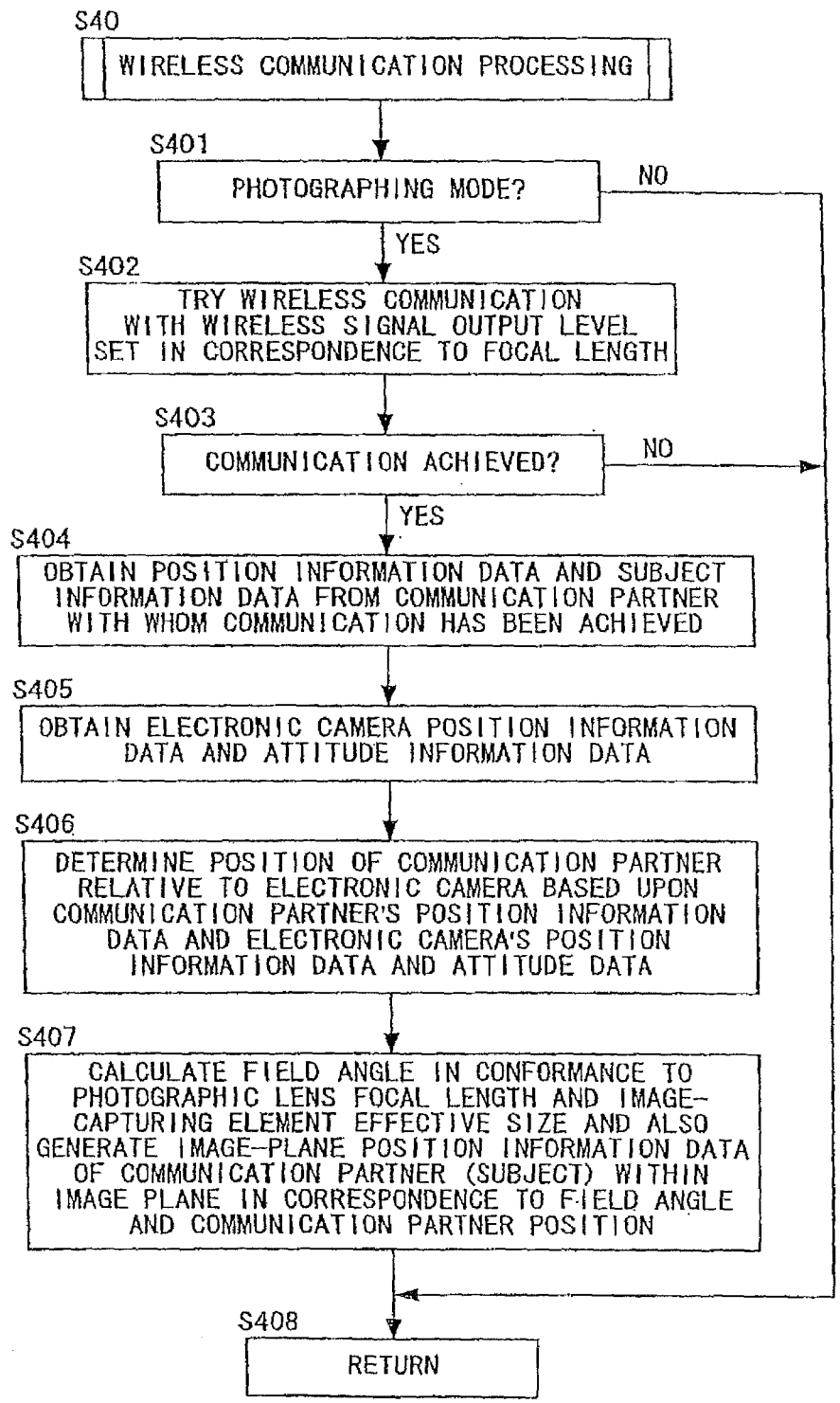
FIG. 70 presents a flowchart of a subroutine.

In the detailed flowchart of the wireless communication processing subroutine presented in FIG. 70, after the subroutine is started up in S40, a verification is achieved in S401 as to whether or not the electronic camera is currently set in the photographing mode, and if it is decided that the camera is not set in the photographing mode, the operation makes a return in S408. If, on the other hand, it is decided the camera is set in the photographing mode, a means for wireless communication 710 is engaged in S402 to attempt wireless communication with electronic instruments in the vicinity of the electronic camera 100 (a portable telephone carried by a subject person, an electronic sightseeing guide apparatus installed in the vicinity of a historical site and capable of transmitting sightseeing information with regard to the historic site through wireless communication or the like). During this process, the signal transmission output for the wireless communication is adjusted in conformance to the focal length of the photographic lens. For instance, since it can be assumed that the subject is present over a long distance when the focal length is large, a signal transmission output level is set higher accordingly. If it is decided in S403 that no communication has been achieved, the operation makes a return in S408. If communication has been achieved, on the other hand, the position information data indicating the electronic instrument position and the subject information data (or the general information data) are obtained through wireless communication from the electronic instrument of the communication partner with whom communication has been achieved in S404. In S405, the position information indicating the position of the electronic camera 100 itself is received from the GPS circuit 61, the attitude information indicating the attitude of the electronic camera 100 itself is received from the attitude detection circuit 62, and the position of the subject (electronic instrument) relative to the electronic camera 100 is determined by using the electronic instrument position information, the position information indicating the position of the electronic camera 100 and the attitude information indicating the attitude of the electronic camera 100, as explained later. In S407, the focal length information indicating the focal length of the photographic lens 10 is received from the photographing control circuit 60 and the angle of field for the photographing operation is calculated based upon the focal length information and the effective image plane size at the image-capturing element as detailed later, and also, based upon the position information indicating the position of the subject relative to the electronic camera 100, data indicating the position of the subject within the photographed image plane (image-plane position information data) are generated before the operation makes a return in S408.

Figure 71:
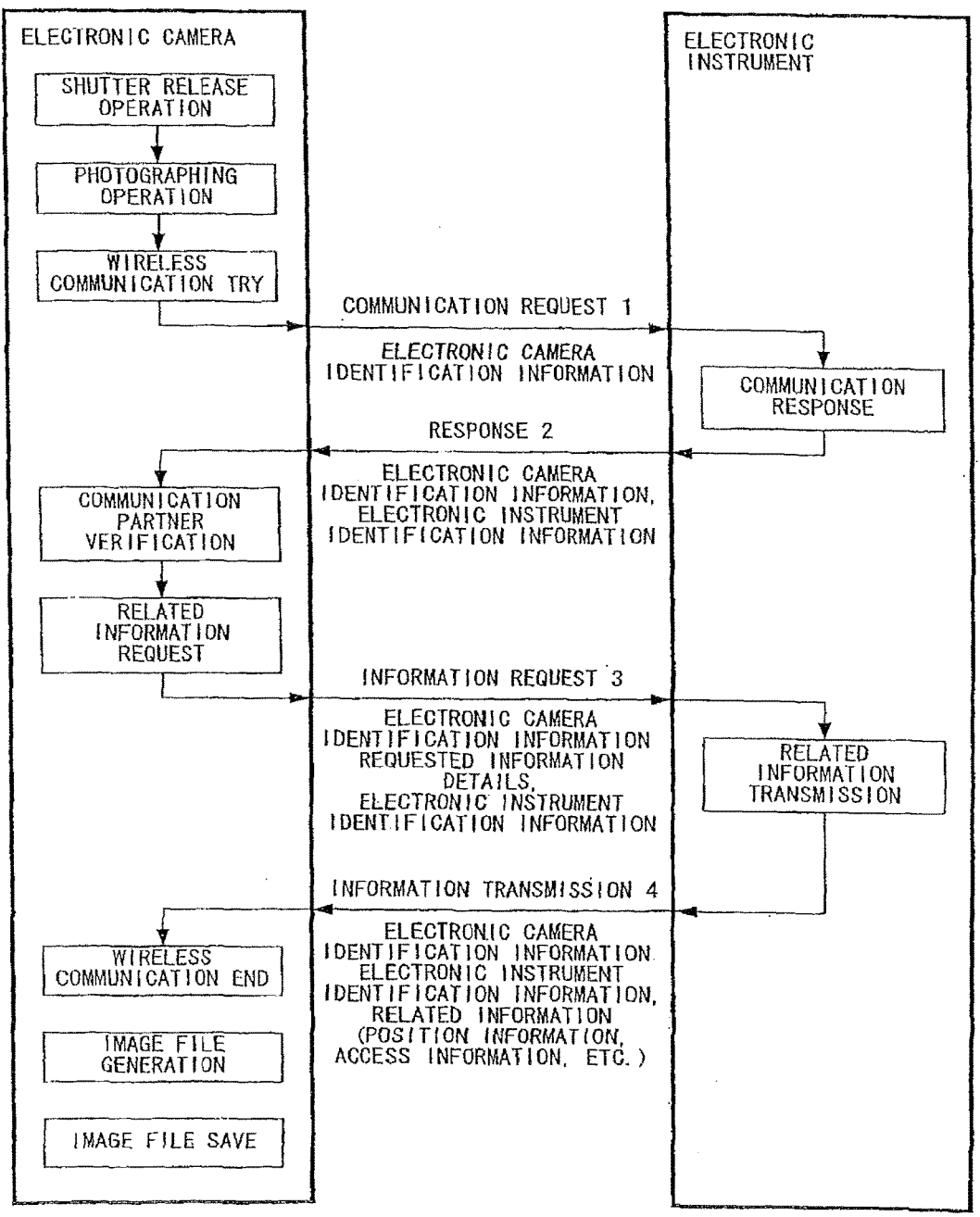
FIG. 71 illustrates the communication sequence.

In the sequence diagram provided in FIG. 71 to facilitate an explanation of the wireless communication operation between the electronic camera and an electronic instrument during the release interrupt processing and the wireless communication processing, a shutter release operation is first performed at the electronic camera 100, a photographing operation is performed in response and then wireless communication is attempted at the electronic camera 100 by transmitting a communication request 1 to electronic instruments present in the vicinity. The transmission request 1 includes the identification information of the electronic camera 100 indicating the sender.

An electronic instrument having received the communication request 1 returns a response 2 to the electronic camera 100 by transmitting the identification information of the sender electronic instrument and the identification information of the recipient electronic camera.

Upon receiving the response 2, the electronic camera 100 verifies the communication partner based upon the electronic instrument identification information and transmits an information request 3 so that information related to the communication partner can be requested by specifying the communication partner's electronic instrument. The information request 3 transmitted to the electronic instrument includes the identification information of the recipient electronic instrument, the identification information of the sender electronic camera 100, the contents of the information being requested and the like.

The electronic instrument corresponding to the electronic instrument identification information included in the information request 3 transmits information 4, i.e., the requested related information (the position information, the access information, etc.) to the electronic camera. The information 4 transmitted to the electronic camera includes the identification information corresponding to the electronic camera 100, i.e., the recipient, the identification information corresponding to the electronic instrument, i.e., the sender and the related information.

The electronic camera 100 receives the information 4 transmitted by the electronic instrument. The electronic camera 100 sequentially issues the information request 3 to all the electronic instruments having responded to the communication request 1. Upon receiving the information 4 from all the electronic instruments, it ends the wireless communication, generates an image file and saves the image file into the memory card 104.

Figure 72:
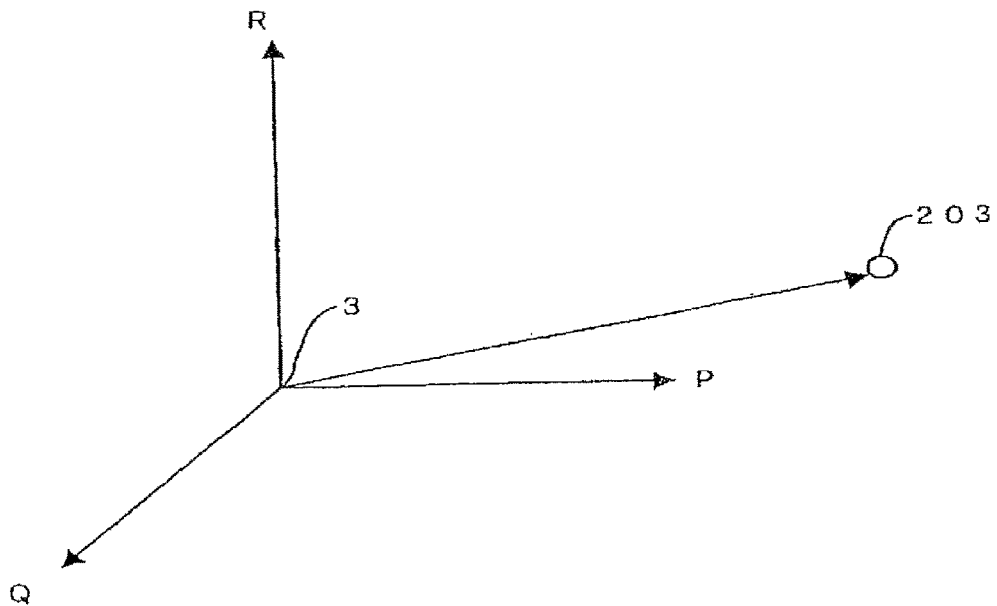
FIG. 72 illustrates the position information detection.
Figure 73:
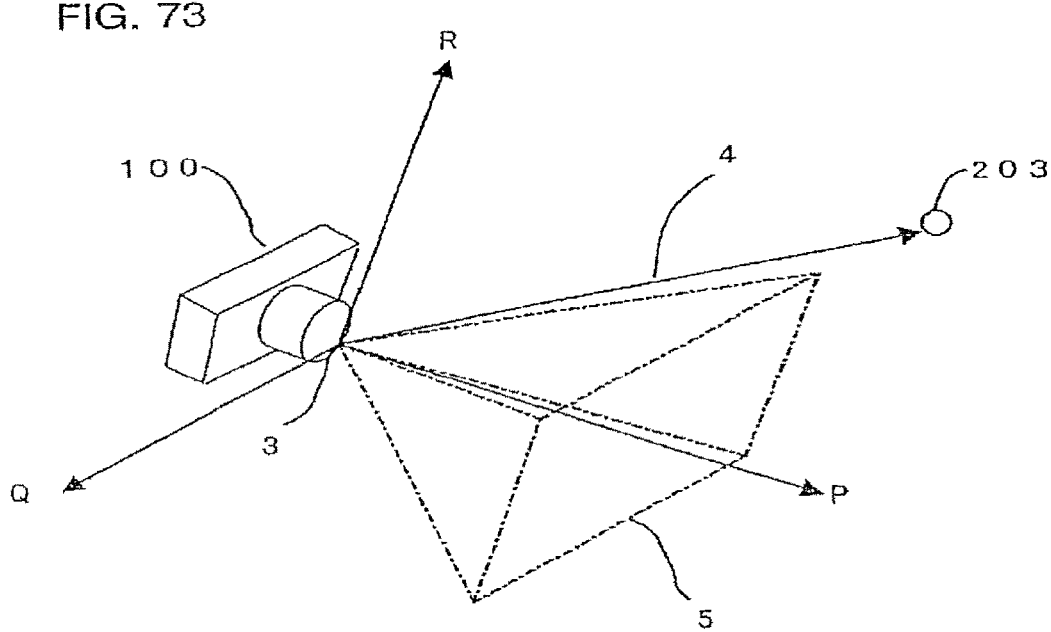
FIG. 73 illustrates the position information detection.

FIGS. 72 and 73 illustrate how the image-plane position information data indicating the position of a subject within the image plane may be obtained. The subject position information data and the photographing position information data are provided as positional coordinates in a three-dimensional coordinate system the center of which is set at a predetermined reference origin point. First, as shown in FIG. 72, the reference coordinate system is converted to a coordinate system (an axis P: extending along the camera optical axis, an axis Q: extending along the lateral side of the camera, an axis R: extending along the longitudinal side of the camera) through a parallel translation of the origin point of the reference coordinate system to a central point 3 (the photographing position) of the electronic camera 100, and the positional coordinates of the subject 203 after the conversion are determined.

Figure 74:
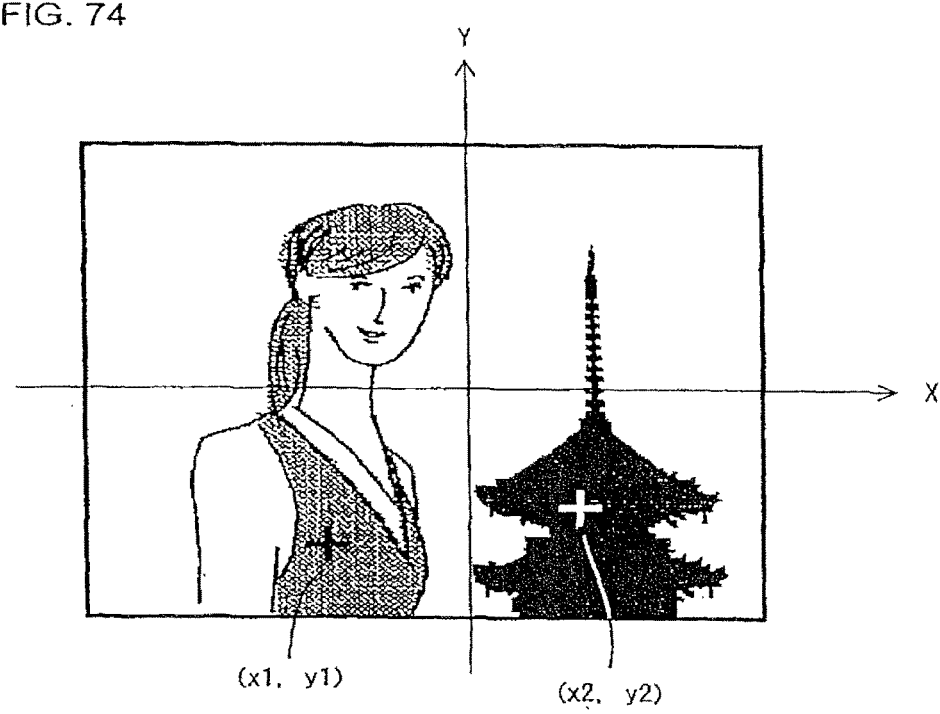
FIG. 74 illustrates the position information detection.

In addition, as shown in FIG. 73, an angle of field 5 (indicated by the one-dot-and-bar chain line) is calculated along photographic optical axis (along the P axis) based upon the photographic lens focal length information and the effective image plane size of the CCD. Next, the direction in which a straight line connecting the origin point 3 and the subject position 203 extends is calculated. By comparing the angle of field 5 and the direction of the straight line 4, a decision can be made as to whether or not the subject is contained in the image plane and the position of the subject within the image plane (the image-plane position information data) can be calculated as shown in FIG. 74.

Figure 75:
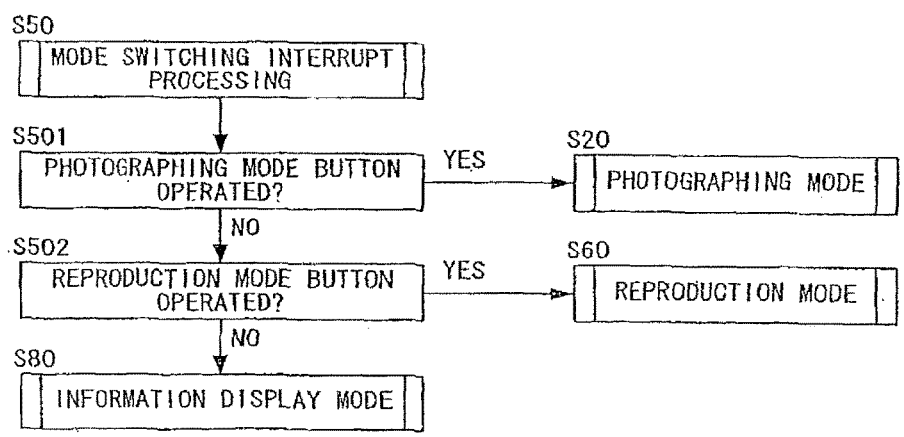
FIG. 75 presents a flowchart of a subroutine.

In the detailed flowchart of the mode switching interrupt processing subroutine presented in FIG. 75, which is started up in response to an operation of an operating button (the photographing mode button 25, the reproduction mode button 26 or the information display mode button 27), after the subroutine is started up in S50, a verification is achieved in S501 as to whether or not the operated button is the photographing mode button 25 and if it is decided that the photographing mode button 25 has been operated, the operation shifts to the photographing mode subroutine in S20. If, on the other hand, it is decided that the photographing mode button 25 has not been operated, a verification is achieved in S501 as to whether or not the operated button is the reproduction mode button 26, and if it is decided that the reproduction mode button 26 has been operated, the operation shifts to the reproduction mode subroutine in S60. If it is decided that the reproduction mode button 26 has not been operated, the operation shifts to the information display mode subroutine in S80.

Figure 76:
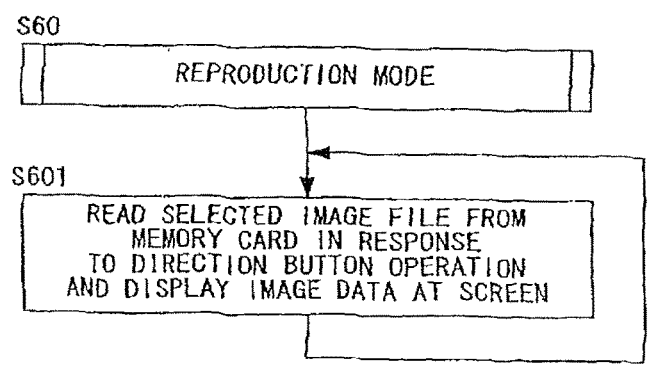
FIG. 76 presents a flowchart of a subroutine.
Figure 77:
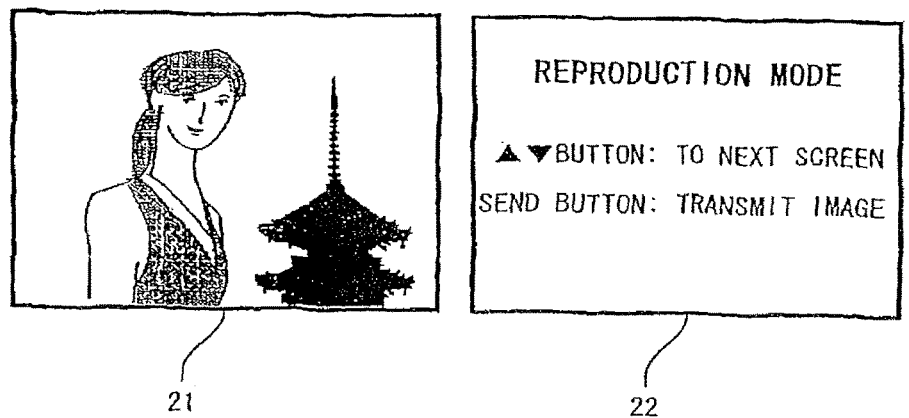
FIG. 77 presents an example of screen display.

In the detailed flowchart of the reproduction mode subroutine presented in FIG. 76, after the subroutine is started up in S60, the processing in S601 is repeatedly executed. In S601, image data of an image file selected from the image files stored in the memory card 104 are read out in response to an operation of the direction button 23 or 24, the selected image data are reproduced and displayed at the left screen 21 and the operational instructions are displayed at the right screen 22, as shown in FIG. 77.

Figure 78:
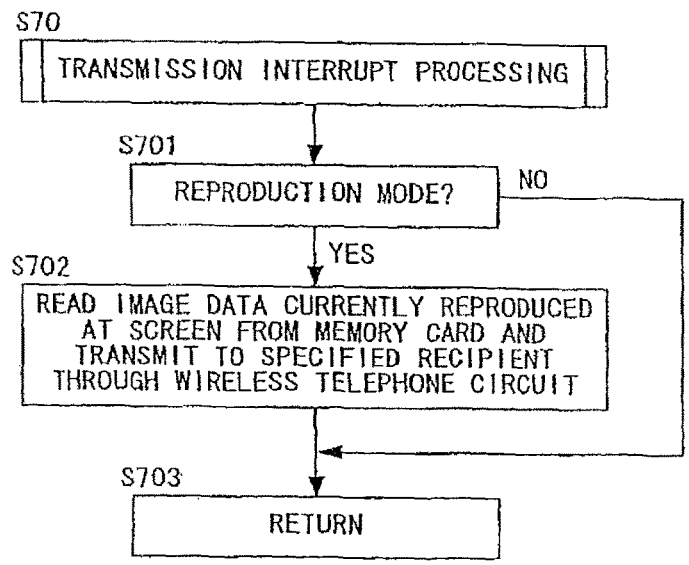
FIG. 78 presents a flowchart of a subroutine.
Figure 79:
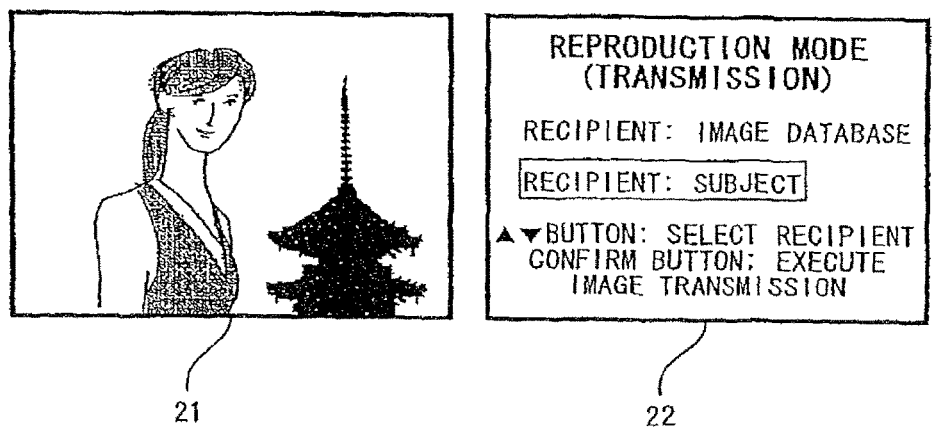
FIG. 79 presents an example of screen display.

In the detailed flowchart of the transmission interrupt processing subroutine presented in FIG. 78, after the subroutine is started up in S70, a verification is achieved in S701 as to whether or not the electronic camera is currently set in the reproduction mode, and if it is decided that the electronic camera is not set in the reproduction mode, the operation makes a return in S703. If, on the other hand, it is decided that the camera is set in the reproduction mode, potential recipients are displayed at the right screen 22 in S702 as shown in FIG. 79. The recipients include the subject within the image currently reproduced and displayed at the left screen 21. Once the desired recipient is specified by the user, the image file containing the image data currently reproduced and displayed at the left screen 21 is read out from the memory card 104 and this image file is transmitted through the wireless telephone circuit 720 to the recipient specified by the user before the operation makes a return in S703.

Figure 80:
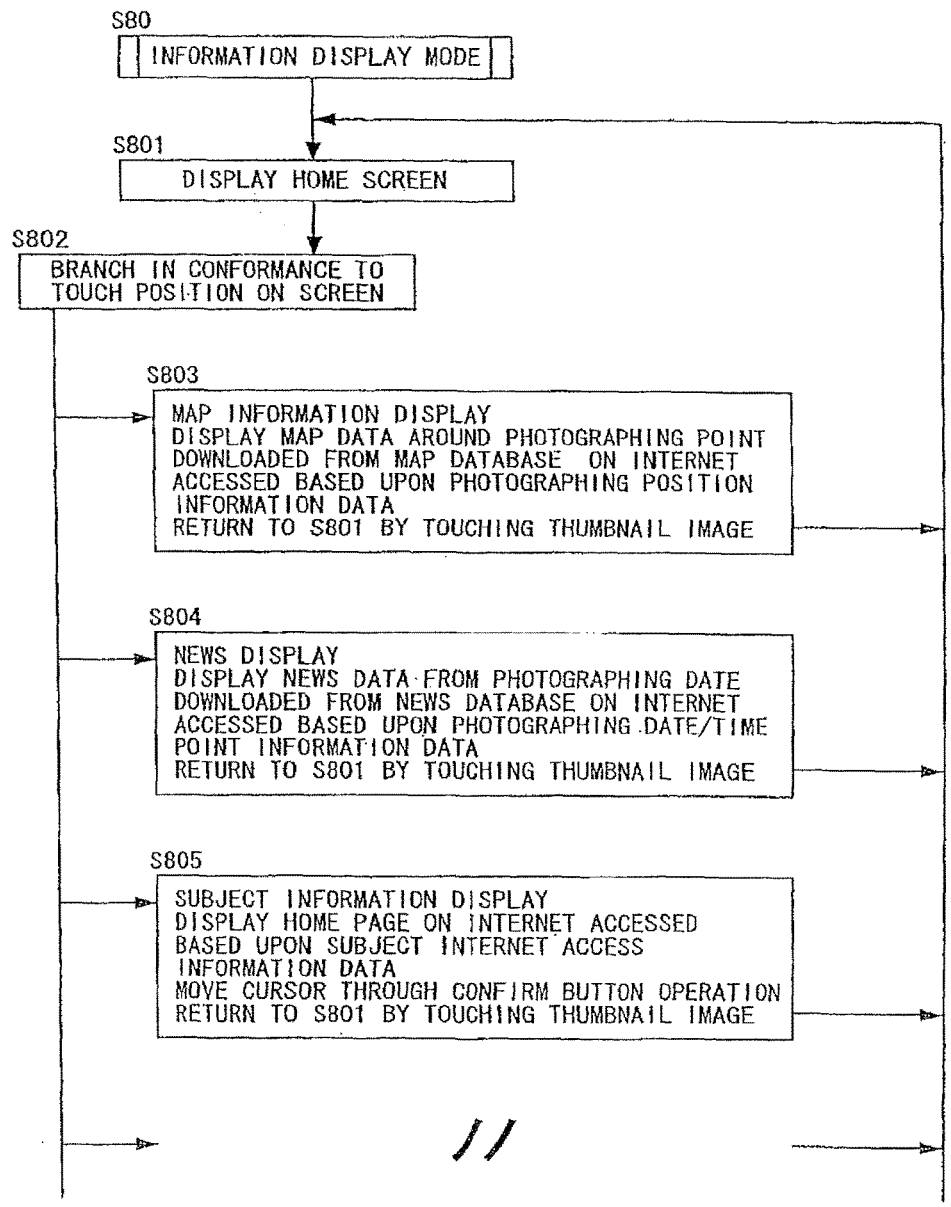
FIG. 80 presents a flowchart of a subroutine.

In the detailed flowchart of the information display mode subroutine presented in FIG. 80, after the subroutine is started up in S80, the home screen of the information display mode is first displayed in S801. In the home screen, image data are displayed at the left screen 21, as shown in FIG. 77. If the operation has shifted into the information display mode from the reproduction mode, the image data that were reproduced and displayed at the left screen 21 in the reproduction mode are kept on display, whereas if the operation has shifted into the information display mode from the photographing mode, the image data of the image file obtained through the most recent photographing operation are displayed. In addition, at the left screen 21, graphics 82 and 83 indicating subject information are displayed at positions corresponding to individual sets of image-plane position information data contained in the additional information data and also an icon 85 for bringing up a display of a map based upon the photographing position information data, an icon 84 for bringing up a display of news items reported on the photographing date based upon the photographing time point information data and an icon 86 for bringing up a display of the general information are displayed, all superimposed over the image data. At the right screen 22, the operating instructions with respect to the left screen 21 are displayed.

When the user touches a desired icon at the left screen 21, the position of the point on the screen touched by the user is detected through the touch tablet 66 in S802 and subsequently, the operation branches to one of the following steps in correspondence to the position on the screen that has been touched by the user.

Figure 81:
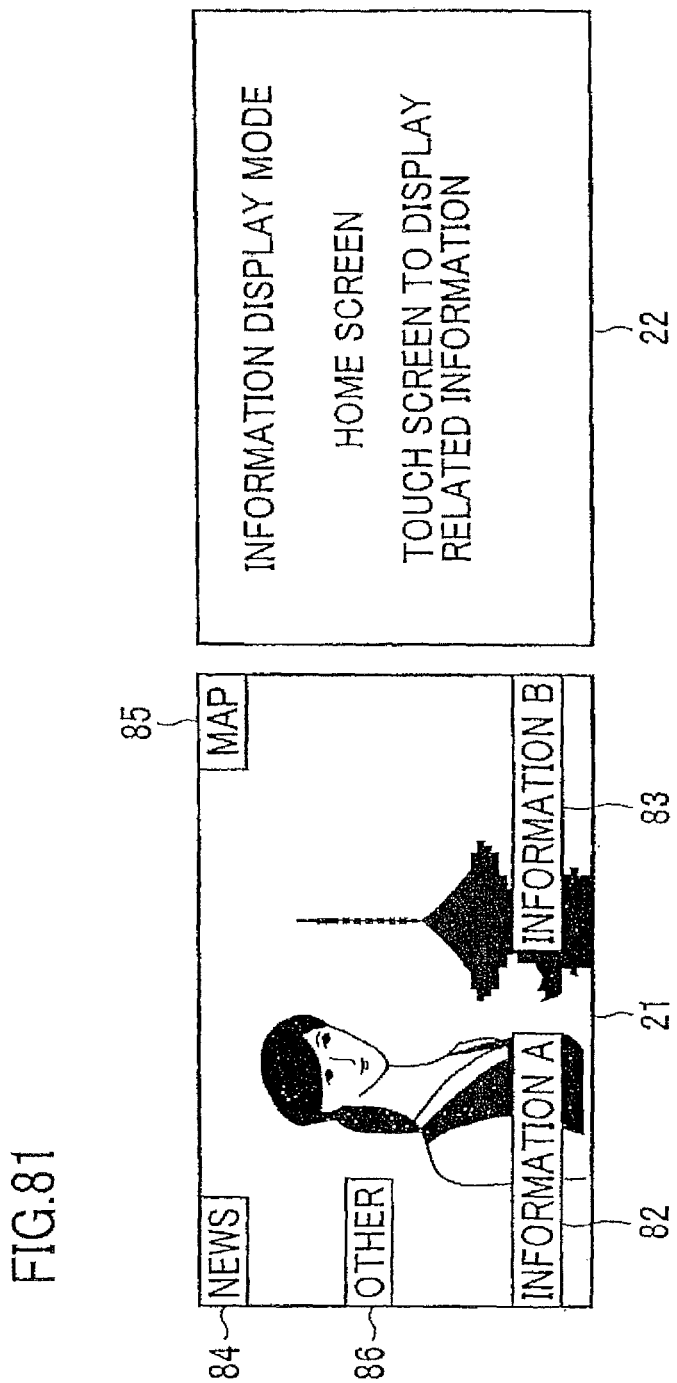
FIG. 81 presents an example of screen display.
Figure 82:
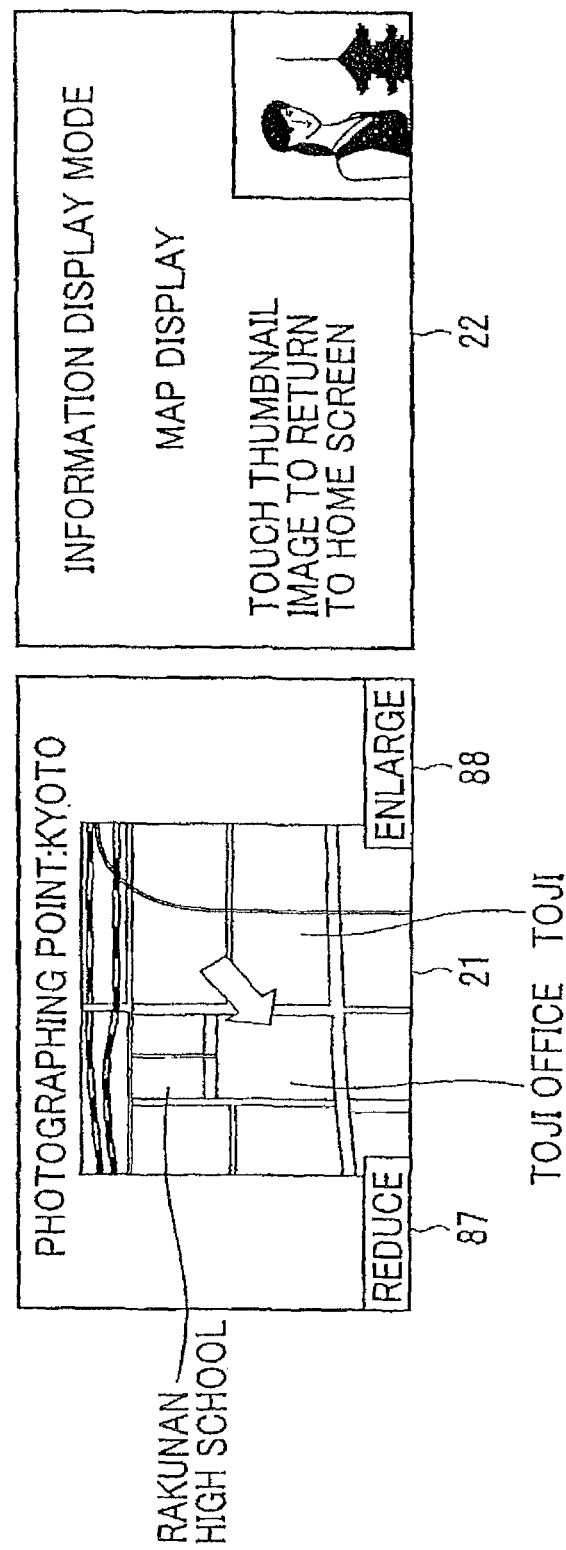
FIG. 82 presents an example of screen display.

If the icon 85 in FIG. 81 is touched, the operation branches to S803 in which a map database on the Internet is accessed via the wireless telephone circuit 720, map data containing the photographing position are downloaded from the map database in conformance to the photographing position information corresponding to the image data displayed at the home screen and the downloaded map data are displayed at the left screen 21, as shown in FIG. 82. At the left screen 21, a reduction icon 87 and an enlargement 88 are superimposed over the map display and as the user touches one of the icons, the map display is either reduced or enlarged in correspondence to the icon that has been touched. At the right screen 22, a thumbnail image (reduced image) of the image data having been displayed at the home screen is displayed and the home screen display in S801 is restored if the user touches this thumbnail image.

Figure 83:
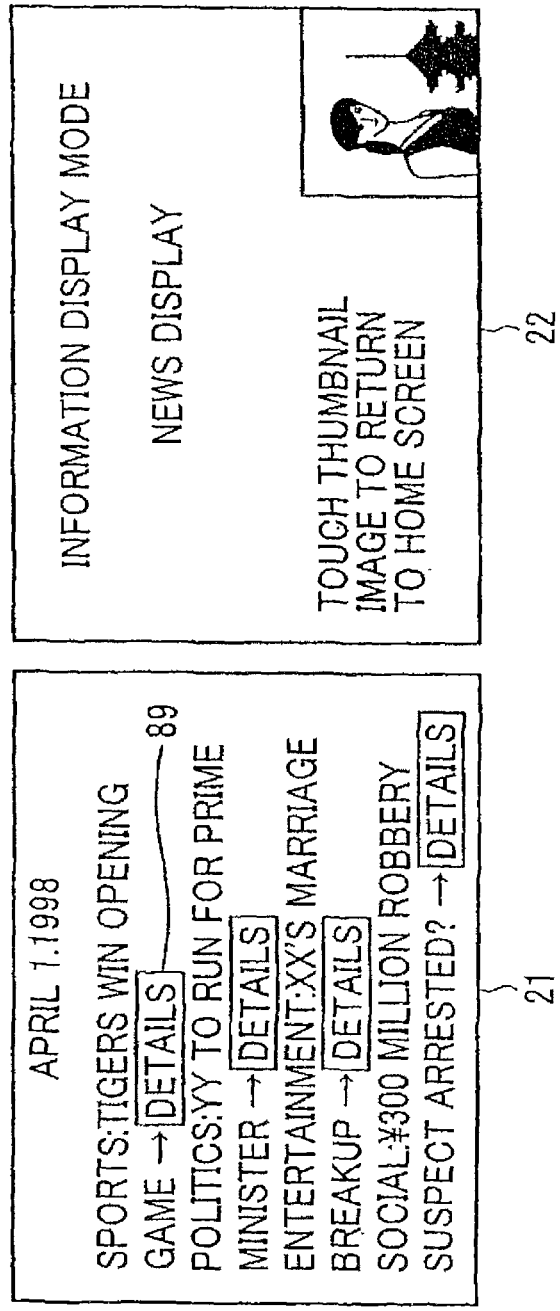
FIG. 83 presents an example of screen display.

If the icon 84 in FIG. 81 is touched, the operation branches to S804 in which a news database on the Internet is accessed via the wireless telephone circuit 720, news data of the news reported on the photographing date are downloaded from the news database based upon the photographing time point information corresponding to the image data displayed at the home screen and the downloaded news data are displayed at the left screen 21, as shown in FIG. 83. At the left screen 21, a list of news items and detail graphics 89 are displayed and if a user touches a specific detail icon, details of the corresponding news item are displayed at the left screen 21. At the right screen 22, a thumbnail image (reduced image for pre-view) of the image data having been displayed at the home screen is displayed and the home screen display in S801 is restored if the user touches this thumbnail image.

Figure 84:
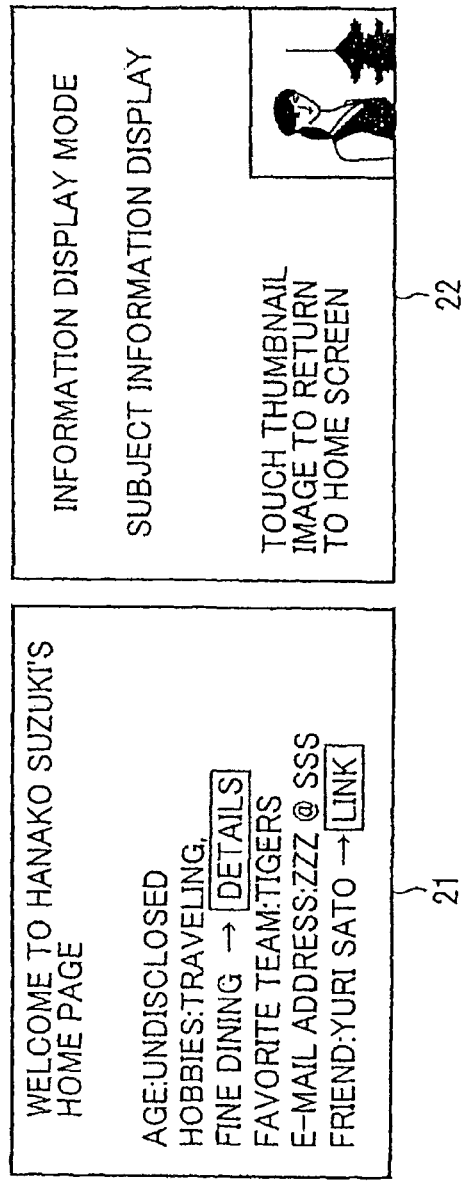
FIG. 84 presents an example of screen display.
Figure 85:
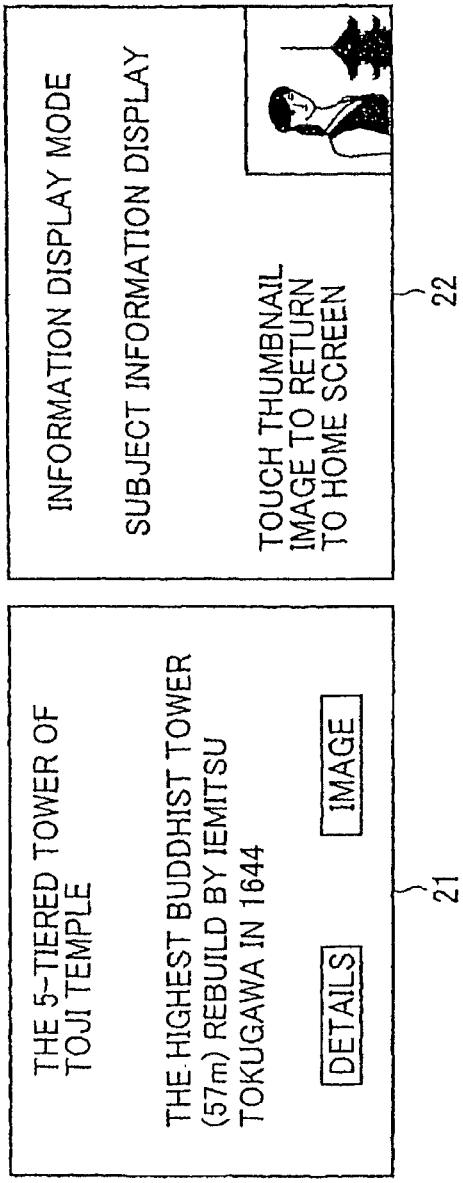
FIG. 85 presents an example of screen display.

If the icon 82 or the icon 83 in FIG. 81 is touched, the operation branches to S805 in which an information source (a homepage or a database) where detailed information related to the subject is stored is accessed on the Internet via the wireless telephone circuit 720 in conformance to the Internet access information data contained in the subject information indicated by the icon and the top screen of the homepage is brought up on display. For instance, if the icon 82 is touched, the top screen of the homepage of the subject person is displayed at the left screen 21, as shown in FIG. 84, to enable the user to display a screen at a lower layer or link to another homepage through the touch tablet 66. If, on the other hand, the icon 83 is touched, a commentary screen related to a historical structure photographed in the image is brought up on display at the left screen 21, as shown in FIG. 85, to enable the user to display a more detailed description or an image of the historical structure at the left screen 21 through the touch tablet 66. At the right screen 22, a thumbnail image (reduced image) of the image data having been displayed at the home screen is displayed and the home screen display in S801 is restored if the user touches this thumbnail image.

Figure 86:
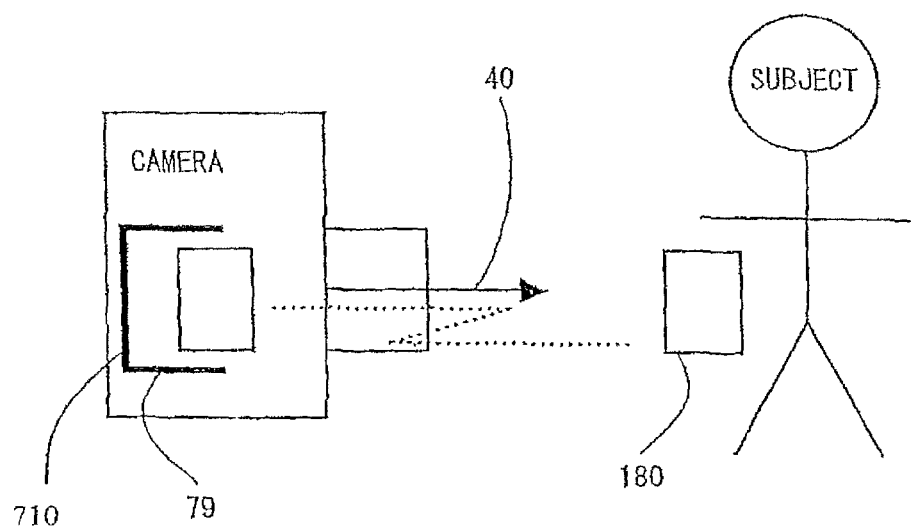
FIG. 86 illustrates the structure of the wireless circuit.
Figure 87:
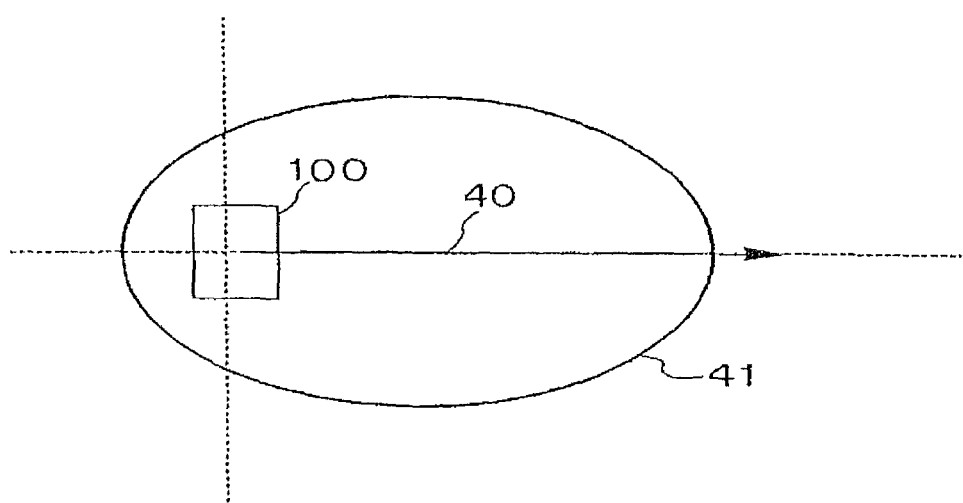
FIG. 87 illustrates the communication directivity.

In FIG. 86 illustrating the structure of the wireless communication circuit 710 in the electronic camera, the wireless communication circuit 710 is enclosed by an electromagnetic shield film 79 along the camera rear surface (in the direction opposite from the direction along which the photographic optical axis extends, i.e., the side on which the photographer is present), the camera lower surface, the camera upper surface and the camera left and right side surfaces. Thus, the wireless communication circuit 710 is allowed to communicate readily with the portable telephone 160 carried by the subject present in the direction along which the photographing operation is performed with the camera to collect the subject information with a high degree of reliability. At the same time, since it cannot readily communicate with a portable instrument carried by a non-subject party who is not present along the photographic optical axis, the collection of unnecessary information irrelevant to the subject can be minimized. In FIG. 87 showing the communication directivity of the wireless communication circuit 710, extreme directivity manifests to the front of the electronic camera 100 (along the optical axis 40) and the directivity to the rear is slight.

By allowing the wireless communication circuit 710 to manifest extreme directivity along the direction in which the photographing operation is performed with the camera through the structure shown in FIG. 86 as described above, the likelihood of communicating with the electronic instrument carried by the subject is increased. It is to be noted that the directivity may be adjusted by adopting a specific antenna structure instead of by using an electromagnetic shield film.

Figure 89:
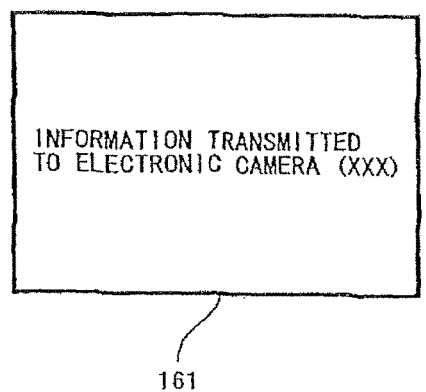
FIG. 89 presents an example of screen display.

In the wireless communication processing shown in FIG. 71, the electronic camera 100 collects subject information by communicating with electronic instruments in the vicinity during the photographing operation. However, the subject information may be transmitted to the electronic camera engaged in the photographing operation from a subject-side electronic instrument either before or after the photographing operation, instead. At the portable telephone 160 carried by the subject, such as that shown in FIG. 88, a UIM card or the like having stored and saved therein the personal information on the user carrying the portable telephone 160 is loaded. The portable telephone 160 includes a display screen 161 and operating buttons 162. When the subject person wishes to transmit his personal information to the electronic camera, the subject person first operates an operating button 162 of the portable telephone 160 to set the portable telephone 160 in a personal information transmission mode, enabling transmission of the subject information to the electronic camera. Once the transmission is completed, a message indicating the recipient electronic camera and the transmission completion is displayed at the display screen 161, as shown in FIG. 89. Since this allows the subject to decide whether or not his personal information should be transmitted, random circulation of the personal information is prevented.

Figure 90:
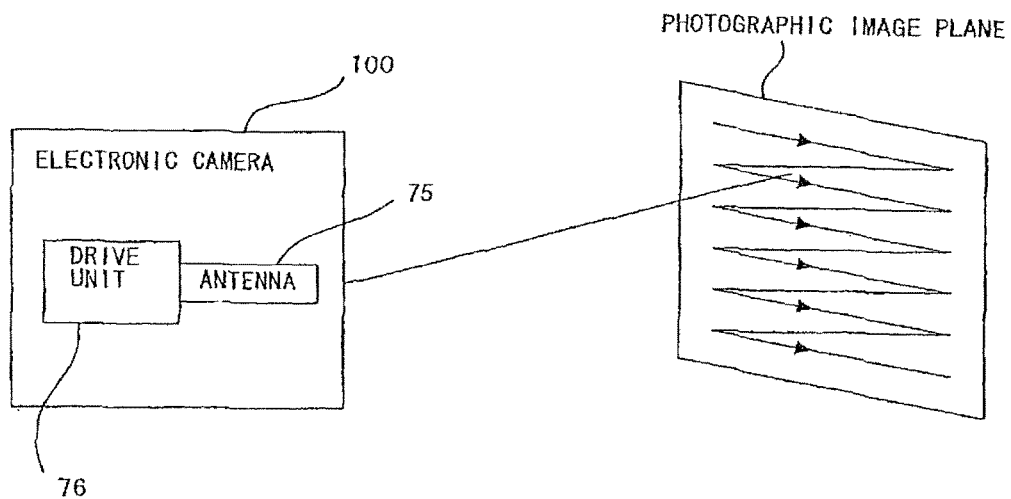
FIG. 90 illustrates the image-plane position information detection.
Figure 91:
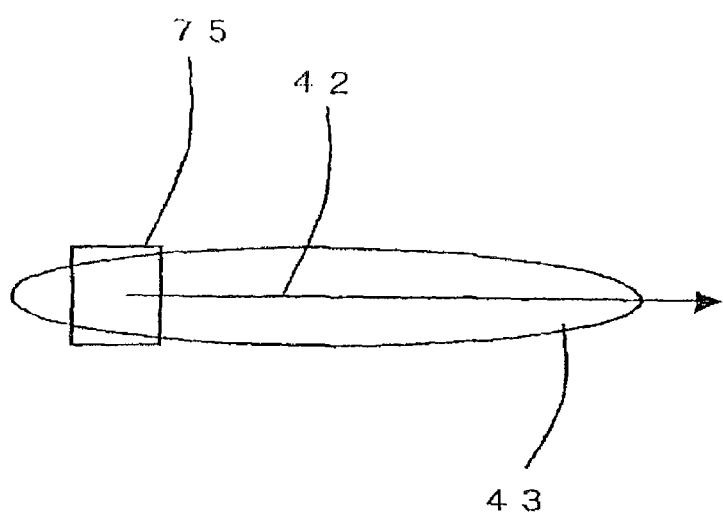
FIG. 91 illustrates the communication directivity.

In the detection of the position of the subject within the image plane shown in FIG. 73, the information indicating the electronic camera position and the information indicating the electronic instrument position detected with GPS units are utilized. However, the subject position within the image plane may be detected through a method other than this. FIG. 90 shows an example in which the subject position within the photographic image plane is detected by using a highly-directional wireless antenna 75 (its directivity 43 manifests with great intensity along a single direction 42, as shown in FIG. 91) which is utilized as a communication antenna of the wireless communication circuit 710. It is to be noted that details of a structure that may be adopted in such a compact directional antenna are disclosed in, for instance, Japanese Laid-Open Patent Publication No. 2000-278037.

The electronic camera 100 is internally provided with the highly-directional wireless antenna 75 and a drive unit 76 that adjusts the direction of the highly-directional wireless antenna 75 by scanning the highly-directional wireless antenna 75 through mechanical drive. While the wireless communication processing is in progress during the photographing operation, the CPU 50 engages the drive unit 76 to drive the highly-directional wireless antenna so as to scan inside the photographic image plane and it concurrently communicates with a subject present within the image plane to collect the subject information data. This makes it possible to correlate scanning position of the highly-directional wireless antenna 75 (i.e., image-plane position information data) with the subject information data.

Figure 92:
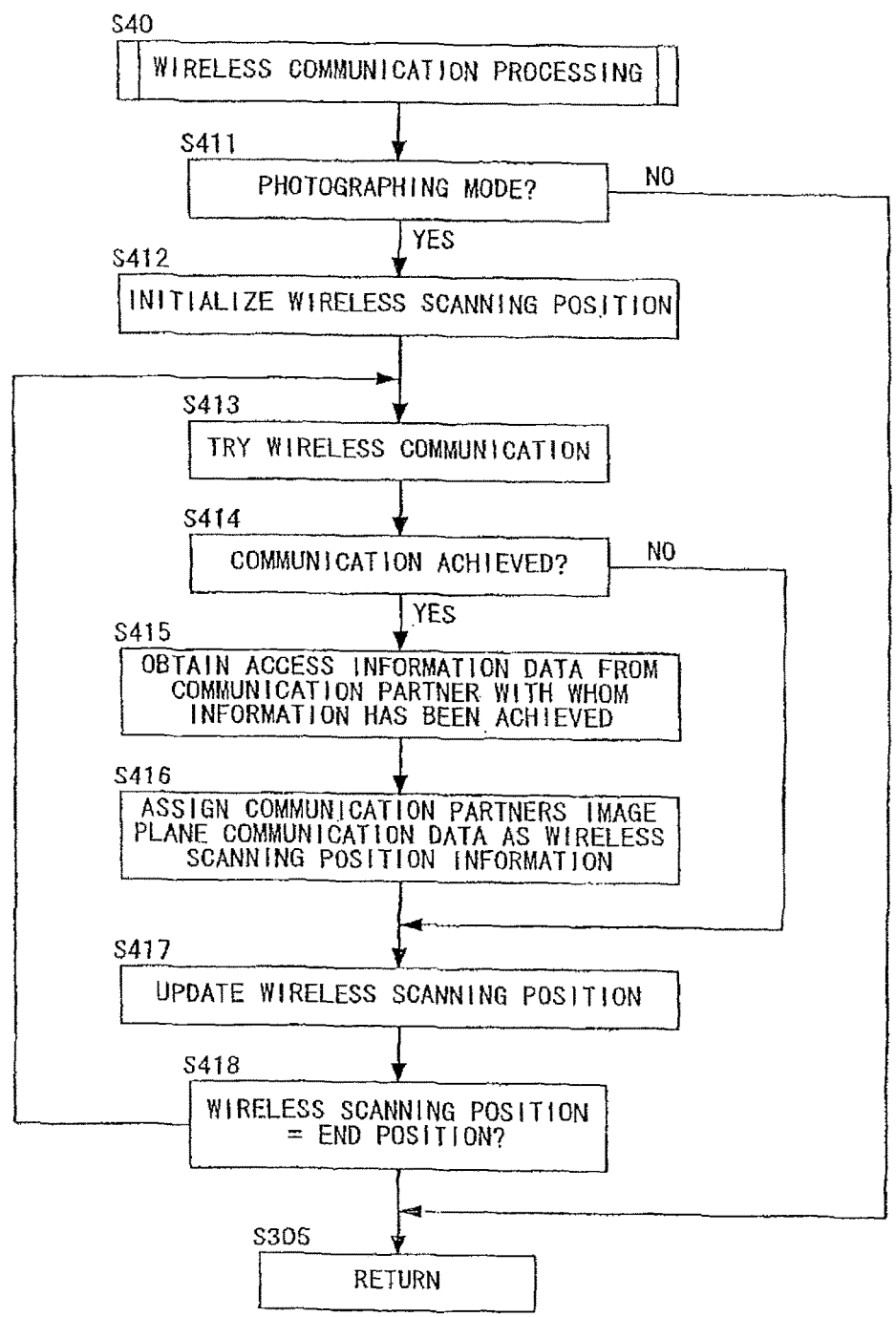
FIG. 92 presents a flowchart of a subroutine.

In the detailed flowchart of the wireless communication processing subroutine executed in conjunction with using the highly-directional wireless antenna 75, which is presented in FIG. 92, after the subroutine is started up in S40, a verification is achieved in S411 as to whether or not the electronic camera is currently set in the photographing mode, and if it is decided that the camera is not set in the photographing mode, the operation makes a return in S419. If, on the other hand, it is decided that the camera is set in the photographing mode, the scanning position of the highly-directional wireless antenna 75 is initialized in S412. It is to be noted that the image plane size is determined in conformance to the photographic lens focal length information and the CCD effective image plane size. In S413, wireless communication with electronic instruments present in the vicinity of the electronic camera 100 (a portable telephone carried by a subject person, an electronic sightseeing guide apparatus installed near a historical site and capable of transmitting sightseeing information with regard to the historical site through wireless communication) is attempted with the means for wireless communication 710. If it is decided in S414 that no communication has been achieved, the operation proceeds to S417. If, on the other hand, communication has been achieved, the subject information data are obtained through wireless communication from the electronic instrument of the communication partner with whom communication has been achieved in S415. In S416, image-plane position information contained in the subject information data is designated as the information indicating the scanning position of the highly-directional wireless antenna 75. In S417, the scanning position of the highly-directional wireless antenna 75 it is updated. In S418, a verification is achieved as to whether or not the scanning position of the highly-directional wireless antenna 75 is at the end position and, if it is decided that the scanning position is not at the end position, the operation returns to S413 to repeatedly executed the operation described above, whereas if the scanning position is at the end position, the operation makes a return in S419.

Figure 93:
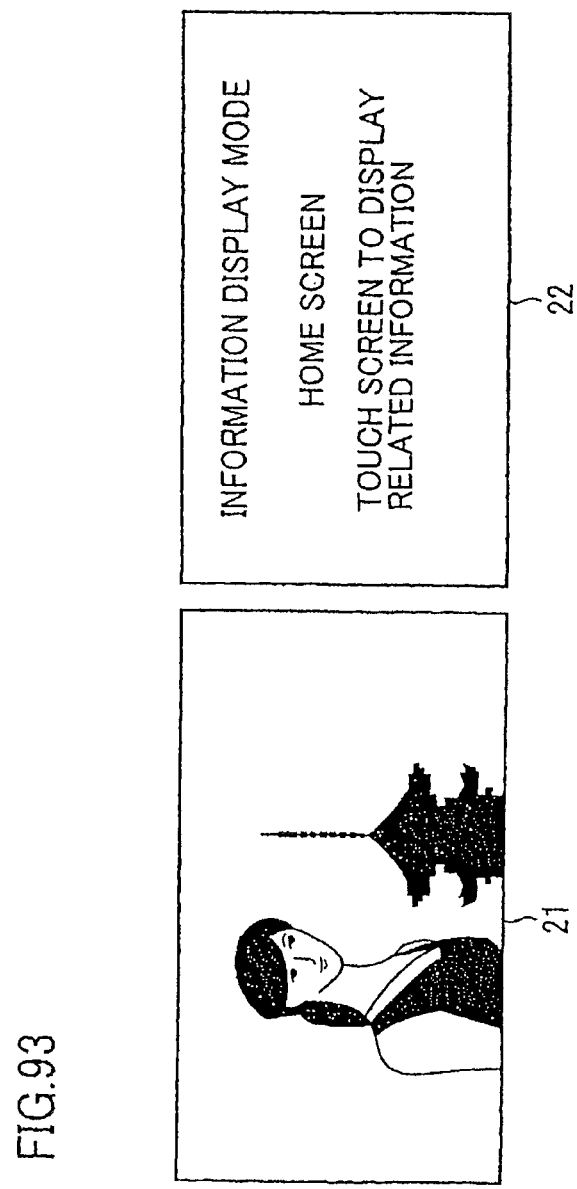
FIG. 93 presents an example of screen display.
Figure 94:
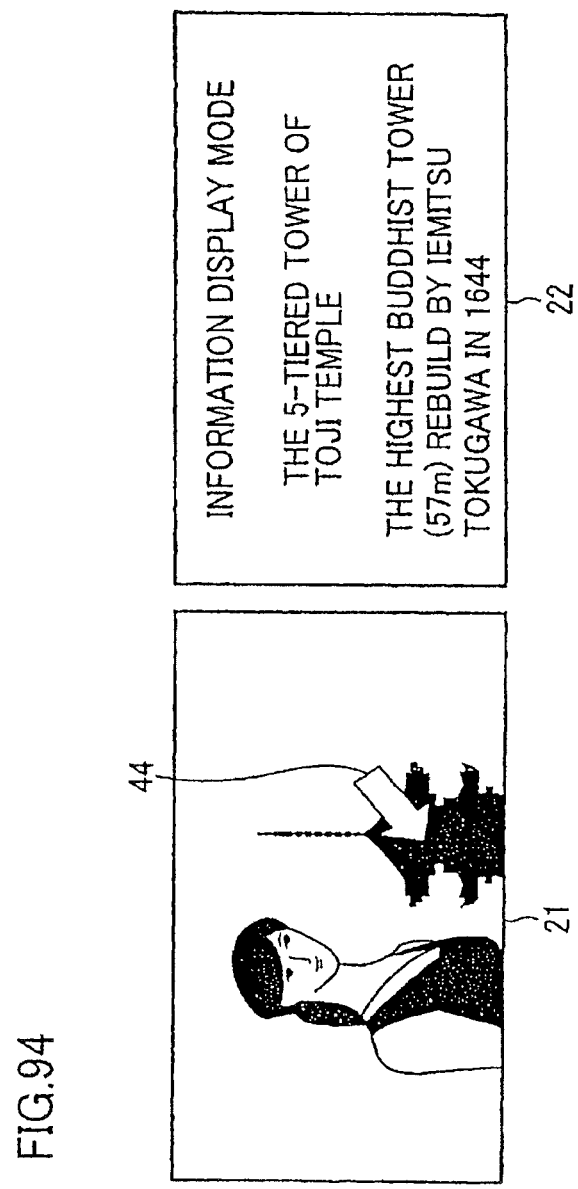
FIG. 94 presents an example of screen display.

In FIG. 93 showing a display example of the home screen brought up in the information display mode, no graphics are displayed at the left screen 21 unlike the example shown in FIG. 81. If the user touches the display of the person or the building on the left screen, the contact position is detected through the touch tablet 66, and the subject information containing the image-plane position information data corresponding to the contact position is brought up on display at the right screen 22, as shown and FIG. 94. In addition, on the left screen 21, an arrow mark 44 is displayed at the subject position corresponding to the subject information. This allows the user to view the image data reproduced and displayed at the left screen 21 without obtrusive graphics crowding on the screen and to review the subject information at the right screen 22 while the image data remains on display at the left screen 21 and to verify the relationship between the subject information and the subject on the image simply by touching the subject which interests the user at the left screen 21. In addition, it makes it possible to display the subject information directly from the reproduction mode by integrating the information display mode and the reproduction mode.

Figure 95:
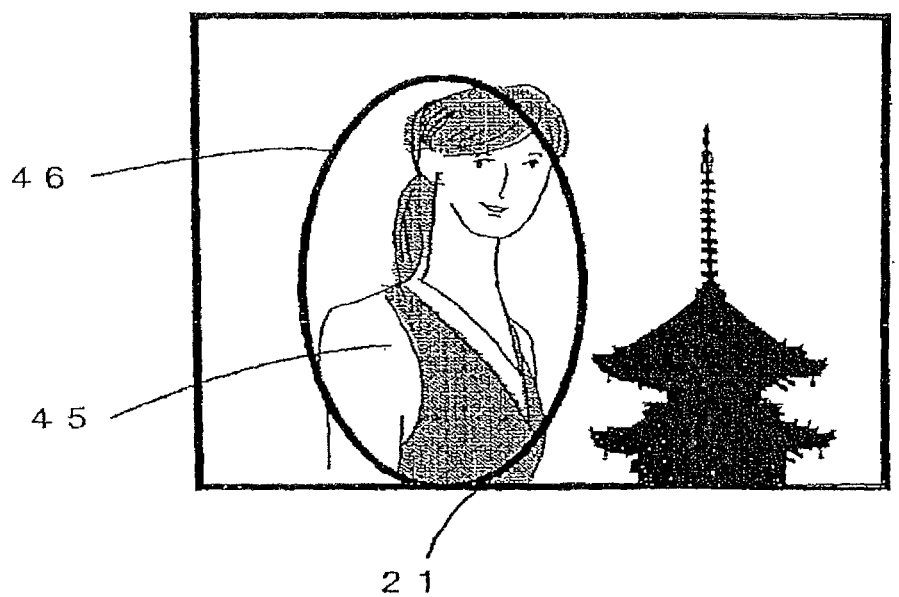
FIG. 95 illustrates how a subject is specified.

Furthermore, the outlines of the image a subjects in the image and displayed may be extracted through an image analysis, so as to enable a display of the subject information corresponding to image-plane position information data contained in an area 46 at the left screen 21 if the user touches the area near an outline (the area 46 in the vicinity of the person 45 in FIG. 95). In this case, even if the user touches a position other than the position of the electronic instrument which has transmitted the subject information to the electronic camera, e.g., if the user touches the face of the subject person, the subject information corresponding to the subject person can be brought up on display.

Figure 96:
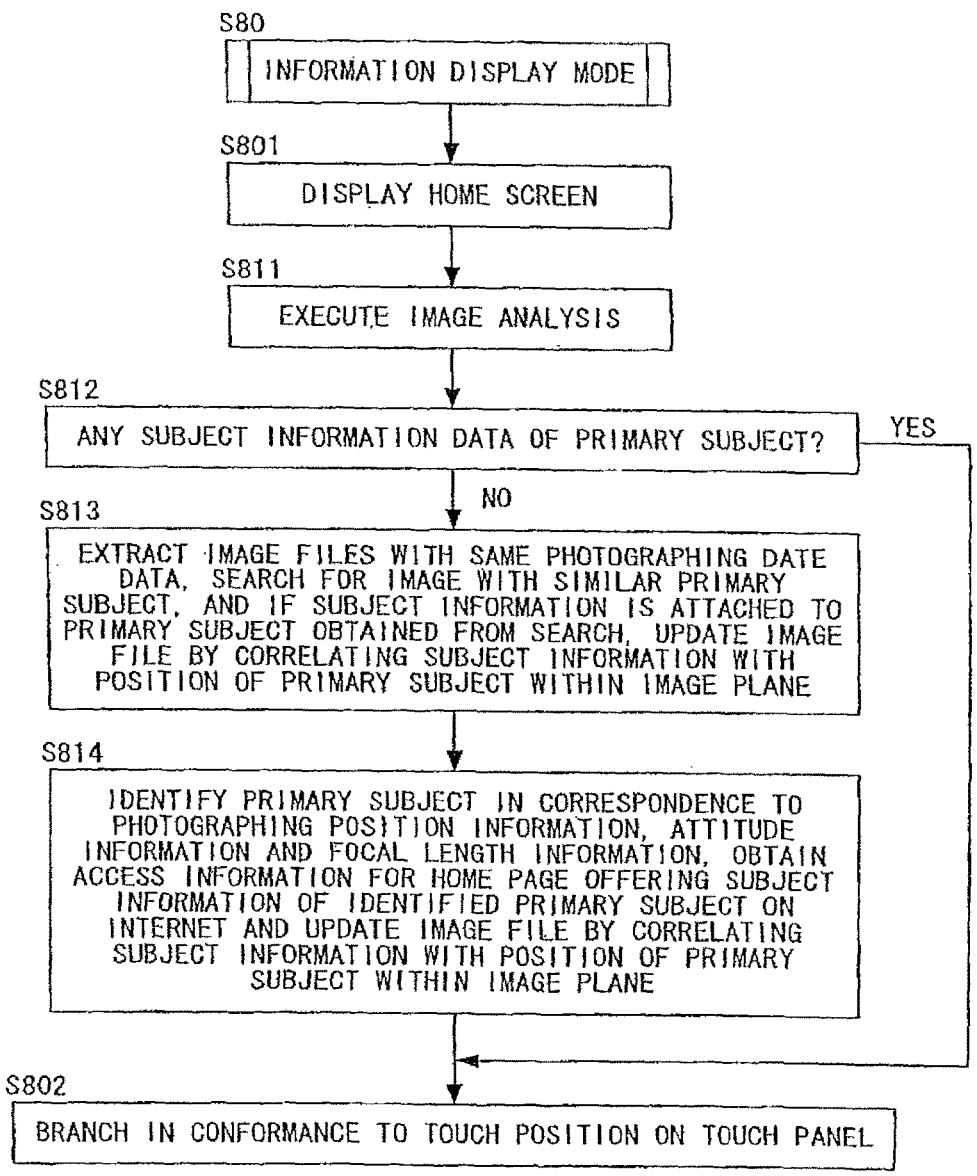
FIG. 96 presents a flowchart of a subroutine.

FIG. 96 presents a detailed flowchart of an information display mode subroutine achieved by executing additional processing between S801 and S802 in the information display mode subroutine shown in FIG. 80. Through the additional processing, the subject information contained in an image file is transplanted into a similar image file that does not have any subject information.

After the home screen is displayed in S801, an image analysis is executed on the image data reproduced and displayed at the left screen 21 in S811 to identify the primary subjects (a primary subject may be, for instance, a person or a building taking up a relatively large area in the image plane) and then a verification is achieved in S812 as to whether or not there is any subject information containing image-plane position information data present in the area occupied by a primary subject. If it is decided that there is such subject information, the operation proceeds to S802. If, on the other hand, it is decided that there is no such subject information, image files with the photographing time point data indicating the same photographing date as the photographing date indicated by the photographing time point data of the image data the reproduced image of which is currently on display are searched in the memory card 104 and are extracted in S813. Next, an image analysis is executed on the image data in these files and image data having a subject similar to the primary subject of the image data the reproduced image of which is currently on display are extracted. Then, a verification is achieved as to whether or not image-plane position information is attached to the similar subject in the extracted image data and, if any image-plane position information is attached, the subject information containing this image-plane position information is appropriated as the subject information of the primary subject of the image data the reproduced image of which is currently on display. Accordingly, the image file containing the image data the reproduced image of which is currently on display is updated by attaching image-plane position information indicating the position of the primary subject within the image plane determined through the image analysis.

In S814, the photographing position information data, the photographing attitude information data and the focal length information data are read out from the image file containing the image data the reproduced image of which is currently on display, and a primary subject is identified upon data corresponding to the information data, which are obtained from a map database on the Internet and the results of the image analysis executed in S813. For instance, if a triangular object appearing to be a mountain is shown in an image plane photographed along a southerly direction from the vicinity of Lake Yamanaka, the object is identified as Mount Fuji. After a specific primary subject is identified, a search is conducted on the Internet by using the name of the primary subject as a keyword, access information with regard to a homepage providing information on the primary subject is obtained and the image file containing the image data the reproduced image of which is currently on display is updated by appending image-plane position information corresponding to the position of the primary subject within the image plane ascertained through the image analysis.

After transplanting the subject information into the image file with no subject information from another file or from the Internet, as described above, the operation proceeds to S802. Thus, even when no subject information related to a subject has been obtained during the photographing operation (e.g. when there is no sightseeing guide apparatus capable of wirelessly providing subject information present in the vicinity of the electronic camera used to photograph a landscape image or the like), information related to the subject can be displayed when the image data are reproduced in the information display mode through this subroutine. It is to be noted that the image files searched in S813 are not limited to those obtained on the same photographing date. For instance, a predetermined number of image files photographed before and after the image file with no subject information may be searched, instead. The camera automatically identifies the subject by using the photographing position information data, the photographing attitude information data and the focal length information data and downloads information on the identified subject from the Internet in S814. However, the user may identify the subject by reviewing the image data, input or download from the Internet information on the specified subject and update the image file by pasting the information onto the subject position on the screen image instead.

Figure 97:
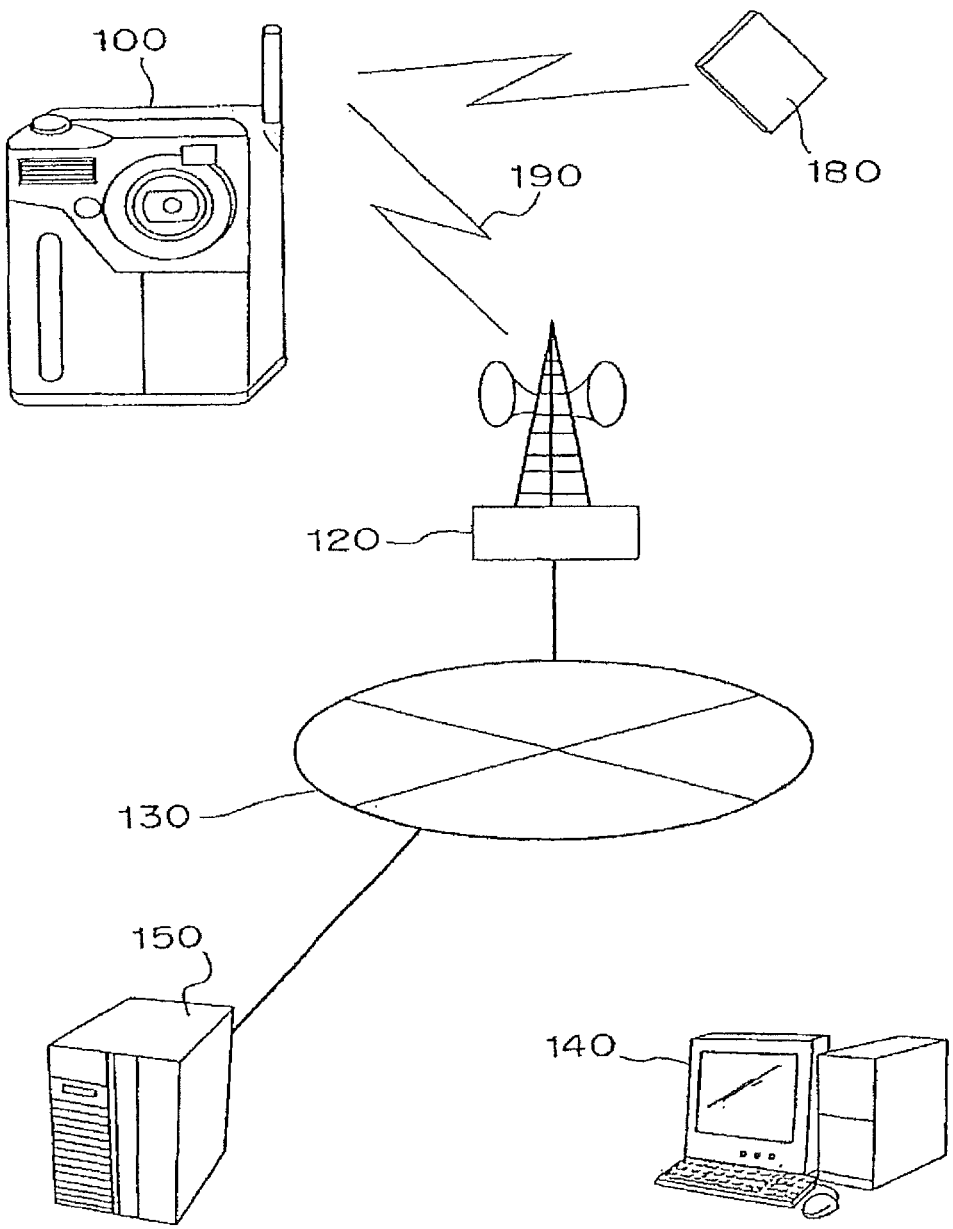
FIG. 97 illustrates an example of a variation of the system configuration.

FIG. 97 is another conceptual diagram of an electronic camera adopting the present invention and an electronic image communication system achieved by using the electronic camera. In the electronic image communication system in FIG. 57, the personal information data stored in the UIM card 170 loaded at the portable telephone 160 are read into the electronic camera 100 through a short-distance wireless communication between the electronic camera 100 and the portable telephone 160 carried by the user. In the electronic image communication system in FIG. 97, on the other hand, as a wireless tag (a non-contact IC card) having stored therein personal information data moves closer to the electronic camera 100 having an internal non-contact wireless read unit, the personal information data are automatically read from the wireless tag into the electronic camera 100.

As described above, the electronic image communication system shown in FIG. 97 allows the subject to communicate with the electronic camera 100 simply by carrying a compact wireless tag (a non-contact IC card) which does not require a power source.

In the embodiment described above (see FIGS. 56 and 66), subject information (including position information) is automatically transferred to the electronic camera through wireless communication between the electronic camera and a portable instrument carried by the subject during an image data photographing operation and, as a result, the need to perform a special operation to obtain the subject information is eliminated. In addition, since the information indicating the subject position assumed at the time when the image data are photographed can be obtained, the image-plane position information data indicating a position accurately corresponding to the actual position on the image plane can be obtained by using the position information. It is to be noted that the subject position information should be obtained without a significant time lag relative to the timing with which the subject is photographed (it is desirable to obtain the subject position information within about 1 second prior to or following the photographing operation) in order to ensure that a position accurately corresponding to the actual position on the image plane is ascertained.

In the embodiment described above (see FIGS. 56 and 66), information related to a subject in the image which interests the user viewing the reproduced image data on display can be reviewed with ease and speed simply by touching the icon displayed in correspondence to the image-plane position information at the screen or by touching the subject.

In the embodiment described above (see FIGS. 56 and 70), subject information is obtained from a subject through a short-distance wireless communication to raise the probability of achieving communication with the subject present in the vicinity of the electronic camera and also to reduce the likelihood of unnecessarily communicating with an electronic instrument that is present at a long distance from the electronic camera and that has no relation to the subject. In addition, since the signal transmission output level for the wireless communication is adjusted in conformance to the photographic lens focal length, a reliable wireless communication with the subject is achieved and, at the same time, the likelihood of achieving wireless communication with a party other than the subject is reduced.

In the embodiment described above (see FIG. 78), the image data reproduced and displayed in the reproduction mode can be transmitted to a transfer address indicated in subject information data obtained during the image data photographing operation. Thus, image data can be transmitted with ease to a stranger met by chance on a trip or the like without having to keep track of the postal address, the e-mail address or the like of the stranger. This feature is particularly convenient when there are numerous people photographed in a group picture because it relieves the user from the task of performing a special operation to send the image data to multiple recipients.

In the embodiment described above (see FIG. 82, etc.), when displaying subject information specified by the user at the screen in the information display mode, the original image data in which the subject is photographed are displayed (as a thumbnail image) at the same time, enabling the user to understand the relationship between the image data and the subject intuitively, and also, the home screen display can be promptly recovered by specifying the image data through the touch tablet 66 which enables the user to quickly and easily review the subject information in reference to the image data.

In the embodiment described above (see FIGS. 86 and 87), the wireless communication directivity of the wireless communication circuit 710 is restricted so as to manifest along the direction in which the subject is likely to be present relative to the electronic apparatus main unit by using an electromagnetic shield or the like and thus, reliable wireless communication with the subject is achieved to obtain the subject information wirelessly and the likelihood of achieving wireless communication with a party other than the subject is reduced.

In the embodiment described above (see FIGS. 88 and 89), a subject information transmission to the electronic camera is initiated on the subject side and, as a result, it becomes possible to prevent uncontrolled circulation of personal information and the like to the outside, as necessary.

In the embodiment described above (see FIG. 92), a scan within the image plane is performed with a highly-directional wireless antenna to collect the image plane position information corresponding to a subject, to allow the system to be configured at low cost without having to provide a special means for positional measurement such as GPS unit at the electronic instrument on the subject side.

In the embodiment described above (see FIG. 96), the image plane position information corresponding to a specific subject is detected through an image analysis and the subject information is copied from a similar image file, to enable the user to reference the subject information for a review even when no subject information has been obtained during the photographing operation. In addition, since information indicating the image-plane position of a subject is detected through image analysis, the subject is identified based upon the results of the image analysis and the position information and subject information related to the identified subject is collected from an information source on the Internet or the like, the user is able to reference the subject information for review even when no subject information has been obtained during the photographing operation.

In the embodiment described above (see FIG. 97), the electronic camera includes a non-contact IC card (wireless tag) read circuit to execute a non-contact read of subject information from a non-contact IC card (wireless tag) carried by the subject. Thus, the subject only needs to hold a compact and light-weight non-contact IC card which does not require a power source to ensure that his subject information is provided to the electronic camera without having to perform any operation.

(Examples of Variations)

The present invention is not limited to the embodiment described above and allows for numerous variations and modifications.

In the embodiment described above (see FIG. 56), subject information is obtained through a wireless (electromagnetic wave) communication between the electronic camera and the electronic instrument carried by a subject. During this process, a redundant communication with electronic instruments carried by parties other than the true user should be prevented by keeping the wireless transmission signal output level within a range lower than a predetermined value and thus limiting the communication-enabled distance range based upon the assumption that electronic instruments have the average reception capability. This distance range is determined by taking into consideration standard manner in which the electronic apparatus is operated, whether or not an object that blocks electromagnetic waves is present between the electronic apparatus and the electronic instrument, the performance of the receiver at the electronic instrument and the like. However, it is desirable to set the distance range to approximately 10 m or less in correspondence to the focal length of the standard photographic lens.

In the embodiment described above (see FIG. 56), the wireless communication circuit engages in communication through a short-distance wireless system such as Bluetooth. However, the short-distance wireless communication may be achieved through a system other than Bluetooth, such as wireless LAN (IEEE802.11) or infrared communication (IrPA). In addition, communication may be achieved by simultaneously utilizing a plurality of short-distance wireless systems. In the latter case, an electronic instrument with any type of short-distance function, carried by a subject can engage in wireless communication with the electronic camera.

In the embodiment described above (see FIG. 56), subject information is transferred through a wireless (electromagnetic wave) communication between the electronic camera and the electronic instrument carried by a subject. However, the subject information may instead be transferred through another non-contact or contact method.

In the embodiment described above (see FIG. 60), sound can be recorded with the audio recording circuit 80 during the photographing operation. However, a highly directional microphone may be utilized during a photographing operation to record sound generated by a subject present within the image plane, the recorded audio data may be stored into the image file in correspondence to the image plane subject position information and the recorded audio may be reproduced if the subject in the reproduced image display is specified through the touch tablet or the like in the information display mode, instead. In addition, a plurality of microphones with extreme directivity may be utilized to record sound generated by a plurality of subjects in the image plane at the same time and the sound corresponding to a subject specified through the touch tablet or the like in the reproduced image display in the information display mode may be reproduced.

Also, sound generated by a subject or voice commentary related to the subject may be transmitted as subject audio information to the electronic camera from an electronic instrument mounted with a microphone which is carried by the subject or an electronic instrument having pre-stored audio data of the information related to the subject any time, regardless of whether or not a photographing operation is in progress and regardless of photographing timing. In such a case, subject audio information may be appended to image data obtained by photographing the subject and saved in correspondence to the position of the subject within the photographic image plane indicated by the image-plane position information. Then, if a given subject is specified with a pointing device such as a touch tablet at the display screen while the user is reviewing the image reproduced from the image data in the information display mode, the subject audio information stored in correspondence to the position of this particular subject is reproduced. As a result, it becomes possible to provide the viewer with diverse types of subject information including visual information and audio information.

In the embodiment described above (see FIG. 60), a position on the left screen 21 or the right screen 22 is specified through the touch tablet 66. However, another pointing device may be utilized for this purpose. For instance, a track ball or a mouse may be utilized as a means for screen position specification. In addition, if an electronic viewfinder (a viewfinder that enlarges through an optical system a screen display brought up at a compact means for screen display to facilitate user observation) is used, the direction along which the line of sight of the user extends (the site line position, the visual focus position) may be detected to enable a screen position specification. In addition, when using the touch tablet 66, a member (pen) provided exclusively for position specification may be used instead of the user's finger to ensure that a position is specified with greater accuracy and that unnecessary subject information is not displayed in response to an inadvertent finger contact.

In the embodiment described above (see FIG. 64), subject information is transferred through wireless (electromagnetic wave) communication between the electronic camera and the electronic instrument carried by a subject. In addition, a notification acknowledging the reception of the subject information may be issued from the electronic camera to the electronic instrument having transmitted the subject information to the electronic camera, and a message indicating that the subject information has been transferred may be brought up on display at the subject-side electronic instrument as well. Alternatively, the electronic instrument may issue an audio message for the subject person to notify him that the subject information has been transferred by employing a means for sound generation.

By adopting the features described above, the subject can verify that the subject information has been transferred. In addition, the subject provided with an audio notification can verify that the subject information has been transferred even if his electronic instrument does not include a means for display, while the electronic instrument is left in a pocket or the like.

In the embodiment described above (see FIG. 66), the electronic camera engages in the photographing mode operation, the reproduction mode operation and the information display mode operation. However, image data may be generated through a photographing operation performed in the electronic camera, an image file may be prepared by collecting subject information and image-plane position information through wireless communication and this image file may be transferred on line or off-line to an image display apparatus other than the electronic camera, which then executes the reproduction mode operation and the information display mode operation, instead.

In the embodiment described above (see FIG. 66), the switch over between the reproduction mode and the information display mode is achieved through a manual operation. Instead, the user may specify a given subject at a specific position within the reproduced image display through the touch tablet in the reproduction mode to bring up a display of the subject information related to this particular subject. This allows the user to check the information on the subject immediately as he becomes interested in the subject while reviewing the image data, without having to switch from the reproduction mode to the information display mode.

With respect to the reproduction mode and the information display mode in the embodiment described above (see FIG. 66), audio data recorded with the audio recording circuit 80 during a photographing operation may be reproduced with the audio reproduction circuit 81 when reproducing the image data. In addition, a music database on the Internet may be accessed based upon the photographing time point data to download music which was popular at the time of the photographing operation and this downloaded music may be automatically reproduced as background music when reproducing the image data, as well. In this case, the user, who is reminded both visually and audibly of the time when the picture was taken, can fully enjoy the viewing experience.

In the embodiment described above (see FIG. 69), the electronic camera does not provide the photographer with a report of the subject information collected through communication with subjects during the photographing operation. However, a list of collected subject information may be brought up on display together with the image data obtained through the photographing operation, instead. Since this allows the photographer to verify exactly what subject information was collected during the photographing operation, he is then able to take further action to collect more information if there is any missing information.

In the embodiment described above (see FIG. 70), the electronic camera attempts wireless communication with electronic instruments present in the vicinity of the electronic camera to collect subject information during a photographing operation. The electronic camera may be set in advance so as not to engage in wireless communication with the electronic instrument carried by the photographer operating the electronic camera in this situation. Alternatively, the electronic camera may engage in wireless communication with the electronic instrument carried by the photographer during the photographing operation and record information related to the photographer collected through the wireless communication as photographer information constituting part of the photographing information data.

In the embodiment described above (see FIG. 70), the electronic camera attempts wireless communication with electronic instruments present in the vicinity of the electronic camera to collect subject information during a photographing operation. During this process, the transmission signal output level for the wireless communication (by means of e.g. electromagnetic waves, infrared light) may be adjusted in conformance to the subject distance (the output level is raised as the distance to the subject increases). The distance to a subject can be obtained through a detection performed by a distance detection device of the known art, or the photographing distance of the photographic lens, which is manually set, may be used as the subject distance. Through this output level adjustment, the electronic camera is able to achieve communication with the electronic instrument held by a subject with a high degree of possibility, while the likelihood of achieving communication with an electronic instrument held by a party other than the subject is reduced.

In the embodiment described above (see FIG. 71), subject information is automatically transferred to the electronic camera through a wireless communication between the electronic camera and the electronic instrument held by a subject during a photographing operation. However, when the electronic instrument receives the communication request 1 or the information request 3 from the electronic camera, the electronic instrument may notify the subject of the reception so as to determine whether or not any further communication is to be carried out in conformance to an instruction from the subject. Since the subject is given the option of refusing further communication as necessary in this manner, uncontrolled circulation of his personal information to the outside is prevented.

Alternatively, when the electronic instrument receives the communication request 1 or the information request 3 from an electronic camera, the electronic instrument may compare the identification number of the electronic camera having transmitted the request with the identification numbers of electronic cameras preregistered at the electronic instrument and may refuse any further communication if the electronic camera is not registered. In this case, the extent to which the personal information is allowed to circulate can be automatically controlled.

In the embodiment described above (see FIG. 71), subject information is automatically transferred to the electronic camera through a wireless communication between the electronic camera and the electronic instrument held by a subject during a photographing operation. Instead, the subject information may be automatically transferred into the electronic camera through a wireless communication between the electronic camera and the electronic instrument held by the subject while a photographing operation is not in progress. In this case, since it is not necessary to engage in wireless communication for each of a plurality of pictures being taken without changing the composition (as in an exposure bracket photographing operation), a series of pictures can be taken quickly, and also, subject information corresponding to the plurality of sets of image data can be collected through a single wireless communication executed either automatically or manually when the photographing operation has been completed or the like.

In the embodiment described above (see FIG. 71), subject information is automatically transferred to the electronic camera through a wireless communication between the electronic camera and the electronic instrument held by a subject, which is carried on at all times during a photographing operation. However, the wireless communication operation for subject information collection may be disallowed to prevent a delay in the photographing operation. For instance, when a continuous photographing (continuous shooting) operation is performed with the electronic camera, wireless communication may be automatically disallowed to prevent a significant lag between continuously photographed image frames due to the wireless communication operation.

In the embodiment described above (see FIG. 73), information indicating the position of a subject within the image plane is calculated by using the electronic camera attitude information and the positional measurement information for the electronic camera and the electronic apparatus obtained through the GPS units. However, the image plane subject position information may be detected through another method. For instance, if the electronic camera and the electronic instrument held by a subject engage in communication with each other by using infrared light, the position of the electronic instrument within the image plane may be specified by detecting the light-receiving position on a two-dimensional infrared light image-capturing element provided at the electronic camera based upon the image data captured at the image-capturing element. Alternatively, the image-plane position information alone may be obtained by detecting the position of a point light source of infrared light originating from the electronic instrument with a two-dimensional infrared light image-capturing element, and the subject information may be obtained through a wireless communication (electromagnetic waves). In such a case, the infrared point light source should be turned on with the timing with which the electronic instrument engages in wireless communication.

In the embodiment described above (see FIG. 80), the subject information corresponding to a position at which the user touches the screen is accessed on the Internet and is brought up on display in the information display mode. However, the Internet does not always need to be accessed, and if sufficient subject information has been collected during the photographing information, such subject information alone may be brought up on display at the screen. Since this eliminates the need to access the Internet to display subject information, a prompt subject information display is achieved, thereby reducing the stress of the user as he no longer needs to wait a long time for the subject information to come up on display for review.

In the embodiment described above (see FIG. 81), image data having been photographed in a predetermined photographic image plane size are reproduced and displayed in a size matching the display screen size and the subject information corresponding to a position on the display screen specified by the user is brought up on display at the display screen in the information display mode. However, the sizes of the photographic image plane and the display screen do not necessarily need to match each other, and the photographic image plane may be displayed either in an enlargement or in a reduction on the display screen, instead. In addition, the image data may be modified, rotated or the like for display at the display screen. If the photographic image plane size and the display screen size do not match, the coordinates of a position specified on the display screen are converted to positional coordinates on the photographic image plane (through enlargement, reduction, shifting, rotation or the like) and the subject information is displayed based upon the positional coordinates resulting from the conversion. Since this eliminates the need to ensure that the shape of the photographic image plane and the shape of the display screen are congruent with each other, it becomes possible to utilize various types of image display apparatus in the information display mode and to specify a desired subject by enlarging the image at the display screen if multiple subjects are present in close proximity to one another in the image.

In the embodiment described above (see FIG. 82), the electronic camera includes two display screens, at one of which subject information is displayed with the image data obtained by subjects displayed (as a thumbnail image) at the other screen in the information display mode. However, if the electronic camera has only one screen, the subject information may be displayed over the entire screen with a superimposed display of the image data containing the subjects brought up over part of the screen. As this allows simultaneous review of the subject information and the corresponding image data, the user can intuitively understand the relationship between the subject information and the image data even when the electronic camera has a single display screen.

In the second embodiment described above, information related to a subject, which is made to correlate to a subject position within the image plane, is appended to the electronic image data for storage, and the subject-related information is brought up on display in correspondence to the subject position within the image plane when the electronic image data are reproduced and displayed. As a result, information related to a subject photographed in an image, which interests the user reviewing reproduced electronic image data on display, can be quickly and easily reviewed in connection with the reproduced display of the electronic image data.

Third Embodiment

Figure 98:
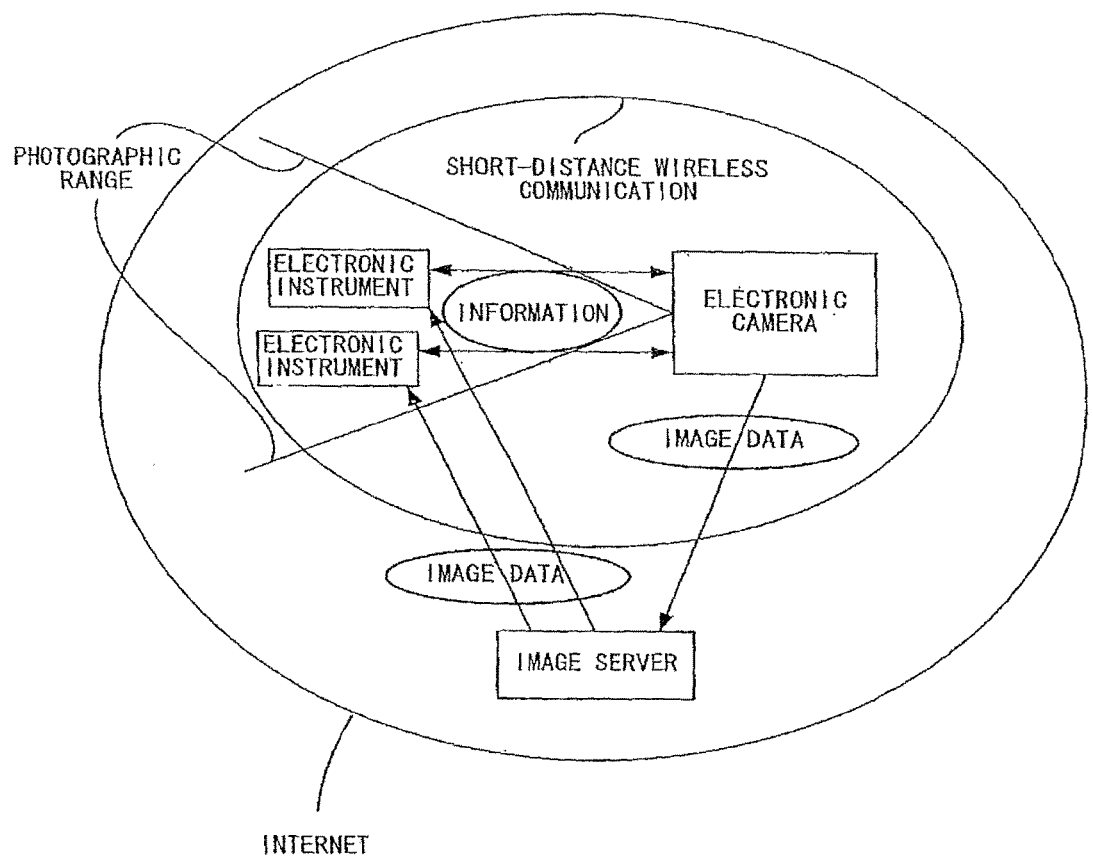
FIG. 98 illustrates the concept adopted in a third embodiment of the present invention.

The third embodiment of the present invention is now explained in reference to the drawings. FIG. 98 is a conceptual diagram of the third embodiment of the present invention. An electronic camera photographs subjects within the photographing range, assigns a file name to image data obtained through the photographing operation, connects with an image server on the Internet and uploads the image data into a specific folder at the image server. In addition, the electronic camera transmits address information (the Internet address of the image server is equivalent to URL (Uniform Resource Locator), the folder name and the image data file name at the image server) to electronic instruments (such as portable telephones) carried by the subjects in the vicinity of the camera through short-distance wireless communication. The electronic instrument (such as a portable telephone) carried by a subject connects to the image server on the Internet based upon the information received from the electronic camera through short-distance wireless communication and displays at its screen the image data downloaded from the specific folder at the image server.

Figure 99:
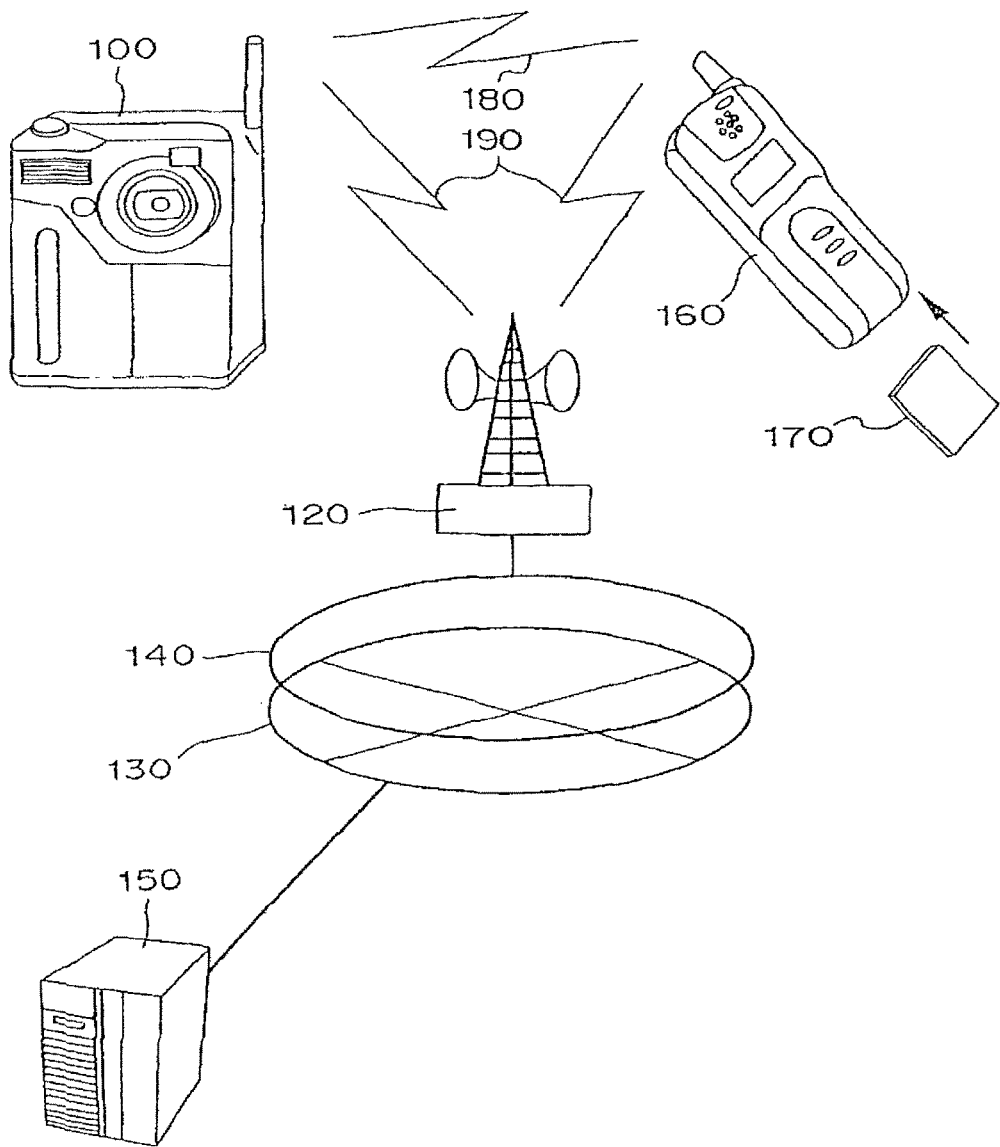
FIG. 99 illustrates the system configuration adopted in the third embodiment of the present invention.

FIG. 99 is a conceptual diagram of an information transmission system achieved by utilizing an electronic camera, an image server and a portable telephone terminal adopting the present invention. In FIG. 99, an electronic camera 100 photographs a subject present within its photographic range and generates electronic image data or digital image data (hereafter referred to as "image data"). The electronic camera 100 having a wireless telephone function is capable of connecting with a public telephone line network 140 via a base station 120 through a wireless portable telephone line 190. The public telephone line network 140 is also connected with the Internet 130 to allow the electronic camera 100 to connect with an image server 150 accessible via the Internet 130. The image server 150 having a large capacity memory for saving image data saves image data uploaded via the Internet 130 into folders set in correspondence to individual users and downloads specified image data via the Internet 130 if a read request is issued from an external partner via the Internet 130. By connecting with the image server 150, the electronic camera 100 uploads and saves image data into a specific folder.

In addition, the electronic camera 100 has a short-distance wireless communication function such as Bluetooth (registered trademark) and transfers identification data (URL) of the image server to which image data have been uploaded, folder identification data (folder name) and image data identification data (filename) to a portable telephone terminal 160 through communication achieved via a short-distance wireless line 180 with the portable telephone 160 having a matching short-distance wireless communication function. The portable telephone 160 is assumed to be carried by a person who is the subject of a photographing operation executed with the electronic camera 100, and a UIM card (user identity module card) 170 having stored therein user personal information at which image data can also be stored is loaded at the portable telephone 160.

The portable telephone 160 having a wireless telephone function is capable of connecting with public telephone line network 140 through the wireless portable telephone line 190. The public telephone line network 140 is also connected with the Internet 130 and thus allows the portable telephone 160 to connect with the image server 150 installed on the Internet 130. By connecting with the image server 150, the portable telephone 160 downloads the image data in the specific folder, saves the image data into the UIM card 170, and also displays the downloaded image data at its screen.

It is to be noted that Bluetooth refers to a mobile communication technology (for portable electronic instruments) with a low transmission output for short-distance communication, which covers a short-range of approximately 10 m by using wireless electromagnetic waves in the 2.45 GHz band and realizes a one-on-one or multiple-partner connection at a transfer rate of 1 Mbps.

Figure 100:
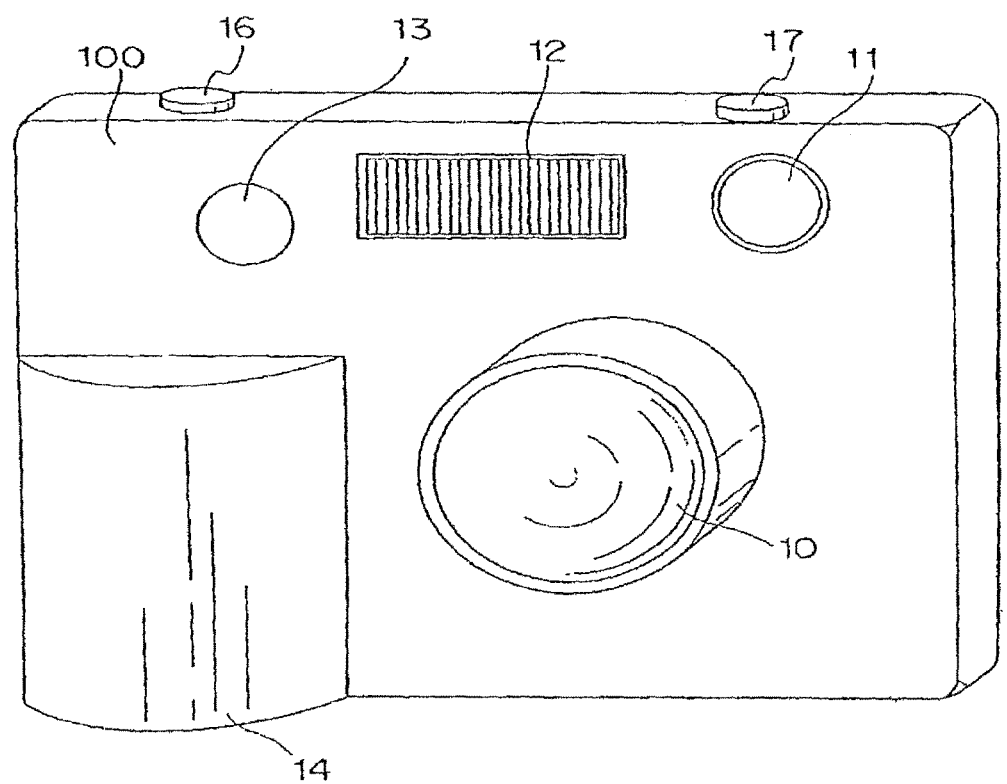
FIG. 100 is an external view (front view) of the electronic camera achieved in the third embodiment of the present invention.
Figure 101:
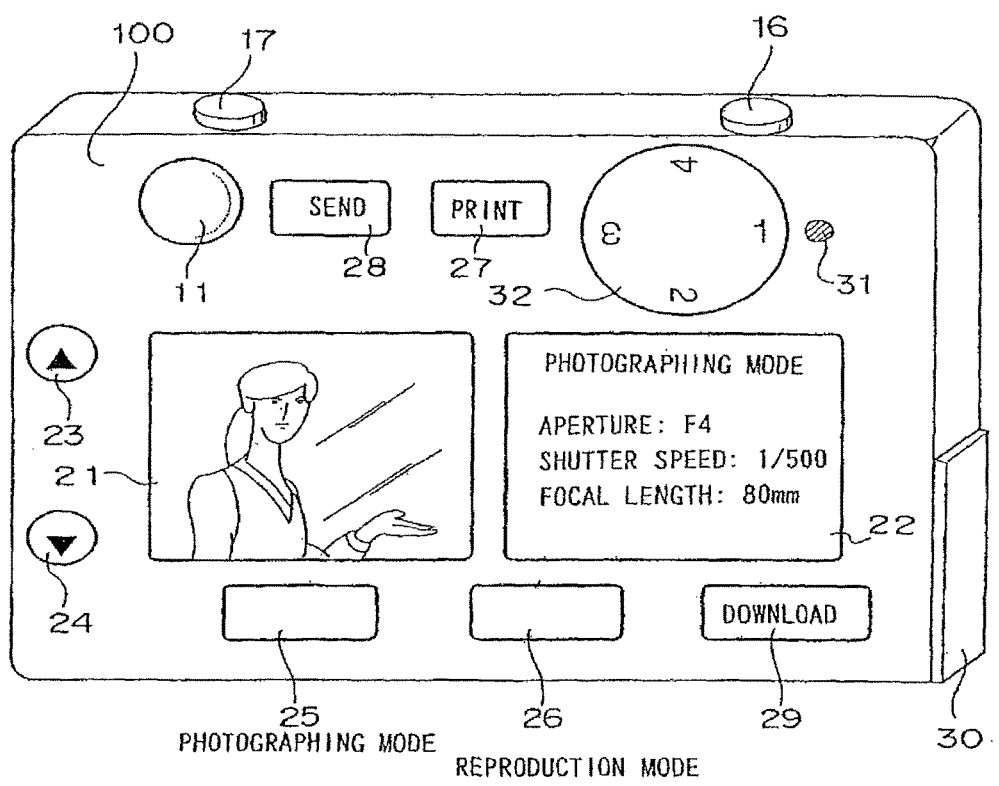
FIG. 101 is an external view (rear view) of the electronic camera achieved in the third embodiment of the present invention.

FIGS. 100 and 101 present external views (a front view and a rear view) of an embodiment of the electronic camera 100 in FIG. 99. As shown in FIG. 100, at the front surface of the electronic camera 100, a photographic lens 10 which forms a subject image, a viewfinder 11 used to check the photographic image plane, a strobe 12 used to illuminate the subject during a photographing operation, a photometering circuit 13 that detects the brightness of the subject and a grip portion 14 that projects out from the camera main body to allow the electronic camera 100 to be held by hand are provided, whereas a shutter release button 16 operated to issue an instruction for a photographing start and a power switch 17 (a momentary switch which is alternately set to on and off each time it is operated) through which the on/off state of the power to the electronic camera 100 is controlled are provided at the upper surface.

As shown in FIG. 101, at the rear surface of the electronic camera 100, an eyepiece unit of the viewfinder 11, a left LCD (left screen) 21 having a substantially quadrangular screen for text and image display and a right LCD (right screen) 22 having a substantially quadrangular screen for text and image display are provided, and an up button 23 and a down button 24 for scrolling the image displayed at the left screen 21 are provided in the vicinity of, and to the left of the left screen 21, whereas a photographing mode button 25 operated to set the electronic camera 100 in a photographing mode, a reproduction mode button 26 operated to set the electronic camera 100 in a reproduction mode, a PRINT button 27 operated to print image data, a SEND button 28 operated to transmit image data and a DOWNLOAD button 29 operated to download image data are provided around the right screen 22 and the left screen 21. An upload dial 32 is an operating member rotated to select an image server to which specific image data are to be uploaded and as it is rotated, the image server corresponding to the number at the position of a dot 31 is selected. At a side surface, a memory card slot 30 at which a memory card 77 can be loaded is provided.

It is to be noted that the shutter release button 16, the up button 23, the down button 24, the photographing mode button 25, the reproduction mode button 26, the PRINT button 27, the SEND button 28, the DOWNLOAD button 29 and the upload dial 32 are all operating keys operated by the user.

It is also to be noted that over the surfaces of the left screen 21 and the right screen 22, so-called touch screens 66 having a function of outputting position data corresponding to a position indicated through a finger contact operation are provided, and they can be used to make a selection from selection items or make an image data selection on the screens. The touch screens 66 are each constituted of a transparent material such as a glass resin so that the user can observe images and text formed inside the touch screens 66 through the touch screens 66.

Figure 102:
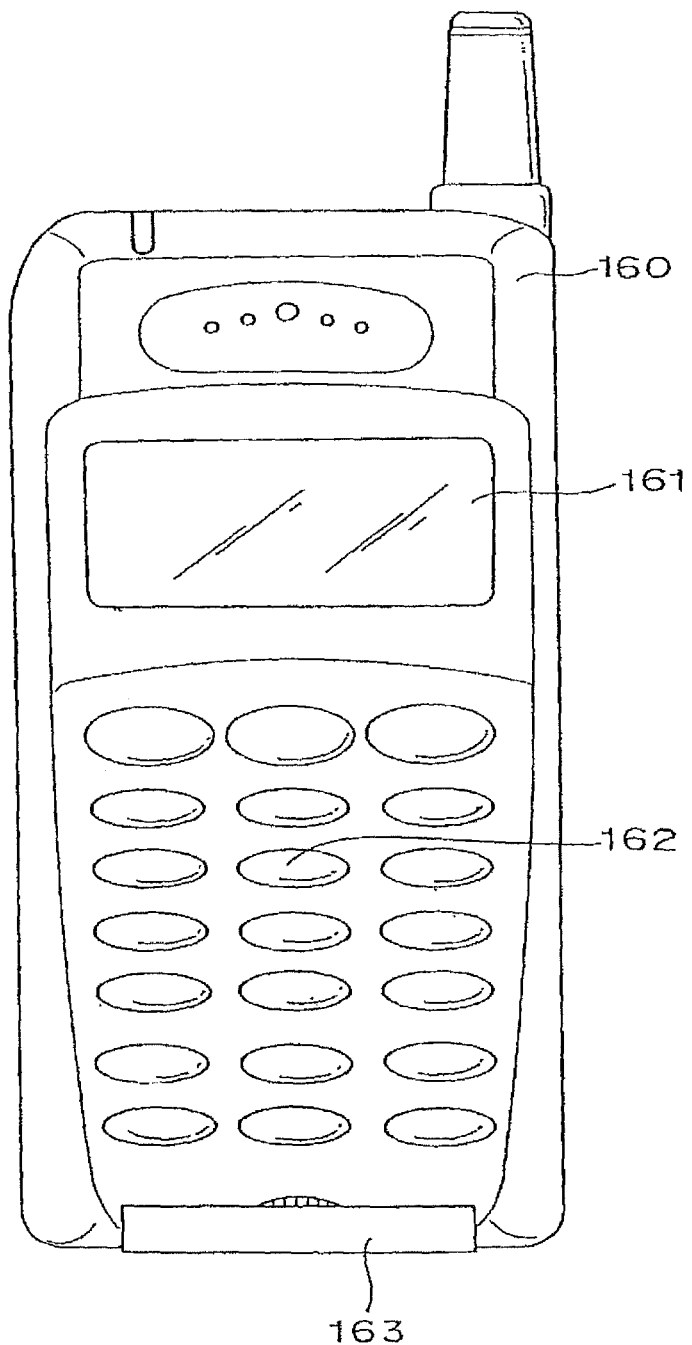
FIG. 102 presents an external view (front view) of a portable telephone terminal.

FIG. 102 presents an example of an external view (front view) of the portable telephone 160 shown in FIG. 99. As shown in FIG. 102, the portable telephone 160 includes a display screen 161, operating keys 162 and a UIM card loading slot 163.

Figure 103:
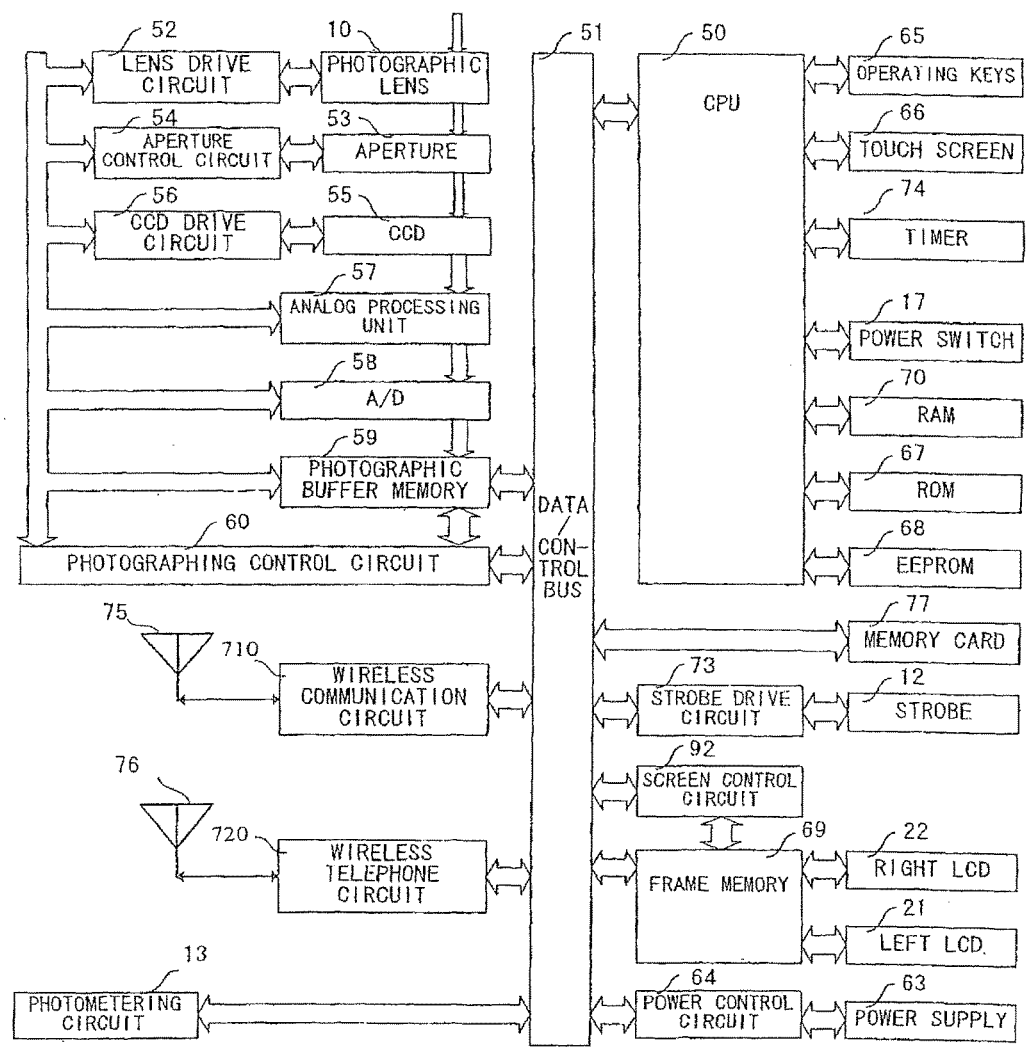
FIG. 103 is a block diagram of the electrical structure adopted in the electronic camera.

In the block diagram in FIG. 103, which presents an example of an internal electrical structure to be positioned assumed in the electronic camera 100 shown in FIGS. 100 and 101, various components are connected with one another via a data/control bus 51 through which various types of information data and control data are transmitted. The components are divided into the following five primary blocks, i.e., (1) a block, the core of which is a photographing control circuit 60 that executes an image data photographing operation, (2) a block, the core of which is constituted of wireless communication circuit 710 that communicates with electronic instruments in the vicinity of the electronic camera 100 through short-distance wireless communication (Bluetooth or the like) and a wireless telephone circuit 720 that exchanges data with the outside through a wireless portable telephone line, (3) a block constituted of the memory card 77 in which image files are stored and saved, (4) a block, the core of which is a screen control circuit 92 that executes display of image data and information related to the image data and (5) a block, the core of which is constituted of user interfaces such as operating keys 65 and a CPU 50 that implements integrated control on various control circuits.

The CPU 50 (central processing unit), which is a means for implementing overall control on the electronic camera 100, issues various instructions for the photographing control circuit 60, the wireless communication circuit 710, the wireless telephone circuit 720, the screen control circuit 92 and a power control circuit 64 in conformance to information input from the operating keys 65, the touch screen 66, the power switch 17, a timer 74 and the photometering circuit 13. The photometering circuit 13 measures the brightness of the subject and outputs photometric data indicating the results of the measurement to the CPU 50. In conformance to the photometric data, the CPU 50 sets the length of the exposure time and the sensitivity of a CCD 55 through a CCD drive circuit 56, and in addition, it controls the aperture value for an aperture 53 with an aperture control circuit 54 via the photographing control circuit 60 in conformance to the data indicating the settings.

In the photographing mode, the CPU 50 controls the photographing operation via the photographing control circuit 60 in response to an operation of the shutter release button 15. In addition, if the photometric data indicate a low subject brightness, the CPU 50 engages the strobe 12 in a light emission operation via a strobe drive circuit 73 during the photographing operation. The timer 74 having an internal clock circuit detects information indicating a current time point and provides the photographing time point information to the CPU 50 during the photographing operation. The CPU 50 controls the various units in conformance to a control program stored in a ROM 67 (read only memory). In an EEPROM 68 (electrically erasable/programmable ROM), which is a nonvolatile memory, the setting information and the like necessary for the operations of the electronic camera 100 are stored. A RAM 70 which is a volatile memory is used as a work area of the CPU 50. The CPU 50 implements control on a power supply 63 via the power control circuit 64 by detecting the operating state of the power switch 17.

The photographing control circuit 60 focuses or zooms the photographic lens 10 through the lens drive circuit 52, controls the exposure quantity at the CCD 55 through control implemented on the aperture 53 by engaging the aperture control circuit 54 and thus controls the operation of the CCD 55 through a CCD drive circuit 56. The photographic lens 10 forms a subject image onto the CCD 55 with a light flux from the subject via the aperture 53 which adjusts the light quantity and this subject image is then captured by the CCD 55. The CCD 55 (charge-coupled device) having a plurality of pixels is a charge storage type image sensor that captures a subject image, and outputs electrical image signals corresponding to the intensity of the subject image formed on the CCD 55 to an analog processing unit 57 in response to a drive pulse supplied by the CCD drive circuit 56.

The photographing control circuit 60 repeatedly executes the operation described above and the screen control circuit 92 repeatedly executes an operation in which the digital data sequentially stored into the photographic buffer memory 59 are read out via the data/control bus 51, the digital data thus read out are temporarily stored into a frame memory 69, the digital data are converted to display image data and are restored into the frame memory 69 and the display image data are displayed at the left screen 21. In addition, the screen control circuit 92 obtains text display information from the CPU 50 as necessary, converts it to display text data which are then stored into the frame memory 69 and displays the display text data at the left screen 21 and the right screen 22. Since the image currently captured by the CCD 55 is displayed at the left screen 21 in real time in the photographing mode in this manner, the user is able to set the composition for the photographing operation by using this through screen as a monitor screen. The photographing control circuit 60 detects the state of the focal adjustment at the photographic lens 10 by analyzing the degree of the high-frequency component of the digital data stored in the photographic buffer memory 59 and performs a focal adjustment for the photographic lens 10 with the lens drive circuit 52 based upon the results of the detection.

During a photographing operation, upon receiving a photographing instruction from the CPU 50, the photographing control circuit 60 engages the CCD 55 to capture a subject image via the CCD drive circuit 56 and temporarily stores image signals generated through the image-capturing operation as digital data (raw data) into the photographic buffer memory 59 via the analog processing unit 57 and the A/D conversion circuit 58. The photographing control circuit 60 then generates image data by converting or compressing the digital data stored in the photographic buffer memory 59 on a temporary basis in a predetermined recording format (such as JPEG) and stores the image data back into the photographic buffer memory 59.

The CPU 50 engages the wireless telephone circuit 720 to wirelessly output the image data through an antenna 76 and thus uploads the image data into the folder at the image server on the Internet. It also engages the wireless communication circuit 710 to wirelessly output the identification data of the image server to which the image data have been uploaded, the folder identification data and the image data identification data through an antenna 75. Subsequently, the CPU 50 converts the image data stored in the photographic buffer memory 59 to save them as reduced image data (hereafter referred to as "thumbnail image data") with a smaller data volume and stores the thumbnail image data appended with the related information (the image server identification data, the folder identification data and the image data identification data), into the memory card 77.

In the reproduction mode, the screen control circuit 92 reads out thumbnail image data specified by the CPU 50 from the memory card 77, temporarily stores the thumbnail image data thus read out into the frame memory 69 and displays the thumbnail image data at the left screen 21. It also stores text data such as reproduction mode instructions into the frame memory 69 and displays the text data at the right screen 22, in response to an instruction issued by the CPU 50. If the PRINT button 27 is operated in the reproduction mode, the CPU 50 executes an operation for having the image data corresponding to the reproduced thumbnail image data printed on a printer. If, on the other hand, the SEND button is operated in the reproduction mode, the CPU 50 executes an operation for having the image data corresponding to the reproduced thumbnail image data transmitted to a recipient electronic instrument.

In addition, if the DOWNLOAD button 29 is operated in the reproduction mode, the CPU 50 downloads the image data corresponding to the reproduced thumbnail image data from image server through the wireless telephone circuit 720 and sets the downloaded image data into the frame memory 69. The screen control circuit 92 converts the image data set in the frame memory 69 to display image data, stores the display image data back into the frame memory 69 and displays the display image data at the left screen 21.

Figures 104, 105:
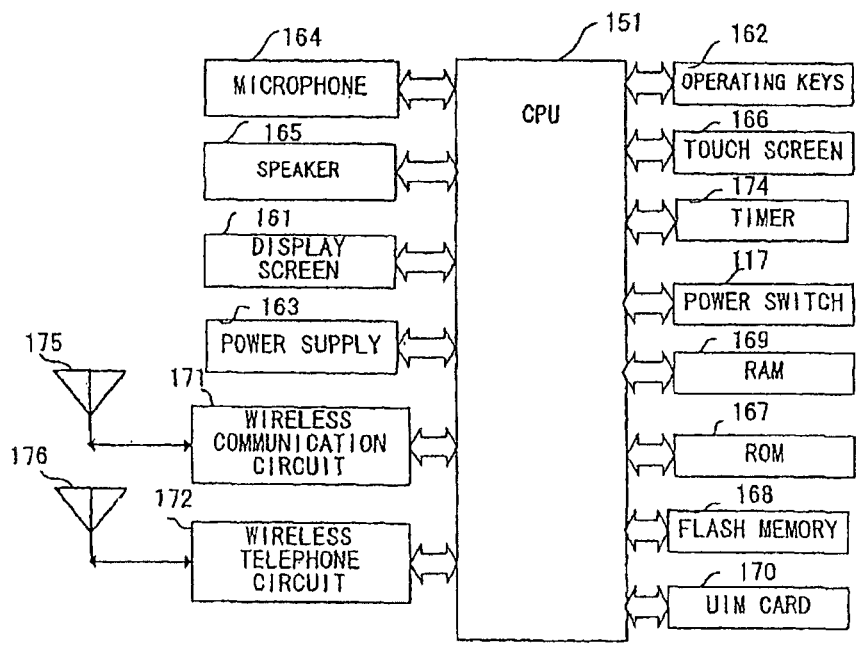
FIG. 104 is a block diagram of the electrical structure adopted at the portable telephone terminal.
FIG. 105 presents a list of upload dial numbers and the corresponding image servers.

In FIG. 104 presenting a block diagram of an example of an electrical structure that may be adopted in the portable telephone 160 shown in FIG. 102, various components are connected around a CPU 151 at their center. The CPU 151 (central processing unit), which is a means for implementing overall control on the portable telephone 160, controls a wireless communication circuit 171, a wireless telephone circuit 172, a display screen 161 and a power source 163 in conformance to information input through the operating keys 162, a touch screen 166, a power switch 117 and a timer 174. In a talk mode, the CPU 151 converts sound input through a microphone 164 to audio data and outputs the audio data in a wireless transmission to the outside through an antenna 176 by engaging the public telephone line network 172 and reproduces through a speaker 165 audio data received from the outside at the wireless telephone circuit 172 via the antenna 176.

In an Internet mode, the CPU 151 engages the antenna 175 and the wireless communication circuit 171 to exchange information related to image data with the electronic camera 100 through short-distance wireless communication and, based upon related information (the image server identification data, the folder identification data and the image data identification data) thus obtained, it connects with the image server on the Internet via the public telephone circuit 172, downloads the desired image data, displays an image reproduced from the image data at its display screen and saves the image data into a UIM card or a flash memory 168.

The CPU 151 controls the various components in conformance to a control program stored in a ROM 167 (read only memory). In the flash memory 168 (electrically erasable programmable memory) which is a nonvolatile memory, image data and the like are stored. A RAM 169 is a volatile memory which is used as a work area of the CPU 151. The CPU 151 controls the power source 163 by detecting the operating state of the power switch 117.

FIG. 105 shows the relationship between the numbers set at the upload dial 32 of the electronic camera 100 shown in FIG. 101 and the image servers that are upload t recipients. As shown in FIG. 105, numbers 1, 2, 3 and 4 respectively correspond to image servers W, X, Y and Z.

FIG. 106 shows the structure of the data stored in the memory card 77. As shown in FIG. 106, a plurality of image files are saved in the memory card 77. Each image file is constituted of thumbnail image data and additional information data. The additional information data is constituted of photographing information data (see FIG. 107) indicating the various settings selected for the photographing operation and upload information data obtained when the image data are uploaded to an image server. The upload of information data include date/time data indicating the date and time point at which the image data were uploaded to the image server, the image server identification data (upload destination (location) URL), the folder name, the file name, the volume of the image data, the format adopted in recording the image data and the like.

Figures 107, 108:
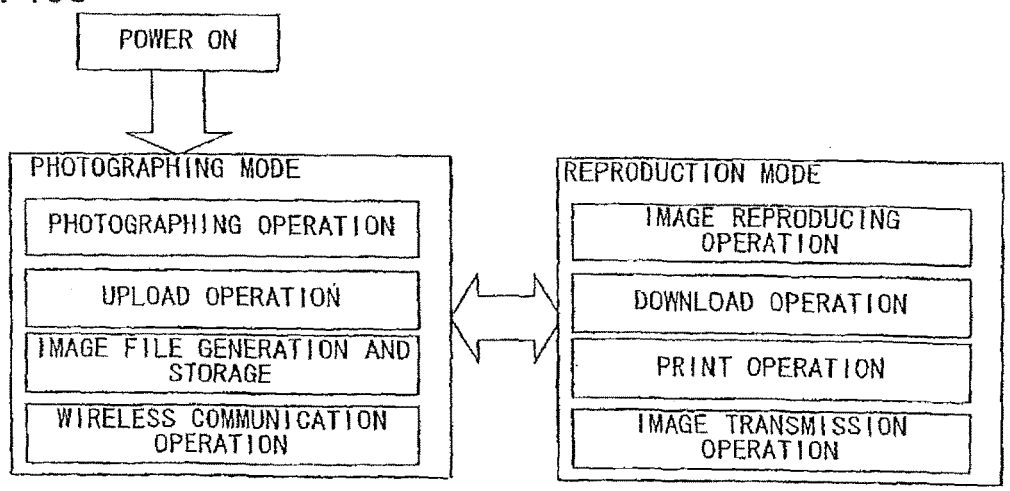
FIG. 107 shows the structure of the photograph information data.
FIG. 108 presents a transition diagram of the operating state of the electronic camera.
Figure 109:
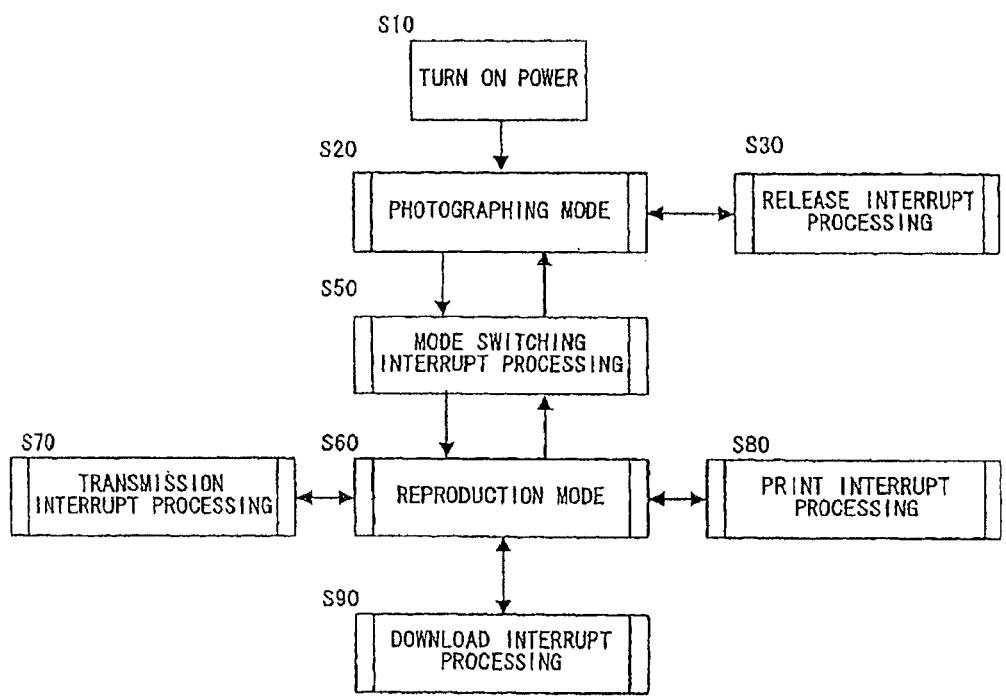
FIG. 109 presents a flowchart of the main program.

In FIG. 107 showing the structure of the photographing information data, the photographing information data are constituted of photographing date/time point data and setting information data related to the photographic lens setting and the camera settings selected for the photographing operation.

FIG. 108 is a transition diagram for the state of the electronic camera according to the embodiment of the present invention. The electronic camera 100, which may be set in either of the photographing mode or the reproduction mode, shifts from one mode to the other in response to an operation of one of two operating buttons (the photographing mode button 25 and the reproduction mode button 26). As the power is turned on, the electronic camera first shifts to the photographing mode. In the photographing mode, the electronic camera executes a photographing operation, an upload operation to upload the image data to an image server, an operation for converting the image data to thumbnail image data and then storing the thumbnail image data into the memory card 77, and a short-distance wireless communication operation for communicating with a portable telephone. In the reproduction mode, it executes a reproducing operation for reproducing the thumbnail image data, a download operation for downloading image data from an image server, a transmission operation for transmitting the image data to a portable telephone and a print operation for printing the image data on the printer.

FIG. 108 presents a flowchart of the main flow of the operations executed in the electronic camera 100 (the CPU 50) in the embodiment described above. First, as the power switch 17 is operated, the power is turned on in S10, and then, a photographing mode subroutine is executed in S20 thereby setting the electronic camera in a photographing-enabled state. If the shutter release button 16 is operated in the photographing mode, a release interrupt processing subroutine in S30 is executed to perform a photographing operation. In addition, the image data obtained through the photographing operation are uploaded into an image server on the Internet specified with the upload dial 32 through a wireless telephone line, the image data are also converted to thumbnail image data and stored into the memory card 77, and information with regard to the image data upload is automatically transmitted to the portable telephone 160 carried by a subject in the vicinity of the electronic camera 100 through short-distance wireless communication.

In addition, if either of the two operating buttons (the photographing mode button 25 and the reproduction mode button 26) is operated while the electronic camera is set in the other operating mode, then mode switching interrupt processing in S50 is started up to switch over to a mode corresponding to the operating button that has been operated.

In the reproduction mode in S60, an image file saved in the memory card 77 is read out and the thumbnail image data are reproduced and displayed at the display screen, and as the SEND button 28 is operated, a transmission interrupt processing subroutine in S70 is executed to transmit information with regard to the upload of the image data corresponding to the selected thumbnail image data to the portable telephone 160 carried by the subject present in the vicinity of the electronic camera 100 through short-distance wireless communication. The portable telephone 160, in turn, automatically connects with the image server on the Internet based upon the information received from the electronic camera 100 and downloads the image data which are then displayed at the screen and saved into the UIM card.

If the PRINT button 27 is operated in the reproduction mode, a print interrupt processing subroutine in S80 is executed to transmit the information related to the upload of the image data corresponding to the selected thumbnail image data to a printer present in the vicinity of the electronic camera 100 through short-distance wireless communication, and the printer, in turn automatically connects with the image server on the Internet based upon the information received from the electronic camera 100, downloads the image data and then executes a printing operation.

If the DOWNLOAD button 29 is operated in the reproduction mode, a download interrupt processing subroutine S90 is executed to download through a wireless telephone line the image data corresponding to the selected thumbnail image data from the image server at which the image data have been uploaded and the downloaded image data are reproduced and displayed at the display screen.

Figure 110:
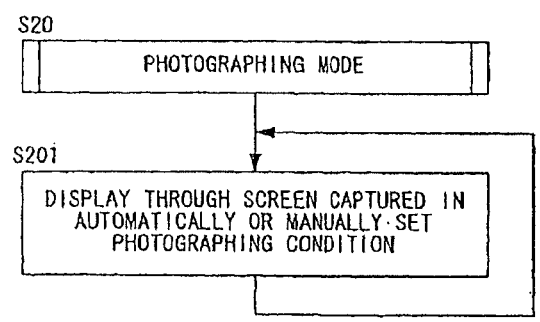
FIG. 110 presents a flowchart of a subroutine.
Figure 111:
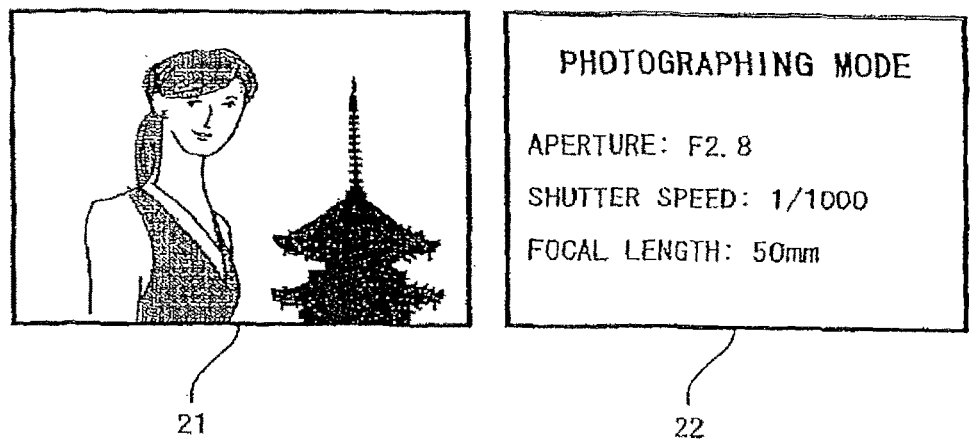
FIG. 111 presents an example of screen display.

In the detailed flowchart of the photographing mode subroutine presented in FIG. 110, after the subroutine is started up in S20, the processing in S201 is repeatedly executed. In S201, image data sequentially generated by the CCD 55 in conformance to the photographing condition set by the user are displayed at the left screen 21 as shown in FIG. 111 and the condition is also displayed as a list at the right screen 22.

Figure 112:
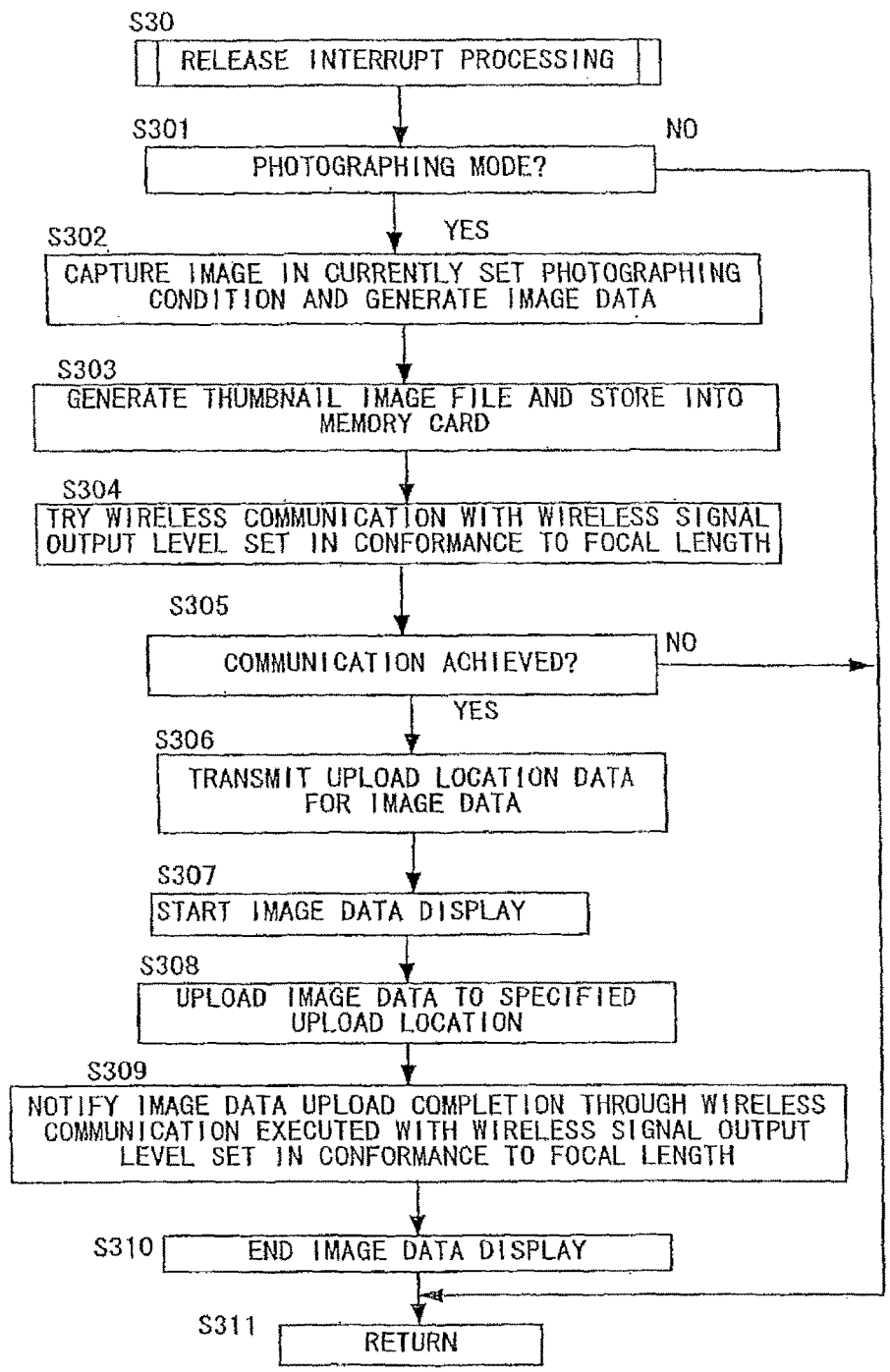
FIG. 112 presents a flowchart of a subroutine.

In the detailed flowchart of the release interrupt processing subroutine presented in FIG. 112, after the subroutine is started up in S30, a verification is achieved in S301 as to whether or not the camera is currently set in the photographing mode and, if it is decided that the camera is not set in the photographing mode, the operation makes a return in S311. If, on the other hand, it is decided that the camera is set in the photographing mode, an image-capturing operation is executed in conformance to the photographing setting condition selected by the user to generate image data in S302 and then in S303, the image data are converted to thumbnail image data and the thumbnail image data appended with the upload information data are stored into the memory card 77 as an image file. Then, in S304, a wireless communication with an electronic instrument (a portable telephone carried by a subject person) present in the vicinity of the electronic camera 100 is attempted through the means for wireless communication 710. At this time, the signal transmission output for the wireless communication is adjusted in conformance to the focal length of the photographic lens 10. For instance, the signal transmission output level is raised as the focal length increases, since a subject is deduced to be present over a greater distance in such a case. If it is decided in S305 that no communication has been achieved, the operation makes a return in S311. If, on the other hand, it is decided that communication has been achieved, the image data upload information is transmitted to the electronic instrument of the communication partner with whom communication has been achieved in S306. In S307, a display of the image data obtained through the photographing operation is started.

In S308, the image data are uploaded into a specific folder (a folder inherent to the photographer or the electronic camera 100) at the image server specified through the upload dial 32. Once the image data upload is completed, a notification of the image data upload completion is transmitted to the electronic instrument in the vicinity of the electronic camera 100 through the means for wireless communication 710 in S309. In S310, the image data display ends and then the operation makes a return in S311 to start a through image display in the photographing mode again.

Figure 113:
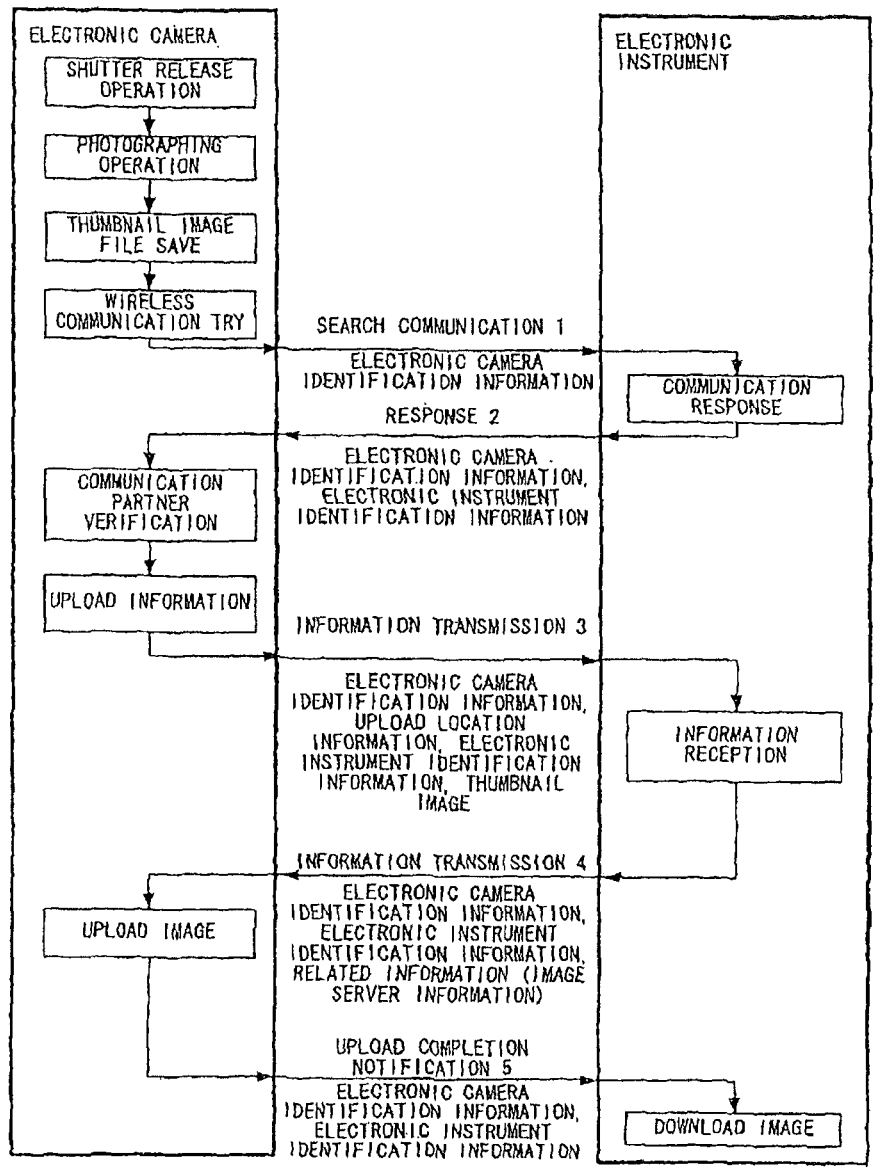
FIG. 113 illustrates the communication sequence.

In the sequence diagram presented in FIG. 113 to facilitate an explanation of the wireless communication operation between the electronic camera and an electronic instrument (a portable telephone) executed during the release interrupt processing, a photographing operation is executed in response to a shutter release operation performed at the electronic camera 100, and then the image data are converted to thumbnail image data which are saved. Next, the electronic camera 100 attempts a wireless search communication 1 with an electronic instrument in the vicinity. In the search communication 1, the identification information of the electronic camera 100 indicating a sender is transmitted.

An electronic instrument having received the search communication 1 returns a response 2 to the electronic camera 100 in response, through which the identification information of the sender electronic instrument and the identification information of the recipient electronic camera are transmitted.

Upon receiving the response 2, the electronic camera 100 verifies the communication partner based upon the electronic instrument identification information, and also executes an information transmission 3 to transmit the upload information to the specific communication partner's electronic instrument. Through the information transmission 3, the identification information of the recipient electronic instrument, the identification information of the sender electronic camera 100, the upload information, the thumbnail image data and the like are transmitted.

The electronic instrument corresponding to the electronic instrument identification information transmitted through the information transmission 3 executes an information transmission 4 to the electronic camera 100 in response. Through the information transmission 4, the identification information of the recipient electronic camera 100, the identification information of the sender electronic instrument and related information which includes specific image server information originating from the electronic instrument) are transmitted.

Upon receiving the information 4 transmitted by the electronic instrument, the electronic camera 100 uploads the image data to the image server on the Internet through a wireless telephone line. Once the image data upload is completed, the electronic camera 100 transmits an upload completion notification 5 to the electronic instrument. The electronic instrument having received this notification connects with the image server on the Internet through a wireless telephone line based upon the upload information received through the information transmission 3, and downloads and utilizes the specified image data.

It is to be noted that if the response 2 is returned by a plurality of electronic instruments, the electronic camera 100 may either execute the information transmission 3 through a simultaneous one-to-multiple partner communication with the electronic instruments or may individually execute the information transmission 3 through a one-to-one communication with each electronic instrument. In the latter case, the information transmission 4 must be executed a plurality of times.

Figure 114:
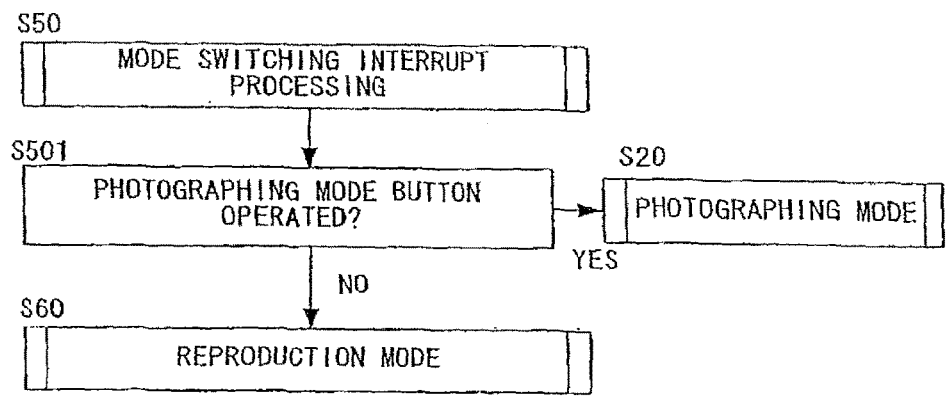
FIG. 114 presents a flowchart of a subroutine.

In the detailed flowchart of the mode switching interrupt processing subroutine presented in FIG. 114, which is started up in response to an operation of an operating button (the photographing mode button 25 or the reproduction mode button 26), after the subroutine is started up in S50, a verification is achieved in S501 as to whether or not the operated button is the photographing mode button 25, and if it is decided that the photographing mode button 25 has been operated, the operation shifts to the photographing mode subroutine in S20. If, on the other hand, it is decided that the photographing mode button 25 has not been operated, the operation shifts to the reproduction mode subroutine in S60.

Figure 115:
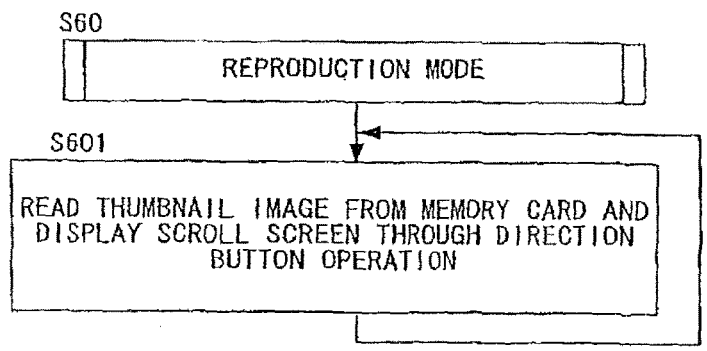
FIG. 115 presents a flowchart of a subroutine.
Figure 116:
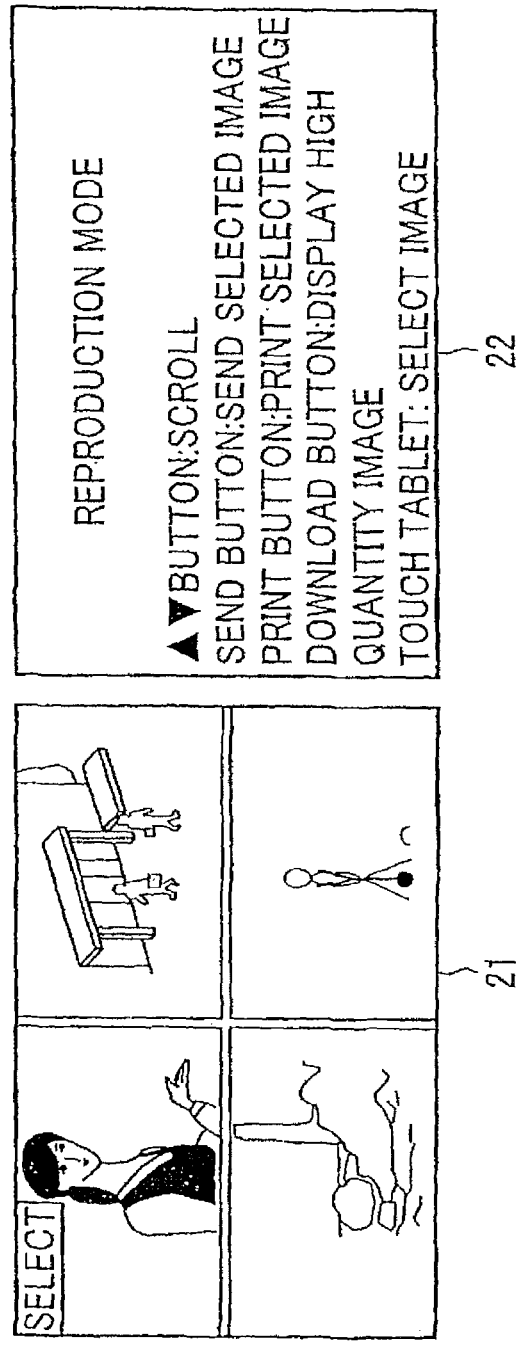
FIG. 116 presents an example of screen display.

In the detailed flowchart of the reproduction mode subroutine presented in FIG. 115, after the subroutine is started up in S60, the processing in S601 is repeatedly executed. In S601, thumbnail image data in image files stored in the memory card 77 are sequentially read out starting with the data photographed most recently, and are reproduced and displayed at the left screen 21 while concurrently displaying relevant operational instructions at the right screen 22, as shown in FIG. 116. The thumbnail image data displayed at the left screen 21 are scrolled in response to an operation of the direction button 23 or 24. It is to be noted that in the reproduction mode, one of the plurality of sets of thumbnail image data displayed at the left screen 21 is selected by the user through the touch screen 66, and the thumbnail image data thus selected subsequently undergo a transmission operation, a print operation or a download operation as described later.

Figure 117:
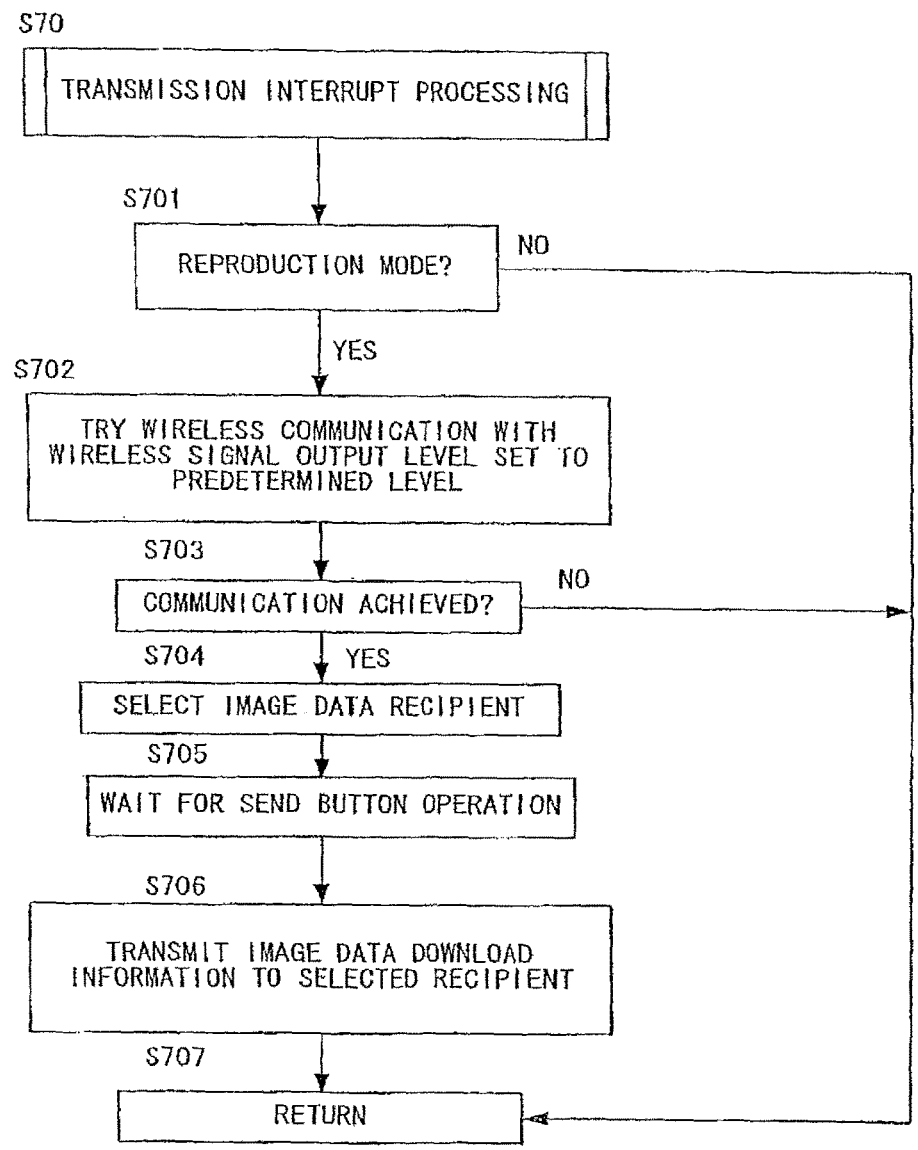
FIG. 117 presents a flowchart of a subroutine.
Figure 118:
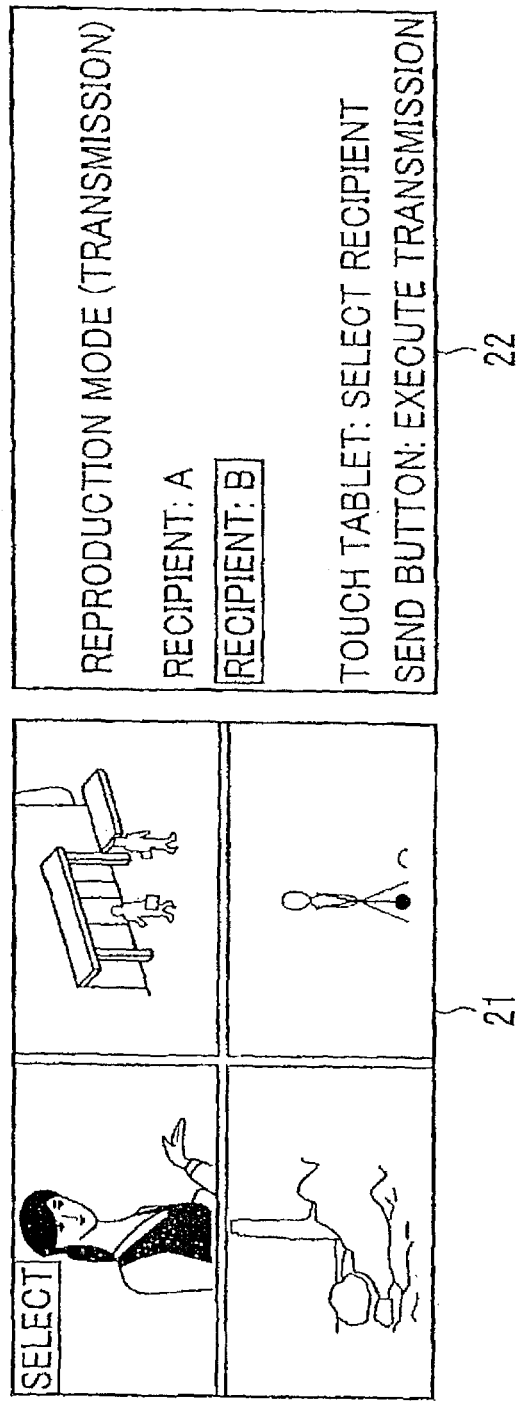
FIG. 118 presents an example of screen display.

In the detailed flowchart of the transmission interrupt processing subroutine presented in FIG. 117, after the subroutine is started up in S70, a verification is achieved in S701 as to whether or not the electronic camera is currently set in the reproduction mode, and if it is decided that the electronic camera is not set in the reproduction mode, the operation makes a return in S707. If, on the other hand, it is decided that the electronic camera is set in the reproduction mode, a wireless communication with an electronic instrument in the vicinity of the electronic camera 100 is attempted at the signal transmission output level through the means for wireless communication 71 in S702. If it is decided in S703 that no communication has been achieved, the operation makes a return in S707. If, on the other hand, it is decided that communication has been achieved, the electronic instruments with which communication has been achieved are displayed at the right screen 22 as possible image data recipients in S704 to allow the user of the electronic camera 100 to select the desired recipient through the touch screen 66, as shown in FIG. 118. In S705, the operation waits in standby for the SEND button 28 to be operated again, and if the SEND button 28 is operated, the image data upload information is transmitted to the selected recipient through short-distance wireless communication in S706 before the operation makes a return in S707.

Figure 119:
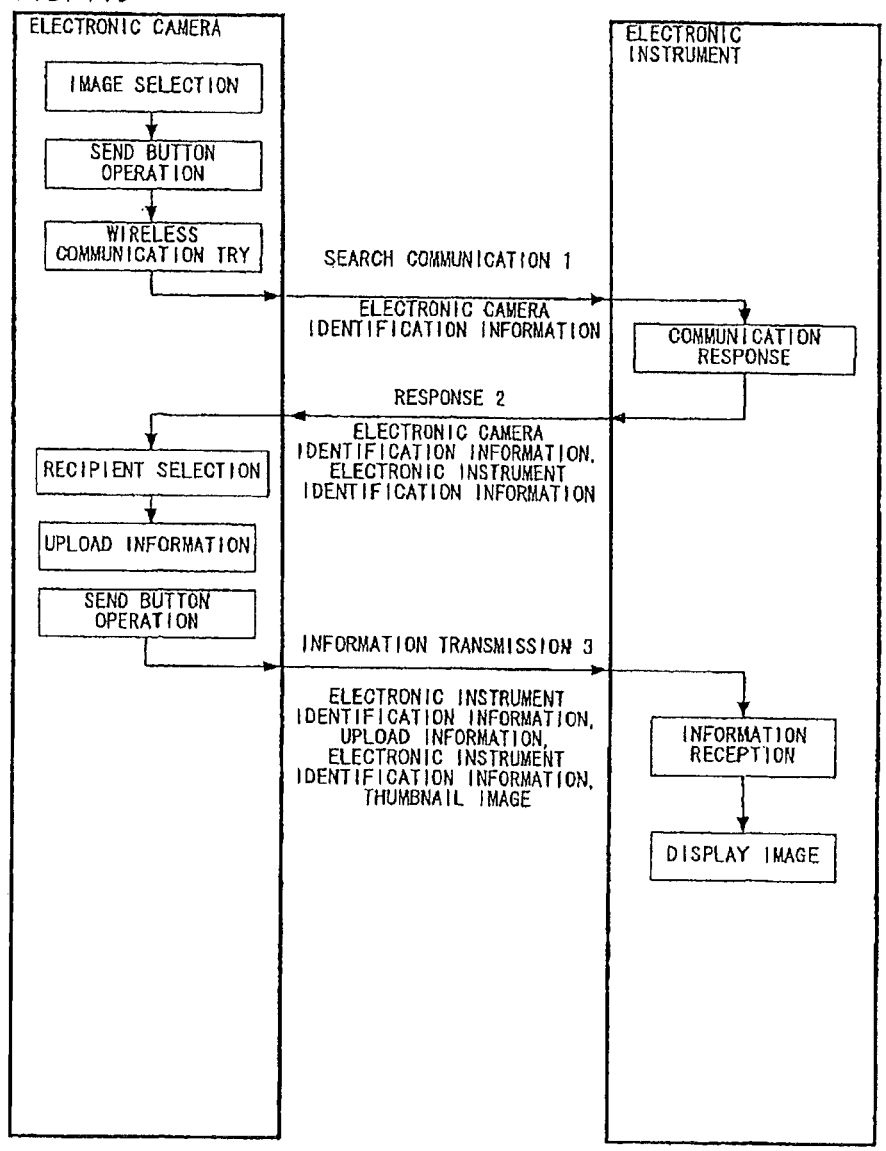
FIG. 119 illustrates the communication sequence.

In the sequence diagram presented in FIG. 119 to facilitate an explanation of the wireless communication operation between the electronic camera and an the electronic instrument (portable telephone) executed during the transmission interrupt processing, the image data to be transmitted are first selected at the electronic camera 100. Then, as the SEND button 28 is operated, a wireless search communication 1 with electronic instruments present within the vicinity is attempted by the electronic camera 100. Through the search communication 1, the identification information of the sender electronic camera 100 is transmitted.

Each electronic instrument having received the search communication 1 returns a response 2 to the electronic camera 100 in response by transmitting the identification information of the sender electronic instrument and the identification information of the recipient electronic camera.

The electronic camera 100 having received the response 2 verifies the communication partners with whom the communication has been achieved based upon the electronic instrument identification information and selects a recipient. Next, it reads out the upload information corresponding to the selected image data from the memory card 77. As the SEND button 28 is operated again, the electronic camera 100 executes an information transmission 3 to transmit the upload information to the specific electronic instrument carried by the selected recipient. Through the information transmission 3, the identification information of the selected recipient's electronic instrument, the identification information of the sender electronic camera 100, the upload information, the thumbnail image data and the like are transmitted.

The selected recipient's electronic instrument having received the information 3 connects with the image server on the Internet through a wireless telephone line based upon the upload information, and downloads and displays the specified image data.

Figure 120:
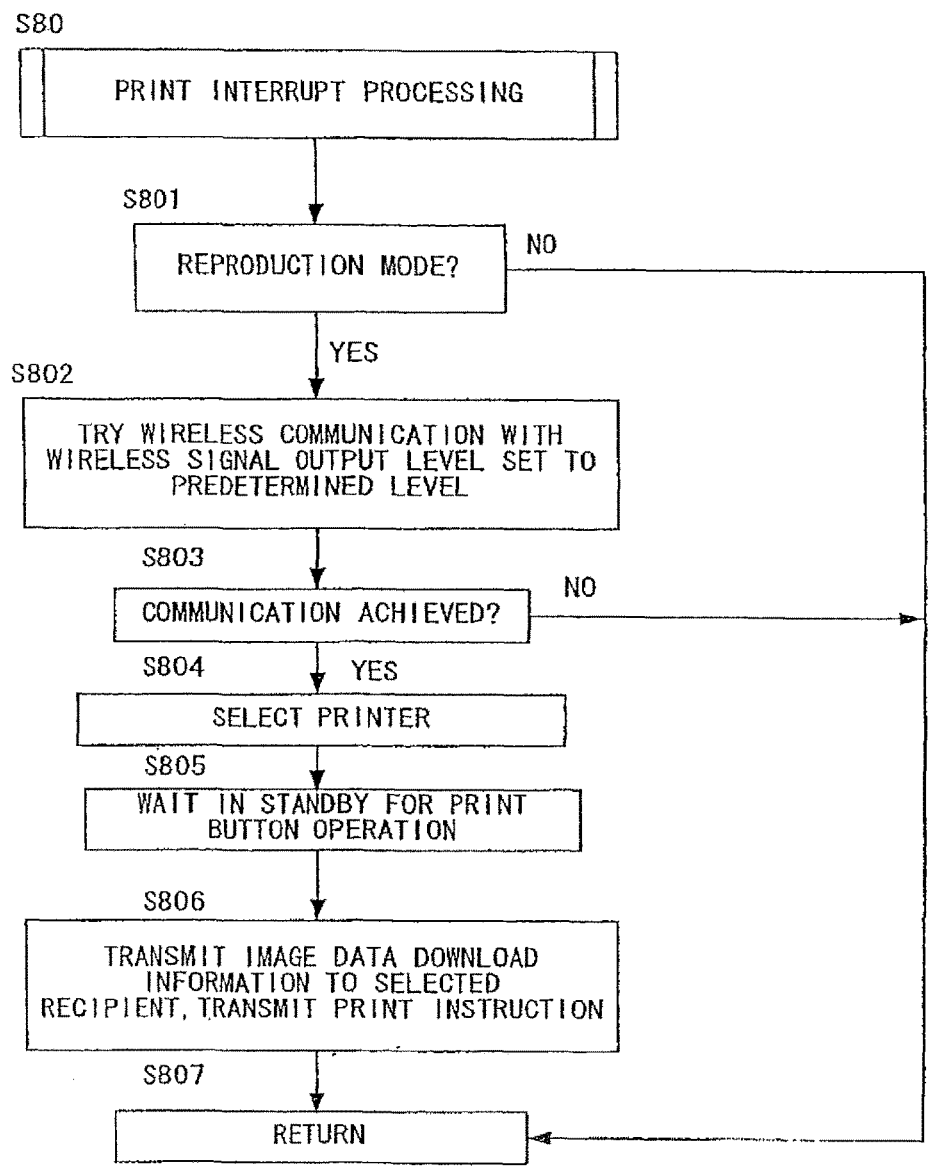
FIG. 120 presents a flowchart of a subroutine.
Figure 121:
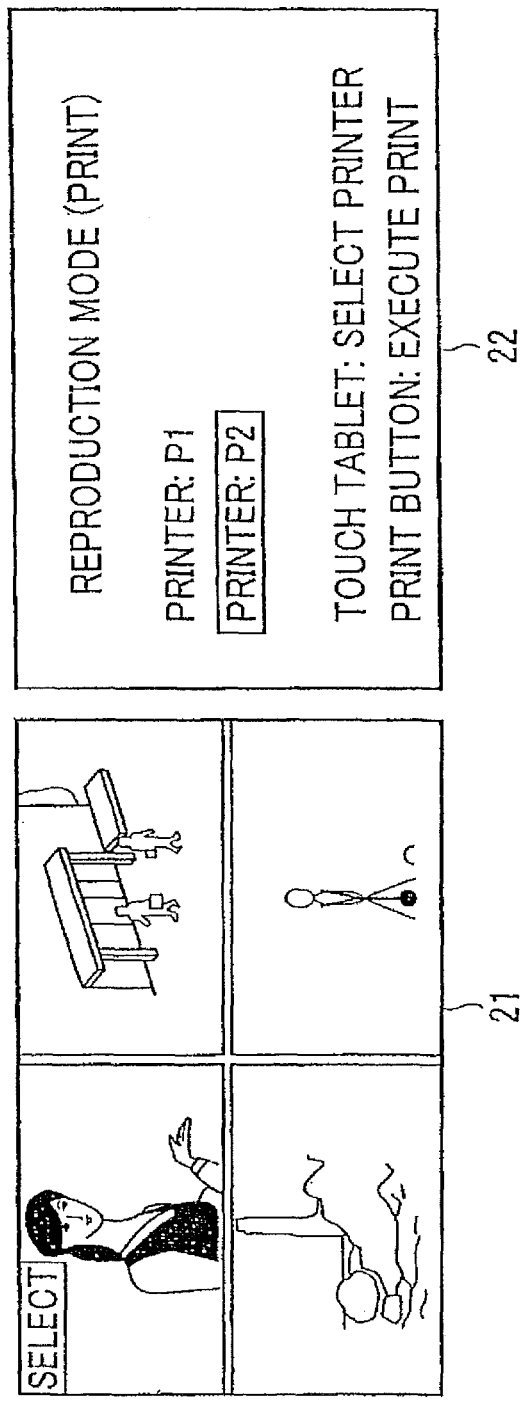
FIG. 121 presents an example of screen display.

In the detailed flowchart of the print interrupt processing subroutine presented in FIG. 120, after the subroutine is started up in S80, a verification is achieved in S801 as to whether or not the electronic camera is currently set in the reproduction mode, and if it is decided that the electronic camera is not set in the reproduction mode, the operation makes a return in S807. If, on the other hand, it is decided that the electronic camera is set in the reproduction mode, short-distance wireless communication with any printer in the vicinity of the electronic camera 100 is attempted at the signal transmission output level through the means for wireless communication 710 in S802. If it is decided in S803 that no communication has been achieved, the operation makes a return in S807. If, on the other hand, it is decided that communication has been achieved, the printers with which communication has been achieved are displayed at the right screen 22 in S804 to allow the user of the electronic camera 100 to select the desired printer through the touch screen 66, as shown in FIG. 121. In S805, the operation waits, in standby state, for the SEND button 28 to be operated again and if the PRINT button 27 is operated, the image data upload information and a print instruction are transmitted to the selected printer through short-distance wireless communication in S806 before the operation makes a return in S807.

Figure 122:
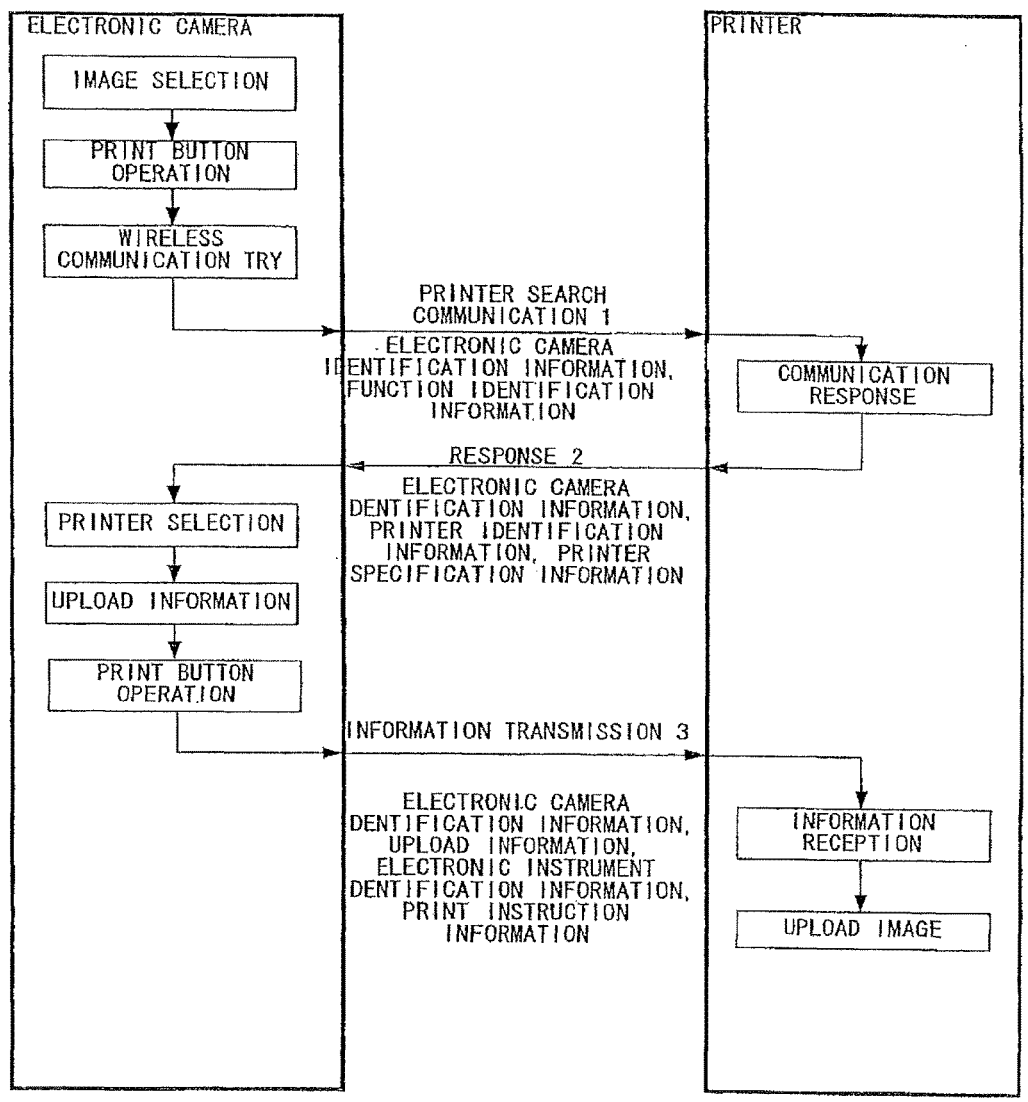
FIG. 122 illustrates the communication sequence.

In the sequence diagram presented in FIG. 122 to facilitate an explanation of the wireless communication operation between the electronic camera and a printer executed during the print interrupt processing, the image data to be transmitted are first selected at the electronic camera 100. Then, as the PRINT button 27 is operated, a wireless printer search communication 1 with any printer within the vicinity is attempted by the electronic camera 100. Through the printer search communication 1, the identification information of the sender electronic camera 100 and function identification information ("printer" in this case) indicating the function of electronic device with which the electronic camera-side wishes to communicate are transmitted.

A printer having received the printer search communication 1 returns a response 2 to the electronic camera 100 in response by transmitting the identification information of the sender printer, the identification information of the recipient electronic camera and printer specification information and the like.

The electronic camera 100 having received the response 2 verifies all the communication partners with whom communicate has been achieved based upon the printer identification information and selects a desired printer. Next, it reads out the upload information corresponding to the selected image data from the memory card 77. As the PRINT button 27 is operated again, the electronic camera 100 executes an information transmission 3 to transmit the upload information to the specific selected printer. Through the information transmission 3, the identification information of the selected printer, the identification information of the sender electronic camera 100, the upload information, the print instruction information and the like are transmitted.

The selected printer having received the information 3 connects with the image server on the Internet through a wireless telephone line based upon the upload information, downloads the specified image data, converts the image data to image data for printing based upon the print instruction information and executes a printing operation.

Figure 123:
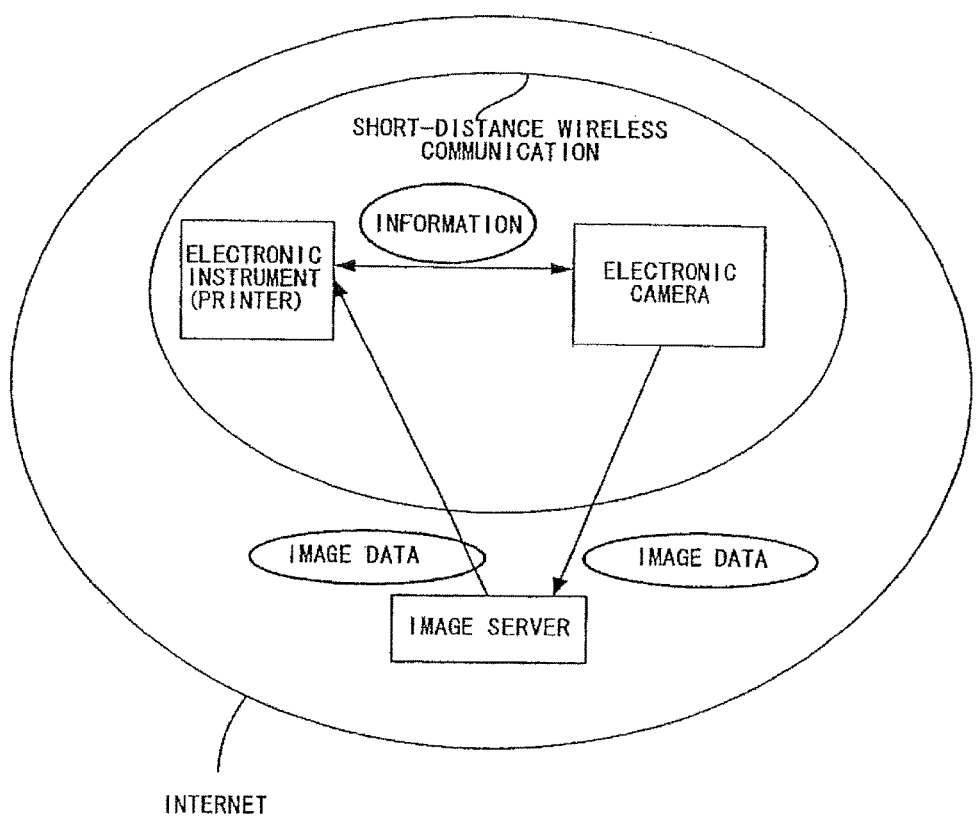
FIG. 123 illustrates the concept adopted in an embodiment of the present invention.

The conceptual diagram presented in FIG. 123 illustrating a mode of the information transmission among the electronic camera, a printer and the image server executed during the print interrupt processing described above, the electronic camera uploads image data obtained through a photographing operation to the image server on the Internet through a wireless telephone line. Next, the electronic camera transmits image data the upload information (the image server's Internet address is equivalent to URL (Uniform Resource Locator), the folder name and the image data filename at the image server) and control information (the print instruction information) an electronic device (printer) within a short-distance wireless communication range through short-distance wireless communication. Based upon the information received from the electronic camera through the short-distance wireless communication, the electronic device (printer) connect with the image server on the Internet through a wireless telephone line, downloads the image data from the specific folder at the image server and executes an operation (printing processing) on the downloaded image data based upon the control information (print instruction information).

Figure 124:
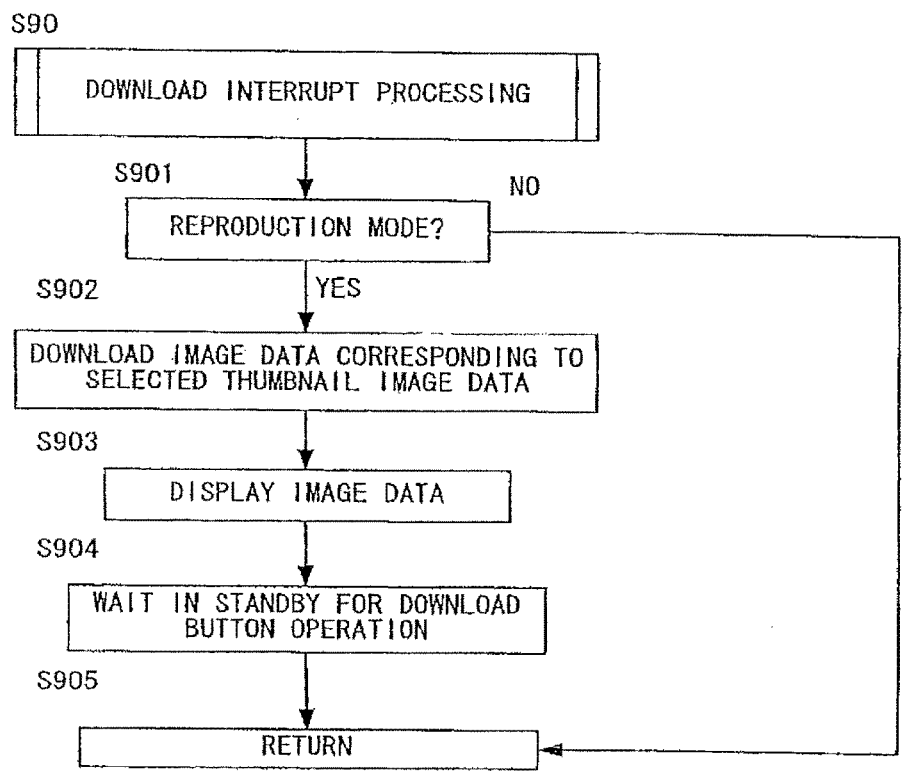
FIG. 124 presents a flowchart of a subroutine.
Figure 125:
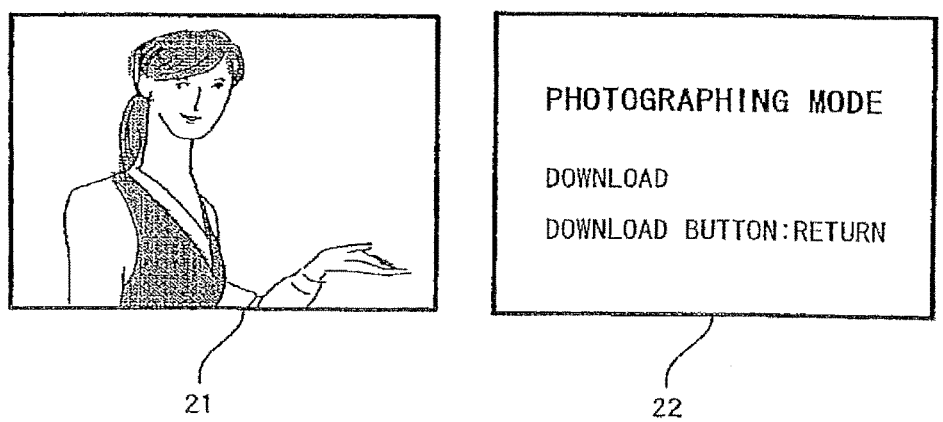
FIG. 125 presents an example of screen display.

In the detailed flowchart of the download interrupt processing subroutine presented in FIG. 124, after the subroutine is started up in S90, a verification is achieved in S901 as to whether or not the electronic camera is currently set in the reproduction mode and, if it is decided the electronic camera is not set in the reproduction mode, the operation makes a return in S905. If, on the other hand, it is decided that the electronic camera is set in the reproduction mode, the image server on the Internet is connected through the wireless telephone circuit 720 based upon the upload information data appended to the selected thumbnail image data to download the image data corresponding to the selected thumbnail image data in S902. In S903, the downloaded image data are reproduced and displayed at the left screen 21, as shown in FIG. 125. In S904, the operation waits in standby for the DOWNLOAD button 29 to be operated again, and if the DOWNLOAD button 29 is operated, the operation makes a return in S905.

Figure 126:
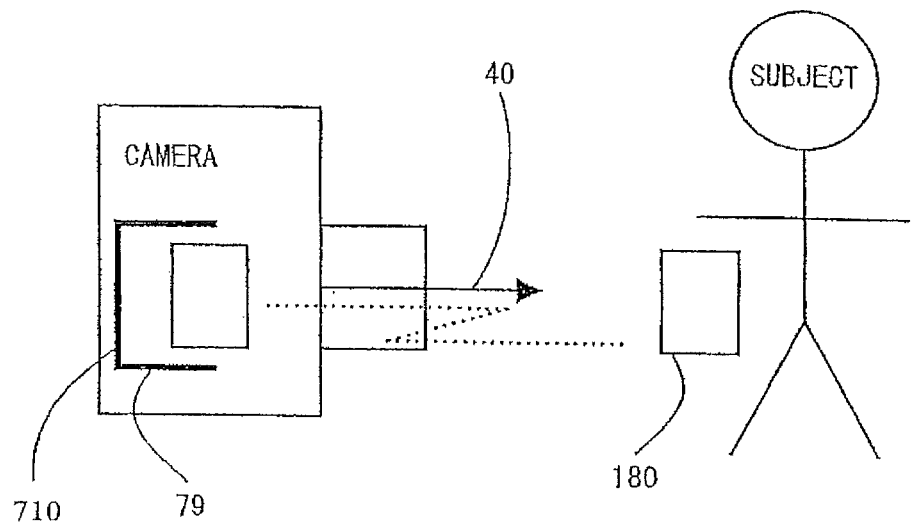
FIG. 126 illustrates the structure of the wireless circuit.
Figure 127:
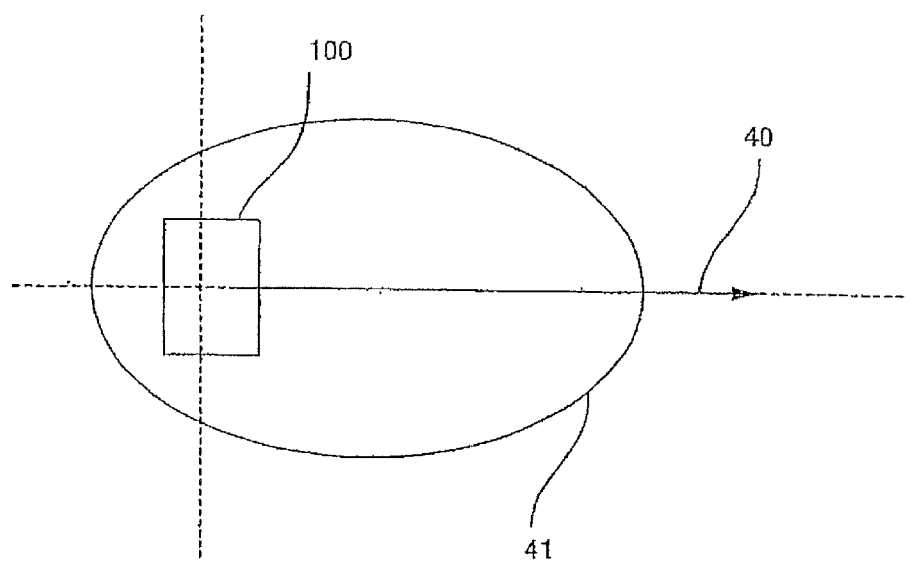
FIG. 127 illustrates the communication directivity.

FIG. 126 illustrates the structure of the wireless communication circuit 710 in the electronic camera. The wireless communication circuit 710 is enclosed by an electromagnetic shield film 79 along the camera rear surface (in the direction opposite from the direction along which the photographic optical axis extends, i.e., the side on which the photographer is present), the camera lower surface, the camera upper surface and the camera left and right side surfaces. Thus, the wireless communication circuit 710 is allowed to communicate readily with the portable telephone 160 carried by a subject present in the direction along which the photographing operation is performed with the camera and since it cannot readily communicate with a portable telephone or an electronic device carried by a non-subject party who is not present along the photographic optical axis. Thus, the image data recipient can be limited to the portable telephone carried by the subject who has been photographed. In FIG. 127 shows the communication directivity of the wireless communication circuit 710, and extreme directivity manifests to the front of the electronic camera 100 (along the optical axis 40) and little directivity to the rear.

By allowing the wireless communication circuit 710 to manifest extreme directivity along the direction in which the photographing operation is performed with the camera through the structure shown in FIG. 126 as described above, the likelihood of communicating with the electronic instrument carried by the subject is increased. It is to be noted that the directivity may be adjusted by adopting a specific antenna structure instead of by using an electromagnetic shield film. A compact directional antenna that may be adopted is disclosed, for instance, in Japanese Laid-Open Patent Publication No. 2000-278037.

In addition, the directivity of the wireless communication circuit 710 may be adjusted in conformance to the focal length of the photographic lens. For instance, the communication directivity should be reduced if the focal length is small since the photographic field angle will be wide in such a case, whereas the communication directivity should be increased if the focal length is larger since the photographic field angle will be narrow in such a case. The directivity of the wireless communication circuit 710 may be adjusted by mechanically moving the electromagnetic shield film or by selectively using one of a plurality of directional antennas with varying directional characteristics. By implementing such an adjustment, the likelihood of the electronic camera 100 achieving communication with an electronic instrument held by a photographed subject is increased without allowing ready communication with an electronic instrument carried by a party other than the subject.

In the conceptual diagram of the embodiment of the present invention presented in FIG. 92, the electronic camera uploads image data obtained through a photographing operation to an image server on the Internet, and an electronic instrument (such as a portable telephone) carried by a subject connects with the image server on the Internet based upon related information received from the electronic camera through short-distance wireless communication and displays at its screen the image data downloaded from a specific folder at the image server. As a variation, the electronic camera may obtain upload information (indicating an image server on the Internet, a folder name and an image data filename specified by the electronic instrument-side) from the electronic instrument during the short-distance wireless communication with the electronic instrument carried by the subject and upload the image data obtained through a photographing operation, appended with the filename specified by the electronic instrument into the specified folder at the specified image server on the Internet based upon the upload information. In this case, the electronic instrument downloads the image data assigned with the specified file name from the specified folder of the image server specified by itself.

This variation relieves the subject from a task of saving the downloaded image data into his own image server.

In addition, the location at which an image is to be saved (a specific folder at a specific image server) may be specified by the electronic instrument and a specific image data file name may be assigned by the electronic camera. Alternatively, the electronic camera may specify an image server and a folder, and the electronic instrument may assign a specific in image data filename.

Figure 128:
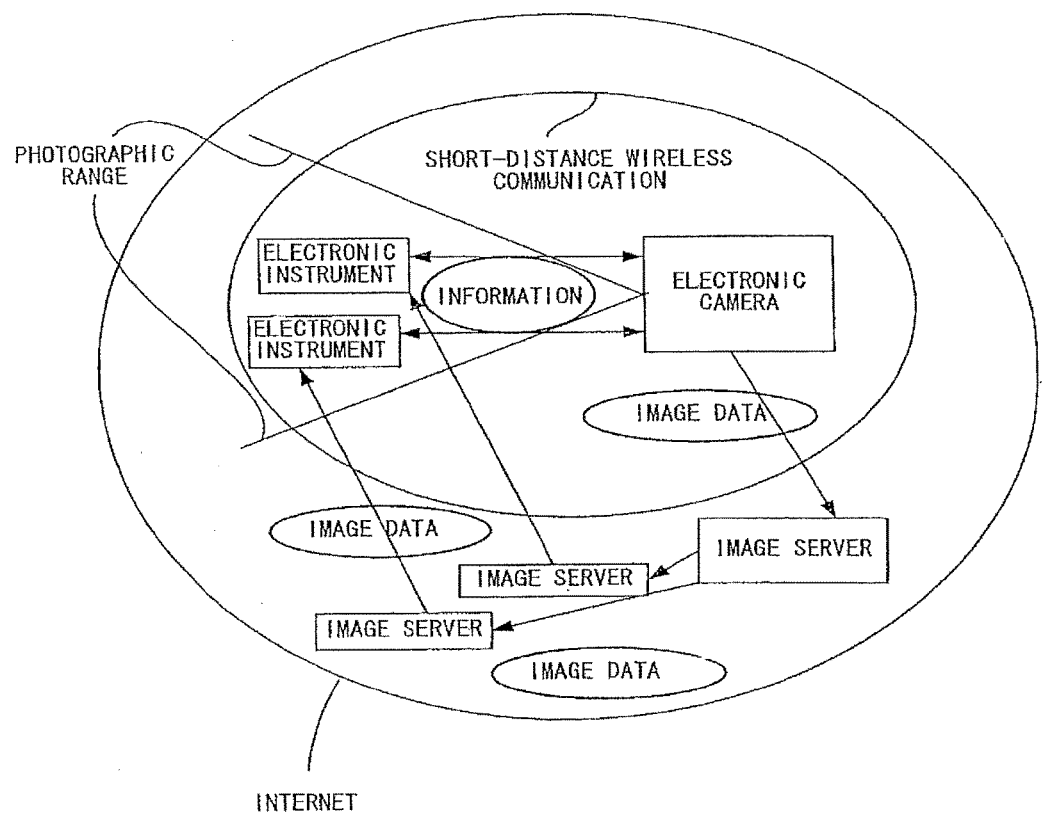
FIG. 128 illustrates the concept adopted in an embodiment of the present invention.

In addition, as shown in FIG. 128, the electronic camera may obtain upload information (indicating an image server on the Internet, a folder name and an image data file name) specified by the electronic-instrument-side from an electronic instrument carried by a subject during the short-distance wireless communication with the electronic instrument and transmit the upload information obtained from the electronic instrument together with image data obtained through a photographing operation to a preassigned image server on the Internet so as to enable the preassigned server to transmit the received image data, appended the specified file name, into the specified folder at the specified image server on the Internet, instead. Also in this case, the electronic instrument can download the image data assigned with the specified file name from the specified folder on the image server specified by itself.

In the embodiment described above (see FIGS. 98 and 113), short-distance communication between the electronic camera and a portable instrument carried by a subject is executed while obtaining image data through a photographing operation, or either immediately before or after the photographing operation, to automatically transfer the image data upload information to the portable instrument, which eliminates the need for performing a special operation such as manually writing down the upload information and also ensures that the image data upload information is transmitted to the portable instrument of a person highly likely to be a subject photographed in the image data.

In the embodiment described above (see FIGS. 98 and 113), image data are not directly exchanged between the electronic camera used to obtain the image data through a photographing operation and the portable telephone which is the ultimate recipient of the image data and as a result, the electronic camera does not need to adjust the image data in conformance to various image display specifications of different portable telephones or to engage in communication with the individual portable telephones over an extended period of time in order to transfer the image data to multiple users. Thus, the onus placed on the electronic camera is reduced.

In the embodiment described above (see FIGS. 98, 123 and 128), image data upload information is exchanged between the electronic camera and an electronic instrument through short-distance wireless communication. As a result, the likelihood of communicating with limited partners such as a portable telephone carried by a subject and a printer in the vicinity of the electronic camera is increased and, at the same time, the likelihood of communicating with an irrelevant electronic instrument present at a large distance from the electronic camera is practically eliminated. In addition, since the signal transmission output level for the wireless communication is adjusted in conformance to the focal length of the photographic lens, a reliable wireless communication with a subject is achieved while reducing the likelihood of wirelessly communicating with a party other than the subject.

In the embodiment described above (see FIGS. 98, 123 and 128), image data upload information is exchanged between the electronic camera and an electronic instrument through short-distance wireless communication. Since the short-distance wireless communication is achieved at a lower information transmission rate than that of a wireless portable telephone line, the structure of the short-distance wireless communication circuit can be simplified, thereby making it possible to reduce the cost of the electronic camera and the cost of the portable telephone and also to reduce their sizes.

In the embodiment described above (see FIGS. 98, 128), the electronic camera which only needs to upload image data obtained through a photographing operation to an image server on the Internet and does not need to individually transmit the image data to a plurality of electronic instruments is able to start the next photographing operation immediately after the image data upload. In addition, since each portable telephone downloads the image data through the image server with a high transmission capability, the individual electronic instruments can download the image data simultaneously at high speed and the downloaded image data can be promptly reviewed at the individual electronic instruments.

In the embodiment described above (see FIGS. 98 and 128), thumbnail image data corresponding to a specific set of image data are transmitted by the electronic camera to the electronic instrument while the image data upload information is exchanged between the electronic camera and the electronic instrument through a wireless communication. Thus, the basic contents of the image data can be checked at the electronic instrument prior to downloading of an image data by reviewing the thumbnail image data and if necessary, an action such as cancellation of the downloading can be taken.

In the embodiment described above (see FIGS. 112 and 113, the electronic camera generates thumbnail image data correspondence to image data being obtained through a photographing operation, uploads the image data to an image server on the Internet and saves the upload information, appended to the thumbnail image data, in the electronic camera. As a result, desirable image data can be selected and promptly downloaded from the image server for use.

In the embodiment described above (see FIGS. 126 and 127), the wireless communication directivity of the wireless communication circuit 710 is restricted so that the directivity manifests in a direction along which a subject is highly likely to be present relative to the electronic camera main unit by using an electromagnetic shield film or the like. Thus, reliable wireless communication with the portable telephone carried by the subject can be achieved to exchange the image data upload information between the electronic camera and the subject's portable telephone through wireless communication and, at the same time, the likelihood of wirelessly communicating with a party other than the subject is reduced.

In the embodiment described above (see FIG. 128), the image data are ultimately saved at the image server specified by the subject. As a result, the subject is relieved from the task of saving the image data at his own image server, whereas the electronic camera is able to start the next photographing operation immediately after the image data upload since it only needs to upload the image to a single preassigned image server.

(Examples of Variations)

The present invention is not limited to the embodiment described above and allows for numerous variations and modifications.

In the embodiment described above (see FIGS. 98, 99, 123 and 128), the electronic camera uploads image data to an image server on the Internet and a portable telephone downloads the image data from this image server. However, the image server does not necessarily need to be one on the Internet, and it may be an image server on a local communication network, instead. For instance, the present invention may be adopted in a system in which an image server set up on a wireless LAN (local area network) conforming to the IEEE 802 standard is accessed by electronic cameras and portable telephones (electronic instruments) to upload and download image data.

In reference to the embodiment (see FIGS. 98, 123 and 128), an information transmission system and an information transmission method, through which image data obtained through a photographing operation performed at an electronic camera are delivered to a portable telephone carried by a subject or a printer, are described. However, the present invention is not limited to the application in image data transmission, and it may be adopted in general information transmission between an information sender and an information recipient present in close proximity to each other. For instance, the present invention may be adopted in an audio data transmission between an information sender that is an audio recording apparatus and an information recipient that is a portable telephone, in which audio data recorded by the audio recording apparatus are transmitted to the portable telephone via an audio server on the Internet.

In the embodiment described above (see FIGS. 98 and 123), the electronic camera uploads image data to an image server on the Internet and a portable telephone (electronic instrument) downloads the image data from this image server. However, the electronic camera may transmit the electronic instrument identification information of each electronic instrument with which communication has been achieved, together with the image data, to the image server and the image server, in turn, may only allow a download of the image data by the electronic instruments corresponding to the identification information thus received, in order to restrict recipients allowed to download the image data from the image server. In this case, an unauthorized image data download from the image server is prevented for privacy protection.

In the embodiment described above (see FIGS. 98 and 123), the electronic camera uploads image data to an image server on the Internet and a portable telephone downloads the image data from this image server. However, the portable telephone may transfer the upload information received from the electronic camera to another electronic device (e.g., a personal computer belonging to the subject) to download the image data by accessing the image server from the other electronic device, instead. In this case, the image data can be reviewed on a screen larger than the portable telephone screen and also a sufficient memory capacity for saving the image data can be assured.

In the embodiment described above (see FIGS. 98 and 123), the electronic camera uploads image data to an image server on the Internet and a portable telephone (electronic instrument) downloads the image data from this image server. Instead, the electronic camera may transmit the electronic instrument identification information of each electronic instrument with which communication has been achieved, together with the image data to the image server, and the image server, in turn, may transmit the image data (in a push-type information transmission) to the electronic instrument corresponding to the identification information by issuing a transmission request to the electronic instrument based upon the identification information. In such a case, since the electronic camera and the electronic instrument do not exchange the image data upload information and the image data are transmitted (pushed) to the specific electronic instrument only, privacy is protected and, at the same time, the image data recipient is relieved of the task of reading out the image data.

In the embodiment described above (see FIGS. 98 and 123), the electronic camera and a portable telephone (electronic instrument) exchange the image data upload information (the image server address information and the image data identification information), the electronic camera uploads the image data to the image server on the Internet and the portable telephone (electronic instrument) downloads the image data from the image server. However, the configuration described below may be adopted to provide an image service system in which electronic cameras are installed at a plurality of photographing points in a larger premises such as a theme park, a guest having taken a picture at a desired photographing point downloads the image data obtained through the photographing operation from an image server. Namely, each camera does not need to include an internal means for communication to communicate with a portable telephone carried by the guest but is instead paired with a means for communication installed separately from the electronic camera, image data obtained through a photographing operation executed with a given electronic camera by a guest are appended with specific identification information and are saved at a specific image server and the image server address information and the image data identification information are transmitted to the portable telephone of the guests by the means for communication. In addition, by restricting the photographing position at which a guest can be photographed during a photographing operation and installing the means for communication provided as a separate member from the electronic camera at a position near the guest being photographed, the communication output can be lowered to prevent any interference from an electronic device other than the portable telephone of the guest who is the subject.

Furthermore, when offering image services such as those described above in a theme park or the like, a special electronic instrument for exclusive use in conjunction with the image transmission system according to the present invention may be offered to each guest at the time of admission to ensure that image data are transmitted to the guest who is photographed in the image data with a high degree of reliability by preventing interference from other electronic devices. In an image transmission system in which the photographing side, the image recipient side and the image server are fixed as described above, it is not necessary to provide the image recipient side with the image server address information, and the image recipient side only needs to be provided with the image data identification information. In this case, the image server address information is fixed and stored within the electronic cameras, the means for communication and the electronic instrument for exclusive use within the property.

Alternatively, the identification information of the special electronic instrument carried by each guest may be transmitted by the electronic instrument to the means for communication so that each set of image data, appended with the corresponding electronic instrument identification information is saved into the image server. In this case, no image data identification information needs to be transmitted to the special electronic instrument carried by the guest. Namely, the electronic instrument identification information is transmitted to the photographing side from the special electronic instrument during the photographing operation and the identification information is appended to the image data and is saved into the image server. The image server, accessed by the special electronic instrument carried by the guest, only needs to download the image data corresponding to the electronic instrument identification information to the electronic instrument. As an alternative, the image server may forcibly transmit the image data to the special electronic instrument corresponding to the identification information appended to the image data. In this case, the volume of data exchanged between the image data photographing side and the image data recipient side and the types of information exchanged between them can both be reduced. In addition, since the communication is conducted by using the special electronic instrument for exclusive use within the property, interference from other electronic devices can be prevented to improve the reliability of the communication.

In the embodiment described above (see FIGS. 98 and 123), the electronic camera and a portable telephone (electronic instrument) exchange the image data upload information (the image server address information and the image data identification information), the electronic camera uploads the image data to the image server on the Internet based upon the upload information and the portable telephone (electronic instrument) downloads the image data from the image server based upon the upload information. However, the upload information does not need to include the image data identification information and may be constituted of the image server address information alone, instead. In this case, the portable telephone connects with the image server to which the image data have been uploaded based upon the image server address information, either manually or automatically searches for desired image data based upon the photographing data and the like after the connection is achieved and downloads the image data selected through the search from the image server. Since this eliminates the need for storing in memory identification information for each set of image data at the portable telephone, a means for storage with a small storage capacity can be utilized in the portable telephone.

In the embodiment described above (see FIG. 98), the electronic camera and a portable telephone (electronic instrument) exchange the image data upload information (the image server address information and the image data identification information), the electronic camera uploads the image data to the image server on the Internet and the portable telephone (electronic instrument) downloads the image data from the image server. Instead, the electronic camera may transmit the image server address information to the portable telephone and receive the portable telephone identification information (the telephone number or the like) from the portable telephone during the photographing operation, generate identification information for the image data based upon the portable telephone identification information and upload the image data appended with the identification information thus generated to the image server. In this case, when the image server is accessed by the subject's portable telephone, the portable-telephone-identification information is provided to the image server so that the image data appended with the identification information corresponding to the portable telephone identification information are downloaded to the portable telephone. In addition, the electronic camera may generate image data identification information (an image data filename or the like) in combination with other photographing information (e.g., the photographing date/time point (date and time) information) as well as the portable telephone identification information.

In the variation described above, it is not necessary to store in memory the image-data-identification information for each set of image data at the portable telephone and the subject carrying the portable telephone is allowed to download all the image data in which the subject is photographed simply by notifying the image server of the portable telephone number.

In addition, the portable telephone may access the image server by specifying a given photographing date/time point to selectively download the image data photographed at the photographing date/time point specified by the subject carrying the portable telephone. Furthermore, the image server may keep track of a download history (portable telephone numbers of download recipients, download date/time points, etc.) for each set of image data so that when a portable telephone accesses the image server by specifying the download history, image data that have never been downloaded to the mobile telephone or image data that have not been downloaded over a predetermined length of time can be selectively downloaded.

In this case, the portable telephone is able to selectively download specific image data without having to store in memory the identification information for each set of image data.

In the embodiment described above (see FIG. 98), the image data upload information is exchanged through a wireless (electromagnetic wave) communication between the electronic camera and an electronic instrument carried by a subject. During this process, a redundant communication with electronic instruments carried by parties other than the true subject should be prevented by keeping the wireless-transmission-signal output level within a range lower than a predetermined value and thus limiting the communication-enabled distance range based upon the assumption that electronic instruments have the average reception capability. This distance range is determined by taking into consideration the standard manner in which the electronic camera is electronic apparatus is used, whether or not an object that blocks electromagnetic waves is present between the electronic camera and the electronic instrument, the performance of the receiver at the electronic instrument and the like. It is desirable to set the distance range to approximately 10 m or less in correspondence to the focal length of the standard photographic lens.

In the embodiment described above (see FIGS. 98, 123 and 128), the wireless communication circuit engages in communication through a short-distance wireless system such as Bluetooth. However, the short-distance wireless communication may be achieved through a system other than Bluetooth, such as a wireless LAN (IEEE802.11) or infrared communication (IrDA). Furthermore, communication may be achieved by simultaneously utilizing a plurality of short-distance wireless systems. In the latter case, an electronic instrument with any type of short-distance wireless function carried by a subject, can engage in wireless communication with the electronic camera.

In the embodiment described above (see FIGS. 98, 123 and 128), the image data upload information is exchanged through a wireless (electromagnetic wave) communication between the electronic camera and the electronic instrument carried by the subject. However, the image data upload information may instead be exchanged through another non-contact or contact method.

In the embodiment described above (see FIGS. 98, 123 and 128), the electronic camera attempts short-distance wireless communication with electronic instruments in the vicinity of the electronic camera in order to exchange image data upload information. The electronic camera, however, may be preset so as to disallow any wireless communication with an electronic instrument carried by the photographer operating the electronic camera.

In the embodiment described above (see FIGS. 98 and 123), an electronic instrument having obtained upload information from the electronic camera through communication between the electronic camera and the electronic instrument accesses the image server to which image data have been uploaded based upon the upload information and downloads desired image data from the image server. Instead, during the communication between the electronic camera and the electronic instrument, the electronic camera may obtain the identification information of the electronic instrument and provide the electronic instrument identification information thus obtained to the image server before the electronic instrument accesses the image server. In this case, the image server enables exclusive access by the electronic instrument corresponding to the identification information received from the electronic camera on a specific condition. The specific condition may be a specific length of time allowed to elapse after the electronic instrument identification information is received from the electronic camera or a specific limit on the number of image data downloads. These measures prevent an electronic instrument that has not communicated with the electronic camera from downloading image data from the image server. In addition, by limiting the time period during which a given set of image data can be downloaded or the number of times the data can be downloaded, the risk of a third-party downloading the image data from the image server by using the same electronic instrument later on is reduced.

In the embodiment described above (see FIGS. 98, 123 and 128), information (the image server address information, the image data identification information, the electronic instrument identification information and the like) exchange through wireless (electromagnetic wave) communication between the electronic camera and the electronic instrument carried by the subject. However, prior to the information exchange, an open key to be used to code the information may be transmitted from the information recipient to the information sender, the information sender may transmit the information coded by using the open key and the information recipient may decode the received information by using a secret key coupled with the open key. In this case, even if the information exchanged between the electronic camera and the electronic instrument is intercepted by another electronic instrument, the information remains secure.

In the embodiment described above (see FIG. 98), the electronic camera attempts wireless communication with electronic instruments present in the vicinity of the electronic camera to exchange the image data upload information during a photographing operation. During this process, the transmission signal output level for the wireless communication (electromagnetic waves, infrared light) may be adjusted in conformance to the subject distance (the output level is raised as the distance to the subject increases). The distance to a subject can be obtained through a detection performed by a distance detection device of the known art, or a photographing distance of the photographic lens which is manually set may be used as the subject distance. Through this output level adjustment, the electronic camera is able to achieve communication with the electronic instrument held by a subject with a high degree of reliability and the likelihood of achieving communication with an electronic instrument held by a party other than the subject is reduced.

In the embodiment described above (see FIG. 99), the electronic camera uploads image data obtained through a photographing operation to an image server on the Internet through its internal-wireless-telephone circuit. Instead, the electronic camera may first transmit the image data to a portable telephone carried by the photographer operating the electronic camera through short-distance wireless communication and the photographer's portable telephone may upload the image data to the image server on the Internet through a wireless telephone line. Since this eliminates the need to provide an internal wireless telephone circuit at the electronic camera, the electronic camera can be miniaturized and further advantages related to power consumption and cost are also achieved.

In the embodiment described above (see FIG. 99), the electronic camera uploads image data obtained through a photographing operation to a selected image server. However, image data may be uploaded to a fixed image server instead. For instance, by setting up a fixed image server to be exclusively used for image data upload, marketing an electronic camera in a package in which image services are offered through the image server and ensuring all the images photographed with the camera are uploaded to the image server, the purchaser of the electronic camera is relieved from the task of signing up with an image server himself and the camera can be operated with ease even by users not familiar with the Internet or the like. It is to be noted that the address information of the fixed image server is stored in an nonvolatile memory such as an EEPROM in the electronic camera.

In the embodiment described above (see FIG. 112), the electronic camera automatically downloads all image data photographed in the photographing mode to the image server (the download recording mode). However, the electronic camera may be allowed to assume another photographing mode (a recording mode for memory cards) for recording photographed image data into a memory card loaded at the electronic camera and may be manually or automatically switched to the download recording mode or the memory card recording mode. For instance, the electronic camera having been operated in the recording mode may be automatically switched to the download recording mode as the remaining capacity of the memory card becomes low or the electronic camera having been operated in the download recording mode may be automatically switched to the recording mode when the electronic camera moves out of the wireless telephone line communication range. Such features allow the photographer to take pictures with the electronic camera without having to worry about state of the memory card or the state of the wireless telephone line.

In addition, image data may be uploaded to the image server and also saved into the memory card at the same time under normal circumstances, and either the upload or the save may be skipped as necessary. This eliminates the need to create an image data back-up later on and thus, the image data can be saved with a higher degree of reliability.

In the embodiment described above (see FIGS. 112 and 113), the image data upload information is exchanged between the electronic camera and the electronic instrument through short-distance wireless communication and then the electronic camera uploads the image data to the image server. However, this order may be reversed, i.e., the electronic camera may first upload the image data to the image server and then the image data upload information may be exchanged between the electronic camera and the electronic instrument through a short-distance wireless communication.

In the embodiment described above (see FIGS. 112 and 113), a photographing operation is executed in response to an operation of the shutter release button provided at the electronic camera. However, a photographing operation in the electronic camera may be started up through short-distance wireless communication in response to remote control implemented from a portable telephone carried by a person to be photographed. In this case, the short-distance wireless circuit can be effectively utilized and, at the same time, the photographing operation can be executed with the timing desired by the subject.

In the embodiment described above (see FIGS. 113 and 119), the short-distance wireless communication between the electronic camera and an electronic instrument in the vicinity is initiated by the electronic camera to transmit the image data upload information to the electronic instrument from the electronic camera. However, a communication request may be first issued to the electronic camera from an electronic instrument carried by the subject and then the image data upload information may be transmitted by the electronic camera to the electronic instrument, instead. For instance, a request for the image data upload information may be issued from the portable telephone 160 to an electronic camera in its vicinity in response to a specific operation of an operating key 162 at the portable telephone 160 shown in FIG. 102. Since this enables the subject side to initiate the short-distance wireless communication between the electronic camera and the portable telephone, the electronic camera does not need to engage in short-distance wireless communication each time a photographing operation is performed unless necessary and thus, the electronic camera can perform the next photographing operation immediately after the photographed image data are uploaded to the image server.

In the embodiment described above (see FIGS. 113 and 119), the image data upload information is exchanged through wireless (electromagnetic wave) communication between the electronic camera and the electronic instrument carried by the subject. During this wireless communication, the electronic instrument having received search messages from the electronic camera may display a message indicating a communication from the electronic camera has been received or such a message may be provided to the subject via a means for sound generation on the subject side.

Such measures make it possible for the subject to verify that a communication from the electronic camera has been received. In addition, the subject, i.e., the user, provided with an audio message, can verify that communication from the electronic camera has been received while keeping the electronic instrument which may not include a means for display in a pocket or the like. In addition, the subject having verified that the communication has been received may refuse to download the image data if necessary by cutting off further communication.

In the embodiment described above (see FIGS. 113 and 119), the image data upload information is automatically exchanged through wireless communication between the electronic camera and the electronic instrument held by the subject. However, the electronic instrument having received the search communication from the electronic camera may compare the identification number of the electronic camera initiating the search communication with the identification numbers of electronic cameras preregistered at the electronic instrument and may refuse any further communication with the electronic camera if it is determined to be an unregistered camera. In this case, the subject can reject any image data photographed by a stranger.

In the embodiment described above (see FIGS. 113, 119 and 122), the image data upload information is exchanged between the electronic camera and an electronic instrument through wireless communication. During the wireless communication, the electronic camera may transmit information on the specifications (the data volume, the recording format, the image aspect ratio, the number of pixels, etc.) to the electronic instrument to allow the electronic instrument side to decide whether or not the image are to be downloaded in correspondence to a specific purpose of use for the image data based upon the received image data specification information. For instance, if the party on the electronic instrument side only wishes to review image data displayed at the screen of his portable telephone, he may choose to download image data with a small data volume or a small number of pixels.

In the embodiment described above (see FIG. 113), the image data upload information is automatically exchanged between the electronic camera and the electronic instrument held by a subject through wireless communication during a photographing operation. Instead, photographed image data may be saved into a RAM or a memory card on a temporary basis, a series of sets of image data may be uploaded to the image server and the image data upload information may be exchanged between the electronic camera and the electronic instrument held by the subject through wireless communication when a series of photographing operations has been completed. Since this eliminates the need to upload the image data and engage in wireless communication each time one of a plurality of pictures taken without changing the composition (as in an exposure bracket photographing operation) is photographed, the series of pictures can be taken quickly. Then, after the series of photographing operations is completed or the like, the plurality of sets of image data can be uploaded in a batch and the upload information with regard to the plurality of sets of image data can be exchanged through a single wireless communication, either automatically or manually.

In the embodiment described above (see FIG. 113), image data are uploaded to the image server and the electronic camera and the electronic instrument held by the subject engage in wireless communication every time a photographing operation is performed. However, the image data upload operation and the wireless communication operation may be disallowed if the image data upload and the wireless communication are likely to cause a delay in the photographing operation. For instance, by automatically disallowing the image data upload operation and the wireless communication operation when performing a continuous photographing (continuous shooting) operation, it is possible to prevent any significant lag attributable to the image data upload operation and the wireless communication operation from manifesting between the image frames obtained through the continuous photographing operation. In this case, the image data obtained through the continuous photographing operation should be saved into RAM or a memory card on a temporary basis so that the series of image data can be uploaded in a batch to the image server and the image data upload information can be exchanged between the electronic camera and the electronic instrument held by the subject through wireless communication either automatically or manually after the series of pictures are taken.

In the embodiment described above (see FIG. 122), the upload information and the print instruction information corresponding to the image data to be printed are transmitted to the printer from the electronic camera in response to an operation of the PRINT button. The print instruction information transmitted through this process may include information on various printer settings (such as the print size, the print quality and the printing color).

In the embodiment described above (see FIG. 122), the upload information and the print instruction information corresponding to the image data to be printed are transmitted to the printer from the electronic camera in response to an operation of the PRINT button. Instead, in response to PRINT button operation, the electronic camera may obtain from the printer the identification information (an IP address) used to identify the printer on the network and may transmit this identification information to the image server to enable the image server to transmit the image data to be printed to the printer corresponding to the identification information. In this case, it is not necessary to store image data at the electronic camera and, at the same time, image data to be printed can be quickly transmitted to the printer to undergo a print operation.

In the third embodiment described above, information (address information) with regard to an upload of information (image) to an information server (image server) on the Internet is exchanged through short-distance communication between the information (image) sender side and the information (image) recipient side, the information (image) is first uploaded to the information server on the Internet from the information (image) sender side and the information (image) recipient side downloads for a utilization the information (image) from the Information server (image server) on the Internet to which the information (image) has been uploaded. Thus, an information transmission system (image transmission system) and an information transmission method (image transmission method) that enable a speedy transmission of the information (image) to the information (image) recipient side without placing a great onus on the information (image) sender side during the information (image) transmission are provided.

In particular, when a group picture is taken with an electronic camera system that handles image data with a large data volume and the image data obtained through the photographing operation need to be delivered to portable telephones or the like of the plurality of subjects, the electronic camera is only required to execute the processing for transmitting the upload information to the individual portable telephones through short-distance communication and the processing for uploading the image data to the image server on the Internet, the onus of having to transmit the image data to the individual portable telephones through short-distance communication with the portable telephone is lifted from the electronic camera and the desired image data can be obtained promptly at each portable telephone as well.

The various programs explained in reference to the embodiments can be provided in a recording medium such as a CD-ROM or through data signals on the Internet. For instance, a program executed on the personal computer 140 in FIG. 1 may be read from a CD-ROM drive device (not shown) mounted at the personal computer 140. If a program installed at the electronic camera 100 or the portable telephone 160 can be overwritten, the electronic camera 100 or the portable telephone 160 may connect with the personal computer 140 to download an upgrade program. The programs may be downloaded via the Internet 130 by adopting the configuration shown in FIG. 1 as well. By setting up an application program server in place of the image sever 150 in the configuration, the programs may be downloaded from this server via the Internet. When providing the programs via the Internet, they are embodied as data signals on a carrier wave to be transmitted via a communication line. Thus, programs can each be distributed as a computer-readable computer program product assuming any of the various modes such as a recording medium or carrier wave.

What is claimed is:

1. A mobile electronic device comprising:
   an image sensor that outputs image data from an image of a subject received through a lens of the mobile electronic device;
   a first communication circuit that transmits the image data to a server; and
   a second communication circuit different from the first communication circuit and that transmits information by which to obtain the image data from the server to a first electronic device so that the image data can be obtained from the server by the first electronic device using the information by which to obtain the image data.

2. The mobile electronic device according to claim 1, wherein:
   the second communication circuit transmits the information by which to obtain the image data to the first electronic device based on a first identification information identifying the first electronic device.

3. The mobile electronic device according to claim 2, wherein:
   the second communication circuit transmits the information by which to obtain the image data to the first electronic device based on the first identification information received from the first electronic device.

4. The mobile electronic device according to claim 3, wherein:
   a second identification information identifying the mobile electronic device is transmitted to the first electronic device by the second communication circuit, and
   the second communication circuit transmits the information by which to obtain the image data to the first electronic device based on the first identification information received from the first electronic device which received the second identification information.

5. The mobile electronic device according to claim 4, wherein:
   the second communication circuit has a plurality of different wireless communication circuits and performs a communication which transmits and receives (i) the first identification information, (ii) the second identification information, and (iii) the information by which to obtain the image data between the mobile electronic device and the first electronic device by the plurality of different wireless communication circuits.

6. The mobile electronic device according to claim 1, wherein:
the second communication circuit transmits the information by which to obtain the image data to the first electronic device not via a second electronic device which is different from the mobile electronic device and the first electronic device.

7. The mobile electronic device according to claim 1, wherein:
the second communication circuit transmits the information by which to obtain the image data to the first electronic device by a short-distance wireless communication.

8. The mobile electronic device according to claim 6, wherein:
the first communication circuit transmits the image data to the server via a base station or an internet.

9. The mobile electronic device according to claim 7, wherein:
the first communication circuit transmits the image data to the server via a base station or an internet.

10. The mobile electronic device according to claim 1, further comprising:
a display that displays a first displaying information by which to select the first electronic device, wherein
the second communication circuit transmits the information by which to obtain the image data to the first electronic device upon selection of the first displaying information.

11. The mobile electronic device according to claim 10, wherein:
the display displays a plurality of displaying information, including the first displaying information, by which to select each of a plurality of electronic devices, including the first electronic device, and
the second communication circuit transmits the information by which to obtain the image data to the first electronic device upon selection of the first displaying information among the plurality of the displaying information displayed by the display.

12. The mobile electronic device according to claim 11, wherein:
the display has a touch panel that detects a selection for a displaying information among the plurality of the displaying information displayed by the display.

13. The mobile electronic device according to claim 11, wherein:
the second communication circuit transmits the information by which to obtain the image data to the plurality of the electronic devices.

14. The mobile electronic device according to claim 3, further comprising:
a display that displays a first displaying information by which to select the first electronic device identified by the first identification information based on the first identification information received by the second communication circuit, wherein
the second communication circuit transmits the information by which to obtain the image data to the first electronic device upon selection of the first displaying information.

15. The mobile electronic device according to claim 14, wherein:

the second communication circuit receives a plurality of identification information, including the first identification information, identifying each of a plurality of electronic devices, including the first electronic device, and
the display displays a plurality of displaying information, including the first displaying information, by which to select each of the plurality of the electronic devices based on the plurality of the identification information, wherein
the second communication circuit transmits the information by which to obtain the image data to the first electronic device upon selection of the first displaying information among the plurality of the displaying information displayed by the display.

16. The mobile electronic device according to claim 3, wherein:
the second communication circuit receives the first identification information from the first electronic device not via a second electronic device which is different from the mobile electronic device and the first electronic device.

17. The mobile electronic device according to claim 16, wherein:
the second communication circuit transmits the information by which to obtain the image data to the first electronic device not via the second electronic device which is different from the mobile electronic device and the first electronic device.

18. The mobile electronic device according to claim 17, wherein:
the first communication circuit transmits the image data to the server via a base station or an internet.

19. The mobile electronic device according to claim 17, further comprising:
a display that displays a first displaying information by which to select the first electronic device identified by the first identification information based on the first identification information received by the second communication circuit, wherein
the second communication circuit transmits the information by which to obtain the image data to the first electronic device upon selection of the first displaying information.

20. The mobile electronic device according to claim 19, wherein:
the second communication circuit receives a plurality of identification information, including the first identification information, identifying each of a plurality of electronic devices, including the first electronic device, and
the display displays a plurality of displaying information, including the first displaying information, by which to select each of the plurality of the electronic devices based on the plurality of the identification information, wherein
the second communication circuit transmits the information by which to obtain the image data to the first electronic device upon selection of the first displaying information among the plurality of the displaying information displayed by the display.

21. The mobile electronic device according to claim 1, wherein:
the information by which to obtain the image data is a lesser amount of data than the image data.

22. A first system comprising:
the mobile electronic device according to claim 1, and the first electronic device, wherein
the first electronic device has (i) a third communication circuit which receives the information by which to obtain the image data, which is transmitted by the second communication circuit and (ii) a fourth communication circuit which receives the image data from the server using the information by which to obtain the image data, the fourth communication circuit being different from the third communication circuit.

23. The first system according to claim 22, wherein:
the fourth communication circuit receives the image data from the server not via the mobile electronic device.

24. The first system according to claim 23, wherein:
the third communication circuit receives the information by which to obtain the image data from the mobile electronic device not via a second electronic device which is different from the mobile electronic device and the first electronic device.

25. The first system according to claim 24, wherein:
the first communication circuit transmits the image data to the server via a base station or an internet, and
the fourth communication circuit receives the image data from the server via the base station or the internet.

26. The first system according to claim 22, wherein:
the first electronic device has a display that displays an image based on the image data received by the fourth communication circuit.

27. A second system comprising:
the first system according to claim 22, and
the server.

28. The second system according to claim 27, wherein:
the server has at least a first server and a second server,
the first server receives the image data transmitted by the first communication circuit, and
the second server transmits the image data to the first electronic device.

29. A system comprising:
the mobile electronic device according to claim 1, and
the server.

30. The system according to claim 29, wherein:
the server has at least a first server and a second server,
the first server receives the image data transmitted by the first communication circuit, and
the second server transmits the image data to the first electronic device.

* * * * *